United States Patent
Lee et al.

(10) Patent No.: US 9,389,737 B2
(45) Date of Patent: Jul. 12, 2016

(54) DISPLAY DEVICE AND METHOD OF DRIVING THE SAME IN TWO MODES

(71) Applicant: Samsung Display Co., Ltd., Yongin (KR)

(72) Inventors: Kangwon Lee, Seoul (KR); Incheol Kim, Goyang-si (KR); Ung Choi, Asan-si (KR); Won-ki Hong, Suwon-si (KR); Seungho Nam, Seongnam-si (KR); Jihong Park, Suwon-si (KR); Chul Kim, Hwaseong-si (KR); Hojin Byun, Suwon-si (KR); Kiseok Cha, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 160 days.

(21) Appl. No.: 14/024,241

(22) Filed: Sep. 11, 2013

(65) Prior Publication Data
US 2014/0078104 A1   Mar. 20, 2014

Related U.S. Application Data

(60) Provisional application No. 61/701,100, filed on Sep. 14, 2012.

(30) Foreign Application Priority Data

Feb. 27, 2013  (KR) .................. 10-2013-0021423
Feb. 27, 2013  (KR) .................. 10-2013-0021426
May 16, 2013  (KR) .................. 10-2013-0055845

(51) Int. Cl.
G06F 3/044   (2006.01)
G06F 3/041   (2006.01)
G09G 3/20   (2006.01)

(52) U.S. Cl.
CPC .............. *G06F 3/044* (2013.01); *G06F 3/0412* (2013.01); *G09G 3/20* (2013.01); *G09G 2300/023* (2013.01)

(58) Field of Classification Search
CPC ......... G06F 3/044; G06F 3/0412; G09G 3/20; G09G 2300/023
See application file for complete search history.

(56) References Cited

U.S. PATENT DOCUMENTS

| 4,686,332 A | 8/1987 | Greanias et al. |
| 4,878,553 A | 11/1989 | Yamanami et al. |
| 6,160,539 A * | 12/2000 | Fleck ................ G06F 3/0488 345/173 |

(Continued)

FOREIGN PATENT DOCUMENTS

| DE | 10 2012 100 320 | 8/2012 |
| JP | 07-160419 | 6/1995 |

(Continued)

*Primary Examiner* — Lun-Yi Lao
*Assistant Examiner* — Elliott Deaderick
(74) *Attorney, Agent, or Firm* — H.C. Park & Associates, PLC

(57) ABSTRACT

A display device includes a display panel and a touch panel. The touch panel calculates coordinate information of an input position by an electrostatic capacitive method in a first mode and calculates the coordinate information of the input position by an electromagnetic induction method in a second mode. The touch panel includes scan line groups and source line groups, which are operated as touch electrodes or touch coils on the basis of the operating mode thereof. In addition, the touch panel includes touch electrodes and touch coils, which are individually operated on the basis of the operating mode thereof.

43 Claims, 89 Drawing Sheets

(56) References Cited

U.S. PATENT DOCUMENTS

| | | | |
|---|---|---|---|
| 7,084,933 B2 * | 8/2006 | Oh | G02F 1/13338 178/18.03 |
| 7,292,229 B2 | 11/2007 | Morag et al. | |
| 7,436,393 B2 | 10/2008 | Hong et al. | |
| 7,666,050 B2 * | 2/2010 | Yamashita | G02F 1/133305 445/26 |
| 7,995,041 B2 | 8/2011 | Chang | |
| 8,023,780 B2 | 9/2011 | Juni | |
| 8,089,475 B2 * | 1/2012 | Ito | G06F 3/03545 178/18.06 |
| 2008/0062139 A1 | 3/2008 | Hotelling et al. | |
| 2009/0167713 A1 | 7/2009 | Edwards | |
| 2009/0273572 A1 | 11/2009 | Edwards et al. | |
| 2010/0026655 A1 | 2/2010 | Harley | |
| 2010/0051356 A1 | 3/2010 | Stern et al. | |
| 2010/0085325 A1 | 4/2010 | King-Smith et al. | |
| 2010/0155153 A1 | 6/2010 | Zachut | |
| 2010/0328249 A1 | 12/2010 | Ningrat et al. | |
| 2011/0018840 A1 | 1/2011 | Fann et al. | |
| 2011/0122087 A1 | 5/2011 | Jang et al. | |
| 2011/0175834 A1 | 7/2011 | Han et al. | |
| 2011/0216030 A1 | 9/2011 | Lee | |
| 2011/0279408 A1 | 11/2011 | Urano et al. | |
| 2011/0298748 A1 | 12/2011 | Chen et al. | |
| 2012/0056664 A1 | 3/2012 | Nam | |
| 2012/0092577 A1 * | 4/2012 | Shi | G02F 1/13338 349/43 |
| 2012/0105362 A1 * | 5/2012 | Kremin | G06F 3/03545 345/174 |
| 2012/0154326 A1 | 6/2012 | Liu | |
| 2012/0154327 A1 | 6/2012 | Liu | |
| 2012/0169400 A1 | 7/2012 | Liu | |
| 2012/0169663 A1 | 7/2012 | Kim et al. | |
| 2012/0262411 A1 | 10/2012 | Ahn et al. | |

FOREIGN PATENT DOCUMENTS

| | | |
|---|---|---|
| JP | 08-179871 | 7/1996 |
| JP | 2000-172447 | 6/2000 |
| JP | 2008-152640 | 7/2008 |
| JP | 2009-162538 | 7/2009 |
| JP | 2010-086542 | 4/2010 |
| JP | 2011-186550 | 9/2011 |
| JP | 2012-519897 | 8/2012 |
| KR | 1020030081729 | 10/2003 |
| KR | 10-0459230 | 12/2004 |
| KR | 10-0628652 | 9/2006 |
| KR | 10-0855476 | 9/2008 |
| KR | 1020090019902 | 2/2009 |
| KR | 1020090028626 | 3/2009 |
| KR | 1020090107640 | 10/2009 |
| KR | 1020100116314 | 11/2010 |
| KR | 1020110022074 | 3/2011 |
| KR | 10-1085776 | 11/2011 |
| KR | 1020120031468 | 4/2012 |
| KR | 1020130051356 | 5/2013 |

* cited by examiner

DISPLAY DEVICE AND METHOD OF DRIVING THE SAME IN TWO MODES

CROSS REFERENCE TO RELATED APPLICATION

This U.S. non-provisional patent application claims priority from and the benefit of U.S. Provisional Patent Application No. 61/701,100, filed on Sep. 14, 2012, Korean Patent Application No. 10-2013-0021423, filed on Feb. 27, 2013, Korean Patent Application No. 10-2013-0021426, filed on Feb. 27, 2013, and Korean Patent Application No. 10-2013-0055845, filed on May 16, 2013, which are hereby incorporated by reference for all purposes as if fully set forth herein.

BACKGROUND

1. Field

Exemplary embodiments of the present disclosure relate to a display device capable of sensing a touch event and a method of driving the display device.

2. Discussion of the Background

In general, a touch panel may acquire coordinate information of an input position at which a touch event occurs and provides the coordinate information to a display panel. The touch panel may be used to replace an input device, such as a keyboard, a mouse, etc.

The display panel displays an image corresponding to the coordinate information provided from the touch panel. The touch panel may be separately manufactured and then attached to the display panel. The touch panel may be classified into a resistive film type of touch panel, k capacitive type of touch panel, and an electromagnetic type of touch panel depending on its operational principle. The display device may include various types of touch panels.

SUMMARY

Exemplary embodiments of the present disclosure provide a display device having a touch panel operated in two modes.

Exemplary embodiments of the present disclosure provide a display device having a touch panel that senses touch events in different ways according to areas of the display device where it senses the touch events.

Exemplary embodiments of the present disclosure provide a method of driving the display device, which is capable of reducing a noise that exerts influences on touch sensitivity.

Additional features of the present disclosure will be set forth in the description which follows, and in part will be apparent from the description, or may be learned by practice of the disclosed subject matter.

Exemplary embodiments of the present disclosure disclose a display device including a display panel, scan line groups, source line groups, a first driver, a second driver, and a touch sensor. The display panel includes a first display substrate and a second display substrate facing the first display substrate. Each scan line group includes a first scan line sub-group, a second scan line sub-group connected to the first scan line sub-group, and a third scan line sub-group disposed between the first scan line sub-group and the second scan line sub-group. Each source line group includes a first source line sub-group, a second source line sub-group connected to the first source line sub-group, and a third source line sub-group disposed between the first source line sub-group and the second source line sub-group. The first driver is configured to provide first scan signals to the scan line groups in a first mode and to provide second scan signals to the scan line groups in a second mode. A magnetic field is induced by a current path formed by the first scan line sub-group and the second scan line sub-group. The second driver is configured to provide first sensing signals corresponding to a variation in a capacitance from the source line groups in the first mode, and to provide second sensing signals according to a resonant frequency associated with an input device. The second sensing signals are provided from the source line groups in the second mode. The touch sensor is configured to receive the first sensing signals and the second sensing signals and to determine coordinate information of an input position based on the first sensing signals and the second sensing signals.

Exemplary embodiments of the present disclosure disclose a display device including a display panel, scan line groups, source line groups, a first driver, a second driver, and a touch sensor. The display panel includes a first display substrate and a second display substrate facing the first display substrate. Each scan line group includes a first scan line sub-group, a second scan line sub-group, and a third scan line sub-group disposed between the first scan line sub-group and the second scan line sub-group. Each source line group includes a first source line sub-group, a second source line sub-group, and a third source line sub-group disposed between the first source line sub-group and the second source line sub-group. The first driver is configured to provide first scan signals to the scan line groups in a first mode and to provide second scan signals to the first scan line sub-group and the second scan line sub-group of the scan line groups in a second mode. A magnetic field is induced by currents flowing through the first scan line sub-group and the second scan line sub-group in opposite directions to each other. The second driver is configured to provide a first sensing signal corresponding to a variation in a capacitance from the source line groups in the first mode, and to provide, from the source line groups in the second mode, a second sensing signal according to a resonant frequency associated with an input device. The touch sensor is configured to receive the first sensing signal and the second sensing signal, and to determine coordinate information of an input position based on the first sensing signal and the second sensing signal.

Exemplary embodiments of the present disclosure disclose a display device including a display panel and a touch panel. The display panel includes a first display substrate and a second display substrate facing the first substrate. The display panel is divided into a blocking area and a plurality of transmitting areas. The touch panel includes a plurality of first touch electrodes, a plurality of second touch electrodes, a plurality of first touch coils, and a plurality of second touch coils. The touch panel includes a first conductive layer and a second conductive layer insulated from the first conductive layer. The touch panel is disposed on one of the first display substrate or the second display substrate that is provided with an input surface. The plurality of first touch electrodes is configured to receive first scan signals. The plurality of second touch electrodes cross the first touch electrodes and is configured to provide first sensing signals according to a variation in capacitance. The plurality of first touch coils overlaps with the blocking area and is configured to receive second scan signals. The plurality of second touch coils overlaps with the blocking area and crosses the first touch coils. The plurality of second touch coils is configured to provide second sensing signals according to a resonant frequency associated with an input device. The first conductive layer includes the first touch electrodes and one of the second touch electrodes and the first touch coils.

Exemplary embodiments of the present disclosure disclose a display device including a display panel and a touch panel.

The display panel includes a first area, a second area, and a plurality of pixels. The display panel is configured to provide an image during a frame period. The touch panel includes a first touch part and a second touch part. The first touch part includes first touch coils and second touch coils. The second touch coils are insulated from the first touch coils and cross the first touch coils. The second touch part includes first touch electrodes disposed on the first touch part and second touch electrodes. The second touch electrodes are insulated from the first touch electrodes and cross the first touch electrodes. Corresponding second scan signals of the second scan signals are applied to the first touch electrodes disposed in the first area when corresponding first scan signals of the first scan signals are applied to the first touch coils disposed in the second area during a first period of the frame period. The second touch coils are configured to provide first sensing signals according to a resonant frequency of an input device. The second touch electrodes are configured to provide second sensing signals according to a variation in capacitance.

Exemplary embodiments of the present disclosure disclose a method of driving a display device comprising a display panel generating an image during a frame period and a touch panel comprising input coils, output coils, input electrodes, and output electrodes. The method includes activating pixels disposed in a first area of the display panel during a first period of the frame period; providing first scan signals to the input coils disposed in a second area adjacent to the first area; providing second scan signals to the input electrodes disposed in the first area of the display panel; and determining coordinate information of an input position from at least one of first sensing signals provided based on a resonant frequency of an input device and output from the output coils, and a second sensing signal provided based on a variation in capacitance and output from the output electrodes.

Exemplary embodiments of the present disclosure disclose a display device including a display panel and a touch panel. The display panel includes a plurality of pixels and is configured to provide an image during a frame period. The frame period includes a display period and a non-display period. The touch panel includes a first touch part and a second touch part. The first touch part includes first touch coils and second touch coils. The second touch coils are insulated from the first touch coils and cross the first touch coils. The second touch part includes first touch electrodes disposed on the first touch part and second touch electrodes. The second touch electrodes are insulated from the first touch electrodes and cross the first touch electrodes. First scan signals are provided to the first touch coils during the display period, and second scan signals are provided to the first touch electrodes during the non-display period. The second touch coils are configured to provide first sensing signals according to a resonant frequency of an input device, and the second touch electrodes are configured to provide second sensing signals according to a variation in capacitance.

It is to be understood that both the foregoing general description and the following detailed description are exemplary and explanatory and are intended to provide further explanation of the disclosed subject matter as claimed.

BRIEF DESCRIPTION OF THE DRAWINGS

The accompanying drawings, which are included to provide a further understanding of the disclosed subject matter and are incorporated in and constitute a part of this specification, illustrate exemplary embodiments of the disclosed subject matter, and together with the description serve to explain the principles of the disclosed subject matter.

DETAILED DESCRIPTION OF THE ILLUSTRATED EMBODIMENTS

Figure 1:
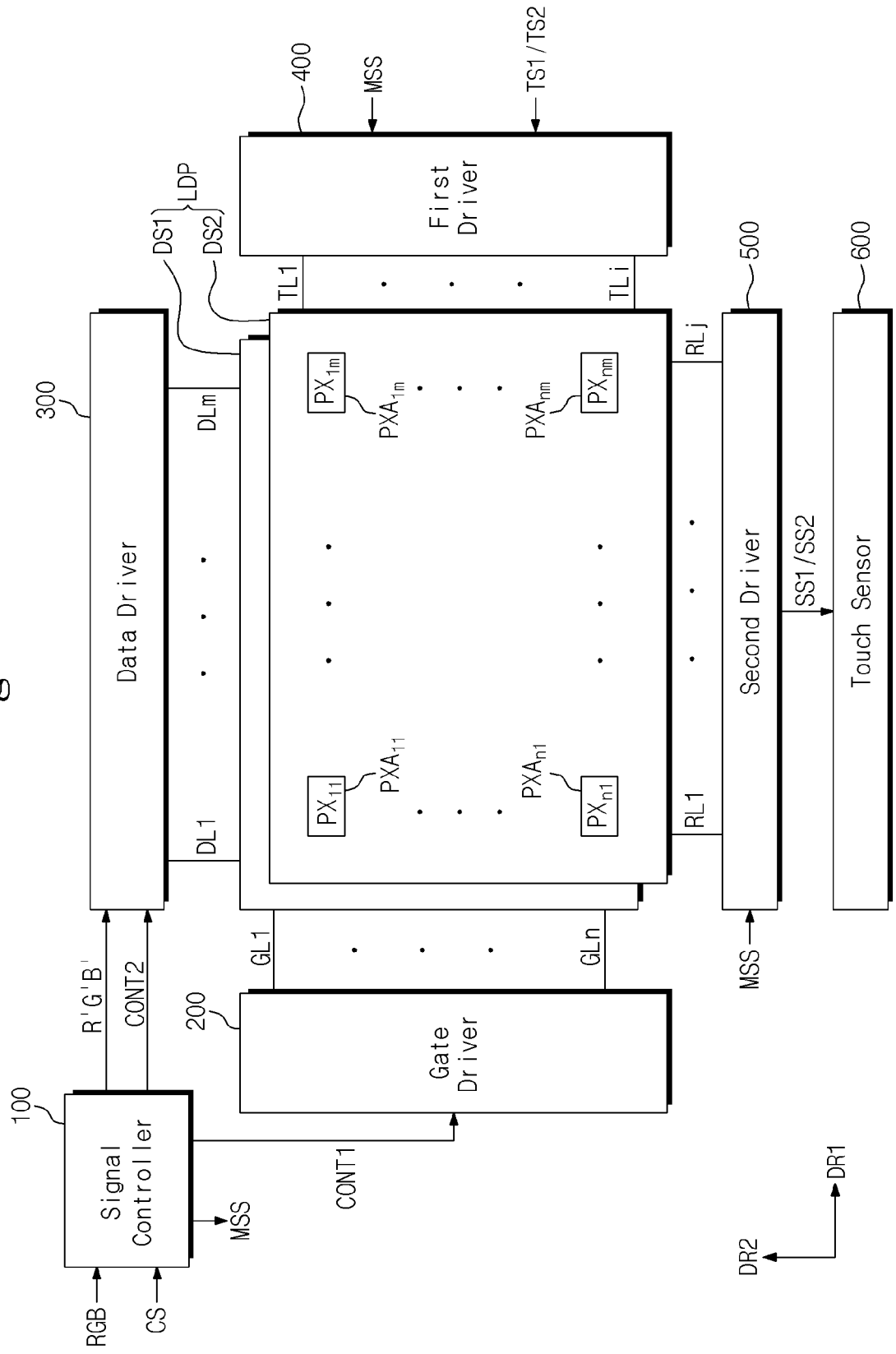
FIG. 1 is a block diagram showing a display device according to exemplary embodiments of the present disclosure.

The disclosed subject matter is described more fully hereinafter with reference to the accompanying drawings, in which exemplary embodiments of the disclosed subject matter are shown. This disclosed subject matter may, however, be embodied in many different forms and should not be construed as limited to the exemplary embodiments set forth herein. Rather, these exemplary embodiments are provided so that this disclosure is thorough, and will fully convey the scope of the disclosed subject matter to those skilled in the art. In the drawings, the size and relative sizes of layers and regions may be exaggerated for clarity. Like reference numerals in the drawings denote like elements.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on," "directly connected to", or "directly coupled to" another element or layer, there are no intervening elements or layers present. As used herein, the term "and/or" includes any and all combinations of one or more of the associated listed items. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosure.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosed subject matter. As used herein, the singular forms, "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Exemplary embodiments of the disclosed subject matter are described herein with reference to cross-section illustrations that are schematic illustrations of idealized embodiments (and intermediate structures) of the disclosed subject matter. As such, variations from the shapes of the illustrations as a result, for example, of manufacturing techniques and/or tolerances, are to be expected. Thus, exemplary embodiments of the disclosed subject matter should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the exemplary embodiments of present disclosure will be explained in detail with reference to the accompanying drawings.

Figure 2:
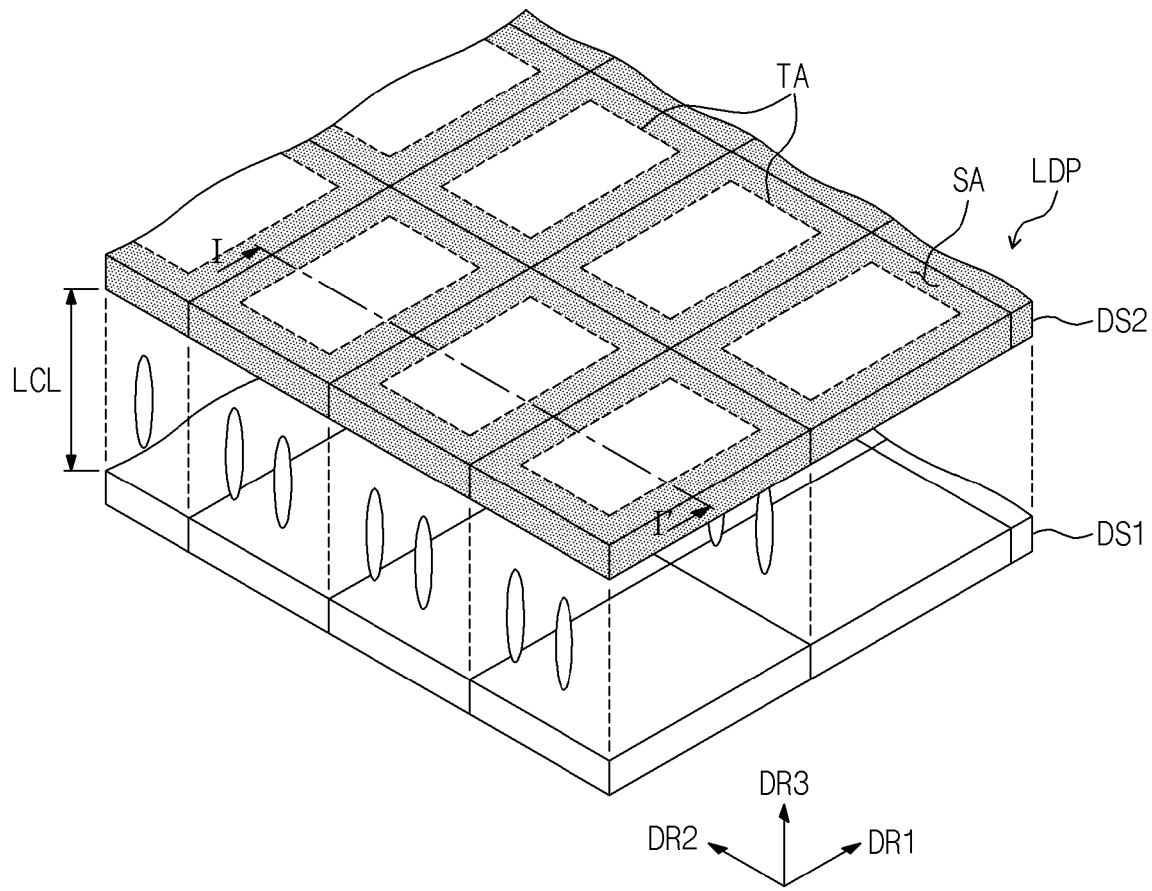
FIG. 2 is a perspective view showing a display panel shown in FIG. 1 according to exemplary embodiments of the present disclosure.
Figure 3:
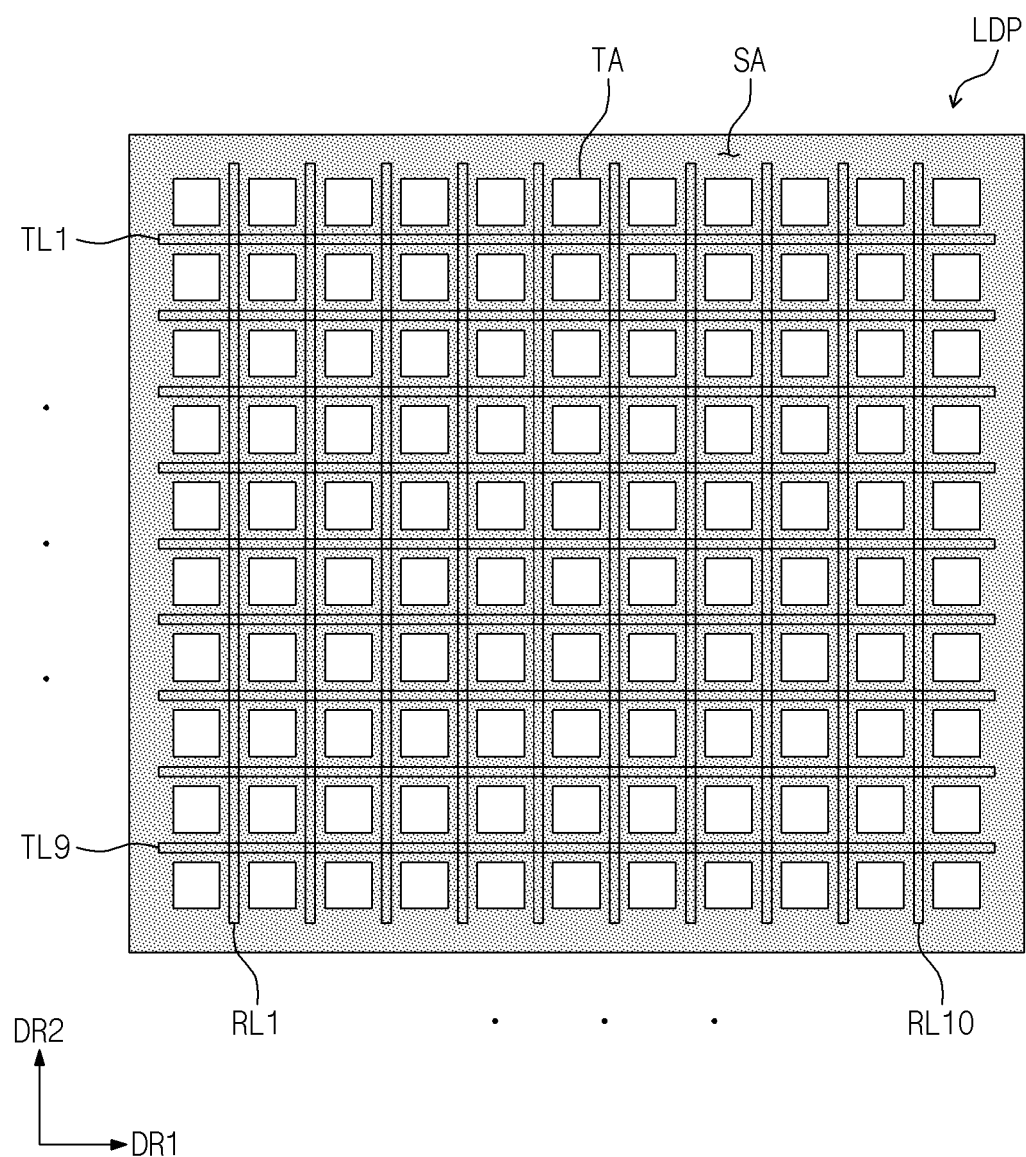
FIG. 3 is a plan view showing a display panel shown in FIG. 2 according to exemplary embodiments of the present disclosure.
Figure 4:
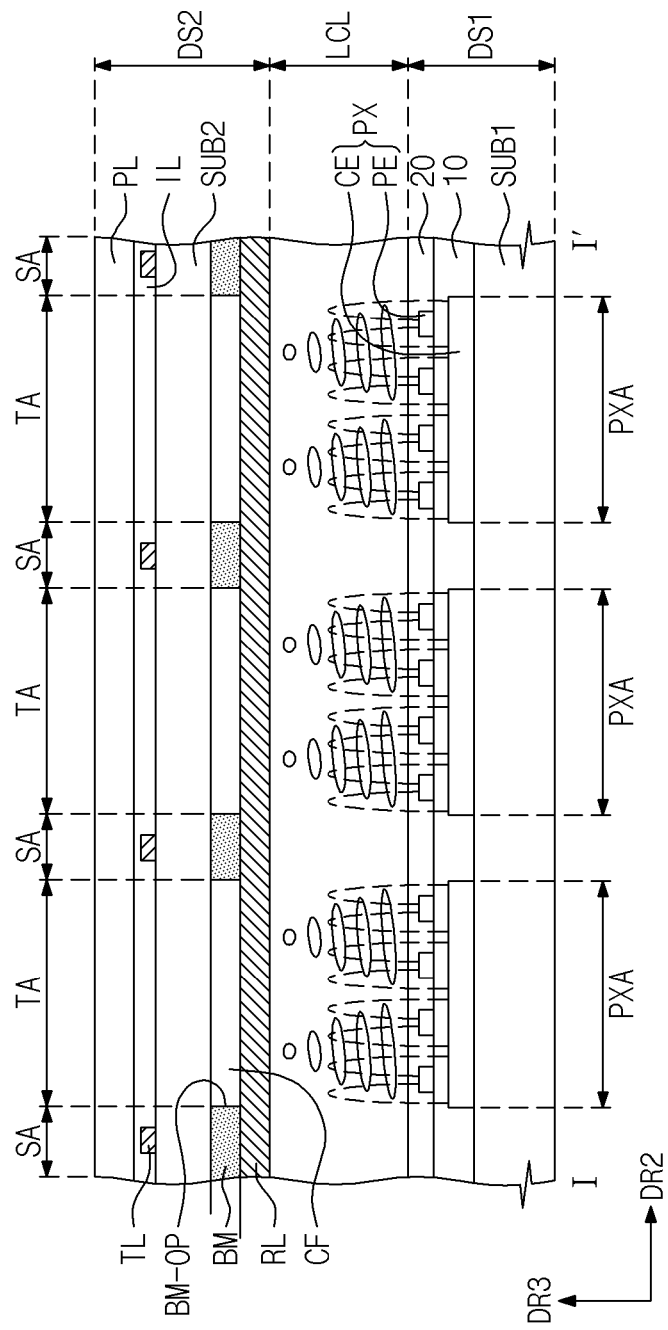
FIG. 4 is a cross-sectional view taken along a line I-I' shown in FIG. 2 according to exemplary embodiments of the present disclosure.

FIG. 1 is a block diagram showing a display device according to exemplary embodiments of the present disclosure. FIG. 2 is a perspective view showing a display panel shown in FIG. 1. FIG. 3 is a plan view showing a display panel shown in FIG. 2. FIG. 4 is a cross-sectional view taken along a line I-I' shown in FIG. 2.

The display device includes a display panel LDP, a signal controller 100, a gate driver 200, a data driver 300, and a touch panel. The touch panel includes a plurality of scan lines TL1 to TLi ("i" is any whole number greater than 1), a plurality of source lines RL1 to RLj ("j" is any whole number greater than 1), a first driver 400, a second driver 500, and a touch sensor 600. The signal controller 100, the gate driver 200, and the data driver 300 control the display panel LDP to generate an image. The first driver 400 and the second driver 500 control the touch panel, and the touch sensor 600 calculates coordinate information of input positions.

Various display panels, such as a liquid crystal display panel, an organic light emitting display panel, an electrophoretic display panel, an electrowetting display panel, etc., may be used as the display panel LDP. According to exemplary embodiments of the present disclosure, in some cases, the display panel LDP may be a liquid crystal display panel, as described below.

A liquid crystal display (LCD) may also include a backlight unit (not shown) to supply a light to the liquid crystal display panel and a pair of polarizing plates (not shown). In addition, the liquid crystal display panel may include a vertical alignment mode panel, a patterned vertical alignment mode panel, an in-plane switching mode panel, a fringe-field switching mode panel, or a plane to line switching mode panel.

The display panel LDP includes a first display substrate DS1 and a second display substrate DS2, which are disposed to be spaced apart from each other. One of the first display substrate DS1 and the second display substrate DS2, which is disposed at a relatively upper position, provides an input device with an input surface.

The display panel LDP includes a plurality of gate lines GL1 to GLn ("n" is any whole number greater than 1), a plurality of data lines DL1 to DLm ("m" is any whole number greater than 1), and a plurality of pixels PX11 to PXnm. Both of the gate lines GL1 to GLn and the data lines DL1 to DLm are disposed on either the first display substrate DS1 or on the second display substrate DS2. In FIG. 1, the gate lines GL1 to GLn and the data lines DL1 to DLm are disposed on the first display substrate DS1.

The gate lines GL1 to GLn are extended in a first direction DR1 and arranged in a second direction DR2 substantially perpendicular to the first direction DR1. The data lines DL1 to DLm are extended in the second direction DR2 and arranged in the first direction DR1. The data lines DL1 to DLm are insulated from the gate lines GL1 to GLn while crossing the gate lines GL1 to GLn. The gate lines GL1 to GLn are connected to the gate driver 200, and the data lines DL1 to DLm are connected to the data driver 300.

The pixels PX11 to PXnm are arranged in a matrix form. The pixels PX11 to PXnm are arranged in pixel areas PXA11 to PXAnm, respectively. Each of the pixels PX11 to PXnm is connected to a corresponding gate line of the gate lines GL1 to GLn and a corresponding data line of the data lines DL1 to DLm.

The scan lines TL1 to TLi and the source lines RL1 to RLj are disposed on the substrate that provides the input surface. The scan lines TL1 to TLi and the source lines RL1 to RLj may be disposed on first display substrate DS1 or the second display substrate DS2. FIG. 3 shows nine scan lines TL1 to TL9 and ten source lines RL1 to RL10, and FIG. 4 shows a few scan lines TL of the scan lines TL1 to TLj and one source line RL of the source lines RL1 to RLj.

The scan lines TL1 to TLi are disposed on a layer different from a layer on which the source lines RL1 to RLj are disposed. The scan lines TL1 to TLj are extended in the first direction DR1 and arranged in the second direction DR2. The source lines RL1 to RLj are extended in the second direction DR2 and arranged in the first direction DR1. The scan lines TL1 to TLi are connected to the first driver 400 and the source lines RL1 to RLj are connected to the second driver 500.

The scan lines TL1 to TLi and the source lines RL1 to RLj are formed of a transparent conductive material. In addition, the scan lines TL1 to TLi and the source lines RL1 to RLj may be formed of a metal material having a low reflectance.

The gate driver 200 and the data driver 300 may be disposed on the first display substrate DS1, and the first driver 400 and the second driver 500 may be disposed on the second display substrate DS2. The signal controller 100 and the touch sensor 600 are disposed on a circuit board connected to the display panel LDP.

Hereinafter, arrangements of the display panel LDP, the scan lines TL1 to TL9, and the source lines RL1 to RL10 will be described in detail with reference to FIGS. 2, 3, and 4.

The second display substrate DS2 includes a plurality of transmitting areas TA and a blocking area SA. The blocking area SA surrounds the transmitting areas TA. The transmitting areas TA transmit light generated by and provided from the backlight unit and the blocking area SA blocks the light. The transmitting areas TA are arranged in a matrix form. The display device generates an image by combining the light transmitting through the transmitting areas TA.

Referring to FIG. 3, the scan lines TL1 to TL9 and the source lines RL1 to RL10 are disposed in the blocking area SA. Among the scan lines TL1 to TL9, two scan lines adjacent to each other are disposed to be spaced apart from each other while interposing the transmitting areas TA arranged in the second direction DR2. Among the source lines RL1 to RL10, two source lines adjacent to each other are disposed to be spaced apart from each other while interposing the transmitting areas TA arranged in the first direction DR1. The scan lines TL1 to TL9 and the source lines RL1 to RL10 are disposed to overlap with the blocking area SA. The scan lines TL1 to TL9 and the source lines RL1 to RL10 are not perceived to a user.

Referring to FIG. 4, the first display substrate DS1 includes a first base substrate SUB1, a plurality of insulating layers 10 and 20, and a plurality of conductive layers CE and PE. FIG. 4 shows the plane to line switching mode panel, but the structure of the display panel should not be limited thereto or thereby.

Common electrodes CE are disposed on the first base substrate SUB1. A first insulating layer 10 is disposed on the first base substrate SUB1 to cover the common electrodes CE. Pixel electrodes PE are disposed on the first insulating layer 10. A second insulating layer 20 is disposed on the first insulating layer 10 to cover the pixel electrodes PE.

Each of the first and second insulating layers 10 and 20 is configured to include at least one organic layer and/or at least one inorganic layer. The gate lines GL1 to GLn (refer to FIG. 1) and the data lines DL1 to DLm (refer to FIG. 1) have not been shown in FIG. 4.

The pixel areas PXA are defined in the first display substrate DS1 and the pixels PX are disposed on the first display substrate DS1. The pixel areas PXA are overlapped with the transmitting areas TA, respectively. As an example, FIG. 4 shows three pixel areas PXA.

Each of the pixels PX includes a corresponding common electrode of the common electrodes CE and a corresponding pixel electrode of the pixel electrodes PE. In addition, each of the pixels PX further includes a thin film transistor connected to a corresponding data line of the data lines DL1 to DLm, a corresponding gate line of the gate lines GL1 to GLn, and a corresponding pixel electrode of the pixel electrodes PE.

The thin film transistor receives a pixel voltage from the pixel electrode PE. The common electrodes CE receive a common voltage. The common electrodes CE and the pixel electrodes PE form an electric field, and thus orientation arrangements of directors (e.g., liquid crystal molecules) included in the liquid crystal layer LCL are changed by the electric field. For example, in some cases, the common electrodes CE and the pixel electrodes PE form a horizontal electric field, and thus orientation arrangements of the liquid crystal molecules in the liquid crystal layer LCL are changed by the horizontal electric field.

As shown in FIG. 4, the second display substrate DS2 includes a second base substrate SUB2, a black matrix BM, and a plurality of color filters CF. The black matrix BM includes a plurality of openings BM-OP formed therethrough. The scan lines TL and the source lines RL are disposed on the second base substrate SUB2. FIG. 4 shows four scan lines TL and one source line RL. In FIG. 4, the one source line RL is presented to explain a layer structure of the second display substrate DS2. Practically, the one source line RL does not be overlapped with the plurality of openings BM-OP, and the one source line RL is overlapped with black matrix BM.

The black matrix BM is disposed on a lower surface of the second base substrate SUB2. The transmitting areas TA are defined by the openings BM-OP. In addition, the blocking area SA corresponds to an area in which the black matrix BM is disposed.

The color filters CF are disposed to overlap with the openings BM-OP, respectively. The color filters CF are respectively inserted into the openings BM-OP. The color filters CF include color filters having different colors from each other. For example, a portion of the color filters has a red color, another portion of the color filters has a green color, and the other portion of the color filters has a blue color.

The scan lines TL are disposed on the second base substrate SUB2. The scan lines TL may be directly disposed on the second base substrate SUB2. An insulating layer IL is disposed on the second base substrate SUB2 to cover the scan lines TL. A protection layer PL is disposed on the insulating layer IL. The insulating layer IL may be, but not limited to, an adhesive layer. The protection layer PL may be an optical member, e.g., a polarizing plate.

The source line RL is disposed under the second base substrate SUB2. The source line RL is overlapped with the black matrix BM. The source line RL may be directly disposed on a lower surface of the second base substrate SUB2. In this case, the black matrix BM covers the source line RL. In some cases, the positions of the scan lines TL and the source line RL may be switched.

Referring to FIG. 1, the signal controller 100 receives input image signals RGB and converts the input image signals RGB to image data R'G'B' corresponding to an operating mode of the display panel LDP. In addition, the signal controller 100 receives various control signals CS, such as a vertical synchronizing signal, a horizontal synchronizing signal, a main clock signal, a data enable signal, etc., and outputs first and second control signals CONT1 and CONT2 and a mode selection signal MSS.

The mode selection signal MSS determines the operating mode of the gate driver 200 and the touch panel. The touch panel may operate in an electrostatic capacitive mode (hereinafter, referred to as a first mode) or an electromagnetic induction mode (hereinafter, referred to as a second mode).

The mode selection signal MSS may be generated on the basis of the image displayed in the display panel LDP. The mode selection signal MSS may have different levels according to the operating modes. For instance, when the display panel LDP displays a keypad image, the mode selection signal MSS is output as a signal to activate the first mode, and when the display panel LDP displays a game image, the mode selection signal MSS is output as a signal to activate the second mode. In some cases, the mode selection signal MSS may be input by the user. For instance, the mode selection signal MSS is generated corresponding to an information inputted to a keypad by the user. The user may touch a first mode activating button.

The gate driver 200 applies gate signals to the gate lines GL1 to GLn in response to the first control signal CONT1. The first control signal CONT1 includes a vertical start signal to control and start an operation of the gate driver 200, a gate clock signal to determine an output timing of a gate voltage, and an output enable signal that controls an ON-pulse width of the gate voltage.

The data driver 300 receives the second control signal CONT2 and the image data R'G'B'. The data driver 300 converts the image data R'G'B' to data voltages and applies the data voltages to the data lines DL1 to DLm.

The second control signal CONT2 includes a horizontal start signal to control and start an operation of the data driver 300, an inverting signal to invert a polarity of the data voltages, and an output indicating signal that controls an output timing of the data voltages from the data driver 300.

The first driver 400 receives the mode selection signal MSS. The first driver 400 receives first scan signals TS1 and second scan signals TS2, and applies the first scan signals TS1 or the second scan signals TS2 to the scan lines TL1 to TLi in response to the mode selection signal MSS. The first driver 400 outputs the first scan signals TS1 in the first mode and outputs the second scan signals TS2 in the second mode.

The second driver 500 receives the mode selection signal MSS. The second driver 500 outputs sensing signals SS1 (hereinafter, referred to as first sensing signals) that represent a variation in capacitance of the source lines RL1 to RLj during the first mode. The second driver 500 outputs sensing signals SS2 (hereinafter, referred to as second sensing signals) according to a resonant frequency of the input device during the second mode. The input device may be, but is not limited to, a stylus pen with an inductor-capacitor (LC) resonant circuit.

The touch sensor 600 receives the first sensing signals SS1 and the second sensing signals SS2. The touch sensor 600 calculates the coordinate information of an input position based on the first sensing signals SS1 and the second sensing signals SS2. The input position in the first mode may be a position on the second display substrate DS2 at which a touch of the input device is detected. In addition, the input position in the second mode may be a position on the second display substrate DS2 at which a touch or an approach by the input device is detected.

Figure 5:
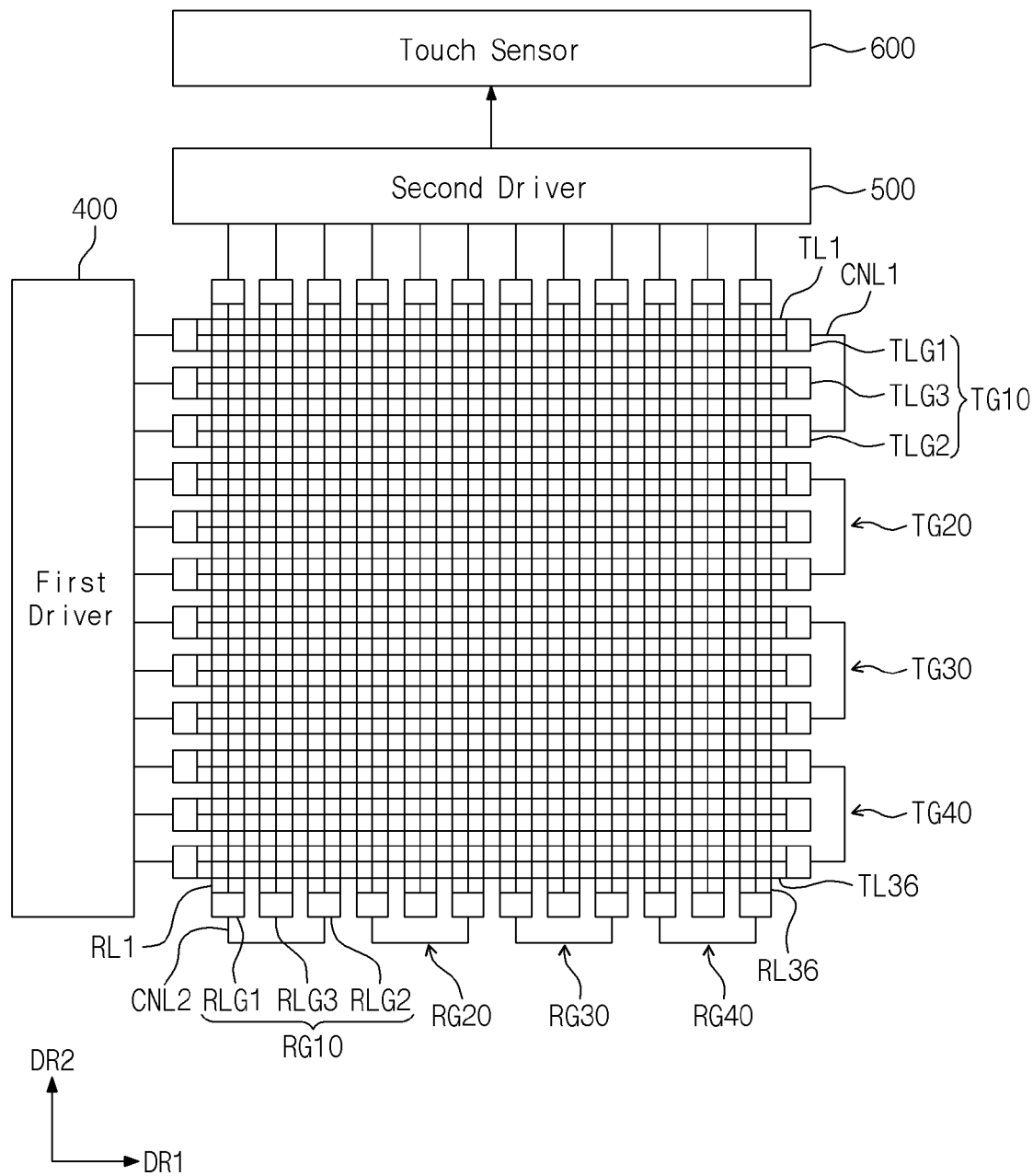
FIG. 5 is a block diagram showing a touch panel according to exemplary embodiments of the present disclosure.

FIG. 5 is a block diagram showing a touch panel according to exemplary embodiments of the present disclosure. FIG. 5 shows thirty-six scan lines TL1 to TL36 and thirty-six source lines RL1 to RL36.

Referring to FIG. 5, the thirty-six scan lines TL1 to TL36 are grouped into four scan line groups TG10, TG20, TG30, and TG40 (hereinafter, referred to first, second, third, and fourth scan line groups, respectively) and the thirty-six source lines RL1 to RL36 are grouped into four source line groups RG10, RG20, RG30, and RG40 (hereinafter, referred to first, second, third, and fourth source line groups, respectively). Each of the first to fourth scan line groups TG10, TG20, TG30, and TG40 includes a first scan line sub-group TLG1, a second scan line sub-group TLG2, and a third scan line sub-group TLG3. Each of the first scan line sub-group TLG1, the second scan line sub-group TLG2, and the third scan line sub-group TLG3 includes at least one scan line.

The first scan line sub-group TLG1, the second scan line sub-group TLG2, and the third scan line sub-group TLG3 include the same number of scan lines. For example, in FIG. 5, each scan line sub-group includes three scan lines. First ends of the three scan lines are connected to each other and the second ends of the three scan lines are connected to each other. It should be understood that various numbers of scan lines may be included in each scan line sub-group.

The first scan line sub-group TLG1, the second scan line sub-group TLG2, and the third scan line sub-group TLG3 are arranged in the second direction DR2. The third scan line sub-group TLG3 is disposed between the first scan line sub-group TLG1 and the second scan line sub-group TLG2. The first scan line sub-group TLG1 and the second scan line sub-group TLG2 are connected to each other by a first connection line CNL1. Accordingly, the first scan line sub-group TLG1 and the second scan line sub-group TLG2 form one loop.

Each of the first to fourth source line groups RG10, RG20, RG30, and RG40 includes a first source line sub-group RLG1, a second source line sub-group RLG2, and a third source line sub-group RLG3. Each of the first source line sub-group RLG1, the second source line sub-group RLG2, and the third source line sub-group RLG3 includes at least one source line.

The first source line sub-group RLG1, the second source line sub-group RLG2, and the third source line sub-group RLG3 include the same number of source lines. For example, in FIG. 5, each source line sub-group includes three source lines. First ends of the three source lines are connected to each other and second ends of the three source lines are connected to each other. It should be understood that various numbers of source lines may be included in each source line sub-group.

The first source line sub-group RLG1, the second source line sub-group RLG2, and the third source line sub-group RLG3 are arranged in the first direction DR1. The third source line sub-group RLG3 is disposed between the first source line sub-group RLG1 and the second source line sub-group RLG2. The first source line sub-group RLG1 and the second source line sub-group RLG2 are connected to each other by a second connection line CNL2.

Figure 6:
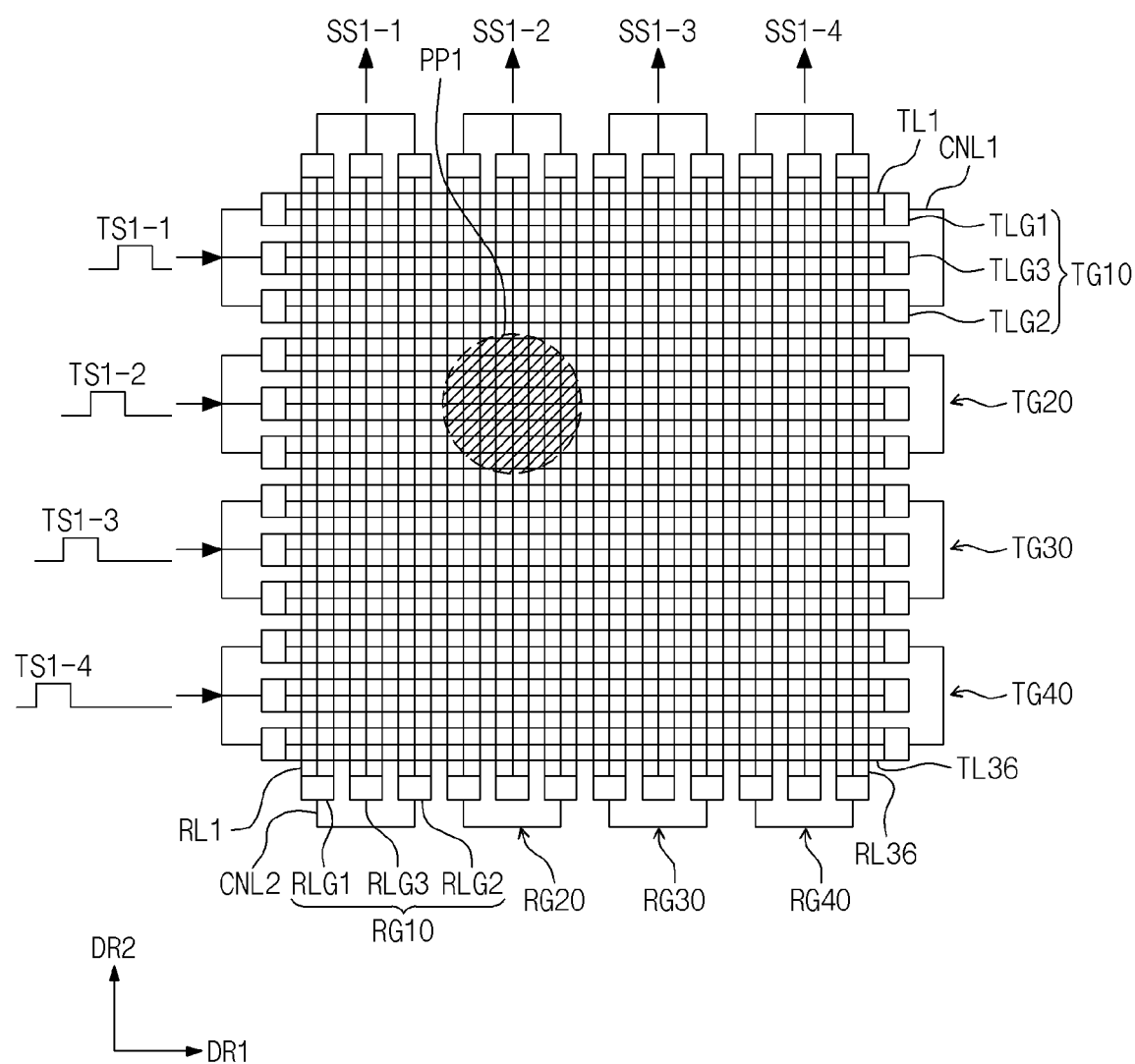
FIG. 6 is a view showing a touch panel operated in a first mode according to exemplary embodiments of the present disclosure.
Figure 7A:
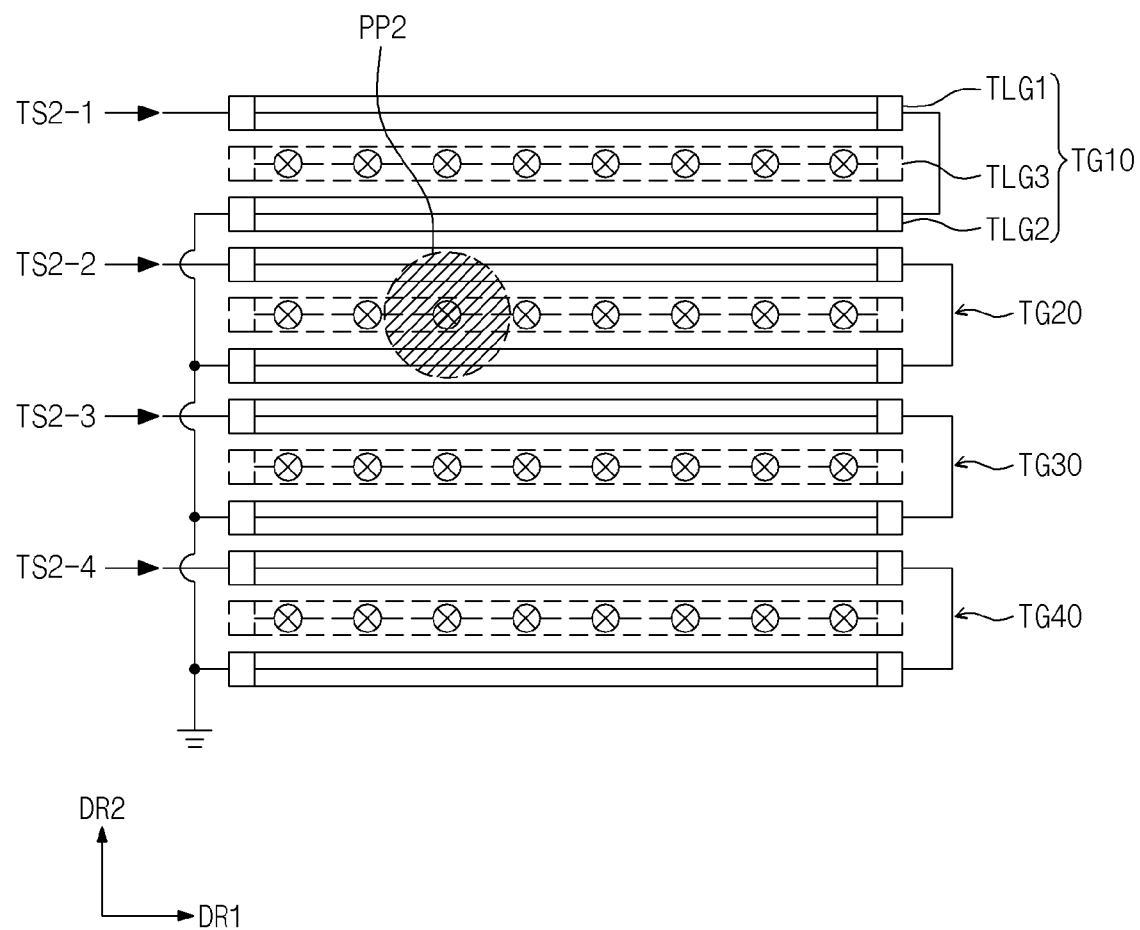
FIGS. 7A and 7B are views showing a touch panel operated in a second mode according to exemplary embodiments of the present disclosure.
Figure 7B:
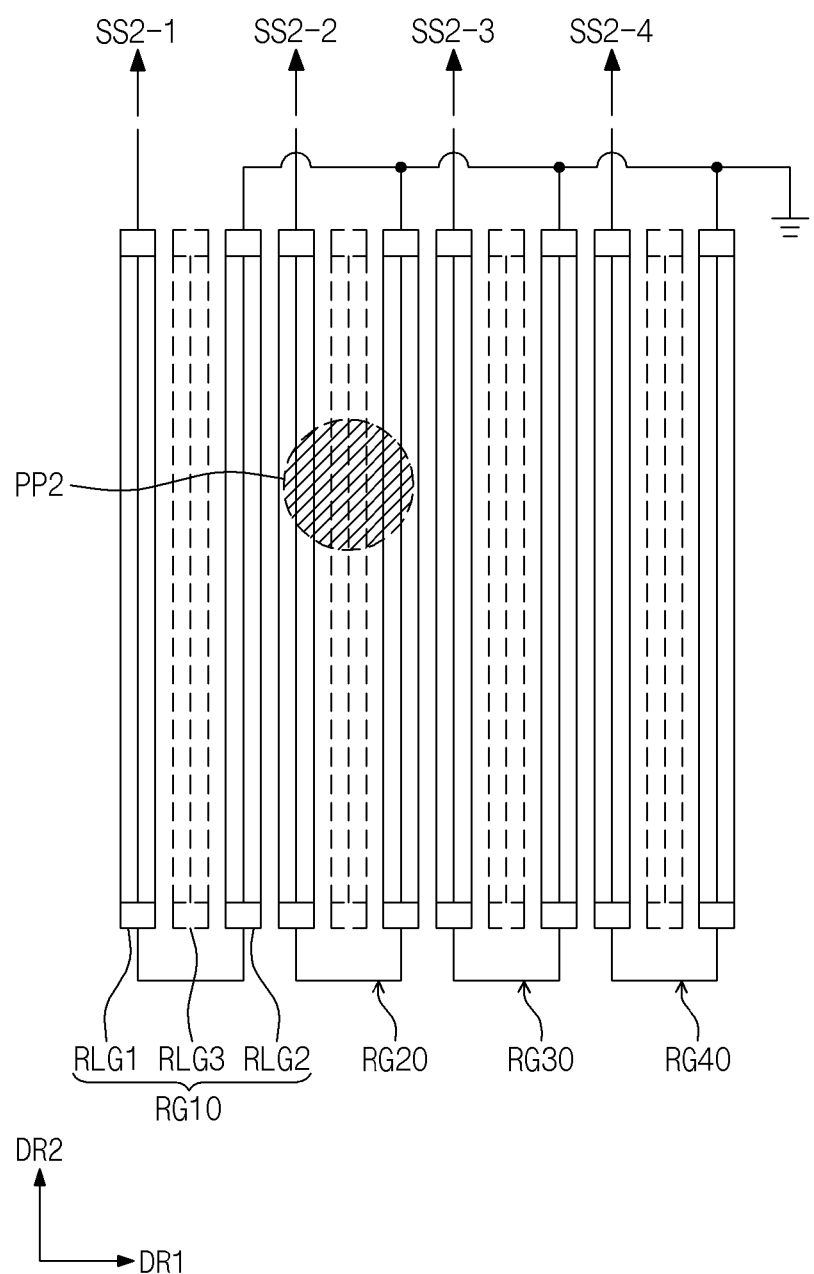
Figure 8:
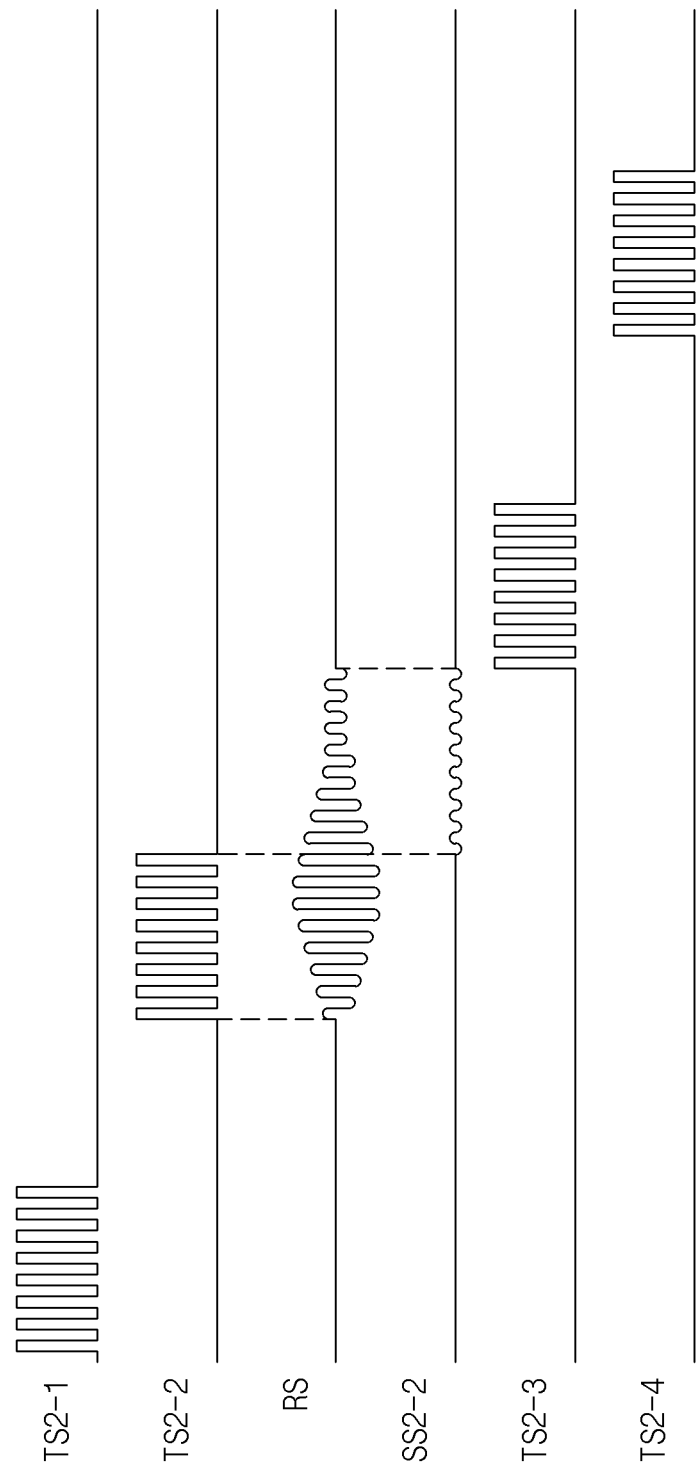
FIG. 8 is a timing diagram showing signals generated in the second mode according to exemplary embodiments of the present disclosure.

FIG. 6 is a view showing the touch panel operated in the first mode. FIGS. 7A and 7B are views showing the touch panel operated in the second mode, and FIG. 8 is a timing diagram showing signals generated in the second mode. Hereinafter, the operation of the touch panel will be described in detail with reference to FIGS. 6, 7A, 7B, and 8.

The touch panel operated in the first mode and shown in FIG. 6 calculates the coordinate information of the input position in the same way as an electrostatic capacitive type touch panel. The first to fourth scan line groups TG10, TG20, TG30, and TG40 correspond to input touch electrodes of the electrostatic capacitive type touch panel, and the first to fourth source line groups RG10, RG20, RG30, and RG40 correspond to output touch electrodes of the electrostatic capacitive type touch panel.

The first to fourth scan line groups TG10, TG20, TG30, and TG40 are capacitive-coupled to the first to fourth source line groups RG10, RG20, RG30, and RG40. Due to the capacitive coupling, capacitors are formed between the first to fourth scan line groups TG10, TG20, TG30, and TG40 and the first to fourth source line groups RG10, RG20, RG30, and RG40.

The first to fourth scan line groups TG10, TG20, TG30, and TG40 receive scan signals TS1-1 to TS1-4 (hereinafter, referred to as first scan signals), respectively, in different periods from each other. The first to fourth scan line groups TG10, TG20, TG30, and TG40 sequentially receive the first scan signals TS1-1 to TS1-4. The first to fourth source line groups RG10, RG20, RG30, and RG40 output sensing signals SS1-1 to SS1-4 (hereinafter, referred to as first sensing signals), respectively.

An area in which the second scan line group TG20 crosses the second source line group RG20 may be the input position PP1 (hereinafter, referred to as first input position). The first sensing signal SS1-2 output from the second source line group RG20 may then have a level different from a level of the first sensing signals SS1-1, SS1-3, and SS1-4 of other source line groups RG10, RG30, and RG40.

The touch sensor 600 calculates a two-dimensional coordinate information of the first input position PP1 based on a time at which the first sensing signal SS1-2 having the different level is sensed and a relative position of the second source line group RG20 with respect to the first to fourth source line groups RG10, RG20, RG30, and RG40.

The touch panel operated in the second mode (shown in FIGS. 7A and 7B) calculates the coordinate information of the input position in the same way as an electromagnetic induction type touch panel. The first to fourth scan line groups TG10, TG20, TG30, and TG40 correspond to input coils of the electromagnetic induction type touch panel, and the first to fourth source line groups RG10, RG20, RG30, and RG40 correspond to output coils of the electromagnetic induction type touch panel.

Referring to FIG. 7A, the first to fourth scan line groups TG10, TG20, TG30, and TG40 receive scan signals TS2-1 to TS2-4 (hereinafter, referred to as second scan signals), respectively, in different periods. The second scan signals TS2-1 to TS2-4 are respectively applied to the first ends of the first scan line sub-groups TLG1 of the first to fourth scan line groups TG10, TG20, TG30, and TG40. The first end of the second scan line sub-group TLG2 of each of the first to fourth scan line groups TG10, TG20, TG30, and TG40 is grounded. The first end of the third scan line sub-group TLG3 of each of the first to fourth scan line groups TG10, TG20, TG30, and TG40 is floated without receiving any voltage.

Therefore, the first scan line sub-group TLG1 and the second scan line sub-group TLG2 form a current path. A magnetic field is induced by the current path formed by the first scan line sub-group TLG1 and the second scan line sub-group TLG2. That is, the first scan line sub-group TLG1 and the second scan line sub-group TLG2 form one input coil. Since the first to fourth scan line groups TG10, TG20, TG30, and TG40 receive the second scan signals TS2-1 to TS2-4 in different periods, the magnetic field is induced in different periods.

When the input device (not shown) approaches the first to fourth scan line groups TG10, TG20, TG30, and TG40, the magnetic field induced from the first to fourth scan line groups TG10, TG20, TG30, and TG40 resonates with the resonant circuit of the input device. Thus, the input device generates the resonant frequency.

Referring to FIG. 7B, the first to fourth source line groups RG10, RG20, RG30, and RG40 output sensing signals SS2-1 to SS2-4 (hereinafter, referred to as second sensing signals), respectively, according to the resonant frequency of the input device. The second sensing signals SS2-1 to SS2-4 are output from the first ends of the first source line sub-groups RGL1 of the first to fourth source line groups RG10, RG20, RG30, and RG40. The first end of the second source line sub-group RLG2 of each of the first to fourth source line groups RG10, RG20, RG30, and RG40 is grounded. The first end of the third source line sub-group RLG3 of each of the first to fourth source line groups RG10, RG20, RG30, and RG40 is floated without receiving any voltage.

An input position PP2 (hereinafter, referred to as second input position) may correspond to an area in which the second scan line group TG20 crosses the second source line group RG20. The second sensing signal SS2-2 output from the second source line group RG20 has a level different from a level of the second sensing signals SS2-1, SS2-3, and SS2-4 of other source line groups RG10, RG30, and RG40.

The touch sensor 600 calculates a two-dimensional coordinate information of the second input position PP2 based on a time at which the second sensing signal SS2-2 having the different level is sensed and a relative position of the second source line group RG20 with respect to the first to fourth source line groups RG10, RG20, RG30, and RG40.

Referring to FIGS. 7A, 7B, and 8, the second scan signals TS2-1 to TS2-4 are sequentially applied to the first scan line sub-groups TLG1 of the first to fourth scan line groups TG10, TG20, TG30, and TG40. An induction signal RS is generated from the input device disposed at the second input position PP2.

After the second scan signal TS2-2 applied to the second scan line group TG20 is deactivated, the induction signal RS is gradually decreased during a predetermined period. The input device generates a frequency corresponding to the induction signal RS that is gradually decreased. The frequency generated by the input device generates the second sensing signal SS2-2 of the second source line group RG20.

Figure 9:
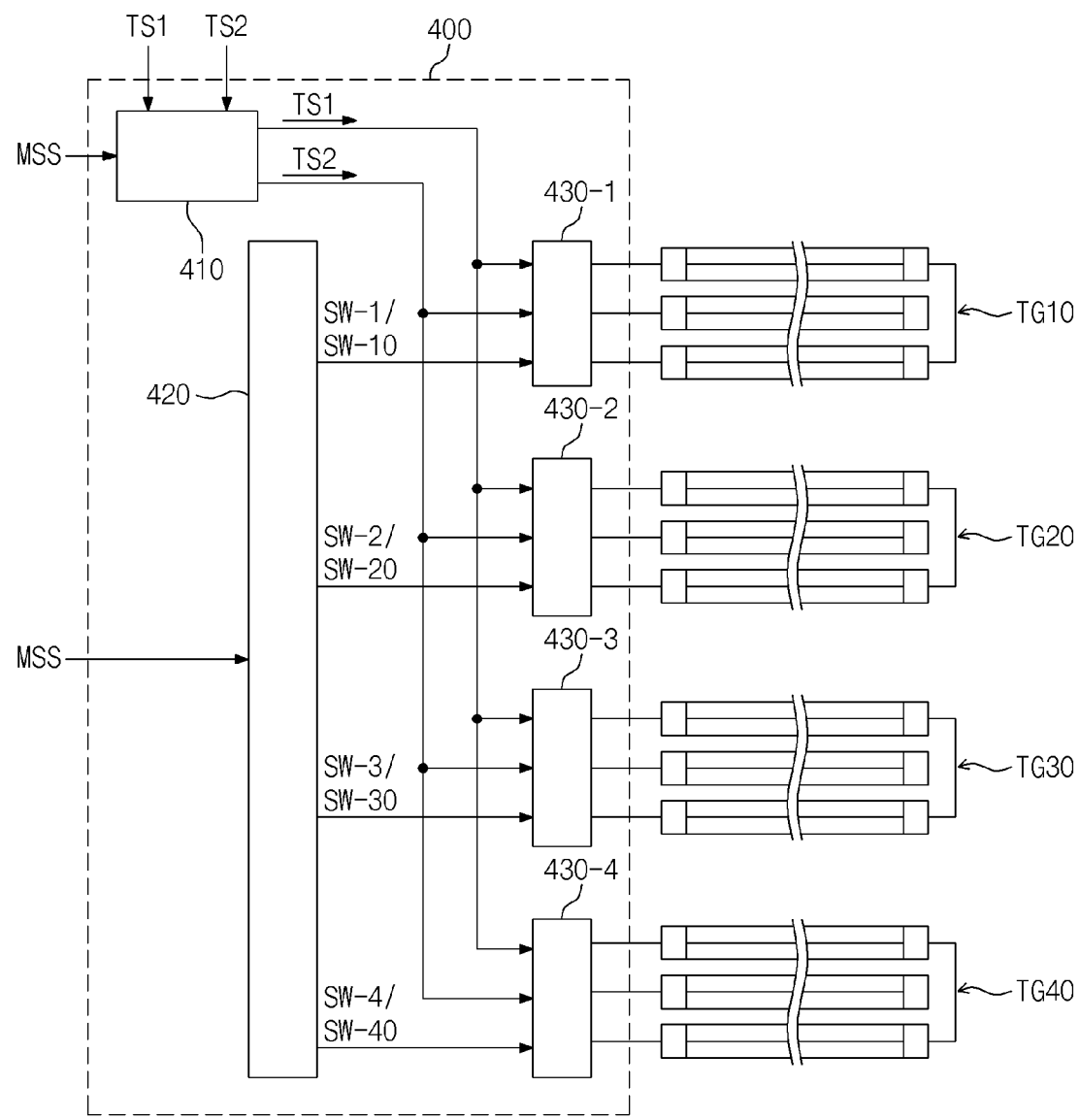
FIG. 9 is a block diagram showing a first driver shown in FIG. 5 according to exemplary embodiments of the present disclosure.
Figure 10:
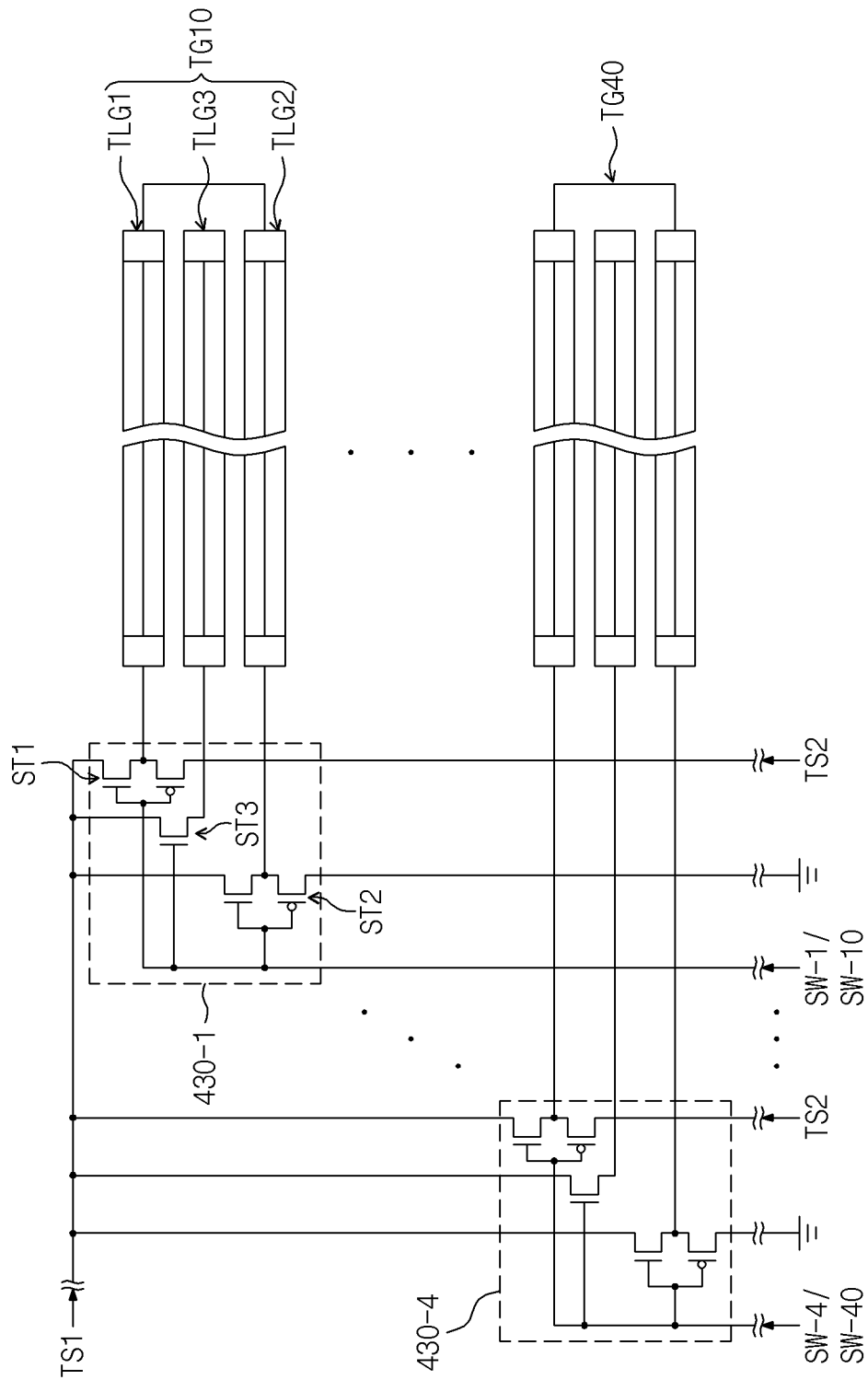
FIG. 10 is a circuit diagram showing a switching part shown in FIG. 9 according to exemplary embodiments of the present disclosure.

FIG. 9 is a block diagram showing the first driver 400 shown in FIG. 5. FIG. 10 is a circuit diagram showing switching parts 430-1 to 430-4 shown in FIG. 9. Hereinafter, the first driver 400 will be described in detail with reference to FIGS. 9 and 10.

The first driver 400 includes a scan signal output part 410, a selection part 420, and switching parts 430-1 to 430-4. FIG. 9 shows four switching parts 430-1 to 430-4 (hereinafter, referred to as first to fourth switching parts, respectively).

The scan signal output part 410 receives the mode selection signal MSS, the first scan signal TS1, and the second scan signal TS2. The first and second scan signals TS1 and TS2 may be provided from an external circuit, e.g., a scan signal generating circuit. The scan signal output part 410 selectively outputs the first scan signal TS1 and the second scan signal TS2 in response to the mode selection signal MSS.

The selection part 420 switches the first to fourth switching parts 430-1 to 430-4. The selection part 420 receives the mode selection signal MSS and outputs switching control signals SW-1 to SW-4 and SW-10 to SW-40 having different turn-on periods. The selection part 420 outputs first switching control signals SW-1 to SW-4 in the first mode and outputs second switching control signals SW-10 to SW-40 in the second mode. The second switching control signals SW-10 to SW-40 have phases opposite to those of the first switching control signals SW-1 to SW-4.

Each of the first to fourth switching parts 430-1 to 430-4 receives the first scan signal TS1 from the scan signal output part 410 in the first mode and receives the second scan signal TS2 from the scan signal output part 410 in the second mode. The first to fourth switching parts 430-1 to 430-4 respectively receive the first switching control signals SW-1 to SW-4 in the first mode and respectively receive the second switching control signals SW-10 to SW-40 in the second mode.

In the first mode, the first to fourth switching parts 430-1 to 430-4 apply the first scan signal TS1 to the first to fourth scan line groups TG10, TG20, TG30, and TG40 in response to the first switching control signals SW-1 to SW-4. In the second mode, the first to fourth switching parts 430-1 to 430-4 apply the second scan signal TS2 to the first to fourth scan line groups TG10, TG20, TG30, and TG40 in response to the second switching control signals SW-10 to SW-40.

Referring to FIG. 10, each of the first to fourth switching parts 430-1 to 430-4 includes a first switch ST1, a second switch ST2, and a third switch ST3. Hereafter, the first switch 430-1 will be described as a representative example.

The first switch ST1 applies the first scan signal TS1 to the first scan line sub-group TLG1 in the first mode and applies the second scan signal TS2 to the first scan line sub-group TLG1 in the second mode.

The first switch ST1 may be, but is not limited to, a Complementary Metal-Oxide Semiconductor (CMOS) transistor. The CMOS transistor includes an n-type transistor and a p-type transistor. Control electrodes of the n-type transistor and the p-type transistor are commonly connected to each other to receive the first switching control signal SW-1 and the second switching control signal SW-10. In some cases, the first switching control signal SW-1 has a high level in the turn-on period and the second switching control signal SW-10 has a low level in the turn-on period.

An input electrode of the n-type transistor receives the first scan signal TS1 and an input electrode of the p-type transistor receives the second scan signal TS2. An output electrode of the n-type transistor and an output electrode of the p-type transistor are commonly connected to the first scan line sub-group TLG1.

The second switch ST2 applies the first scan signal TS1 to the second scan line sub-group TLG2 in the first mode and applies the second scan signal TS2 to the second scan line sub-group TLG2 in the second mode.

The second switch ST2 may be, but is not limited to, a CMOS transistor. Control electrodes of an n-type transistor and a p-type transistor of the second switch ST2 are commonly connected to each other to receive the first switching control signal SW-1 and the second switching control signal SW-10.

An input electrode of the n-type transistor receives the first scan signal TS1 and an input electrode of the p-type transistor receives a ground voltage. An output electrode of the n-type transistor and an output electrode of the p-type transistor are commonly connected to the second scan line sub-group TLG2.

The n-type transistor of each of the first and second switches ST1 and ST2, which are turned on in the first mode, applies the first scan signal TS1 to the first and second scan line sub-groups TLG1 and TLG2. The p-type transistor of each of the first and second switches ST1 and ST2, which are turned on in the second mode, forms a current path in the first scan signal TS1 to the first and second scan line sub-groups TLG1 and TLG2.

The third switch ST3 applies the first scan signal TS1 to the third scan line sub-group TLG3 in the first mode and floats the third scan line sub-group TLG3 in the second mode.

The third switch ST3 may be, but is not limited to, an n-channel MOS (NMOS) transistor. A control electrode of the NMOS transistor receives the first switching control signal SW-1 and the second switching control signal SW-10. An input electrode of the NMOS transistor receives the first scan signal TS1 and an output electrode of the NMOS transistor is connected to the third scan line sub-group TLG3. In the second mode, the third switch ST3 is turned off by the second switching control signal SW-10 having the low level, and thus the third scan line sub-group TLG3 is floated.

In some cases, the n-type transistor and the p-type transistor of the CMOS transistor may be switched. In such cases, the third switch ST3 may be a p-channel MOS (PMOS) transistor.

Figure 11:
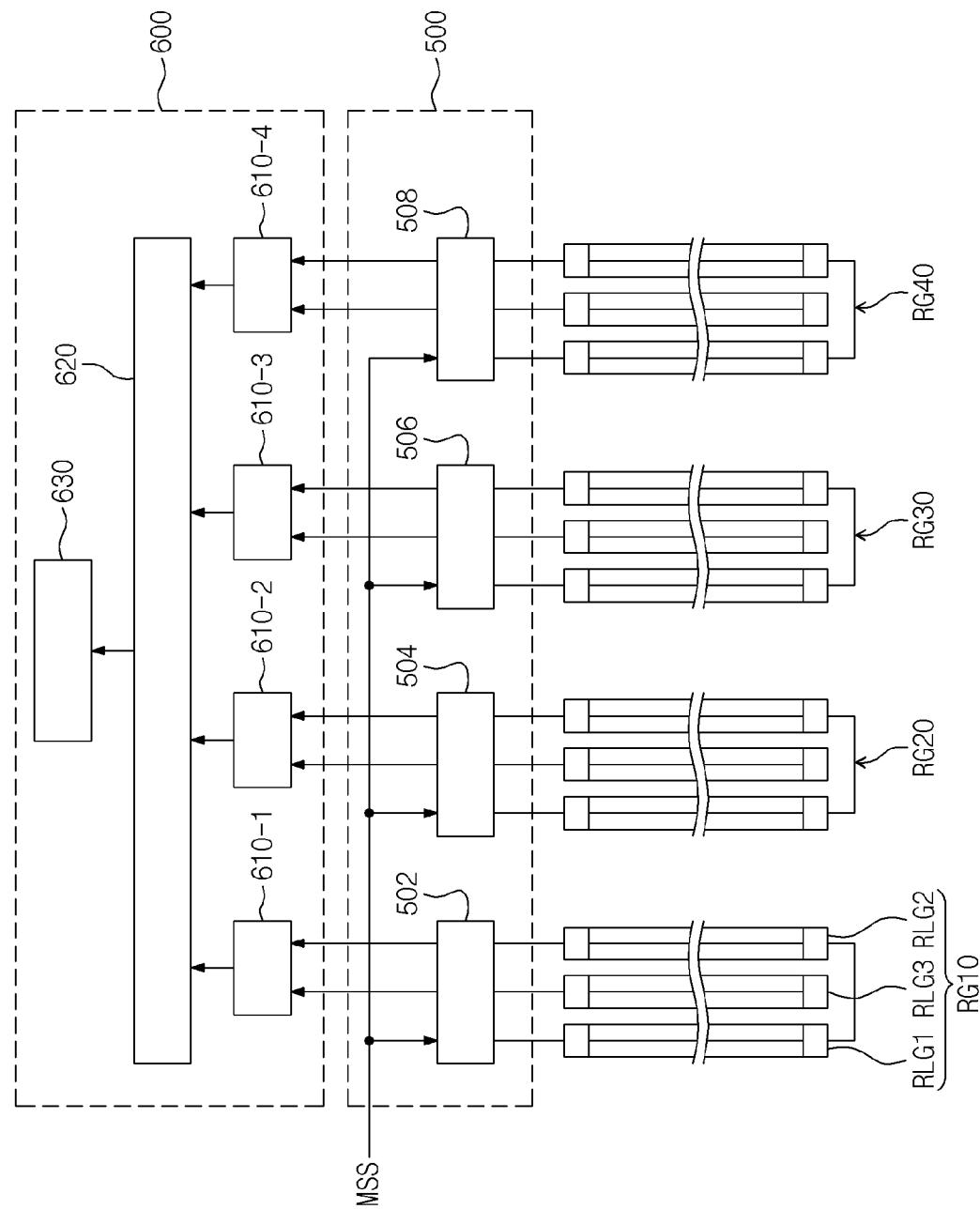
FIG. 11 is a block diagram showing a second driver and a touch sensor shown in FIG. 5 according to exemplary embodiments of the present disclosure.
Figure 12:
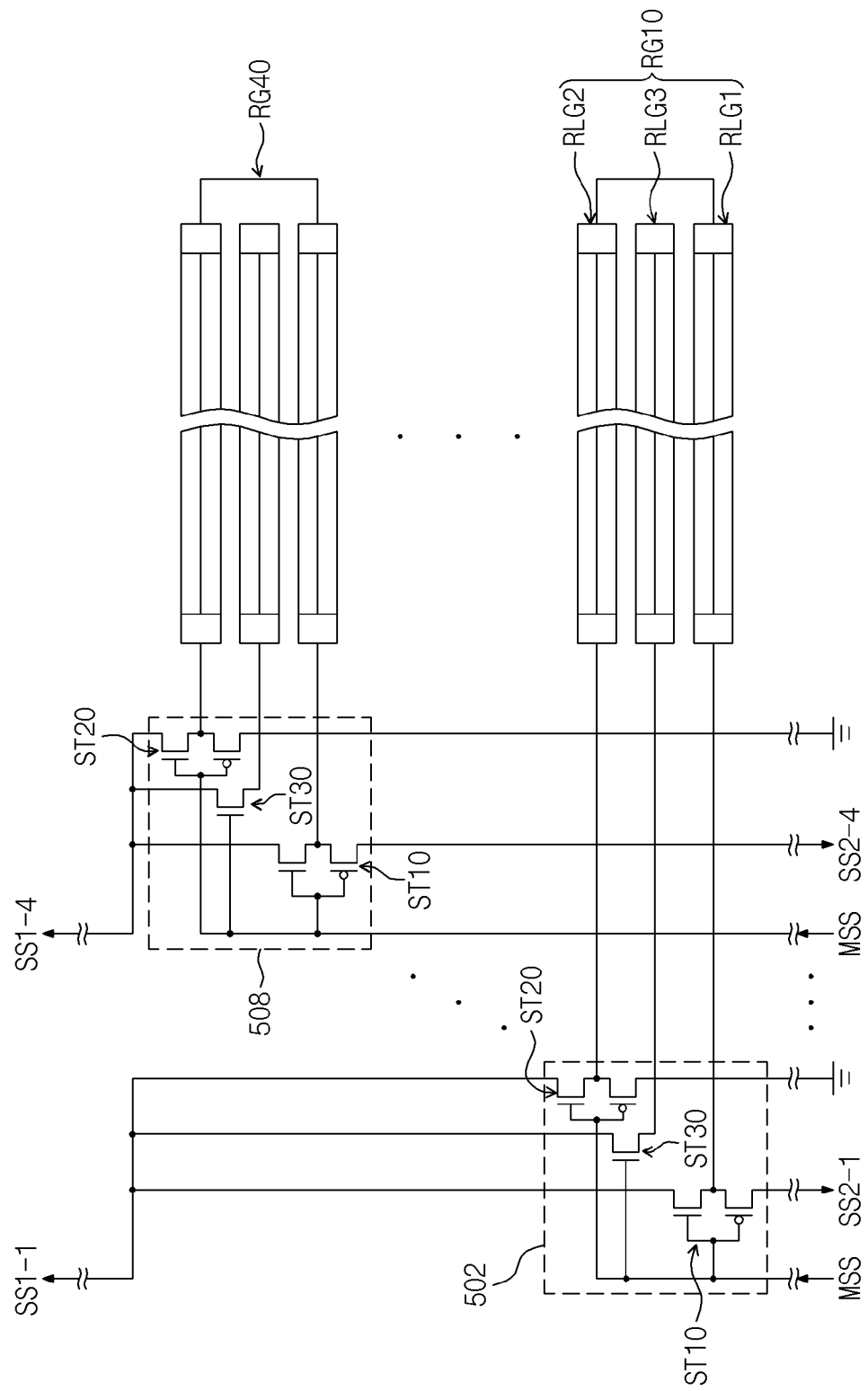
FIG. 12 is a circuit diagram showing a sensing signal output part shown in FIG. 11 according to exemplary embodiments of the present disclosure.

FIG. 11 is a block diagram showing the second driver 500 and the touch sensor shown 600 in FIG. 5, and FIG. 12 is a circuit diagram showing a sensing signal output part shown in FIG. 11. Hereinafter, the second driver 500 and the touch sensor 600 will be described in detail with reference to FIGS. 11 and 12.

Referring to FIG. 11, the second driver 500 includes a plurality of sensing signal output parts 502, 504, 506, and 508. FIG. 11 shows four sensing signal output parts 502, 504, 506, and 508 (hereinafter, referred to as first to fourth sensing signal output parts, respectively).

The first to fourth sensing signal output parts 502, 504, 506, and 508 are connected to the first to fourth source line groups RG10, RG20, RG30, and RG40, respectively. Each of the first to fourth sensing signal output parts 502, 504, 506, and 508 receives a control signal. The control signal may be the mode selection signal MSS. In some cases, the control signal may be another signal having the same phase as the mode selection signal MSS.

In the first mode, the first to fourth sensing signal output parts 502, 504, 506, and 508 output the first sensing signals SS1-1 to SS1-4 (refer to FIG. 6) from the first to fourth source line groups RG10, RG20, RG30, and RG40. In the second mode, the first to fourth sensing signal output parts 502, 504, 506, and 508 output the second sensing signals SS2-1 to SS2-4 (refer to FIG. 7B) from the first to fourth source line groups RG10, RG20, RG30, and RG40.

Referring to FIG. 12, each of the first to fourth sensing signal output parts 502, 504, 506, and 508 includes a first switch ST10, a second switch ST20, and a third switch ST30. Hereinafter, the first sensing signal output part 502 will be described as a representative example.

The first switch ST10 outputs the first sensing signal SS1-1 from the first end of the first source line sub-group RLG1 in the first mode and outputs the second sensing signal SS2-1 from the first end of the first source line sub-group RLG1 in the second mode. The first switch ST10 may be, but is not limited to, a CMOS transistor.

The CMOS transistor includes an n-type transistor and a p-type transistor. Control electrodes of the n-type transistor and the p-type transistor are commonly connected to each other to receive the mode selection signal MSS. The mode selection signal MSS has a high level in the first mode and a low level in the second mode.

An input electrode of the n-type transistor is connected to the first source line sub-group RLG1 and an output electrode of the n-type transistor is connected to the touch sensor 600. An input electrode of the p-type transistor is connected to the first source line sub-group RLG1 and an output electrode of the p-type transistor is connected to the touch sensor 600. The output electrode of the n-type transistor applies the first sensing signal SS1-1 to the touch sensor 600 and the output electrode of the p-type transistor applies the second sensing signal SS2-1 to the touch sensor 600.

The second switch ST20 outputs the first sensing signal SS1-1 from the first end of the second source line sub-group RLG2 in the first mode and grounds the second source line sub-group RLG2 in the second mode. The second switch ST20 may be, but is not limited to, a CMOS transistor.

Control electrodes of the n-type transistor and the p-type transistor of the second switch ST20 are commonly connected to each other to receive the mode selection signal MSS. An input electrode of the n-type transistor is connected to the second source line sub-group RLG2 and an output electrode of the n-type transistor is connected to the touch sensor 600. An input electrode of the p-type transistor is connected to the second source line sub-group RLG2 and an output electrode of the p-type transistor receives the ground voltage.

The third switch ST30 outputs the first sensing signal SS1-1 to the touch sensor 600 in the first mode and floats the third source line sub-group RLG3 in the second mode.

The third switch ST30 may be, but is not limited to, an NMOS transistor. A control electrode of the NMOS transistor receives the mode selection signal MSS. An input electrode of the NMOS transistor is connected to the third source line sub-group RLG3 and an output electrode of the NMOS transistor is connected to the touch sensor 600. In some cases, the n-type transistor and the p-type transistor of the CMOS may be switched. In such cases, the third switch ST30 may be a PMOS transistor.

Referring to FIG. 11 again, the touch sensor 600 includes signal processors 610-1 to 610-4 (hereinafter, referred to as first to fourth signal processing parts, respectively), a multiplexer 620, and a coordinate calculator 630.

The first to fourth signal processors 610-1 to 610-4 respectively receive the first sensing signals SS1-1 to SS1-4 (refer to FIG. 6) from the first to fourth sensing signal output parts 502, 504, 506, and 508 in the first mode and respectively receive the second sensing signals SS2-1 to SS2-4 (refer to FIG. 7B) from the first to fourth sensing signal output parts 502, 504, 506, and 508 in the second mode. Each of the first to fourth signal processors 610-1 to 610-4 includes a first mode signal processor (not shown) to process the first sensing signals SS1-1 to SS1-4 and a second mode signal processor (not shown) to process the second sensing signals SS2-1 to SS2-4.

The first mode signal processor includes an amplifier, a noise filter, and an analog-to-digital converter. The amplifier amplifies the first sensing signals SS1-1 to SS1-4. The noise filter removes noises from the amplified first sensing signals SS1-1 to SS1-4. The analog-to-digital converter converts the first sensing signals SS1-1 to SS1-4 from which the noises are removed to first digital signals.

The second mode signal processor includes an amplifier, a band-pass filter, a wave detector, a sample-hold circuit, and an analog-to-digital converter. The second sensing signals SS2-1 to SS2-4 are converted to second digital signals using the second mode signal processor.

The multiplexer 620 selectively applies the first and second digital signals from the first to fourth signal processors 610-1 to 610-4 to the coordinate calculator 630. The coordinate calculator 630 compares the first and second digital signals to a reference value to sense the output touch electrode or the output coil in which the external input occurs. The coordinate calculator 630 calculates the coordinate information of the first input position PP1 (refer to FIG. 6) from the first digital signals and calculates the coordinate information of the second input position PP2 (refer to FIG. 7B) from the second digital signals.

Figure 13:
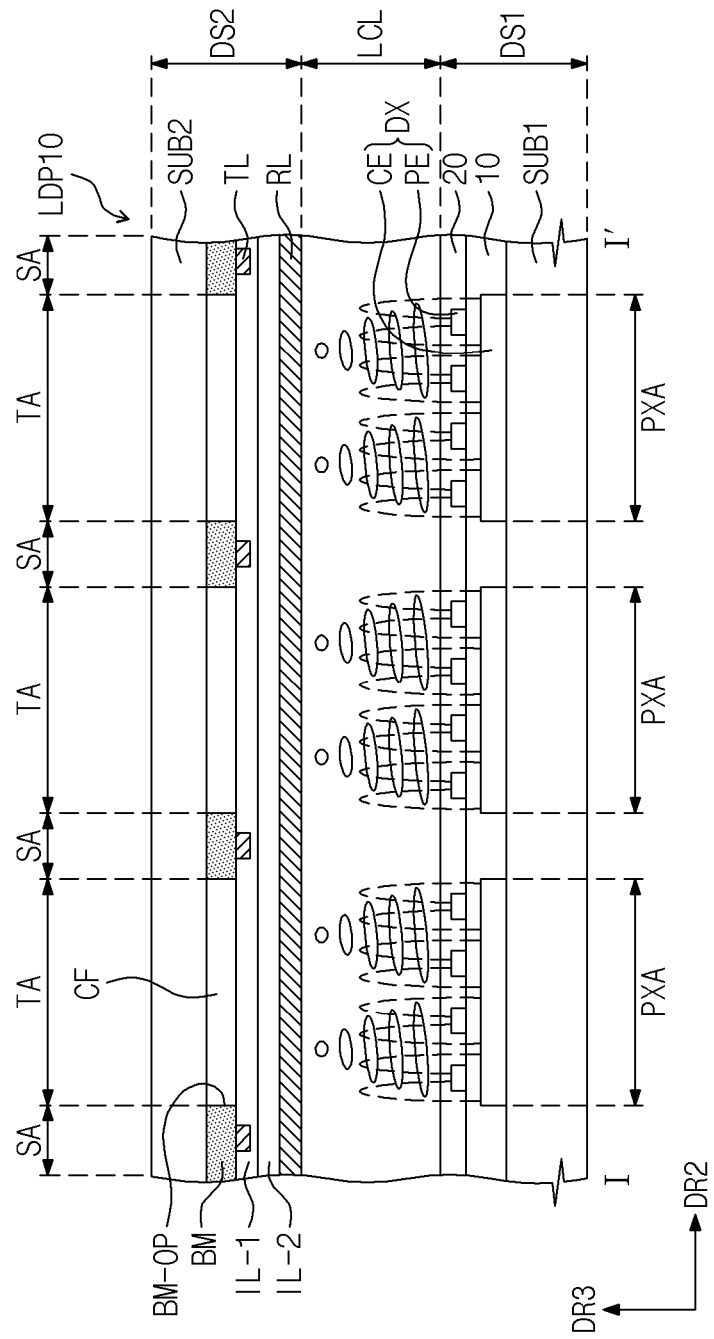
FIG. 13 is a cross-sectional view showing a display panel according to exemplary embodiments of the present disclosure.
Figure 14:
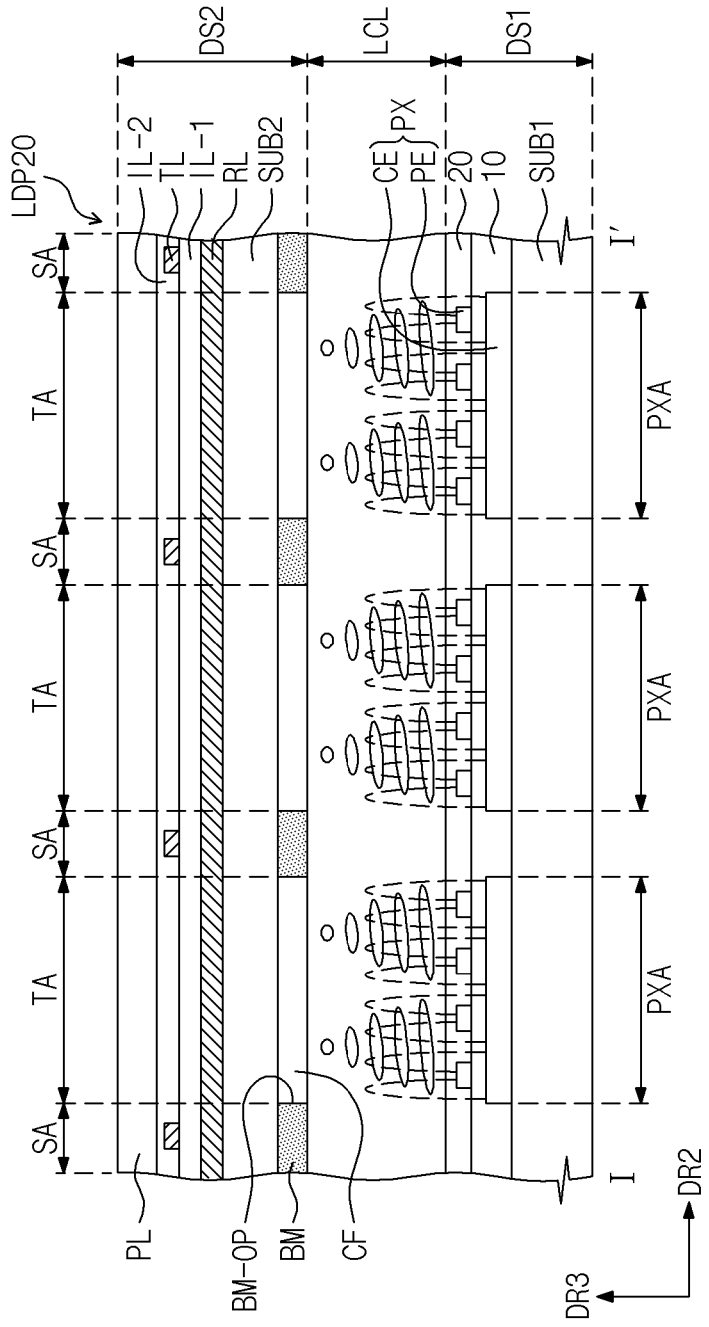
FIG. 14 is a cross-sectional view showing a display panel according to exemplary embodiments of the present disclosure.

FIGS. 13 and 14 are cross-sectional views showing display panels according to exemplary embodiments of the present disclosure. In FIGS. 13 and 14, the same reference numerals denote the same elements in FIGS. 1 to 3, and thus detailed descriptions of the same elements will be omitted.

Referring to FIGS. 13 and 14, the scan lines TL and the source lines RL are disposed on or under the second base substrate SUB2. In FIG. 13, the scan lines TL and the source lines RL are disposed under the second base substrate SUB2. In FIG. 14, the scan lines TL and the source lines RL are disposed on the second base substrate SUB2.

Referring to FIG. 13, a black matrix BM including a plurality of openings BM-OP is disposed on a lower surface of the second base substrate SUB2 of the display panel LDP10. Color filters CF are disposed in the openings BM-OP. The scan lines TL and the source lines RL are disposed to overlap, at least partially, with the black matrix BM.

The scan lines TL are disposed on a lower surface of the black matrix BM. A third insulating layer IL-1 is disposed on the black matrix BM and the color filters CF to cover the scan lines TL. The third insulating layer IL-1 provides a flat surface thereon. A fourth insulating layer IL-2 is disposed on the third insulating layer IL-1 to cover the source lines RL. Each of the third insulating layer IL-1 and the fourth insulating layer IL-2 includes at least one organic layer and/or at least one inorganic layer.

Referring to FIG. 14, a black matrix BM including a plurality of openings BM-OP is disposed on a lower surface of the second base substrate SUB2 of the display panel LDP20. Color filters CF are disposed in the openings BM-OP. The source lines RL are disposed on an upper surface of the second base substrate SUB2 to overlap, at least partially, with the black matrix BM.

A third insulating layer IL-1 is disposed on the upper surface of the second base substrate SUB to cover the source lines RL. The third insulating layer IL-1 provides a flat surface thereon. The scan lines TL are disposed on the third insulating layer IL-1. A fourth insulating layer IL-2 is disposed on the third insulating layer IL-1 to cover the scan lines TL. A protection layer PL is disposed on the fourth insulating layer IL-2. In some cases, the positions of the scan lines TL and the source lines RL may be switched.

Figure 15A:
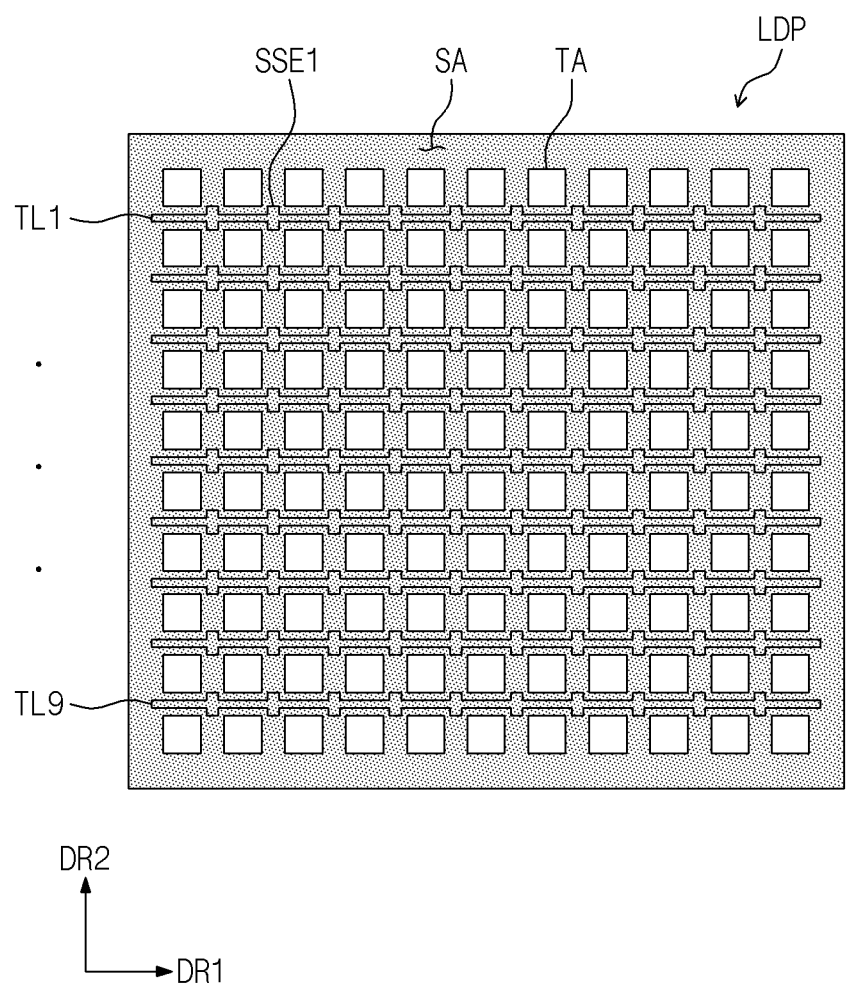
FIGS. 15A and 15B are plan views showing display panels according to exemplary embodiments of the present disclosure.
Figure 15B:
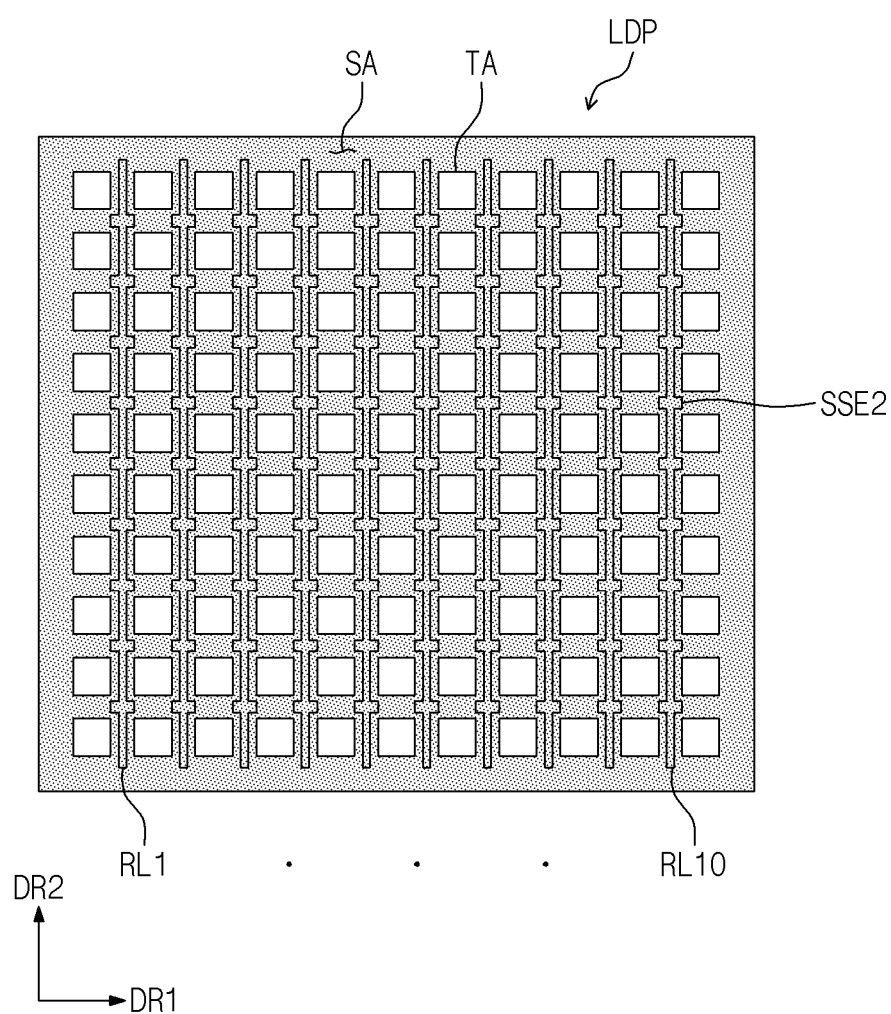

FIGS. 15A and 15B are plan views showing display panels according to exemplary embodiments of the present disclosure. In FIGS. 15A and 15B, the same reference numerals denote the same elements in FIGS. 1 to 3, and thus detailed descriptions of the same elements will be omitted.

Referring to FIGS. 15A and 15B, a plurality of scan lines TL1 to TL9 and a plurality of source lines RL1 to RL10 are disposed in the blocking area SA. Each of the scan lines TL1 to TL9 further includes first sensing electrodes SSE1 disposed at positions in which each of the scan lines TL1 to TL9 crosses the source lines RL1 to RL10. In addition, each of the source lines RL1 to RL9 further includes second sensing electrodes SSE2 disposed at positions in which each of the source lines RL1 to RL9 crosses the scan lines TL1 to TL9.

The first sensing electrodes SSE1 are overlapped with the second sensing electrodes SSE2. The overlap areas between the scan lines TL1 to TL9 and the source lines RL1 to RL10 are increased by the first sensing electrodes SSE1 and the second sensing electrodes SSE2. Accordingly, the capacitance variation of capacitors formed between the scan lines TL1 to TL9 and the source lines RL1 to RL10 becomes large. Therefore, touch sensitivity in the first mode may be improved. In some cases, either the first sensing electrodes SSE1 or the second sensing electrodes SSE2 may be omitted.

Figure 16:
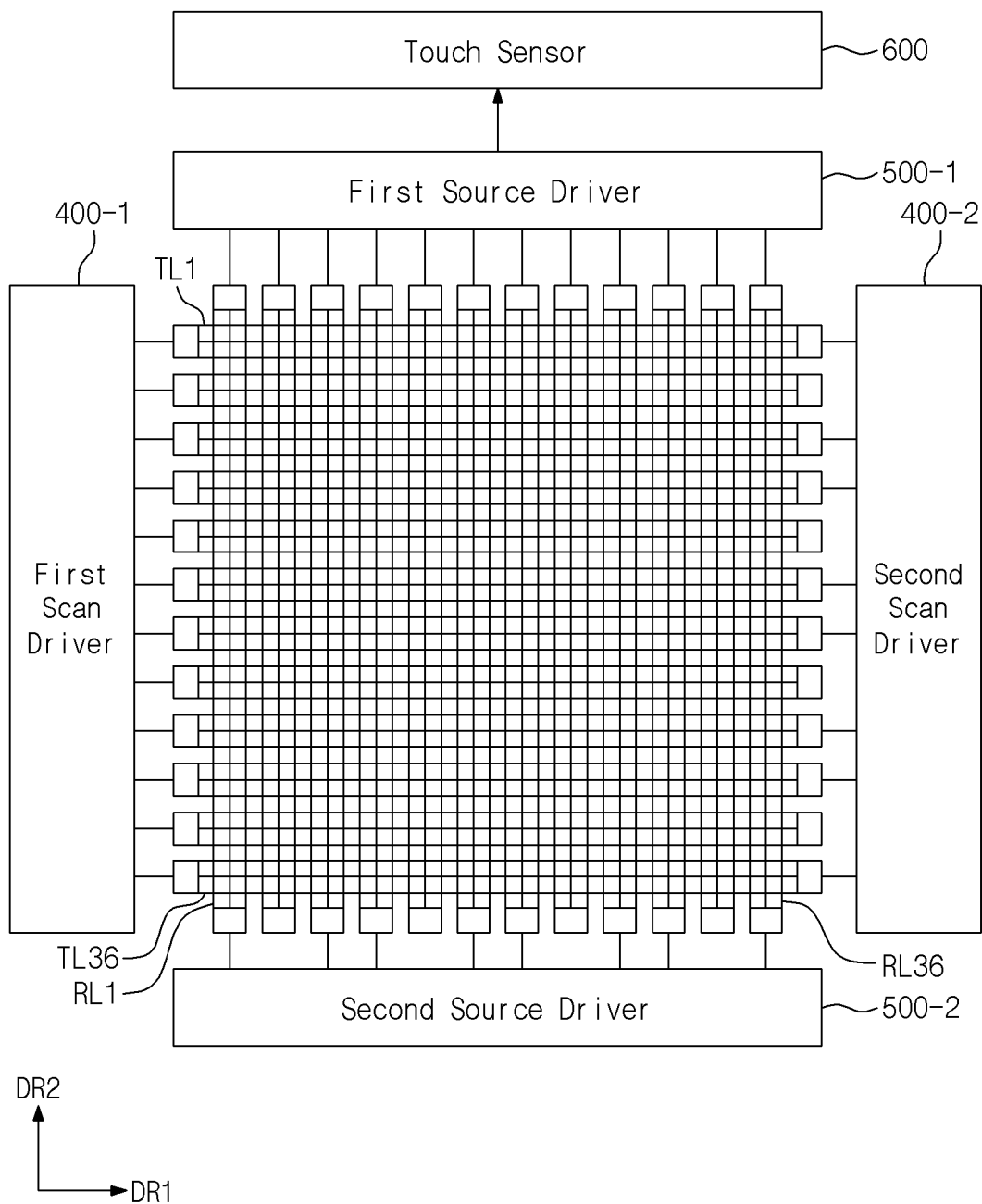
FIG. 16 is a block diagram showing a touch panel according to exemplary embodiments of the present disclosure.
Figure 17:
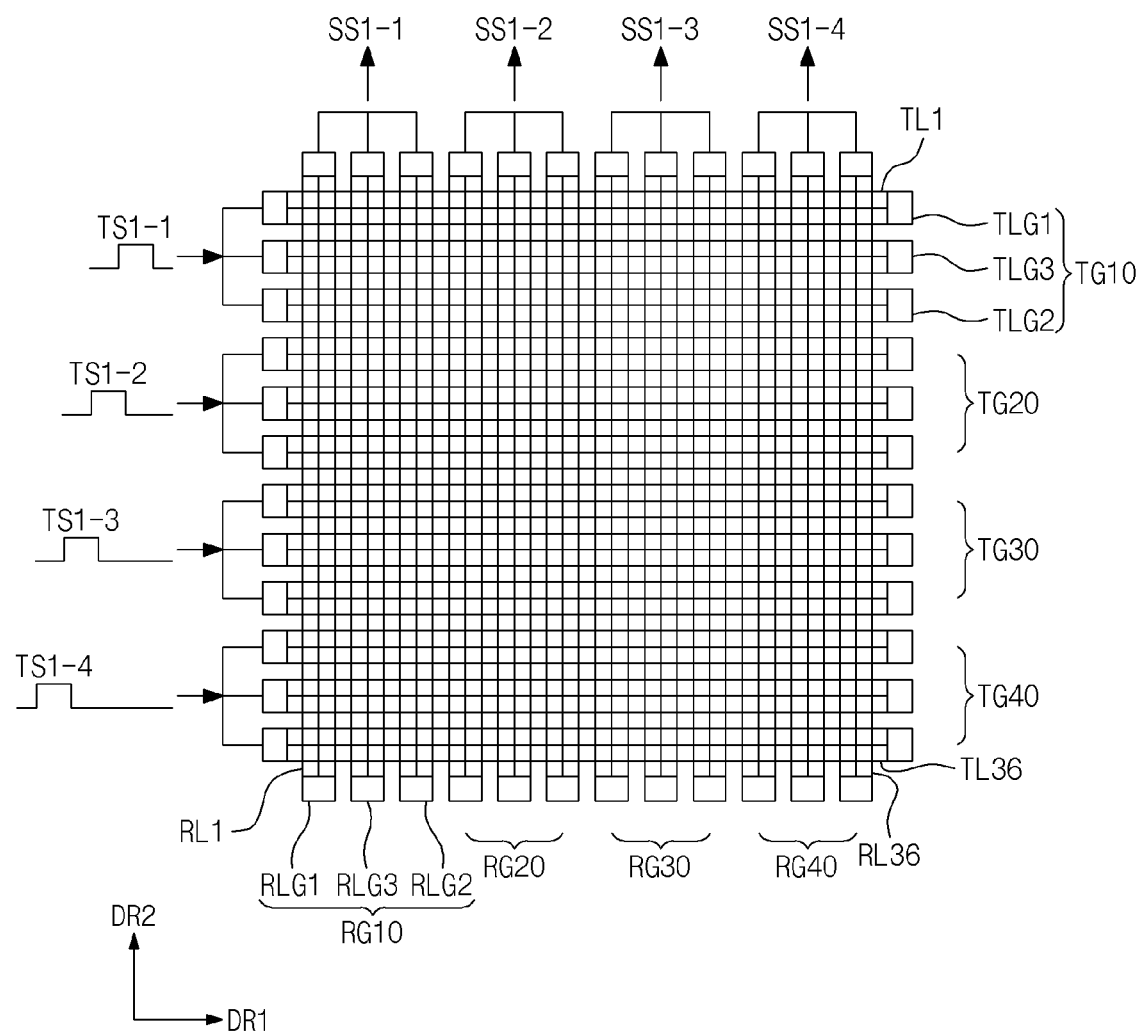
FIG. 17 is a view showing a touch panel operated in a first mode according to exemplary embodiments of the present disclosure.
Figure 18A:
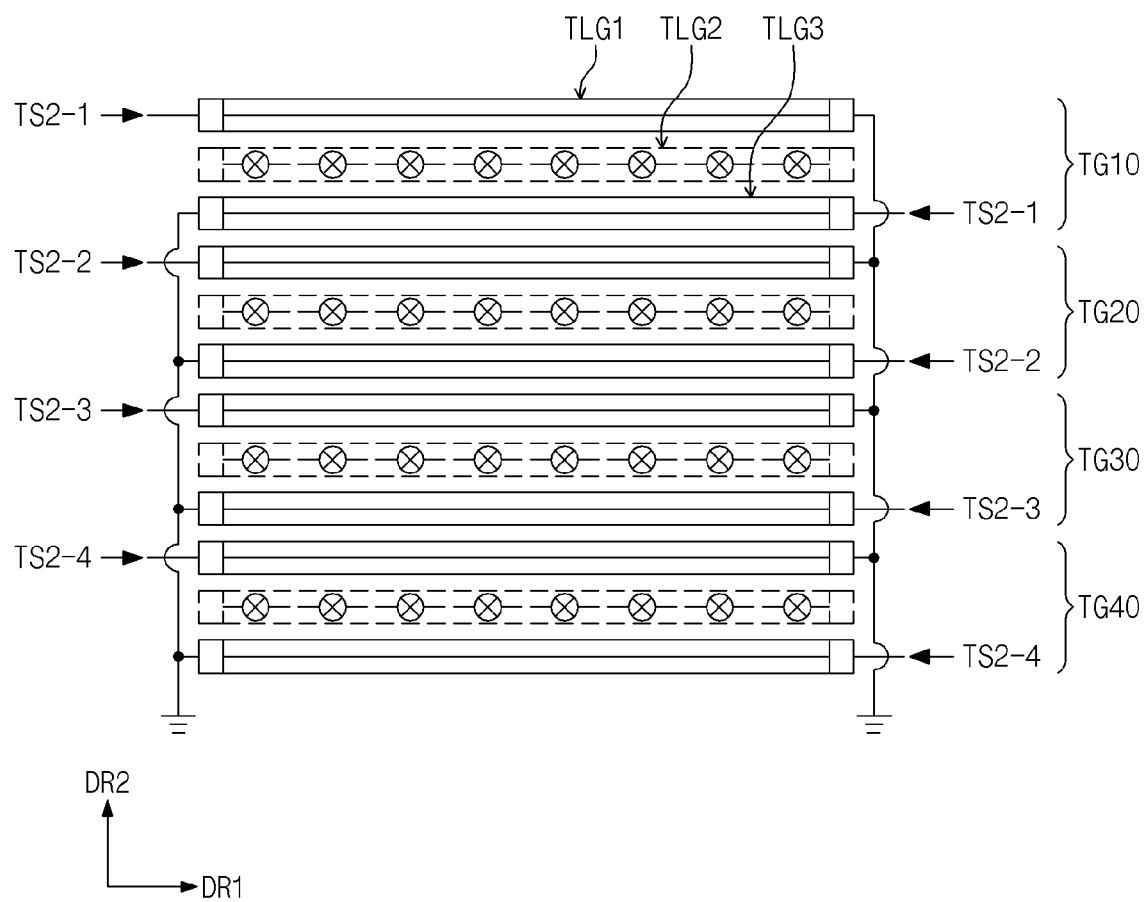
FIGS. 18A and 18B are views showing touch panels operated in a second mode according to exemplary embodiments of the present disclosure.
Figure 18B:
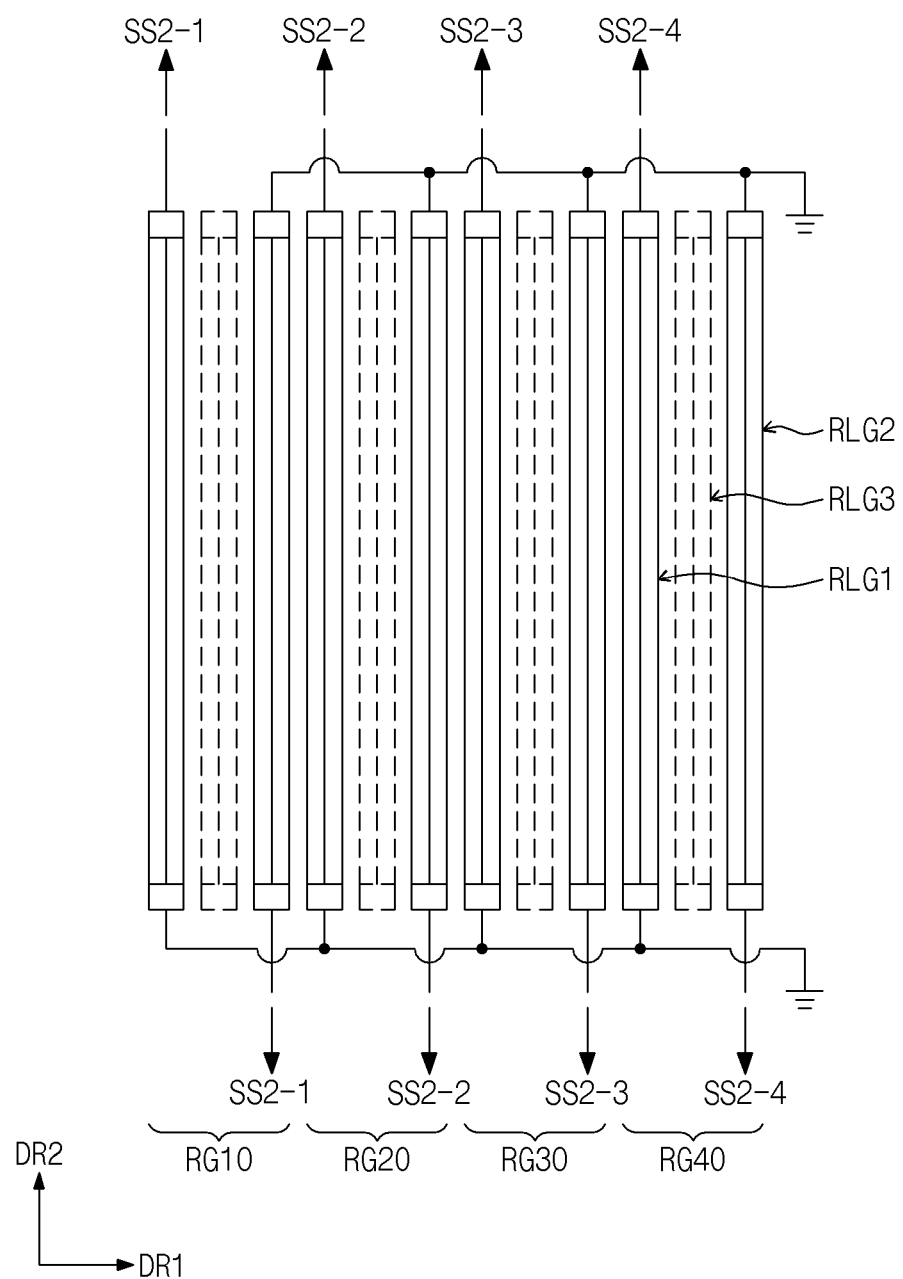

FIG. 16 is a block diagram showing a touch panel according to exemplary embodiments of the present disclosure, FIG. 17 is a view showing a touch panel operated in a first mode. FIGS. 18A and 18B are views showing touch panels operated in a second mode. In FIGS. 16, 17, 18A, and 18B, the same reference numerals denote the same elements in FIGS. 1 to 15B, and thus detailed descriptions of the same elements will be omitted.

With respect to FIG. 16, a display device includes a display panel LDP (refer to FIG. 1), a signal controller 100 (refer to FIG. 1), a gate driver 200 (refer to FIG. 1), a data driver 300 (refer to FIG. 1), first drivers 400-1 and 400-2, second drivers 500-1 and 500-2, and a touch sensor 600. FIGS. 16 to 18B show thirty-six scan lines TL1 to TL36 and thirty-six source lines RL1 to RL36. The first and second scan drivers 400-1 and 400-2, the first and second source drivers 500-1 and 500-2, the touch sensor 600, the scan lines TL1 to TL36, and the source lines RL1 to RL36 form the touch panel.

Referring to FIGS. 16 to 18B, the scan lines TL1 to TL36 are extended in the first direction DR1 and arranged in the second direction DR2. The source lines RL1 to RL36 are extended in the second direction DR2 and arranged in the first direction DR1. The scan lines TL1 to TL36 are grouped into four scan line groups TG10, TG20, TG30, and TG40, and the source lines RL1 to RL36 are grouped into four source line groups RG10, RG20, RG30, and RG40.

Each of the first to fourth scan line groups TG10, TG20, TG30, and TG40 includes a first scan line sub-group TLG1, a second scan line sub-group TLG2, and a third scan line sub-group TLG3. The third scan line sub-group TLG3 is disposed between the first scan line sub-group TLG1 and the second scan line sub-group TLG2. Each of the first scan line sub-group TLG1, the second scan line sub-group TLG2, and the third scan line sub-group TLG3 includes at least one scan line.

The first scan line sub-group TLG1, the second scan line sub-group TLG2, and the third scan line sub-group TLG3 include the same number of scan lines. For instance, each scan line sub-group includes three scan lines as shown in FIGS. 16 and 17. It should be understood that various numbers of scan lines may be included in each scan line sub-group. The three scan lines are connected to each other at two ends thereof.

Each of the first to fourth source line groups RG10, RG20, RG30, and RG40 includes a first source line sub-group RLG1, a second source line sub-group RLG2, and a third source line sub-group RLG3. The third source line sub-group RLG3 is disposed between the first source line sub-group RLG1 and the second source line sub-group RLG2. Each of the first source line sub-group RLG1, the second source line sub-group RLG2, and the third source line sub-group RLG3 includes at least one source line.

The first source line sub-group RLG1, the second source line sub-group RLG2, and the third source line sub-group RLG3 include the same number of source lines. Three source lines of each of the first to third source line sub-groups RLG1 to RLG3 are connected to each other at two ends thereof. It should be understood that various numbers of source lines may be included in each source line sub-group.

The first scan driver 400-1 is connected to first ends of the first to fourth scan line groups TG10, TG20, TG30, and TG40, and the second scan driver 400-2 is connected to the second ends of the first to fourth scan line groups TG10, TG20, TG30, and TG40. For instance, the first scan driver 400-1 is connected to the first end of the first scan line sub-group TLG1, the second scan line sub-group TLG2, and the third scan line sub-group TLG3 of each of the first to fourth scan line groups TG10, TG20, TG30, and TG40. The second scan driver 400-2 is connected to the second end of the first scan line sub-group TLG1 and the second scan line sub-group TLG2 of each of the first to fourth scan line groups TG10, TG20, TG30, and TG40.

The first source driver 500-1 is connected to first ends of the first to fourth source line groups RG10, RG20, RG30, and RG40, and the second source driver 500-2 is connected to the second ends of the first to fourth source line groups RG10, RG20, RG30, and RG40. For example, the first source driver 500-1 is connected to the first end of the first source line sub-group RLG1, the second source line sub-group RLG2, and the third source line sub-group RLG3 of each of the first to fourth source line groups RG10, RG20, RG30, and RG40. The second source driver 500-2 is connected to the second end of the first source line sub-group RLG1 and the second source line sub-group RLG2 of each of the first to fourth source line groups RG10, RG20, RG30, and RG40.

FIG. 17 shows the touch panel operated in the first mode. The touch panel operated in the first mode calculates the coordinate information of the input position in the same way as an electrostatic capacitive type touch panel. The method of calculating the coordinate information of the input position is the same as that described with reference to FIG. 6, and thus detailed descriptions thereof will be omitted.

The touch panel shown in FIGS. 18A and 18B and operated in the second mode calculates the coordinate information of the input position in the same way as an electromagnetic induction type touch panel. The first to fourth scan line groups TG10, TG20, TG30, and TG40 correspond to input coils of the electromagnetic induction type touch panel, and the first to fourth source line groups RG10, RG20, RG30, and RG40 correspond to output coils of the electromagnetic induction type touch panel.

Referring to FIG. 18A, the first to fourth scan line groups TG10, TG20, TG30, and TG40 receive second scan signals TS2-1 to TS2-4 in different periods. The second scan signals TS2-1 to TS2-4 are respectively applied to first ends of the first scan line sub-groups TLG1 and to second ends of the second scan line sub-group TLG2 of the first to fourth scan line groups TG10, TG20, TG30, and TG40. The second end of the first scan ling sub-group TLG1 and the first end of the second scan line sub-group TLG2 of each of the first to fourth scan line groups TG10, TG20, TG30, and TG40 are grounded. The third scan line sub-group TLG3 of each of the first to fourth scan line groups TG10, TG20, TG30, and TG40 is floated without receiving any voltage.

In the second mode, a direction in which a current flows through the first scan line sub-group TLG1 of each of the first to fourth scan line groups TG10, TG20, TG30, and TG40 is opposite to a direction in which a current flows through the second scan line sub-group TLG2 of each of the first to fourth scan line groups TG10, TG20, TG30, and TG40. A magnetic field is induced by the currents flowing through the first scan line sub-group TLG1 and the second scan line sub-group TLG2 in opposite directions. Although the first scan line sub-group TLG1 is not connected to the second scan line sub-group TLG2, the first scan line sub-group TLG1 and the second scan line sub-group TLG2 form one coil. Since the first to fourth scan line groups TG10, TG20, TG30, and TG40 receive the second scan signals TS2-1 to TS2-4 in different periods, the magnetic field is induced in different periods.

When the input device (not shown) approaches the first to fourth scan line groups TG10, TG20, TG30, and TG40, the magnetic field induced from the first to fourth scan line groups TG10, TG20, TG30, and TG40 resonates with the resonant circuit of the input device. Thus, the input device causes generation of the resonant frequency.

Referring to FIG. 18B, the first to fourth source line groups RG10, RG20, RG30, and RG40 output second sensing signals SS2-1 to SS2-4 according to the resonant frequency of the input device. The second sensing signals SS2-1 to SS2-4 are output from the first ends of the first source line sub-groups RGL1 and the second ends of the second source line sub-groups RLG2 of the first to fourth source line groups RG10, RG20, RG30, and RG40. The second end of the first source line sub-group RLG1 and the first end of the second source line sub-group RLG2 of each of the first to fourth source line groups RG10, RG20, RG30, and RG40 are grounded. The third source line sub-group RLG3 of each of the first to fourth source line groups RG10, RG20, RG30, and RG40 is floated without receiving any voltage.

The touch sensor 600 calculates the coordinate information about the input position based on the second sensing signals SS2-1 to SS2-4 provided from at least one of the first end of the first source line sub-group RLG1 of each of the first to fourth source line groups RG10, RG20, RG30, and RG40 or the second end of the second source line sub-group RLG2 of each of the first to fourth source line groups RG10, RG20, RG30, and RG40.

Figure 19:
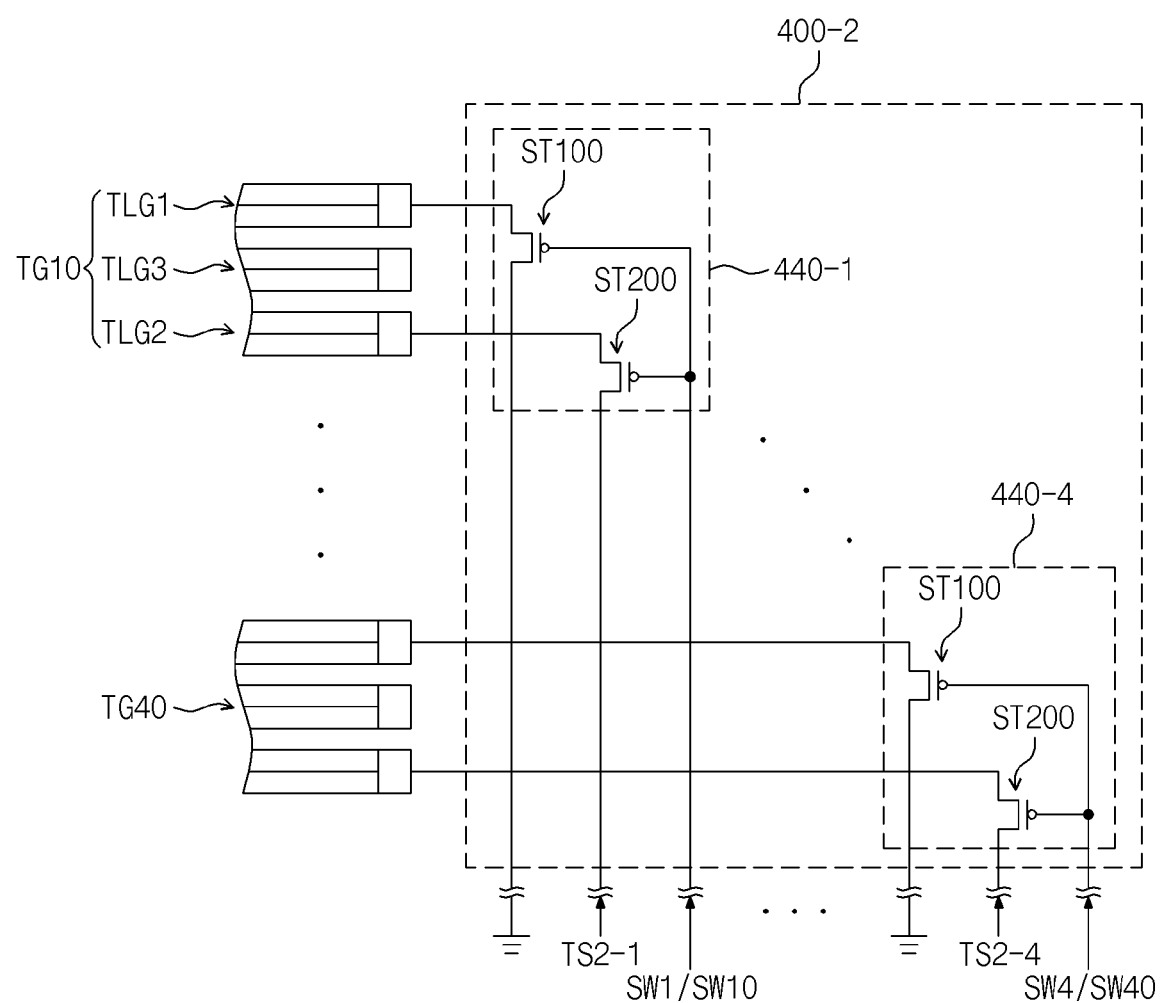
FIG. 19 is a bock diagram showing a second scan driver according to exemplary embodiments of the present disclosure.
Figure 20:
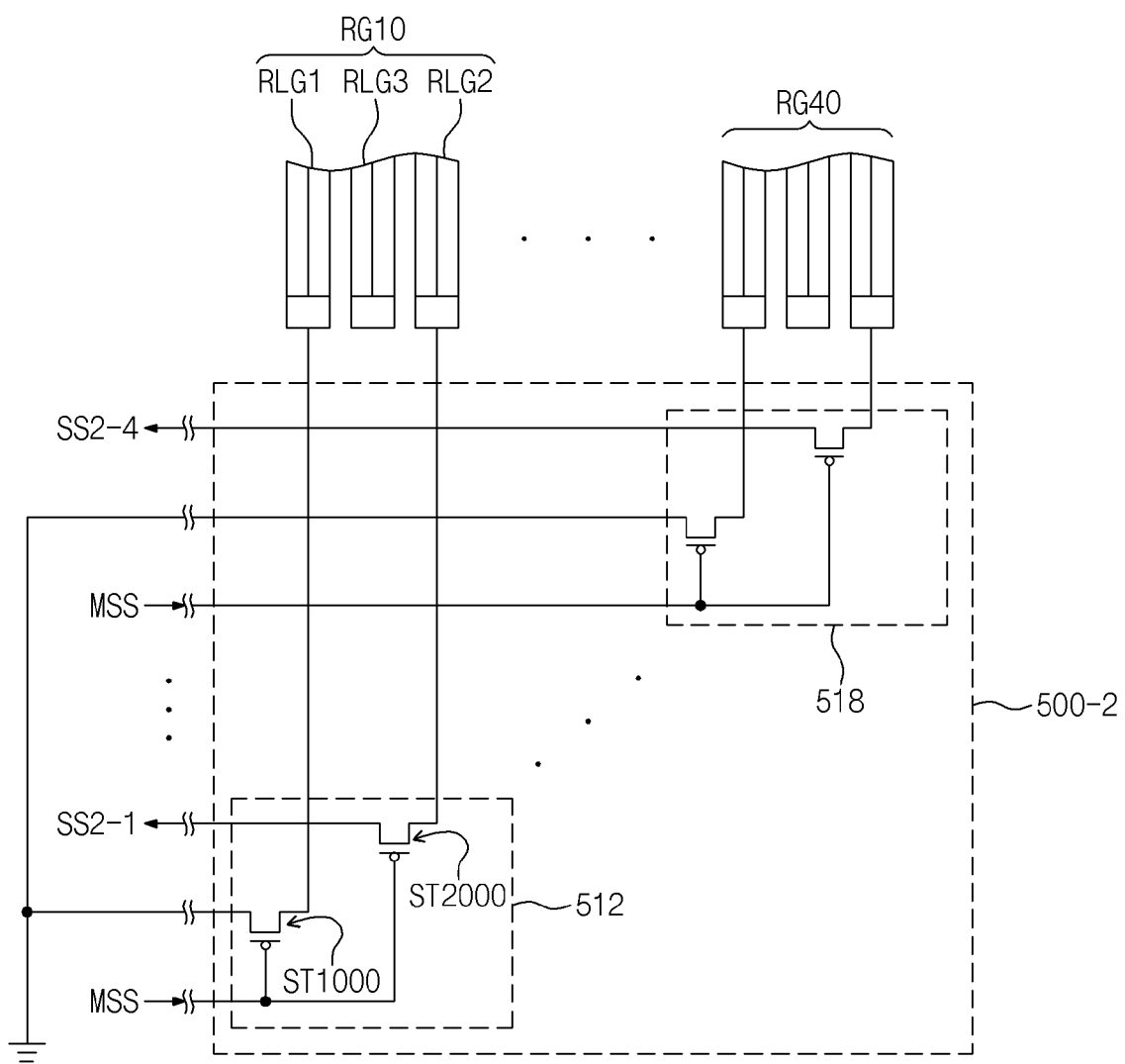
FIG. 20 is a block diagram showing a second source driver according to exemplary embodiments of the present disclosure.

FIG. 19 is a bock diagram showing the second scan driver 400-2 according to exemplary embodiments of the present disclosure. FIG. 20 is a block diagram showing the second source driver 500-2 according to exemplary embodiments of the present disclosure. Hereinafter, the second scan driver 400-2 and the second source driver 500-2 will be described in detail with reference to FIGS. 19 and 20. The first scan driver 400-1 may have the same or similar configuration and function as the configuration and function of the first driver 400 described with reference to FIGS. 9 and 10, and thus the detailed description of the first scan driver 400-1 will be omitted. In addition, the first source driver 500-1 may have the same configuration and function as the configuration and function of the second driver 500 described with reference to FIGS. 11 and 12, and thus the detailed description of the first source driver 500-1 will be omitted.

Referring to FIG. 19, the second scan driver 400-2 includes switching parts 440-1 to 440-4. The switching parts 440-1 to 440-4 respectively receive the first switching control signals SW-1 to SW-4 in the first mode and respectively receive the second switching control signals SW-10 to SW-40 in the second mode.

The switching parts 440-1 to 440-4 float the second end of the first scan line sub-group TLG1 and the second end of the second scan line sub-group TLG2 of each of the first to fourth scan line groups TG10, TG20, TG30, and TG40 in the first mode. The switching parts 440-1 to 440-4 ground the second end of the first scan line sub-group TLG1 of each of the first to fourth scan line groups TG10, TG20, TG30, and TG40 in the second mode and apply the second scan signals TS2-1 to TS2-4 to the second end of the second scan line sub-group TLG2 of each of the first to fourth scan line groups TG10, TG20, TG30, and TG40 in the second mode.

Among the switching parts 440-1 to 440-4, two switching parts 440-1 and 440-4 have been shown in FIG. 19 as an example. Each of the switching parts 440-1 to 440-4 includes a first switch ST100 and a second switch ST200.

The first switch ST100 is turned off in the first mode and turned on in the second mode to apply the ground voltage to the second end of the first scan line sub-group TLG1. The second switch ST200 is turned off in the first mode and turned on in the second mode to apply the second scan signal TS2-1 to the second end of the second scan line sub-group TLG2. The first switch ST100 and the second switch ST200 may be a PMOS transistor or a NMOS transistor. FIG. 19 shows PMOS transistors as a representative example.

Referring to FIG. 20, the second source driver 500-2 includes a plurality of switching parts 512 to 518. FIG. 20 shows four switching parts 512 to 518 as an example. Each of the switching parts 512 to 518 receives the mode selection signal MSS.

The switching parts 512 to 518 float the second end of the first source line sub-group RLG1 and the second end of the second source line sub-group RLG2 of each of the first to fourth source line groups RG10, RG20, RG30, and RG40 in the first mode. The switching parts 512 to 518 ground the second end of the first source line sub-group RLG1 of each of the first to fourth source line groups RG10, RG20, RG30, and RG40 in the second mode and output the second sensing signal SS2-1 from the second end of the second source line sub-group RLG2. The second sensing signal SS2-1 output from the second end of the second source line sub-group RLG2 may be applied to the touch sensor 600.

Among the switching parts 512 to 518, two switching parts 512 and 518 have been shown in FIG. 20 as an example. Each of the switching parts 512 to 518 includes a first switch ST1000 and a second switch ST2000. Responsive to the mode selection signal MSS, the first and second switches ST1000 and ST2000 are turned off in the first mode and turned on in the second mode. The first switch ST1000 and the second switch ST2000 may be a PMOS transistor or a NMOS transistor. FIG. 20 shows PMOS transistors as a representative example.

Figure 21:
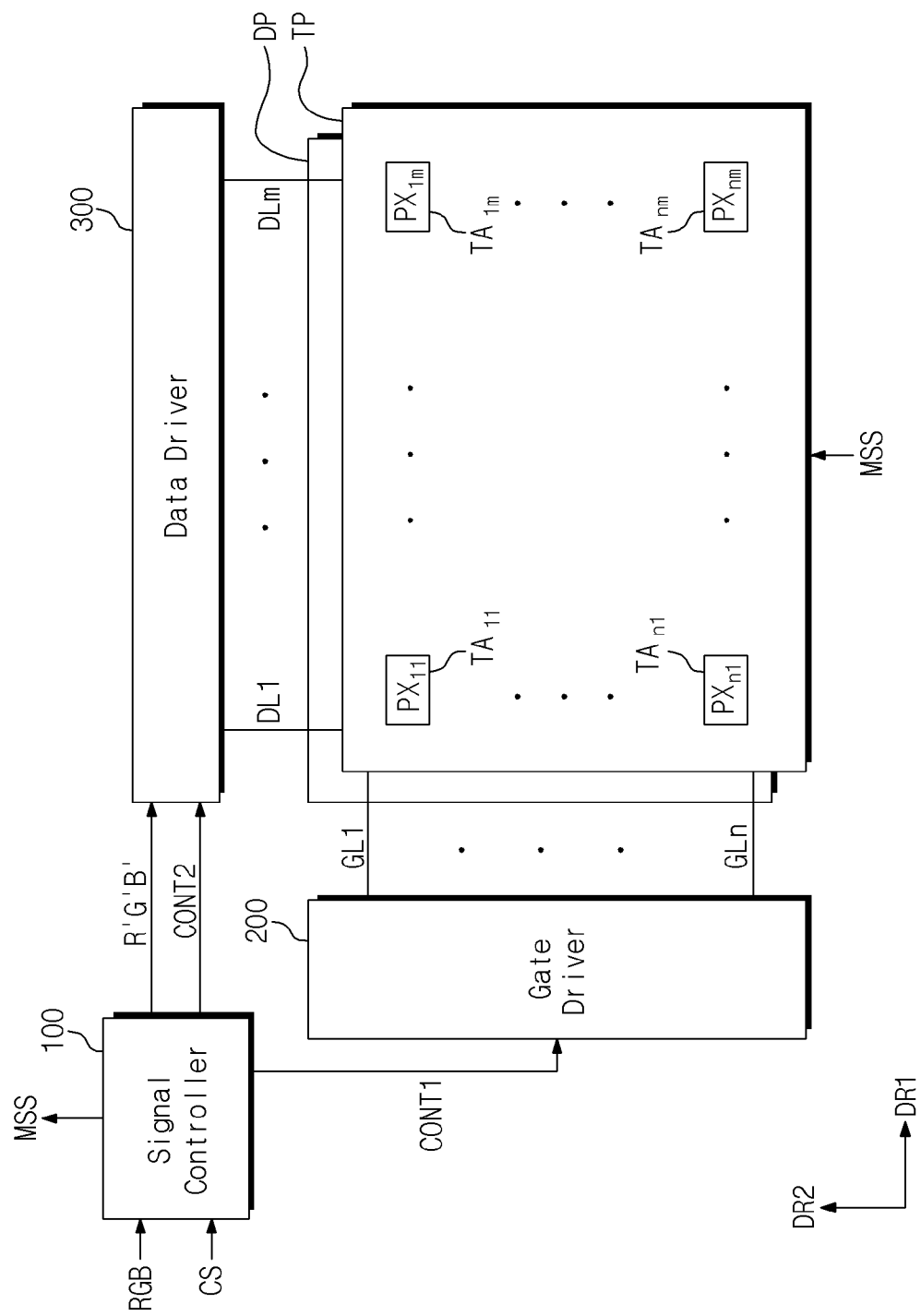
FIG. 21 is a block diagram showing a display device according to exemplary embodiments of the present disclosure.
Figure 22:
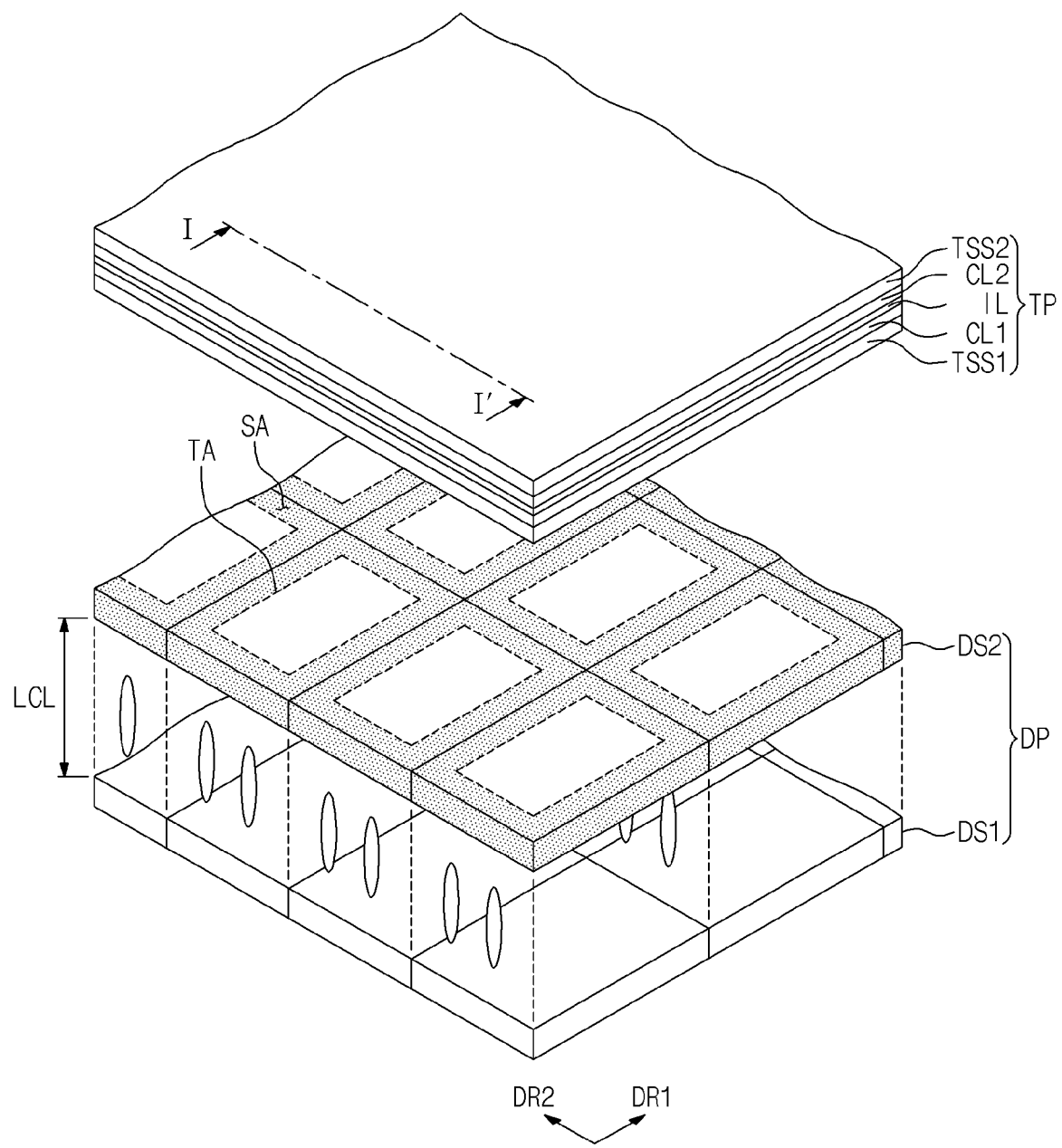
FIG. 22 is a partial perspective view showing a display panel and a touch panel shown in FIG. 21 according to exemplary embodiments of the present disclosure.
Figure 23A:
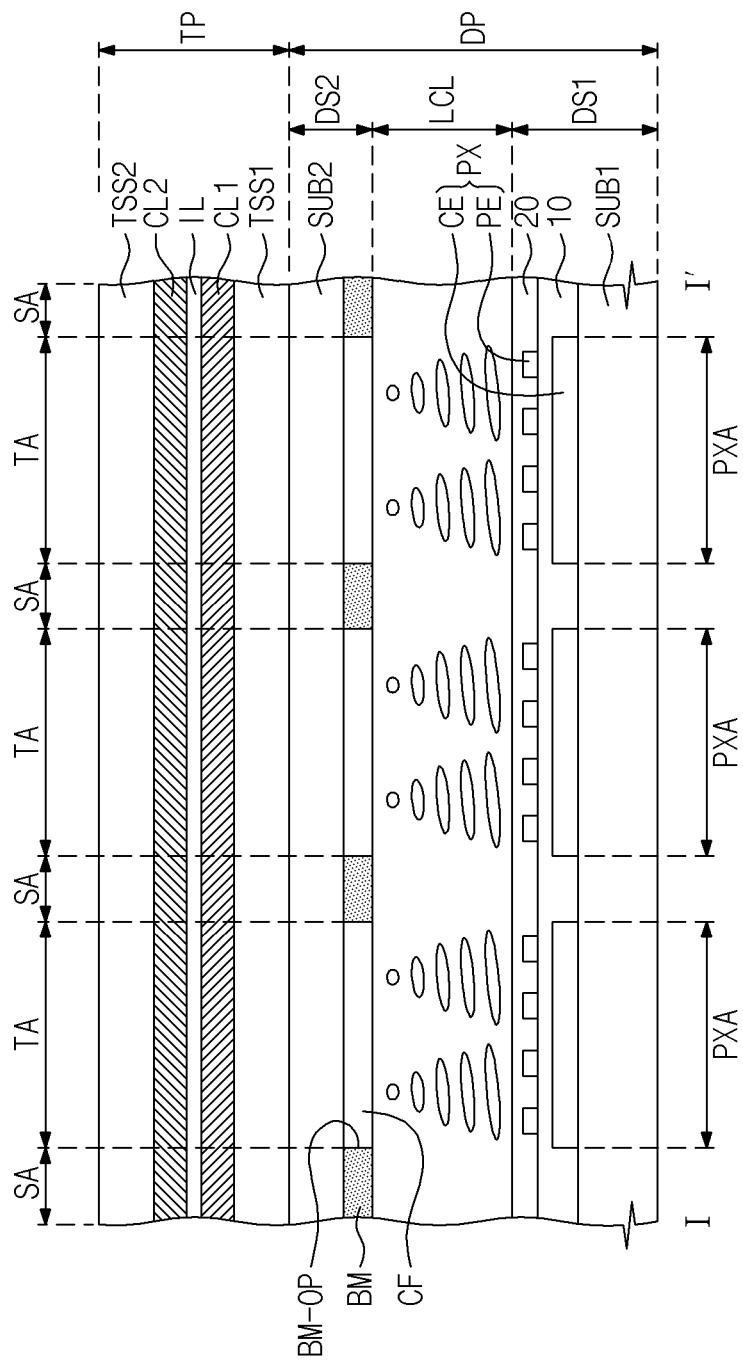
FIGS. 23A and 23B are cross-sectional views taken along a line I-I' shown in FIG. 22 according to exemplary embodiments of the present disclosure.
Figure 23B:
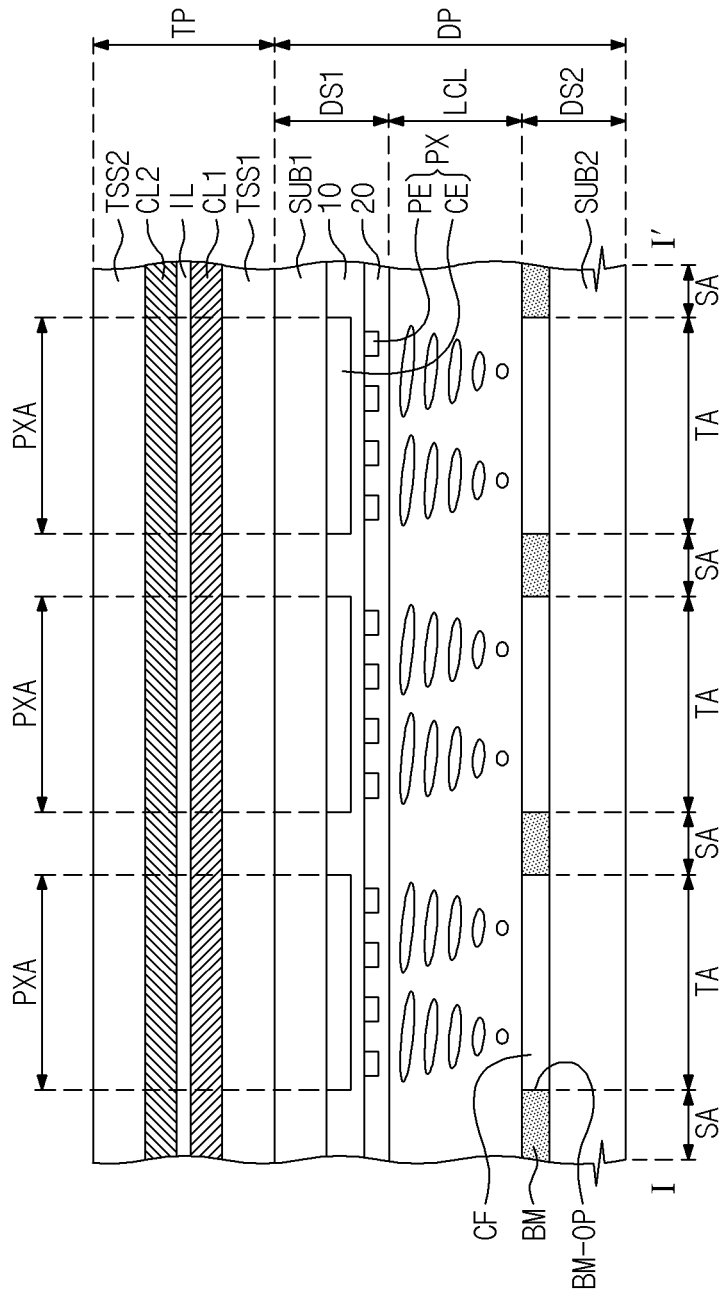

FIG. 21 is a block diagram showing a display device according to exemplary embodiments of the present disclosure. FIG. 22 is a partial perspective view showing a display panel and a touch panel shown in FIG. 21. FIGS. 23A and 23B are cross-sectional views taken along a line I-I' shown in FIG. 22. FIG. 21 shows the display panel DP and the touch panel TP, which are dislocated from each other to separately show the display panel DP and the touch panel TP.

Referring to FIG. 21, the display device includes a display panel DP, a signal controller 100, a gate driver 200, a data driver 300, and a touch panel TP. The signal controller 100, the gate driver 200, and the data driver 300 control the display panel DP to generate an image. Although not shown in figures, the display device further includes a touch panel driver to drive the touch panel TP and a touch sensor to calculate coordinate information of an input position.

The display panel DP may be various types of display panels, including, for example a LCD panel. The display panel DP includes a plurality of gate lines GL1 to GLn, a plurality of data lines DL1 to DLm, and a plurality of pixels PX11 to PXnm. The gate lines GL1 to GLn are extended in a first direction DR1 and arranged in a second direction DR2 substantially perpendicular to the first direction DR1. The data line DL1 to DLm are extended in the second direction DR2 and arranged in the first direction DR1. The data lines DL1 to DLm are insulated from the gate lines GL1 to GLn while crossing the gate lines GL1 to GLn.

The pixels PX11 to PXnm are arranged in a matrix form. The pixels PX11 to PXnm are arranged in pixel areas PXA11 to PXAnm, respectively. Each of the pixels PX11 to PXnm is connected to a corresponding gate line of the gate lines GL1 to GLn and a corresponding data line of the data lines DL1 to DLm.

The signal controller 100 receives input image signals RGB and converts the input image signals RGB to image data R'G'B' corresponding to an operating mode of the display panel DP. In addition, the signal controller 100 receives various control signals CS, such as a vertical synchronizing signal, a horizontal synchronizing signal, a main clock signal, a data enable signal, etc., and outputs first and second control signals CONT1 and CONT2 and a mode selection signal MSS.

The mode selection signal MSS determines the operating mode of the touch panel TP. The touch panel TP is operated in an electrostatic capacitive mode (hereinafter, referred to as a first mode), an electromagnetic induction mode (hereinafter, referred to as a second mode), or a hybrid mode (hereinafter, referred to as a third mode).

The mode selection signal MSS may be generated on the basis of the image displayed in the display panel DP. The mode selection signal MSS may have different levels corresponding to the operating modes. For instance, when the display panel DP displays a keypad image, the mode selection signal MSS is output as a signal to activate the first mode, and when the display panel DP displays a background image, the mode selection signal MSS is output as a signal to activate the third mode. In some cases, the mode selection signal MSS may be input by the user. For instance, the mode selection signal MSS is generated corresponding to an information inputted to a keypad by the user. The user may touch a first mode activating button.

The gate driver 200 applies gate signals to the gate lines GL1 to GLn in response to the first control signal CONT1. The data driver 300 receives the second control signal CONT2 and the image data R'G'B'. The data driver 300 converts the image data R'G'B' to data voltages and applies the data voltages to the data lines DL1 to DLm.

Referring to FIG. 22, the display panel DP includes a first display substrate DS1 and a second display substrate DS2, which are disposed to be spaced apart from each other. A liquid crystal layer LCL is disposed between the first display substrate DS1 and the second display substrate DS2. The gate lines GL1 to GLn (refer to FIG. 1), the data lines DL1 to DLm (refer to FIG. 1), and the pixels PX11 to PXnm (refer to FIG. 1) may be disposed on the first display substrate DS1 or the second display substrate DS1.

Hereinafter, to explain the exemplary embodiments, the gate lines GL1 to GLn, the data lines DL1 to DLm, and the pixels PX11 to PXnm are assumed to be disposed on the first display substrate DS1. The second display substrate DS2 includes a plurality of transmitting areas TA and a blocking area SA. The blocking area SA surrounds the transmitting areas TA. The transmitting areas TA transmit light generated by and provided from the backlight unit, and the blocking area SA blocks the light.

The touch panel TP is disposed on the display panel DP. The touch panel TP may be attached to the upper surface of the second display substrate DS2. The touch panel TP includes a first touch substrate TSS1, a first conductive layer CL1, an insulating layer IL, a second conductive layer CL2, and a second touch substrate TSS2.

The first touch substrate TSS1 and the second touch substrate TSS2 may be configured to include a plastic substrate, a glass substrate, or a film. In addition, the first touch substrate TSS1 and the second touch substrate TSS2 may be an optical film, e.g., a polarizing plate. The first conductive layer CL1 and the second conductive layer CL2 may be configured to include a transparent metal oxide material or a metal material with a low reflectivity including at least one of chromium oxide, chromium nitride, titanium oxide, titanium nitride, or alloys thereof. The insulating layer IL may be configured to include an organic insulating material or an inorganic insulating material.

Although not shown in FIG. 22, each of the first and second conductive layers CL1 and CL2 includes a plurality of conductive patterns. The conductive patterns of the first conductive layer CL1 are configured to include portions (e.g., first portions) of first touch electrodes, second touch electrodes, first touch coils, and second touch coils, and the conductive patterns of the second conductive layer CL2 are configured to include other portions (e.g., second portions) of first touch electrodes, second touch electrodes, first touch coils, and second touch coils.

The first conductive layer CL1 and the second conductive layer CL2 are insulated from each other by the insulating layer IL. The insulating layer IL may have a multi-layer structure. For instance, the insulating layer IL may include at least one organic layer and/or at least one inorganic layer. The organic layer and the inorganic layer in the insulating layer IL may be stacked on one another.

Referring to FIG. 23A, the first display substrate DS1 includes a first base substrate SUB1, a plurality of insulating layers 10 and 20, and a plurality of pixels PX. The pixel areas PXA are defined in the first display substrate DS1 and the pixels PX are disposed on the first display substrate DS1. FIG. 23A shows three pixel areas PXA. The three pixel areas PXA correspond to a part of the pixel areas PXA11 to PXAnm shown in FIG. 21.

Each of the pixels PX includes a common electrode PE and a common electrode CE. In addition, each of the pixels PX further includes a thin film transistor (not shown). The pixel electrode PE may be disposed on a layer different from a layer on which the common electrode CE is disposed.

The second display substrate DS2 includes a second base substrate SUB2, a black matrix BM, and a plurality of color filters CF. The black matrix BM includes openings BM-OP. The color filters CF are disposed in the openings BM-OP. The pixel areas PXA correspond to the openings BM-OP, respectively, and the blocking area SA corresponds to the areas in which the black matrix BM is disposed.

As shown in FIG. 23B, the display panel DP includes the first display substrate DS1 disposed on the liquid crystal layer LCL and the second display substrate DS2 disposed under the liquid crystal layer LCL. The touch panel TP is disposed on the first display substrate DS1. The first display substrate DS1, the second display substrate DS2, and the touch panel TP have the same or similar structure and function as the structure and function of the display device shown in FIG. 3A. In some cases, the color filter CF may be disposed on the first display substrate DS1.

Figure 24A:
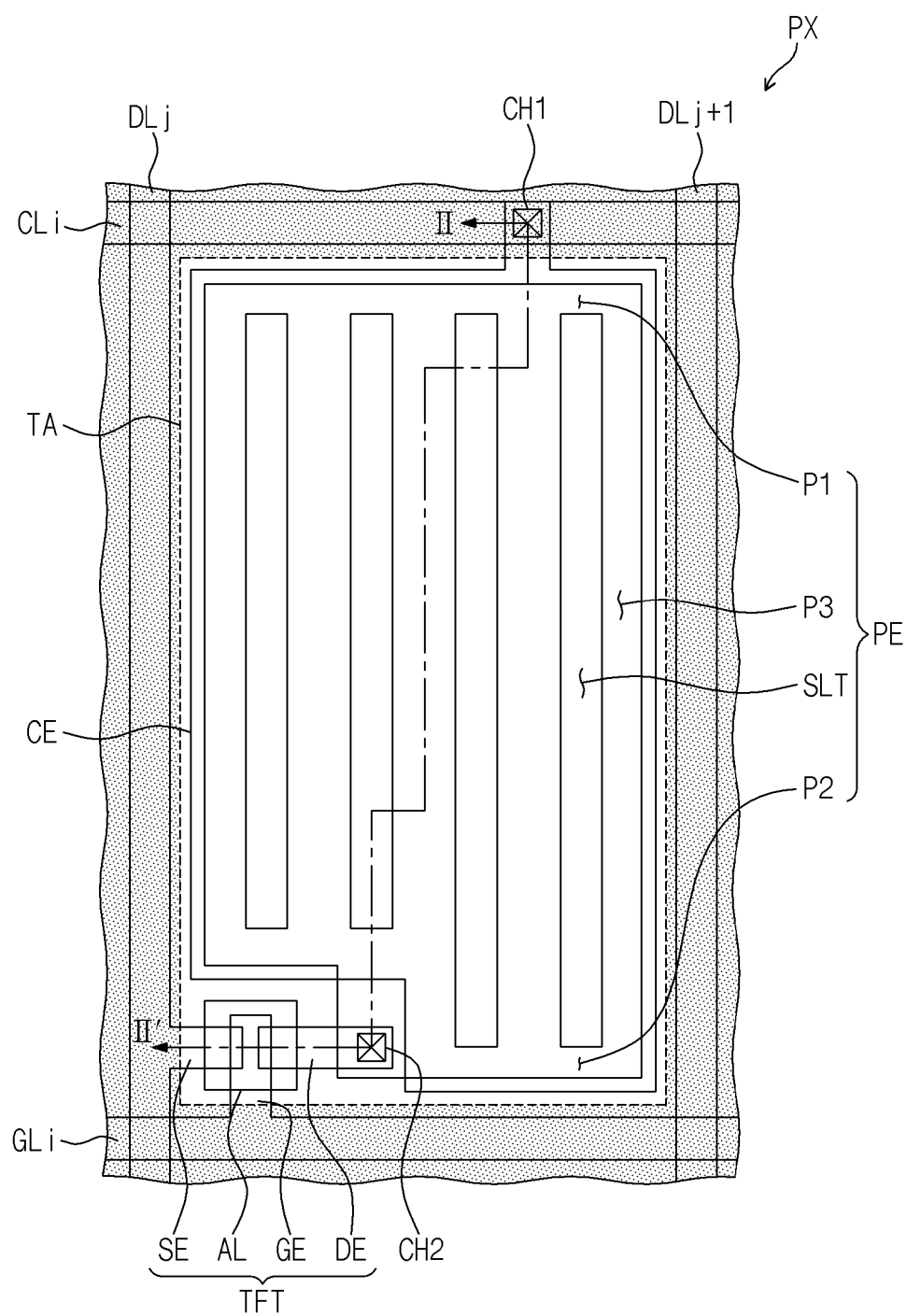
FIG. 24A is a plan view showing a pixel of a display panel according to exemplary embodiments of the present disclosure.
Figure 24B:
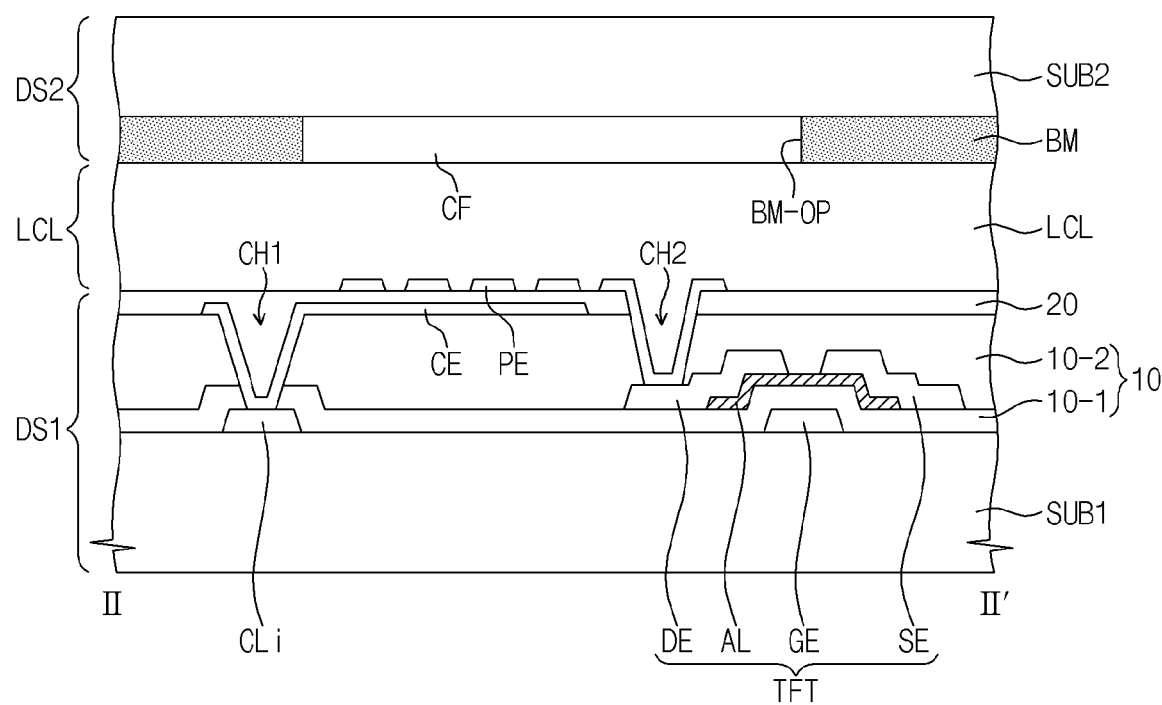
FIG. 24B is a cross-sectional view taken along a line II-II' shown in FIG. 24A according to exemplary embodiments of the present disclosure.

FIG. 24A is a plan view showing a pixel of a display panel DP according to exemplary embodiments of the present disclosure. FIG. 24B is a cross-sectional view taken along a line II-IF shown in FIG. 24A. FIGS. 24A and 24B show the display panel DP according to the display panel DP shown in FIG. 23A and do not show the touch panel. Hereinafter, the display panel DP will be described in detail with reference to FIGS. 24A and 24B. FIGS. 24A and 24B show a plane to line switching mode pixel, but the pixel should not be limited to the plane to line switching mode.

The pixel PX includes a thin film transistor TFT, a common electrode CE, and a pixel electrode PE. The thin film transistor TFT, the common electrode CE, and the pixel electrode PE are disposed to overlap with the pixel area PXA, which is the same as a transmitting area TA. In some cases, a portion of the pixel PX, e.g., the thin film transistor TFT, may be disposed to overlap with the blocking area SA.

The gate line GLi and the common line CLi are disposed on the first base substrate SUB1. A gate electrode GE of the thin film transistor TFT is branched from the gate line GLi. A gate insulating layer 10-1 is disposed on the first base substrate SUB1 to cover the gate line GLi and the common line CLi.

Data lines DLj and DLj+1 are disposed on the gate insulating layer 10-1. A semiconductor layer AL is disposed on the gate insulating layer 10-1 to overlap with the gate electrode GE. A source electrode SE of the thin film transistor TFT is branched from one data lines DLj of the data lines DLj and DLj+1. The source electrode SE and a drain electrode DE spaced apart from the source electrode SE are disposed on the gate insulating layer 10-1. The source electrode SE and the drain electrode DE are overlapped with the semiconductor layer AL.

A planarization layer 10-2 is disposed on the gate insulating layer 10-1 to cover the source electrode SE, the drain electrode DE, and the data lines DLj and DLj+1. The common electrode CE is disposed on the planarization layer 10-2. The common electrode CE is connected to the common line CLi through a first contact hole CH1 formed through the gate insulating layer 10-1 and the planarization layer 10-2.

A second insulating layer 20, e.g., a passivation layer 20, is disposed on the planarization layer 10-2 to cover the common electrode CE. The pixel electrode PE is disposed on the passivation layer 20 to overlap with the common electrode CE. The pixel electrode PE is connected to the drain electrode DE through a second contact hole CH2 formed through the planarization layer 10-2 and the passivation layer 20. A protection layer (not shown) that protects the pixel electrode PE and an alignment layer (not shown) may be disposed on the passivation layer 20.

The pixel electrode PE includes a plurality of slits SLT. The pixel electrode PE includes a first horizontal portion P1, a second horizontal portion P2 disposed to be spaced apart from the first horizontal portion P1, and a plurality of vertical portions P3 that connects the first horizontal portion P1 and the second horizontal portion P2. The slits SLT are disposed between the vertical portions P3. However, the shape of the pixel electrode PE is not limited thereto or thereby.

The thin film transistor TFT outputs a data voltage applied to the data line DLj in response to a gate signal applied to the gate line GLi. The common electrode CE receives a reference voltage and the pixel electrode PE receives a pixel voltage corresponding to the data voltage. The common electrode CE and the pixel electrode PE form a horizontal electric field. Due to the horizontal electric field, arrangements of directors included in the liquid crystal layer LCL are changed.

Figure 25:
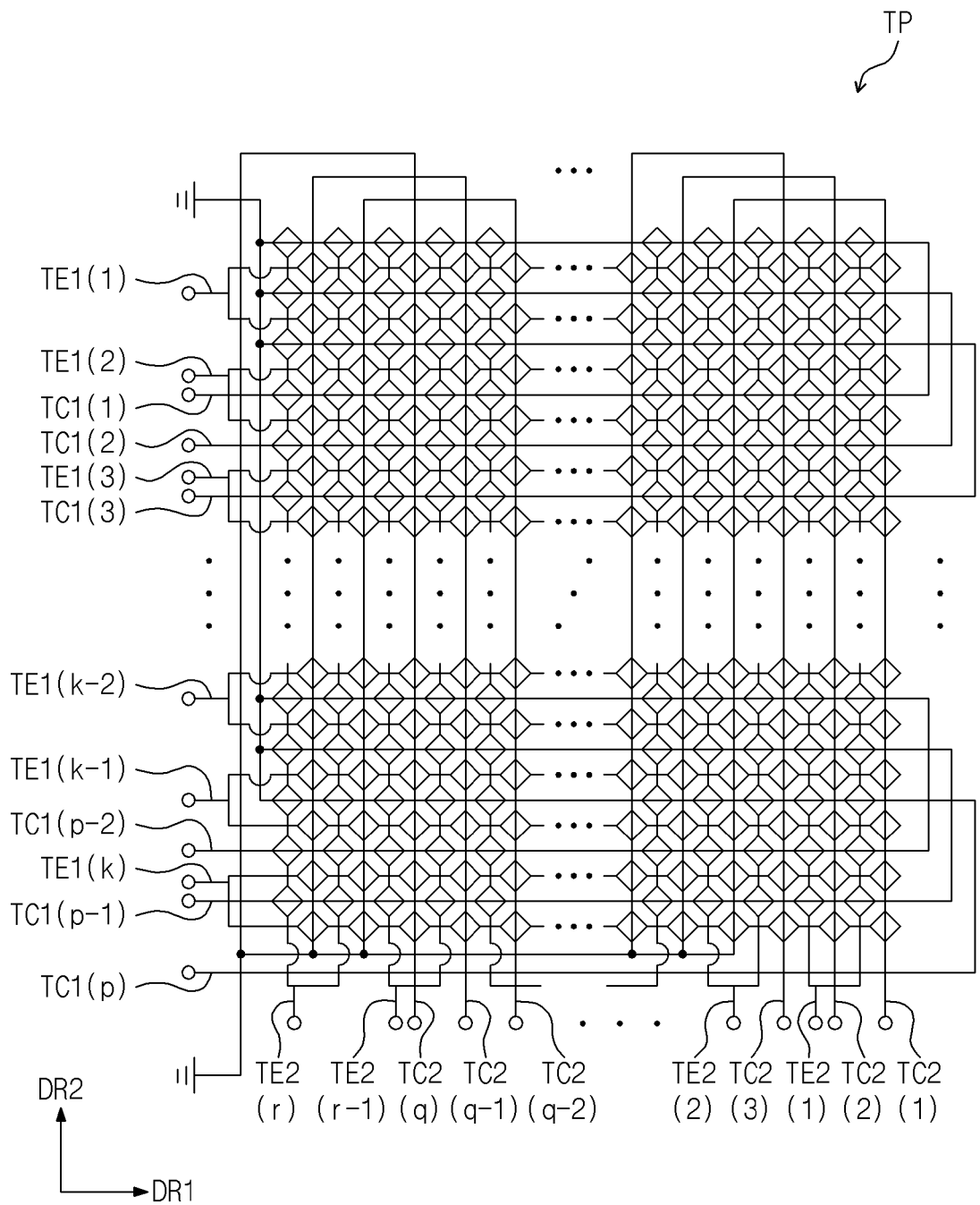
FIG. 25 is a plan view showing a touch panel according to exemplary embodiments of the present disclosure.
Figure 26A:
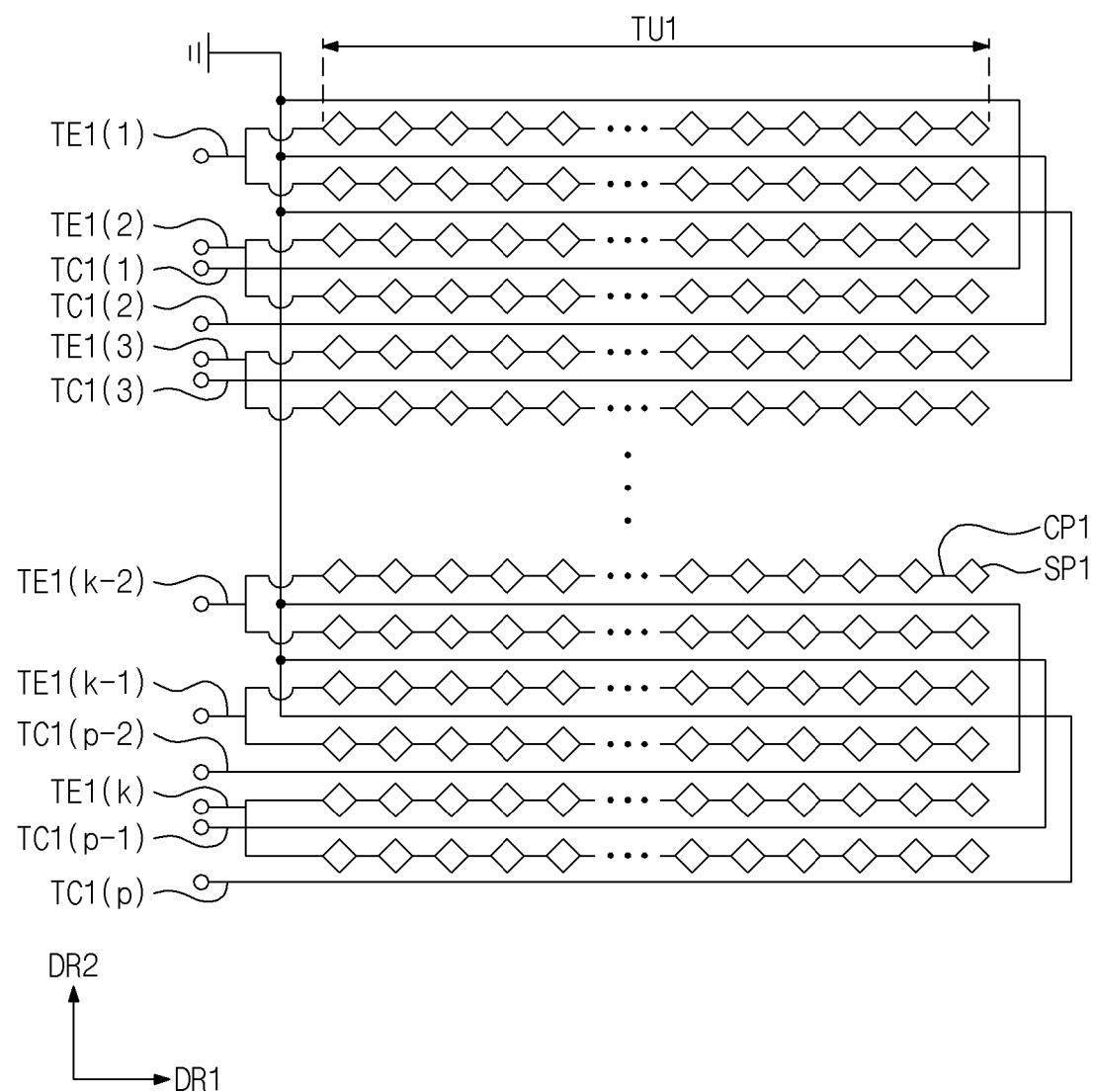
FIG. 26A is a plan view showing first touch electrodes and first touch coils shown in FIG. 25 according to exemplary embodiments of the present disclosure.
Figure 26B:
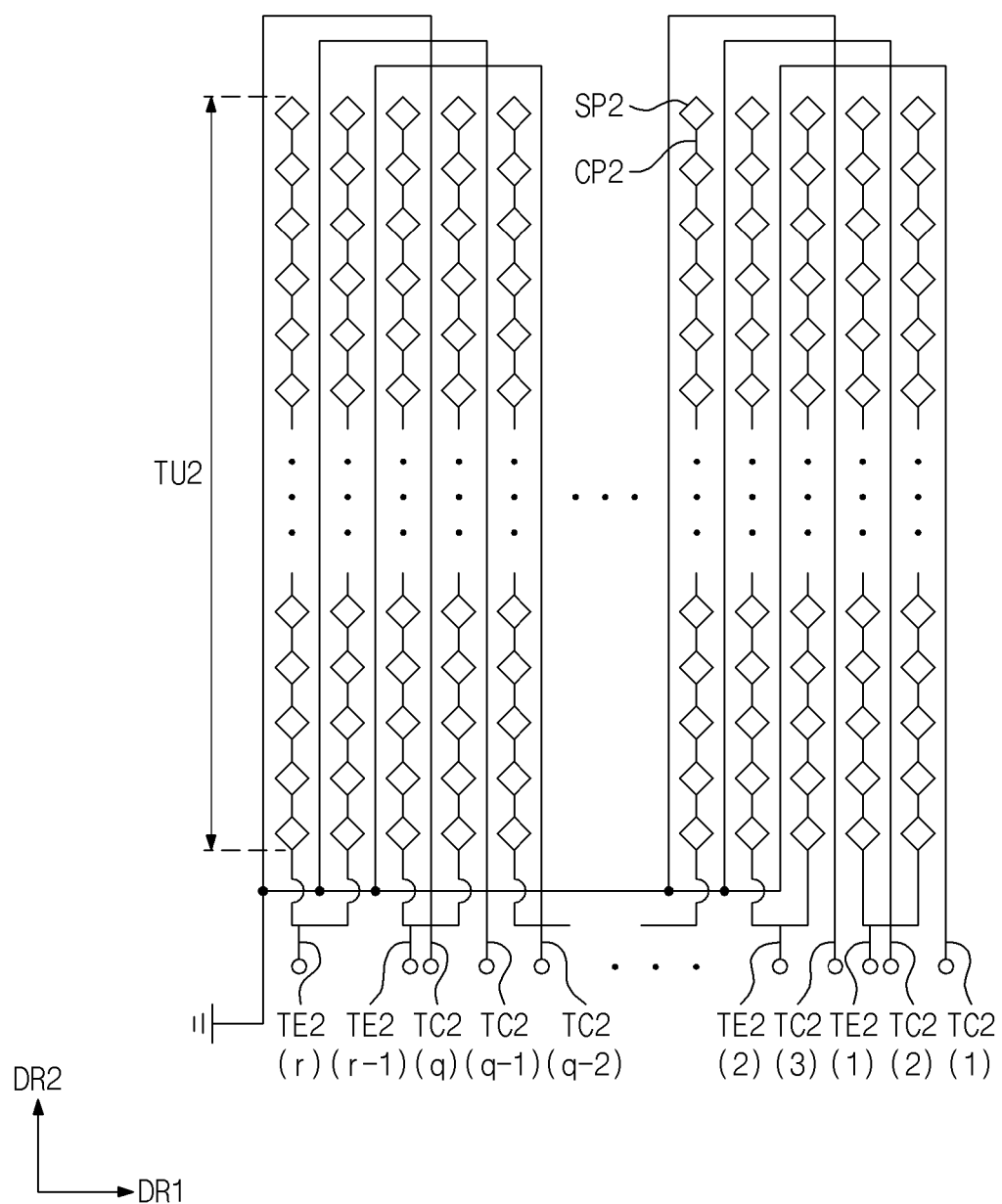
FIG. 26B is a plan view showing second touch electrodes and second touch coils shown in FIG. 25 according to exemplary embodiments of the present disclosure.

FIG. 25 is a plan view showing a touch panel TP according to exemplary embodiments of the present disclosure. FIG. 26A is a plan view showing first touch electrodes and first touch coils shown in FIG. 25. FIG. 26B is a plan view showing second touch electrodes and second touch coils shown in FIG. 25. Hereinafter, the touch panel TP will be described in detail with reference to FIGS. 25, 26A, and 26B.

Referring to FIG. 25, the touch panel TP includes first touch electrodes TE1(1) to TE1($k$), second touch electrodes TE2(1) to TE2($r$), first touch coils TC1(1) to TC1($p$), and second touch coils TC2(1) to TC2($q$) ("k", "r", "p", and "q" being any whole number greater than 1). The first touch electrodes TE1(1) to TE1($k$) are insulated from the second touch electrodes TE2(1) to TE2($r$) while crossing the second touch electrodes TE2(1) to TE2($r$), and the first touch coils TC1(1) to TC1($p$) are insulated from the second touch coils TC2(1) to TC2($q$) while crossing the second touch coils TC2(1) to TC2($q$).

Referring to FIG. 26A, the first touch electrodes TE1(1) to TE1($k$) are extended in the first direction DR1. The first touch electrodes TE1(1) to TE1($k$) are arranged in the second direction DR2 to be spaced apart from each other. Each of the first touch electrodes TE1(1) to TE1($k$) includes a plurality of sensor parts SP1 (hereinafter, referred to as first sensor parts) and a plurality of connection parts CP1 (hereinafter, referred to as first connection parts).

A portion of the first sensor parts SP1 and a portion of the first connection parts CP1 form a first touch unit TU1. The first touch unit TU1 includes the first sensor parts SP1 arranged in the first direction DR1 and the first connection parts CP1 that connect two adjacent sensor parts to each other among the first sensor parts SP1. The first touch electrodes TE1(1) to TE1($k$) may include two first touch units TU1, but the number of the first touch units TU1 is not limited to two. That is, each of the first touch electrodes TE1(1) to TE1($k$) may include one first touch unit TU1, or three or more first touch units TU1.

Each of the first sensor parts SP1 may have a trapezoid shape and the first connection parts CP1 may have a line shape. Each of the first connection parts CP1 connects vertices of two adjacent first sensor parts SP1 to each other. The first sensor parts SP1 having the trapezoid shape have an area greater than that of the first connection parts CP1 having the line shape.

Referring to FIG. 26A, each of the first touch coils TC1(1) to TC1($p$) has a loop shape extended in the first direction DR1. The first touch coils TC1(1) to TC1($p$) are arranged in the second direction DR2.

The first touch coils TC1(1) to TC1($p$) may be overlapped with each other in various ways. For instance, the first ouch coils TC1(1) to TC1($p$) are sequentially overlapped with each other one by one or by groups. As shown in FIG. 26A, each of the first touch coils TC1(1) to TC1($p$) is partially overlapped with two first touch coils adjacent thereto, and one end of each of the first touch coils TC1(1) to TC1($p$) is grounded.

The first touch electrodes TE1(1) to TE1($k$) are disposed in areas defined by overlapping the first touch coils TC1(1) to TC1($p$). In other words, the first touch electrodes TE1(1) to TE1($k$) are not overlapped with the first touch coils TC1(1) to TC1($p$) and the first touch units TU1 are surrounded by the first touch coils TC1(1) to TC1($p$).

The first touch electrodes TE1(1) to TE1($k$) and the first touch coils TC1(1) to TC1($p$) may be included in the first conductive layer CL1 or the second conductive layer CL2 shown in FIG. 22. In addition, the first touch electrodes TE1(1) to TE1($k$) are included in one of the first conductive layer CL1 and the second conductive layer CL2, and the first touch coils TC1(1) to TC1($p$) are included in the other of the first conductive layer CL1 and the second conductive layer CL2.

Referring to FIG. 26B, the second touch electrodes TE2(1) to TE2($r$) are extended in the second direction DR2. The second touch electrodes TE2(1) to TE2($r$) are arranged in the first direction DR1 to be spaced apart from each other. Each of the second touch electrodes TE2(1) to TE2($r$) includes a plurality of sensor parts SP2 (hereinafter, referred to as second sensor parts) and a plurality of connection parts CP2 (hereinafter, referred to as second connection parts).

A portion of the second sensor parts SP2 and a portion of the second connection parts CP2 form a second touch unit TU2. The second touch unit TU2 includes the second sensor parts SP2 arranged in the second direction DR2 and the second connection parts CP2 that connect two adjacent sensor parts to each other among the second sensor parts SP2.

Each of the second touch coils TC2(1) to TC2($q$) has a loop shape extended in the second direction DR2. The second touch coils TC2(1) to TC2($q$) are arranged in the first direction DR1. The second touch coils TC2(1) to TC2($q$) may be overlapped with each other in various ways as the first touch coils TC1(1) to TC1($p$) shown in FIG. 26A. As shown in FIG. 26B, each of the second touch coils TC2(1) to TC2($q$) is partially overlapped with two second touch coils adjacent thereto, and one end of each of the second touch coils TC2(1) to TC2($q$) is grounded.

The second touch electrodes TE2(1) to TE2($r$) are disposed in areas defined by overlapping the second touch coils TC2(1) to TC2($q$). In other words, the second touch electrodes TE2(1) to TE2($r$) are not overlapped with the second touch coils TC2(1) to TC2($q$), and the second touch units TU2 are surrounded by the second touch coils TC2(1) to TC2($q$).

The second touch electrodes TE2(1) to TE2($r$) and the second touch coils TC2(1) to TC2($q$) may be included in one of the first conductive layer CL1 and the second conductive layer CL2 shown in FIG. 22, in which the first touch electrodes TE1(1) to TE1($k$) and the first touch coils TC1(1) to TC1($p$) are not included. In addition, the second touch electrodes TE2(1) to TE2($r$) are included in one of the first conductive layer CL1 and the second conductive layer CL2, and the second touch coils TC2(1) to TC2($q$) are included in the other of the first conductive layer CL1 and the second conductive layer CL2.

Figure 27A:
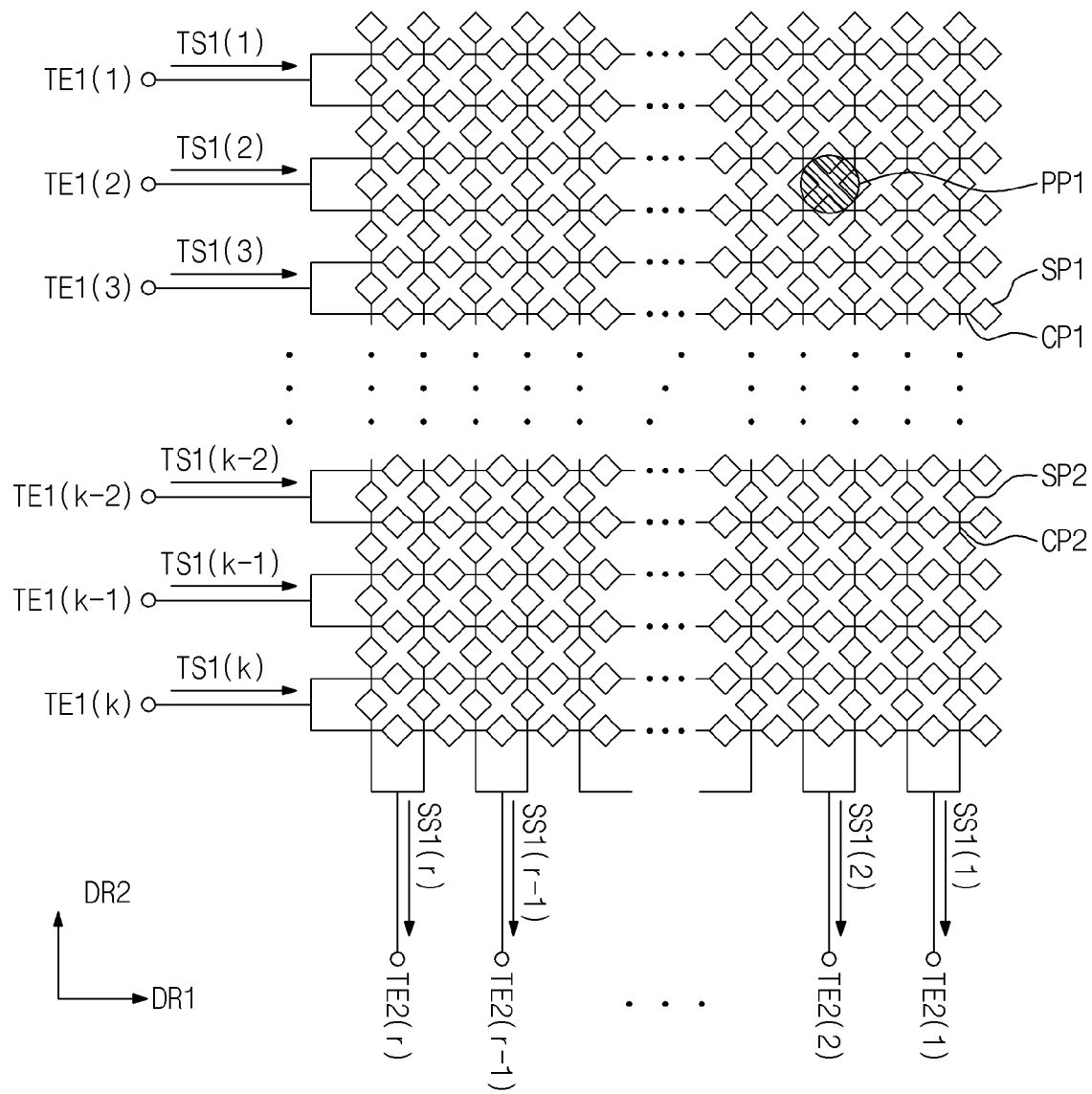
FIG. 27A is a plan view showing first touch electrodes and first touch coils shown in FIG. 25 according to exemplary embodiments of the present disclosure.
Figure 27B:
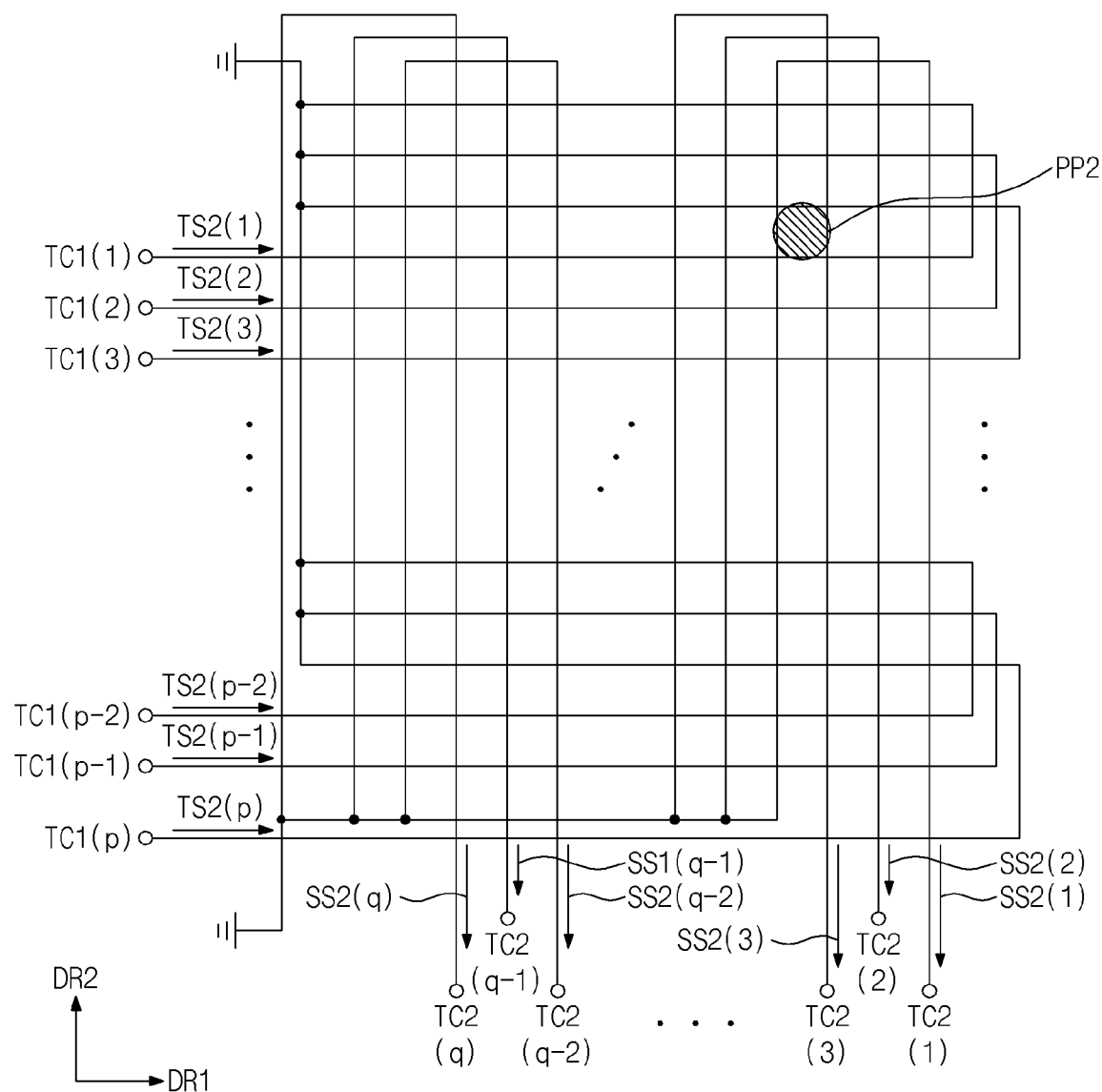
FIG. 27B is a plan view showing second touch electrodes and second touch coils shown in FIG. 25 according to exemplary embodiments of the present disclosure.

FIG. 27A is a plan view showing first touch electrodes TE1(1) to TE1($k$) and first touch coils TC1(1) to TC1($p$) shown in FIG. 25. FIG. 27B is a plan view showing second touch electrodes TE2(1) to TE2($r$) and second touch coils TC2(1) to TC2($q$) shown in FIG. 25. Hereinafter, the operation of the touch panel TP will be described in detail with reference to FIGS. 27A and 27B.

Referring to FIG. 27A, the first touch electrodes TE1(1) to TE1($k$) are insulated from the second touch electrodes TE2(1) to TE2($r$) while crossing the second touch electrodes TE2(1) to TE2($r$). The first touch electrodes TE1(1) to TE1($k$) correspond to input touch electrodes and the second touch electrodes TE2(1) to TE2($r$) correspond to output touch electrodes. The first touch electrodes TE1(1) to TE1($k$) and the second touch electrodes TE2(1) TE2($r$) may provide information to calculate the coordinate information of the input position in the same way as in an electrostatic capacitive type touch panel.

The first touch electrodes TE1(1) to TE1($k$) are capacitive-coupled to the second touch electrodes TE2(1) to TE2($r$). When first scan signals TS1(1) to TS1($k$) are applied to the first touch electrodes TE1(1) to TE1($k$), a capacitance is formed between the first sensor parts SP1 and the second sensor parts SP2.

The first touch electrodes TE1(1) to TE1($k$) sequentially receive the first scan signals TS1(1) to TS1($k$). The first scan signals TS1(1) to TS1($k$) are activated in different periods from each other. The second touch electrodes TE2(1) to TE2($r$) outputs sensing signals SS1(1) to SS1($r$) (hereinafter, referred to as first sensing signals) generated from the first scan signals TS1(1) to TS1($k$).

An area in which the second first touch electrode TE1(2) of the first touch electrodes TE1(1) to TE1($k$) crosses the second second touch electrode TE2(2) of the second touch electrodes TE2(1) to TE2($r$) may be the input position PP1 (hereinafter, referred to as a first input position). The first input position PP1 may be generated by an input device, e.g., user's finger.

The first sensing signal SS1(2) output from the second second touch electrode TE2(2) of the second touch electrodes TE2(1) to TE2($r$) has a level different from that of the first sensing signals SS1(1), and SS1(3) to SS1($r$) output from other second touch electrodes TE2(1) and TE2(3) to TE2($r$).

The coordinate information in the second direction DR2 of the first input position PP1 is calculated on the basis of the time at which the first sensing signal SS1(2) having the different level is sensed, and the coordinate information in the first direction DR1 of the first input position PP1 is calculated on the basis of the relative position of the second second touch electrode TE2(2) with respect to the second touch electrodes TE2(1) to TE2($r$).

Referring to FIG. 27B, the first touch coils TC1(1) to TC1($p$) are insulated from the second touch coils TC2(1) to TC2($q$) while crossing the second touch coils TC2(1) to TC2($q$). The first touch coils TC1(1) to TC1($p$) correspond to input coils of an electromagnetic induction type touch panel and the second touch coils TC2(1) to TC2($q$) correspond to output coils of an electromagnetic induction type touch panel. The first touch coils TC1(1) to TC1($p$) and the second touch coils TC2(1) to TC2($q$) may provide information to calculate the coordinate information of the input position in the same way as in an electromagnetic induction type touch panel.

The first touch coils TC1(1) to TC1($p$) receive scan signals TS2(1) to TS2($p$) (hereinafter, referred to as second scan signals) activated in different periods from each other. Each of the first touch coils TC1(1) to TC1($p$) generates the magnetic field in response to a corresponding scan signal of the second scan signals TS2(1) to TS2($p$).

When the input device (not shown) approaches to the first touch coils TC1(1) to TC1($p$), the magnetic field induced from the first touch coils TC1(1) to TC1($p$) resonates with the resonant circuit of the input device. Thus, the input device causes generation of the resonant frequency. In the present exemplary embodiment, the input device may be, but is not limited to, a stylus pen with an LC resonant circuit. The second touch coils TC2(1) to TC2($q$) output sensing signals SS2(1) to SS2($q$) (hereinafter, referred to as second sensing signals) according to the resonant frequency.

An area in which the second first touch coil TC1(2) of the first touch coils TC1(1) to TC1($p$) crosses the second second touch coil TC2(2) of the second touch coils TC2(1) to TC2($q$) may be the input position PP2 (hereinafter, referred to as a second input position). The second sensing signal SS2(2) output from the second second touch coil TC2(2) of the second touch coils TC1(1) to TC2($q$) may have a level different from that of the second sensing signals SS2(1) and SS2(3) to SS2($q$) output from other second touch coils TC2(1) and TC2(3) to TC2($q$).

A two-dimensional coordinate information of the second input position PP2 is calculated on the basis of the time at which the second sensing signal SS2(2) having the different level is sensed, and the relative position of the second second touch coil TC2(2) with respect to the second touch coils TC1(1) to TC2($q$).

In some cases, the first touch coils TC1(1) to TC1($p$) and the second touch coils TC2(1) to TC2($q$) may have functions of the input and output coils, respectively. Hereinafter, the operation of the touch panel TP including the first and second touch coils TC1(1) to TC1($p$) and TC2(1) to TC2($q$), which have functions of the input and output coils, will be described in detail on the assumption that the touch event occurs at the second input position PP2.

The first touch coils TC1(1) to TC1($p$) receive the scan signals during a first scan period. The input device causes generation of the resonant frequency according to the magnetic field induced from the first touch coils TC1(1) to TC1($p$). After the first scan period (hereinafter, referred to as a first sensing period), the first touch coils TC1(1) to TC1($p$) receive/detect the resonant frequency.

During the first sensing period, the first touch coils TC1(1) to TC1($p$) output the sensing signals according to the resonant frequency. At least one first touch coil disposed on the second input position PP2 outputs the sensing signal having a level different from those of other first touch coils.

After the first sensing period, the second touch coils TC2(1) to TC2($q$) receive other scans signals during a second scan period. The input device causes generation of the resonant frequency according to the magnetic field induced from the second touch coils TC2(1) to TC2($q$). After the second scan period (hereinafter, referred to as a second sensing period), the second touch coils TC2(1) to TC2($q$) receive/detect the resonant frequency.

During the second sensing period, the second touch coils TC2(1) to TC2($q$) output the sensing signals according to the resonant frequency. At least one second touch coil disposed on the second input position PP2 outputs the sensing signal having a level different from those of other second touch coils.

The coordinate information of the second input position PP2 is calculated on the basis of the sensing signal output from the at least one first touch coil disposed on the second input position PP2 and the sensing signal output from the at least one second touch coil disposed on the second input position PP2.

Figure 28A:
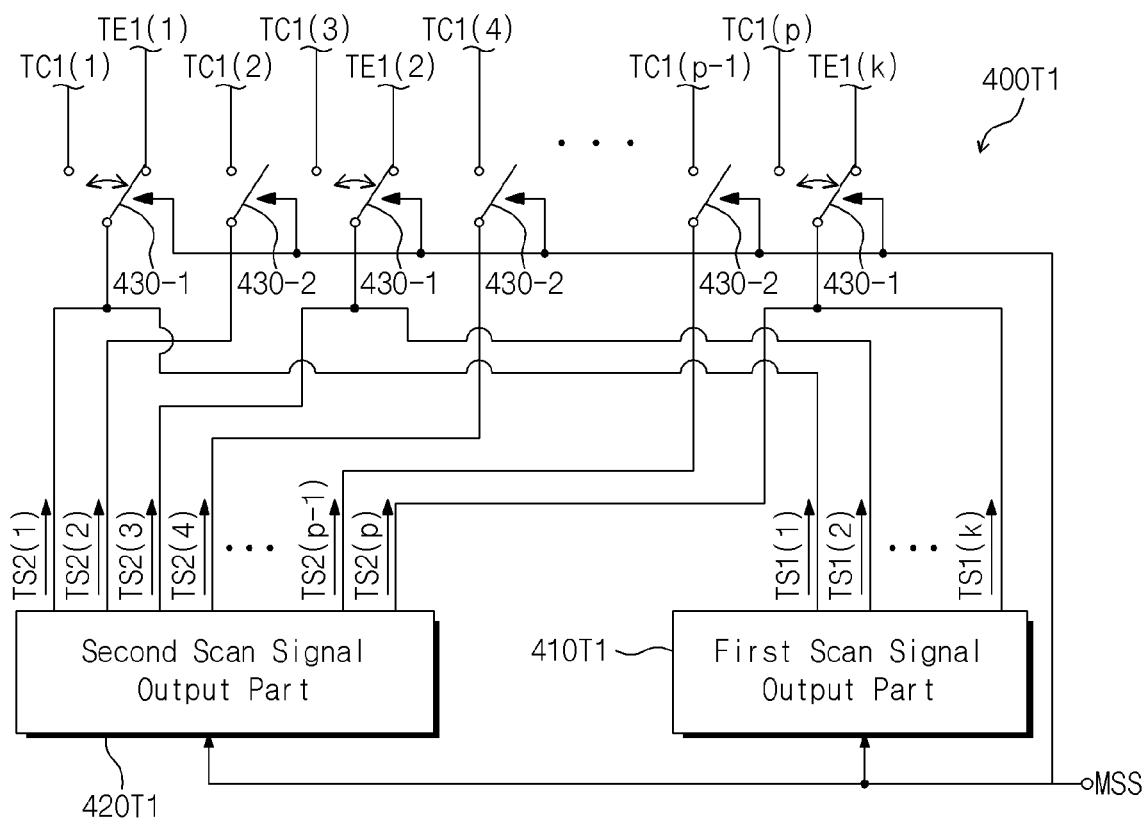
FIG. 28A is a block diagram showing a touch panel driver according to exemplary embodiments of the present disclosure.
Figure 28B:
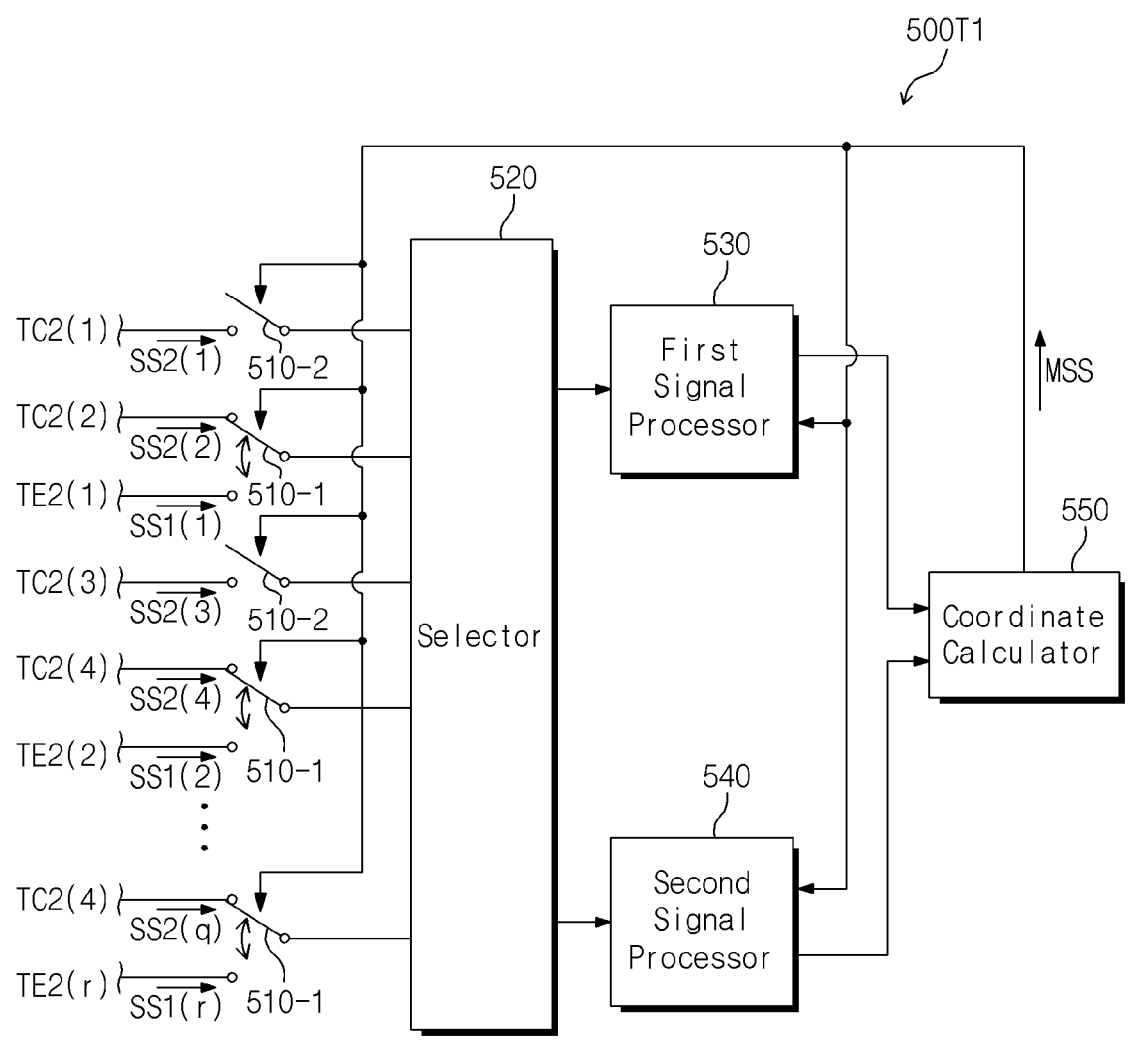
FIG. 28B is a block diagram showing a touch sensor according to exemplary embodiments of the present disclosure.

FIG. 28A is a block diagram showing a touch panel driver 400T1 according to exemplary embodiments of the present disclosure. FIG. 28B is a block diagram showing a touch sensor 500T1 according to exemplary embodiments of the present disclosure. Hereinafter, the touch panel driver 400T1 and the touch sensor 500T1 will be described in detail with reference to FIGS. 28A and 28B.

The touch panel driver 400T1 includes a first scan signal output part 410T1, a second scan signal output part 420T1, and switching parts 430-1 and 430-2. The first scan signal output part 410T1 outputs first scan signals TS1(1) to TS1($k$), and the second scan signal output part 420T1 outputs the second scan signals TS2(1) to TS2($p$).

The first scan signal output part 410T1 and the second scan signal output part 420T1 are turned on or turned off in response to the mode selection signal MSS. The first scan signal output part 410T1 is turned on in the first mode to sequentially output the first scan signals TS1(1) to TS1($k$). The second scan signal output part 420T1 is turned on in the second mode to sequentially output the second scan signals TS2(1) to TS2($p$).

The switching parts 430-1 and 430-2 include first switching parts 430-1 and second switching parts 430-2. Each of the first switching parts 430-1 receives a corresponding first scan signal of the first scan signals TS1(1) to TS1($k$) and a corresponding second scan signal of the second scan signals TS2(1) to TS2($p$). Responsive to the mode selection signal MSS, each of the first switching parts 430-1 applies the corresponding first scan signal TS1(1) to TS1($k$) to the corresponding first touch electrode or applies the corresponding second scan signal TS2(1) to TS2($p$) to the corresponding first touch coil. Each of the first switching parts 430-1 may be a CMOS transistor.

Each of the second switching parts 430-2 receives a corresponding second scan signal of the second scans signals TS2(1) to TS2($p$). Each of the second switching parts 430-2 is turned on in the first mode and turned off in the second mode. Each of the second switching parts 430-2 may be an NMOS transistor or a PMOS transistor. In some cases, when the number of the first touch electrodes TE1(1) to TE1($k$) included in the touch panel TP is equal to the number of the first touch coils TC1(1) to TC1($p$) included in the touch panel TP, the touch panel driver 400T1 does not include the second switching parts 430-2.

Referring to FIG. 28B, the touch sensor 500T1 includes third and fourth switching parts 510-1 and 510-2, a selector 520, a first signal processor 530, a second signal processor 540, and a coordinate calculator 550.

The switching parts 510-1 and 510-2 include third switching parts 510-1 and fourth switching parts 510-2. Each of the third switching parts 510-1 receives a corresponding first sensing signal of the first sensing signals SS1(1) to SS1($r$) and a corresponding second sensing signal of the second sensing signals SS2(1) to SS2($q$). Responsive to the mode selection signal MSS, each of the third switching parts 510-1 applies the corresponding first sensing signal to the selector 520 in the first mode and applies the corresponding second sensing signal to the selector 520 in the second mode. Each of the third switching parts 510-1 may be a CMOS transistor.

Each of the fourth switching parts 510-2 receives a corresponding second sensing signal of the second sensing signals SS2(1) to SS2($q$). Each of the fourth switching parts 510-2 is turned on in response to the mode selection signal MSS. Each of the fourth switching parts 510-2 may be an NMOS transistor or a PMOS transistor. In some cases, when the number of the second touch electrodes TE2(1) to TE2(r) included in the touch panel TP is equal to the number of the second touch coils TC2(1) to TC2(q) included in the touch panel TP, the second switching parts 430-2 may be omitted from the touch panel driver 400T1.

The selector 520 applies the first sensing signals SS1(1) to SS1(r) to the first signal processor 530 in response to the mode selection signal MSS and applies the second sensing signals SS2(1) to SS2(q) to the second signal processor 540 in response to the mode selection signal MSS.

The first signal processor 530 includes an amplifier, a noise filter, and an analog-to-digital converter. The amplifier amplifies the first sensing signals SS1(1) to SS1(r). The noise filter removes noises from the amplified first sensing signals SS1(1) to SS1(r). The analog-to-digital converter converts the first sensing signals SS1(1) to SS1(r) from which the noises are removed to first digital signals. The coordinate calculator 550 calculates the coordinate information of the first input position PP1 (refer to FIG. 27A) from the first digital signals.

The second signal processor 540 includes an amplifier, a band-pass filter, a wave detector, a sample-hold circuit, and an analog-to-digital converter. The second sensing signals SS2(1) to SS2(q) are converted to second digital signals using the second signal processor 540. The coordinate calculator 550 calculates the coordinate information of the second input position PP2 (refer to FIG. 27B) from the second digital signals.

Figure 29A:
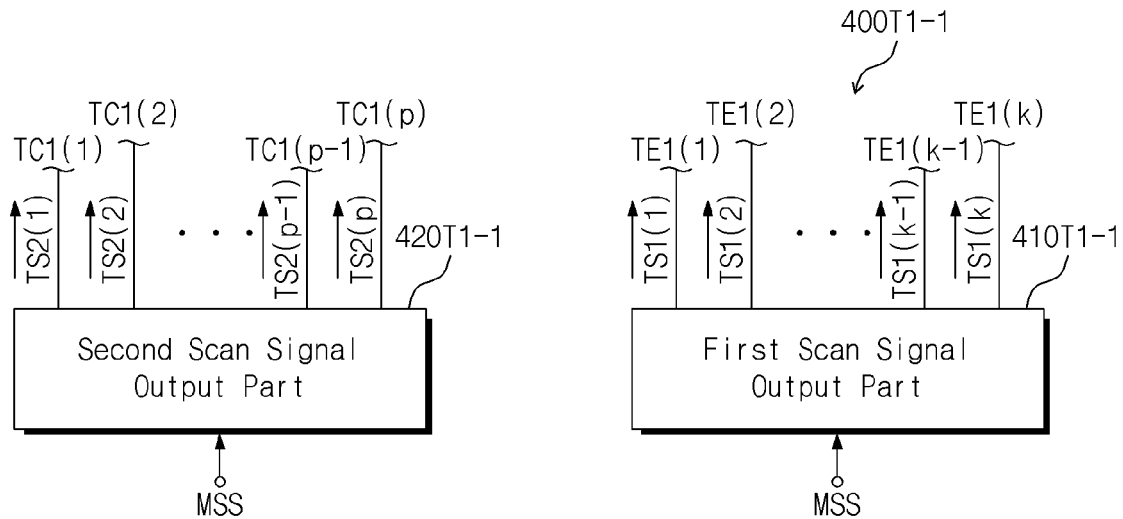
FIG. 29A is a block diagram showing a touch panel driver according to exemplary embodiments of the present disclosure.
Figure 29B:
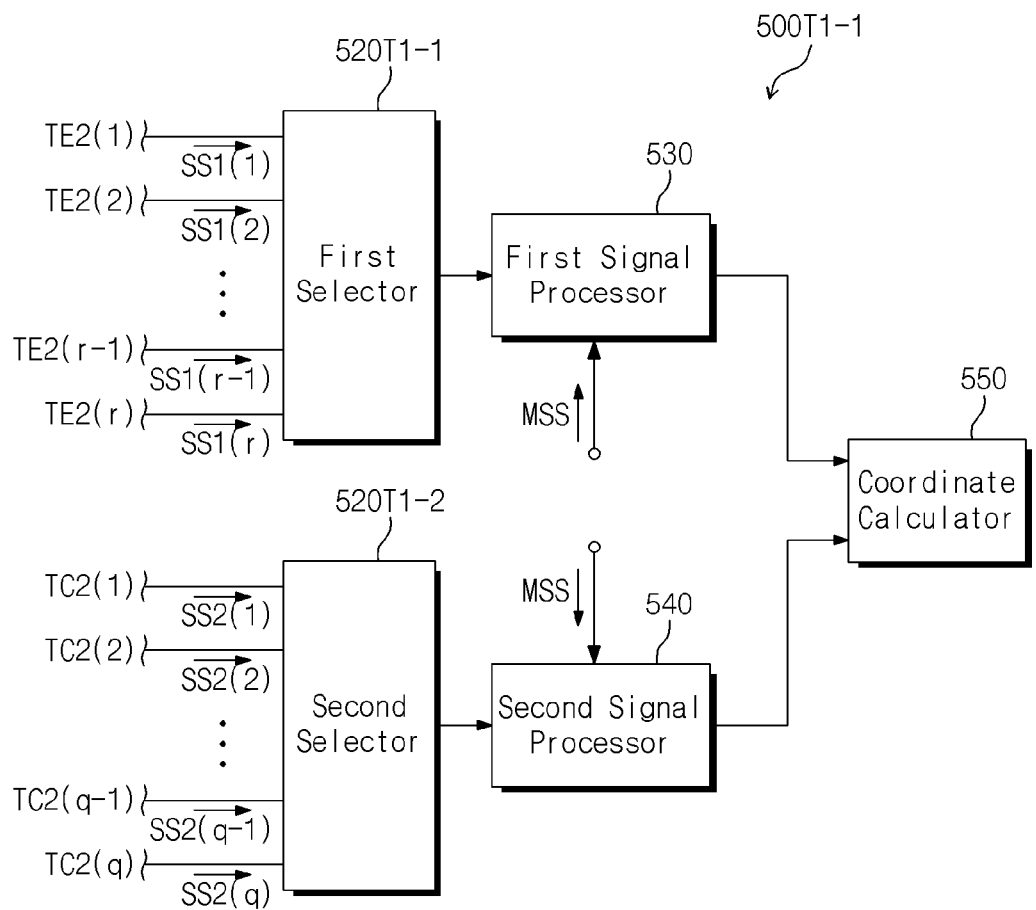
FIG. 29B is a block diagram showing a touch sensor according to exemplary embodiments of the present disclosure.

FIG. 29A is a block diagram showing a touch panel driver 400T1-1 according to exemplary embodiments of the present disclosure. FIG. 29B is a block diagram showing a touch sensor 500T1-1 according to exemplary embodiments of the present disclosure. Hereinafter, the touch panel driver 400T1-1 and the touch sensor 500T1-1 will be described in detail with reference to FIGS. 29A and 29B. In FIGS. 29A and 29B, the same reference numerals denote the same elements in FIGS. 28A and 28B, and thus detailed descriptions of the same elements will be omitted.

Referring to FIG. 29A, the touch panel driver 400T1-1 includes a first scan signal output part 410T1-1 and a second scan signal output part 420T1-1. The first scan signal output part 410T1-1 outputs the first scan signals TS1(1) to TS1(k) and the second scan signal output part 420T1-1 outputs the second scan signals TS2(1) to TS2(p).

The first scan signal output part 410T1-1 and the second scan signal output part 420T1-1 are turned on or turned off in response to the mode selection signal MSS. In the first mode, the first scan signal output part 410T1-1 is turned on and the second scan signal output part 420T1-1 is turned off. In the second mode, the first scan signal output part 410T1-1 is turned off and the second scan signal output part 420T1-1 is turned on. In the third mode, the first scan signal output part 410T1-1 and the second scan signal output part 420T1-1 are turned on.

The turned-on first scan signal output part 410T1-1 sequentially outputs the first scan signals TS1(1) to TS1(k) to the first touch electrodes TE1(1) to TE1(k). The turned-on second scan signal output part 420T1-1 sequentially outputs the second scan signals TS2(1) to TS2(p) to the first touch coils TC1(1) to TC1(p). Accordingly, the first touch electrodes TE1(1) to TE1(k) and the first touch coils TC1(1) to TC1(p) receive corresponding signals in the third mode.

Referring to FIG. 29B, the touch sensor 500T1-1 includes a first selector 520T1-1, a second selector 520T1-2, a first signal processor 530, a second signal process 540, and a coordinate calculator 550.

The first selector 520T1-1 selects signals from the first sensing signals SS1(1) to SS1(r) to pass to the first signal processor 530 and the second selector 520T1-2 selects signals from the second sensing signals SS2(1) to SS2(q) to pass to the second signal processor 540. In some cases, each of the first and second selectors 520T1-1 and 520T1-2 may be a multiplexer.

The first signal processor 530 converts the first sensing signals SS1(1) to SS1(r) to the first digital signals. The second signal processor 540 converts the second sensing signals SS2(1) to SS2(q) to the second digital signals. The coordinate calculator 550 calculates the coordinate information of the first input position PP1 (refer to FIG. 27A) from the first digital signals and the coordinate information of the second input position PP2 (refer to FIG. 27B) from the second digital signals.

In addition, the coordinate calculator 550 may calculate the coordinate information from the first and second digital signals in the third mode. The coordinate calculator 550 may calculate the coordinate information of one input position of one input device in two different ways or calculate the coordinate information of two input positions of two input devices in different ways from each other.

Figure 30:
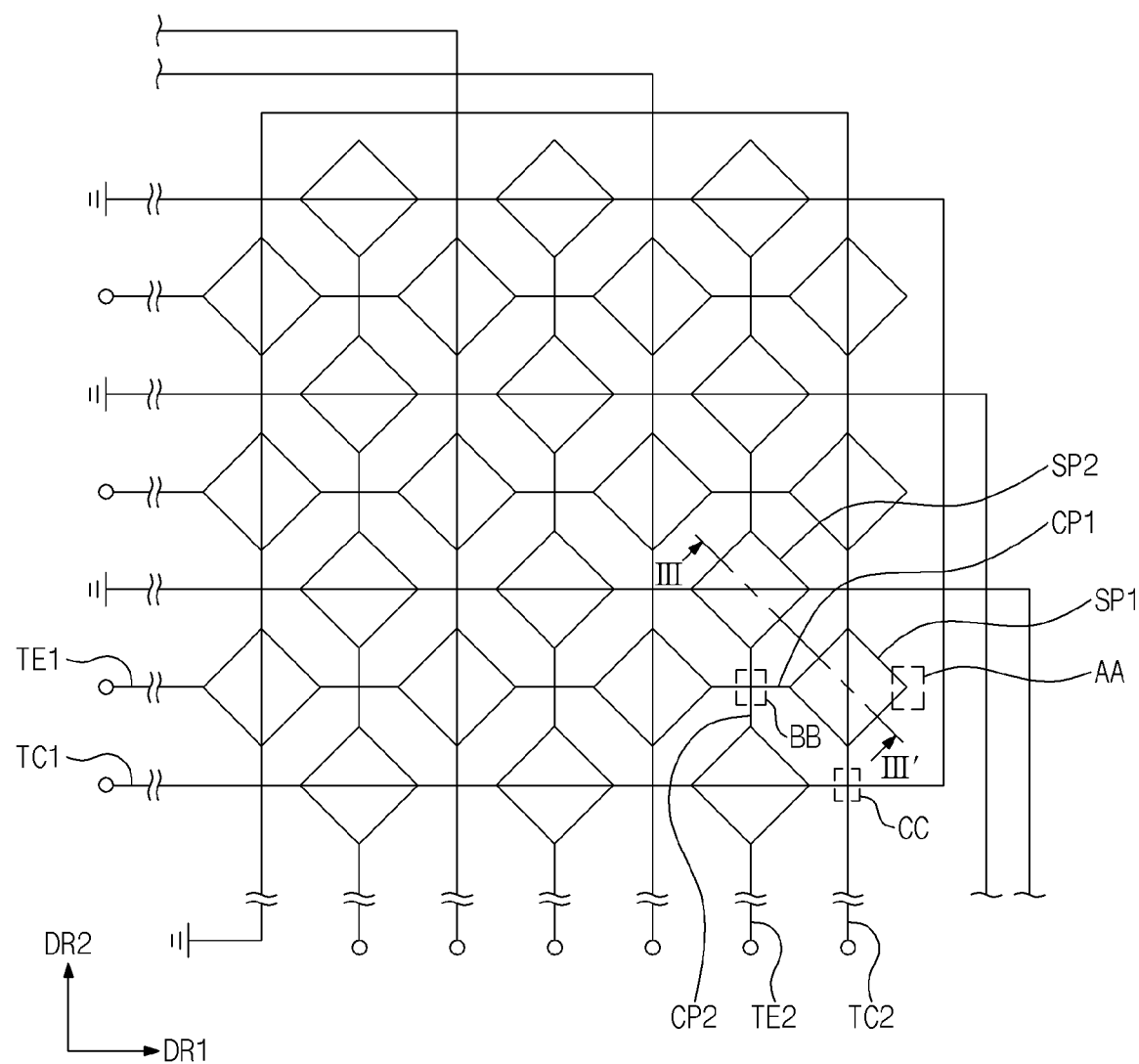
FIG. 30 is a partially enlarged plan view showing a portion of the touch panel shown in FIG. 25 according to exemplary embodiments of the present disclosure.

FIG. 30 is a partially enlarged plan view showing a portion of the touch panel TP shown in FIG. 25. FIG. 30 shows some first touch electrodes TE1 of the first touch electrodes TE1(1) to TE1(k), some second touch electrodes TE2 of the second touch electrodes TE2(1) to TE2(r), some first touch coils TC1 of the first touch coils TC1(1) to TC1(p), and some second touch coils TC2 of the second touch coils TC2(1) to TC2(q).

Figure 31A:
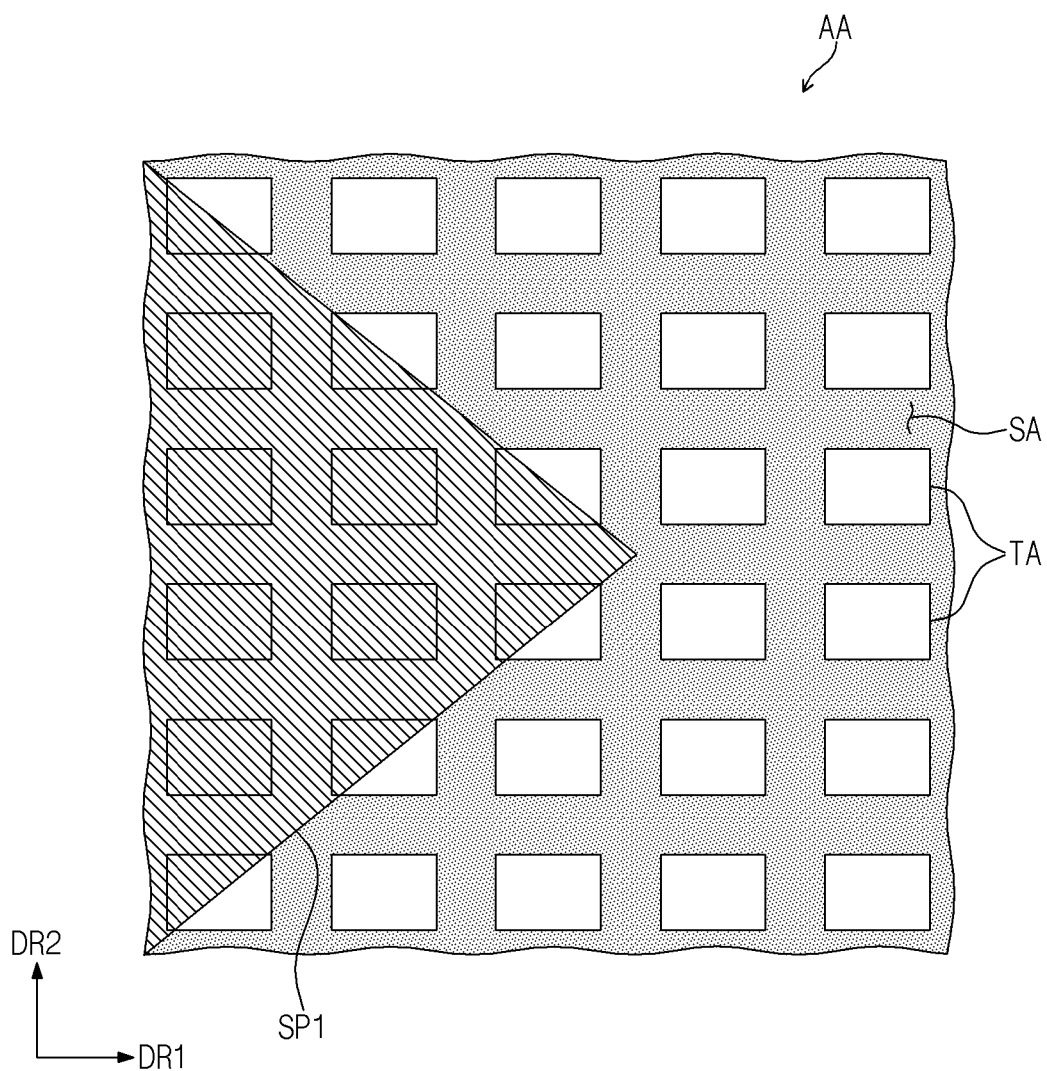
FIGS. 31A and 31B are enlarged plan views showing a portion "AA" shown in FIG. 30 according to exemplary embodiments of the present disclosure.
Figure 31B:
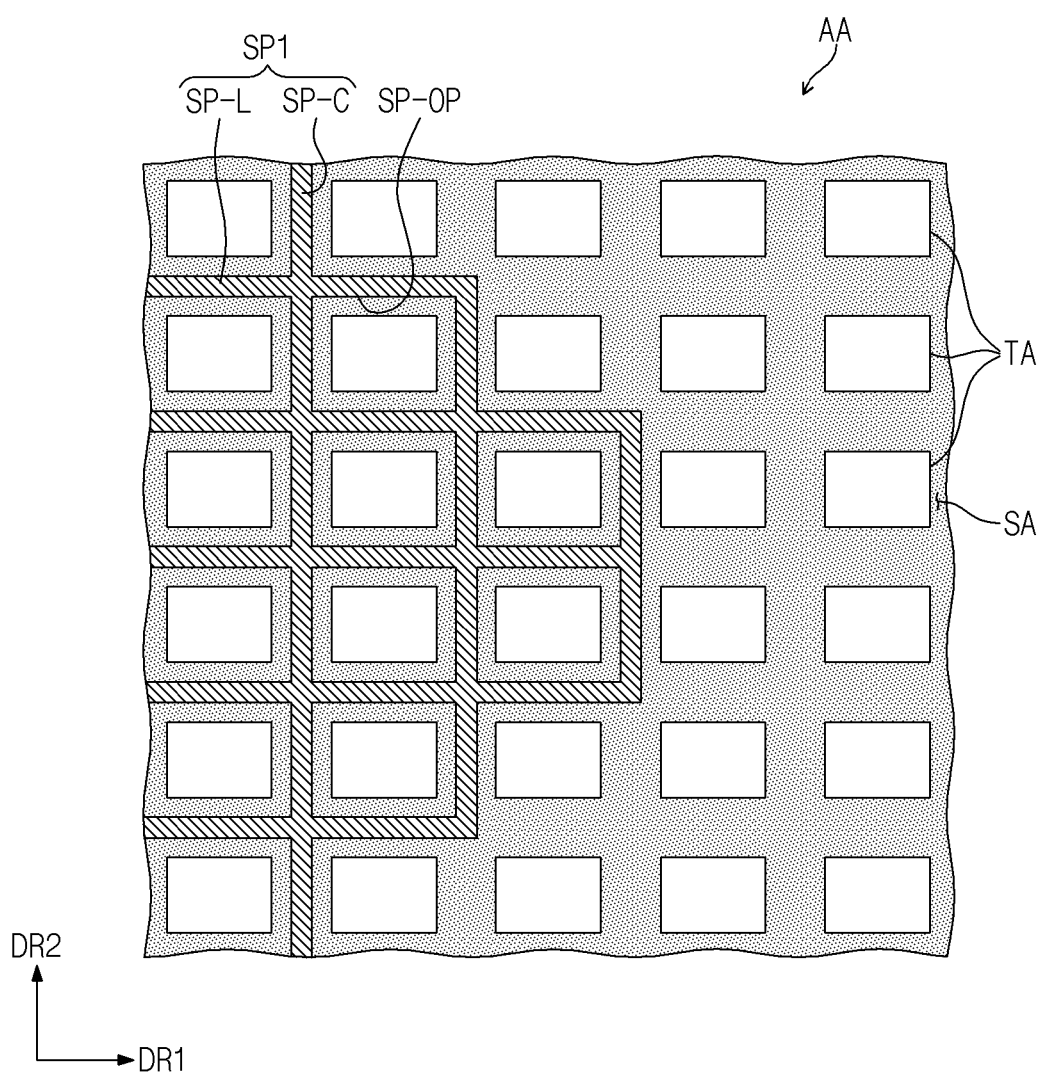

FIGS. 31A and 31B are enlarged plan views showing a portion "AA" shown in FIG. 30. FIGS. 31A and 31B show one sensor part of the first sensor parts SP1, but the other sensor parts have the same shape shown in FIGS. 31A and 31B. In addition, the second sensor parts SP2 may have the same shape as shown in FIGS. 31A and 31B.

Referring to FIG. 31A, the first sensor part SP1 is overlapped with some transmitting areas TA of the transmitting areas TA. The first sensor part SP1 includes a transparent metal oxide material such that light provided from the backlight unit transmits through the first sensor part SP1.

Referring to FIG. 31B, the first sensor part SP1 is overlapped with a portion of the blocking area SA. The first sensor part SP1 includes a plurality of horizontal portions SP-L extended in the first direction DR1 and a plurality of vertical portion SP-C extended in the second direction DR2.

The horizontal portions SP-L are connected to the vertical portions SP-C to form a plurality of openings SP-OP. In other words, the first sensor part SP1 has a mesh shape defined by the openings SP-OP.

In this case, the first sensor part SP1 is made of a metal material with a low reflectivity. The metal material with the low reflectivity includes chromium oxide, chromium nitride, titanium oxide, titanium nitride, or alloys thereof.

Although not shown in figures, the first sensor part SP1 may have a double-layer structure of the metal oxide layer shown in FIG. 31A and the mesh type metal layer shown in FIG. 31B.

Figure 32:
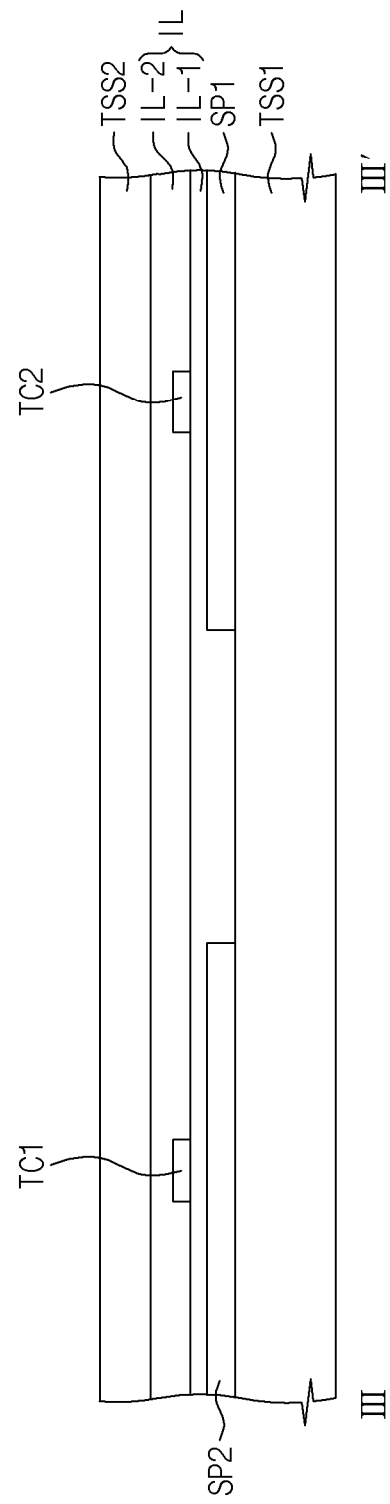
FIG. 32 is a cross-sectional view taken along a line III-III' of FIG. 10 according to exemplary embodiments of the present disclosure.

FIG. 32 is a cross-sectional view taken along a line III-III' of FIG. 30 according to exemplary embodiments of the present disclosure.

Referring to FIG. 32, the first sensor part SP1 and the second sensor part SP2 are disposed on the same layer, and the first touch coil TC1 and the second touch coil TC2 are disposed on the same layer. In other words, the first touch electrode TE1 and the second touch electrode TE2 are disposed on the same layer. The first sensor part SP1 and the second sensor part SP2 form a portion of the first conductive layer CL1 (refer to FIG. 22) and the first touch coil TC1 and the second touch coil TC2 form a portion of the second conductive layer CL2 (refer to FIG. 22).

The first sensor part SP1 and the second sensor part SP2 are disposed on a surface of the first touch substrate TSS1. A first insulating layer IL-1 is disposed on the first touch substrate TSS1 to cover the first sensor part SP1 and the second sensor part SP2. The first touch coil TC1 and the second touch coil TC2 are disposed on the first insulating layer IL-1. A second insulating layer IL-2 is disposed on the first insulating layer IL-1 to cover the first touch coil TC1 and the second touch coil TC2. The second touch substrate TSS2 is disposed on the second insulating layer IL-2. In some cases, the positions of the first and second sensor parts SP1 and SP2 may be switched with the positions of the first touch coil TC1 and the second touch coil TC2.

Figure 33:
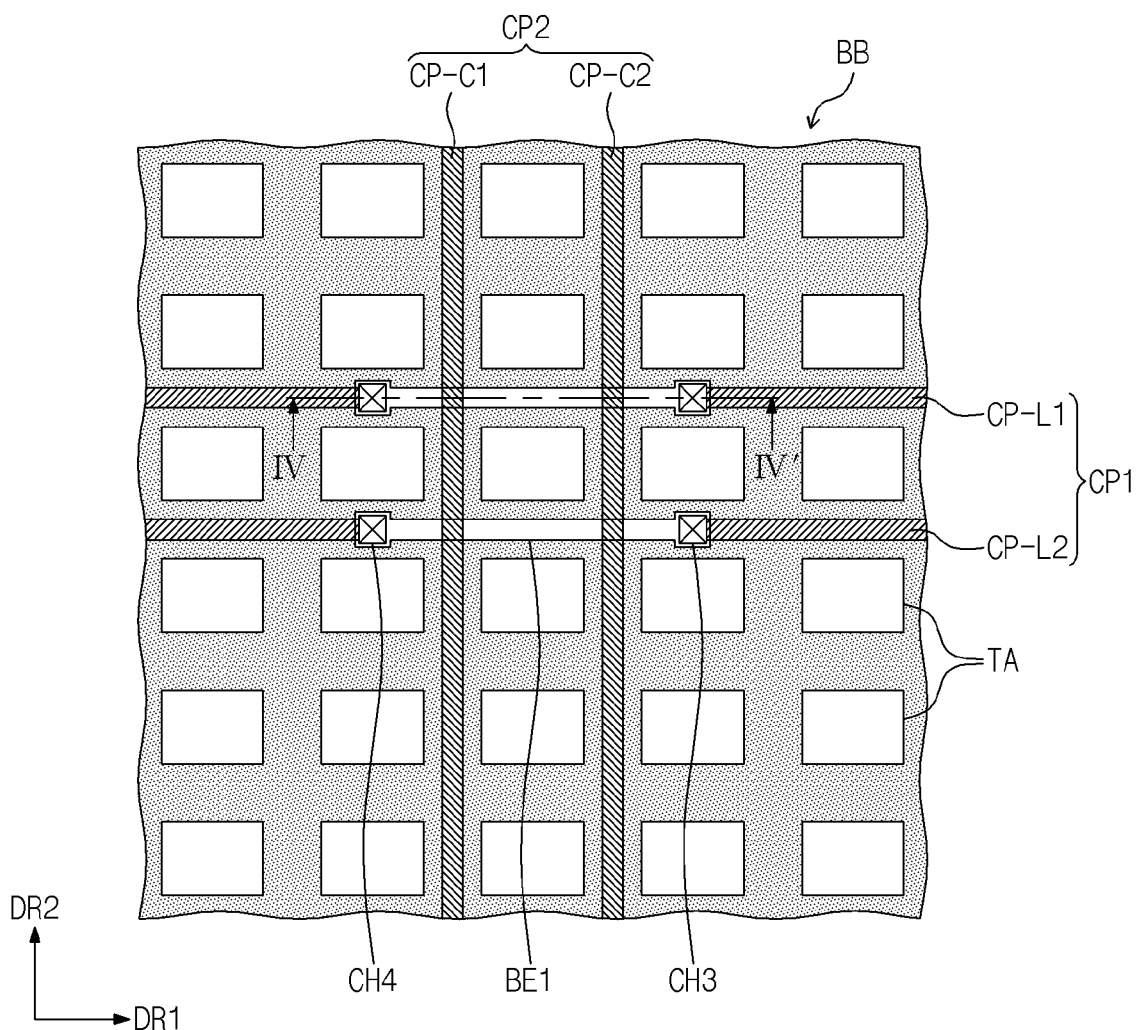
FIG. 33 is a partially enlarged plan view showing a portion "BB" shown in FIG. 30 according to exemplary embodiments of the present disclosure.
Figure 34:
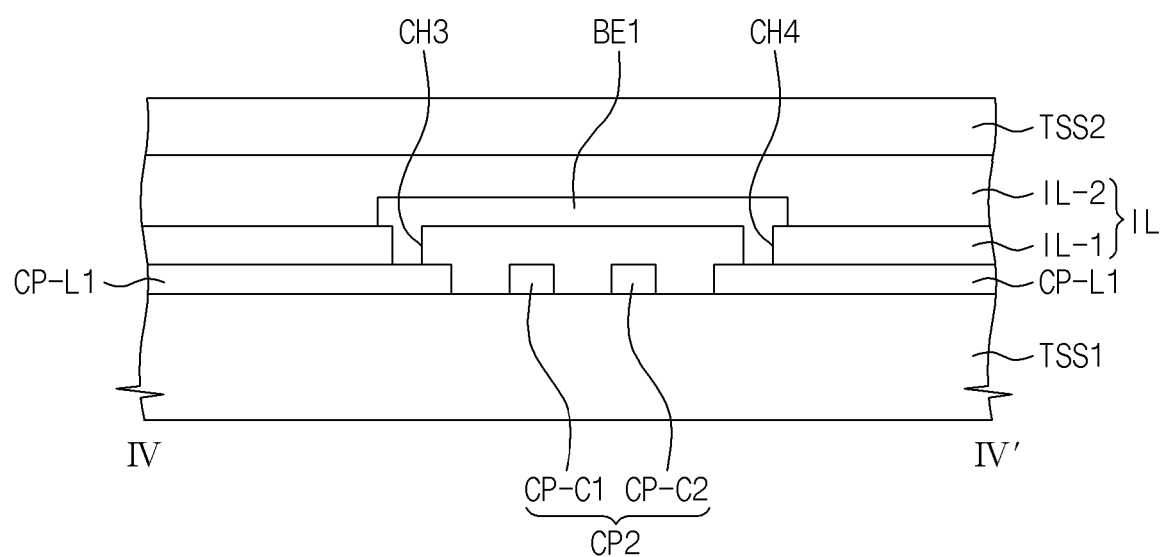
FIG. 34 is a cross-sectional view taken along a line IV-IV' shown in FIG. 33 according to exemplary embodiments of the present disclosure.
Figure 35:
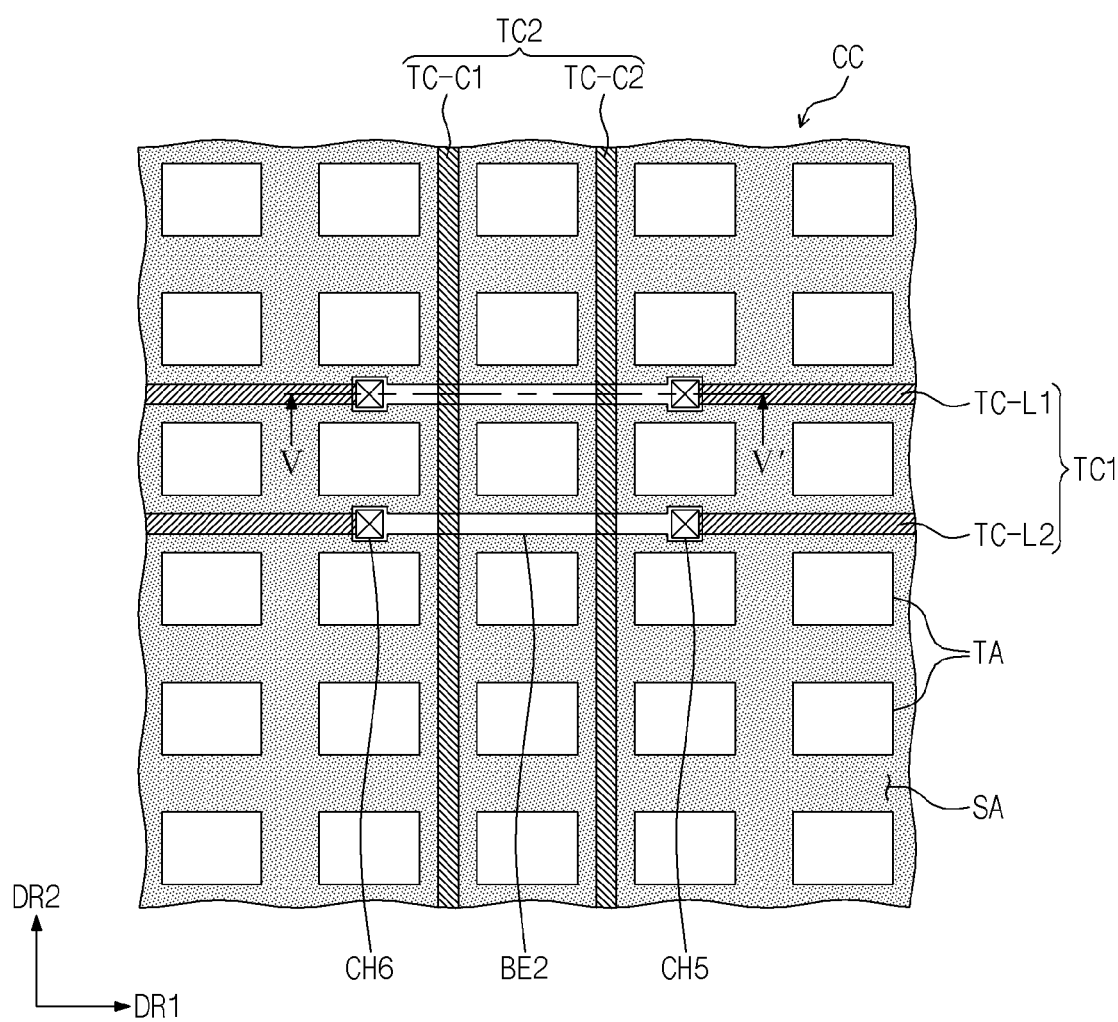
FIG. 35 is a partially enlarged plan view showing a portion "CC" shown in FIG. 30 according to exemplary embodiments of the present disclosure.
Figure 36:
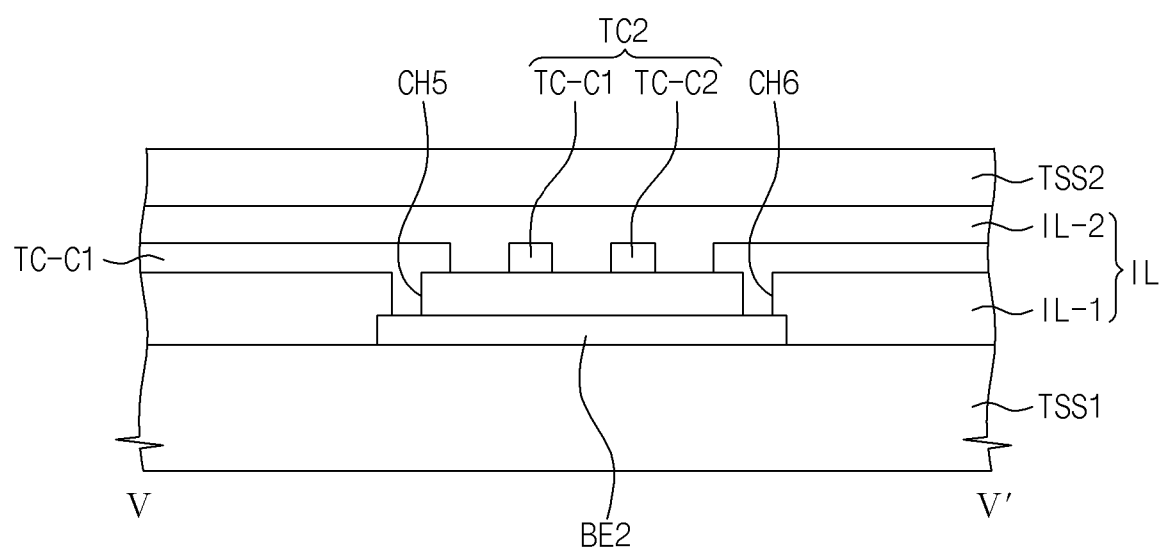
FIG. 36 is a cross-sectional view taken along a line V-V' shown in FIG. 35 according to exemplary embodiments of the present disclosure.

FIG. 33 is a partially enlarged plan view showing a portion "BB" shown in FIG. 30 according to exemplary embodiments of the present disclosure. FIG. 34 is a cross-sectional view taken along a line IV-IV' shown in FIG. 33. FIG. 35 is a partially enlarged plan view showing a portion "CC" shown in FIG. 30. FIG. 36 is a cross-sectional view taken along a line V-V' shown in FIG. 35.

FIG. 33 shows an arrangement of the first connection part CP1 and the second connection part CP2, and FIG. 35 shows an arrangement of the first touch coil TC1 and the second touch coil TC2.

Referring to FIGS. 33 and 34, the first connection part CP1 includes a plurality of horizontal portions CP-L1 and CP-L2 and the second connection CP2 includes a plurality of vertical portions CP-C1 and CP-C2. FIG. 33 shows two horizontal portions CP-L1 and CP-L2 and two vertical portions CP-C1 and CP-C2. Although not shown in figures, the first connection part CP1 may further include vertical portions overlapped with the blocking area SA and connecting the horizontal portions CP-L1 and CP-L2. The second connection portion CP2 may further include horizontal portions overlapped with the blocking area SA and connecting the vertical portions CP-C1 and CP-C2.

As shown in FIG. 34, the first connection part CP1 and the second connection part CP2 are disposed on the first touch substrate TSS1. The first connection part CP1 is partially cut off on the first touch substrate TSS1. The first connection part CP1 includes a bridge BE1 (hereinafter, referred to as a first bridge) in the area in which the first connection part CP1 crosses the second connection part CP2. The first bridge BE1 connects two ends of the first connection part CP1 that are partially cut off.

The first insulating layer IL-1 covers the first connection part CP1 and the second connection part CP2. The first insulating layer IL-1 includes a third contact hole CH3 and a fourth contact hole CH4 to partially expose the first connection part CP1. The third contact hole CH3 exposes one end of the first connection part CP1 that is cut off and the fourth contact hole CH4 exposes another end of the first connection part CP1 that is cut off.

The first bridge BE1 is disposed on the first insulating layer IL-1. The first bridge BE1 connects the horizontal portions CP-L1 and CP-L2 of the cut-off first connection part CP1 through the third and fourth contact holes CH3 and CH4. In some cases, the second connection part CP2 may be partially cut off on the first touch substrate TSS1, and the first bridge BE1 may connect the cut-off second connection part CP2.

Referring to FIGS. 35 and 36, the first touch coil TC1 includes a plurality of horizontal portions TC-L1 and TC-L2, and the second touch coil TC2 includes a plurality of vertical portions TC-C1 and TC-C2. FIG. 35 shows two horizontal portions TC-L1 and TC-L2 and two vertical portions TC-C1 and TC-C2 as an example. Although not shown in figures, the first touch coil TC1 further includes vertical portions overlapped with the blocking area SA and connecting the horizontal portions TC-L1 and TC-L2, and the second touch coil TC2 further includes horizontal portions overlapped with the blocking area SA and connecting the vertical portions TC-C1 and TC-C2.

The first touch coil TC1 and the second touch coil TC2 are disposed on the first insulating layer IL-1. The first touch coil TC1 is partially cut off on the first insulating layer IL-1. The first touch coil TC1 includes a bridge BE2 (hereinafter, referred to as a second bridge) in the area in which the first touch coil TC1 crosses the second touch coil TC2. The second bridge BE2 connects two ends of the cut-off first touch coil TC1.

The first insulating layer IL-1 covers the second bridge BE2. The first insulating layer IL-1 includes a fifth contact hole CH5 and a sixth contact hole CH6 to partially expose the second bridge BE2. The fifth contact hole CH5 exposes the one end of the second bridge BE2 and the sixth contact hole CH6 exposes another end of the second bridge BE2.

The one end of the cut-off first touch coil TC1 is connected to the second bridge BE2 through the fifth contact hole CH5 and another end of the cut-off first touch coil TC1 is connected to the second bridge BE2 through the sixth contact hole CH6. In some cases, the second touch coil TC2 may be partially cut off on the first insulating layer IL-1, and the second bridge BE2 may connect the cut-off second touch coil TC2.

Figure 37:
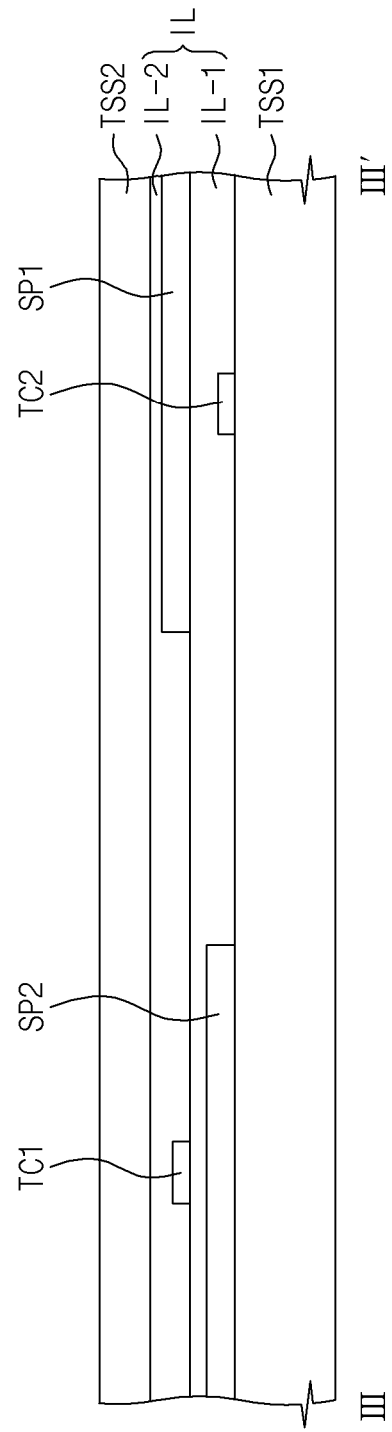
FIG. 37 is a cross-sectional view taken along a line III-III' shown in FIG. 30 according to exemplary embodiments of the present disclosure.
Figure 38:
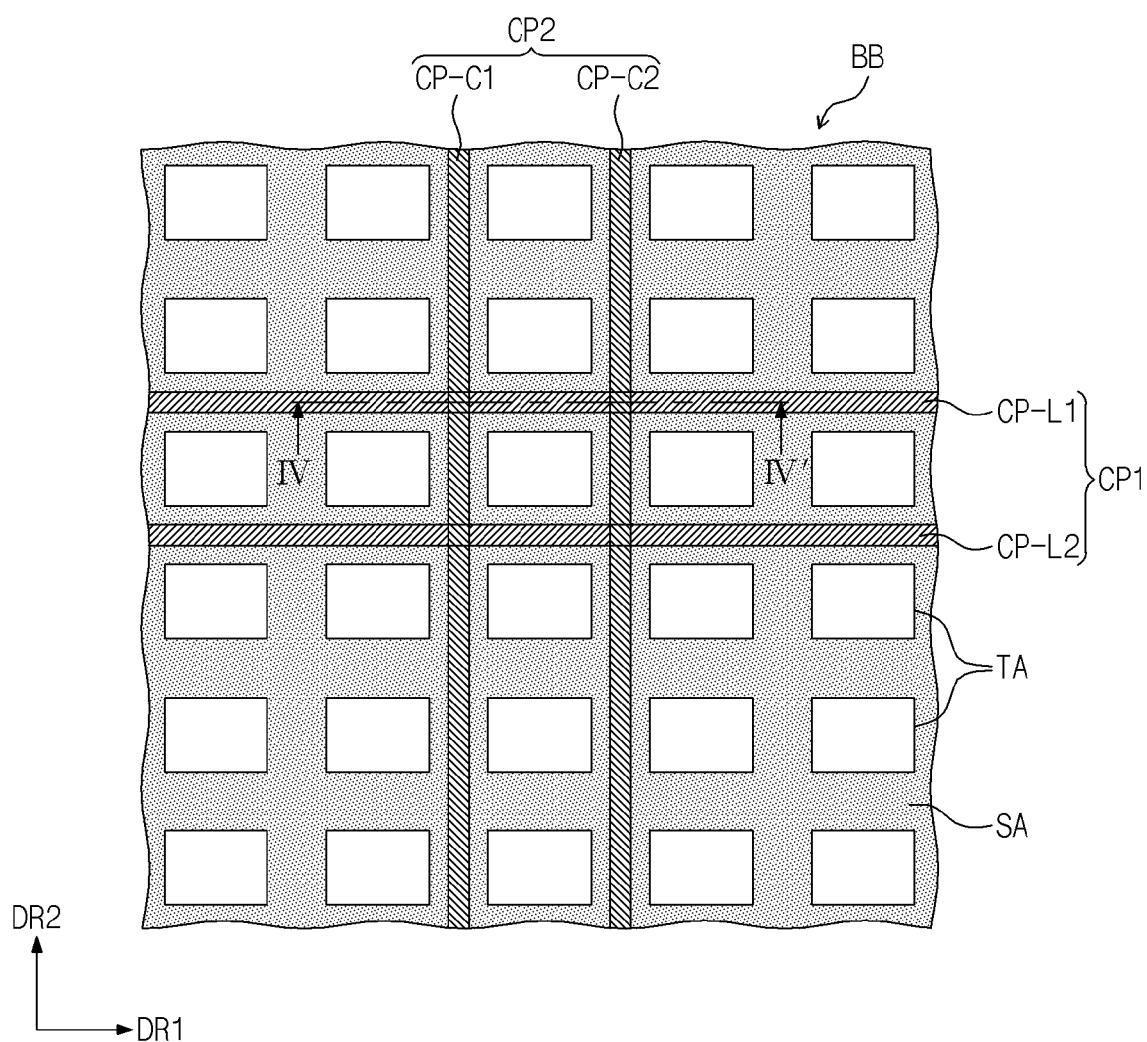
FIG. 38 is a partially enlarged plan view showing a portion "BB" shown in FIG. 30 according to exemplary embodiments of the present disclosure.
Figure 39:
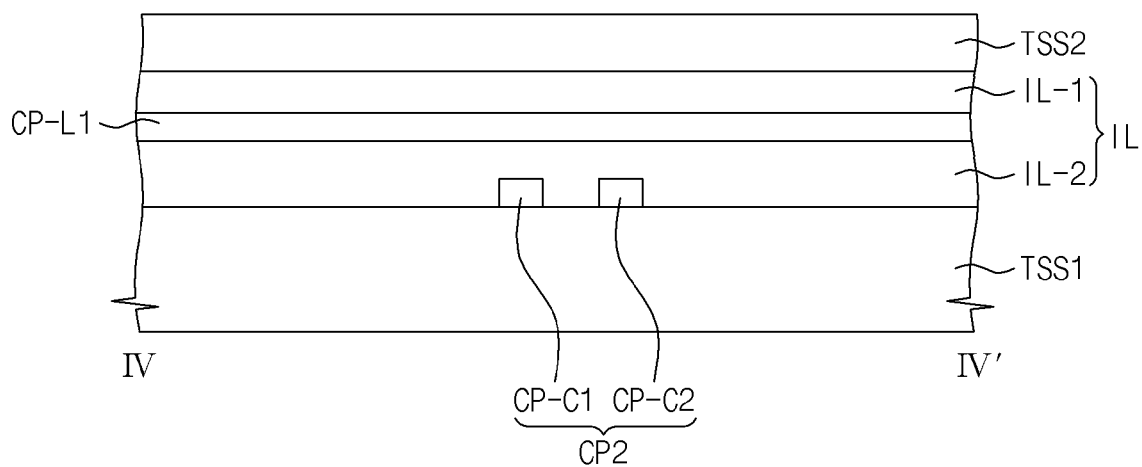
FIG. 39 is a cross-sectional view taken along a line IV-IV' shown in FIG. 38 according to exemplary embodiments of the present disclosure.

FIG. 37 is a cross-sectional view taken along a line III-III' shown in FIG. 30 according to exemplary embodiments of the present disclosure. FIG. 38 is a partially enlarged plan view showing a portion "BB" shown in FIG. 30 according to exemplary embodiments of the present disclosure. FIG. 39 is a cross-sectional view taken along a line IV-IV' shown in FIG. 38.

Figure 40:
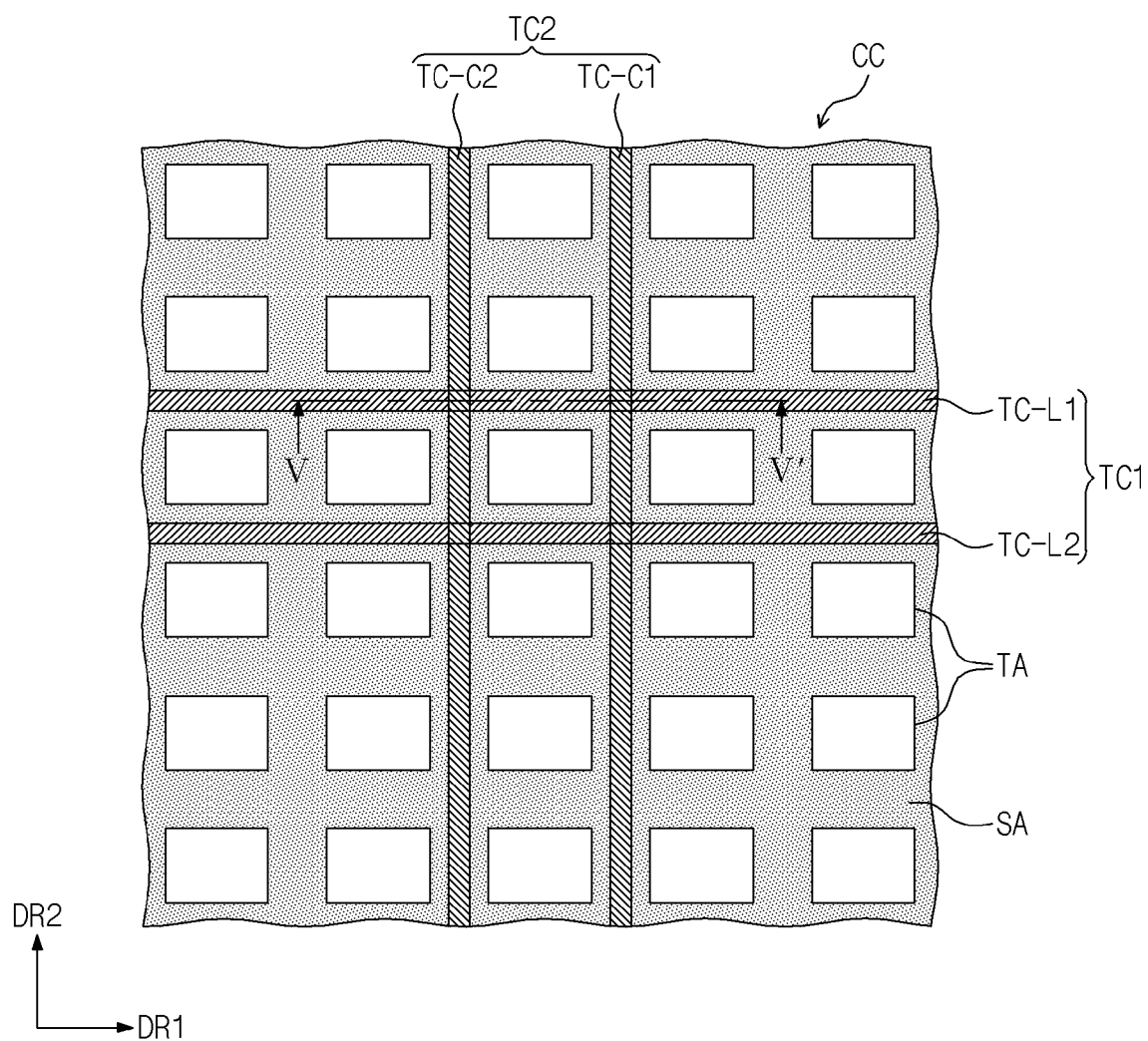
FIG. 40 is a partially enlarged plan view showing a portion "CC" shown in FIG. 30 according to exemplary embodiments of the present disclosure.
Figure 41:
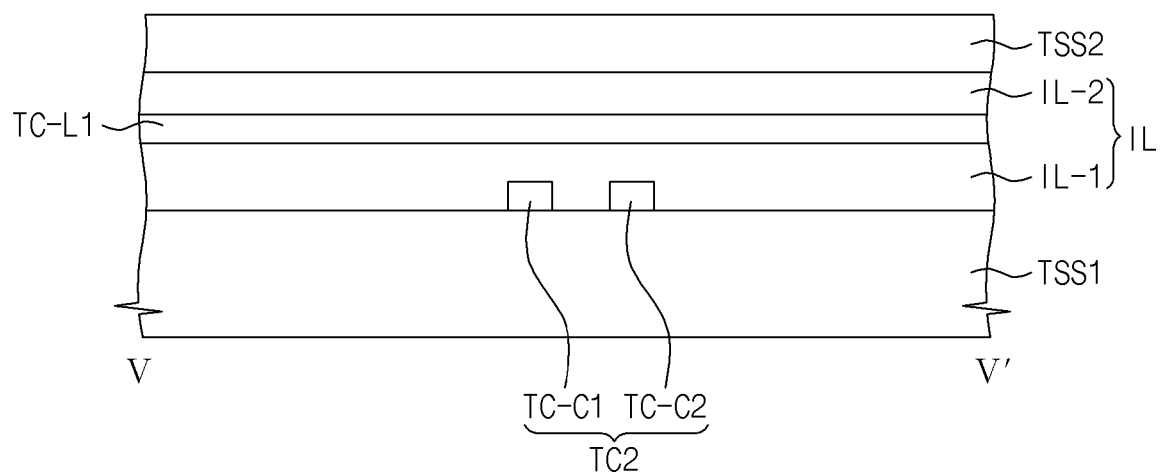
FIG. 41 is a cross-sectional view taken along a line V-V' shown in FIG. 40 according to exemplary embodiments of the present disclosure.

FIG. 40 is a partially enlarged plan view showing a portion "CC" shown in FIG. 30 according to exemplary embodiments of the present disclosure. FIG. 41 is a cross-sectional view taken along a line V-V' shown in FIG. 40.

Referring to FIG. 37, the first sensor part SP1 and the first touch coil TC1 are disposed on the same layer, and the second sensor part SP2 and the second touch coil TC2 are disposed on the same layer. The second sensor part SP2 and the second touch coil TC2 form a portion of the first conductive layer CL1 (refer to FIG. 22) and the first sensor part SP1 and the first touch coil TC1 form a portion of the second conductive layer CL2 (refer to FIG. 22).

The second sensor part SP2 and the second touch coil TC2 are disposed on the first touch substrate TSS1. The first insulating layer IL-1 is disposed on the first touch substrate TSS1 to cover the second sensor part SP2 and the second touch coil TC2. The first sensor part SP1 and the first touch coil TC1 are disposed on the first insulating layer IL-1. The second insulating layer IL-2 is disposed on the first insulating layer IL-1 to cover the first sensor part SP1 and the first touch coil TC1. The second touch substrate TSS2 is disposed on the second insulating layer IL2.

As shown in FIGS. 38 and 39, the first connection part CP1 includes the horizontal portions CP-L1 and CP-L2, and the second connection part CP2 includes the vertical portions CP-C1 and CP-C2. The second connection portion CP2 is disposed on the first touch substrate TSS1. The first connection part CP1 is disposed on the first insulating layer IL-1 that covers the second connection part CP2. Since the first connection part SP1 and the second connection part CP2 are disposed on different layers from each other, the first bridge BE1 (refer to FIGS. 33 and 34) may be omitted.

As shown in FIGS. 40 and 41, the first touch coil TC1 includes the horizontal portions TC-L1 and TC-L2, and the second touch coil TC2 includes the vertical portions TC-C1 and TC-C2. The second touch coil TC2 is disposed on the first touch substrate TSS1. The first touch coil TC1 is disposed on the first insulating layer IL-1 that covers the second touch coil TC2. Since the first touch coil TC1 and the second touch coil TC2 are disposed on different layers from each other, the second bridge BE2 (refer to FIGS. 35 and 36) may be omitted.

Figure 42:
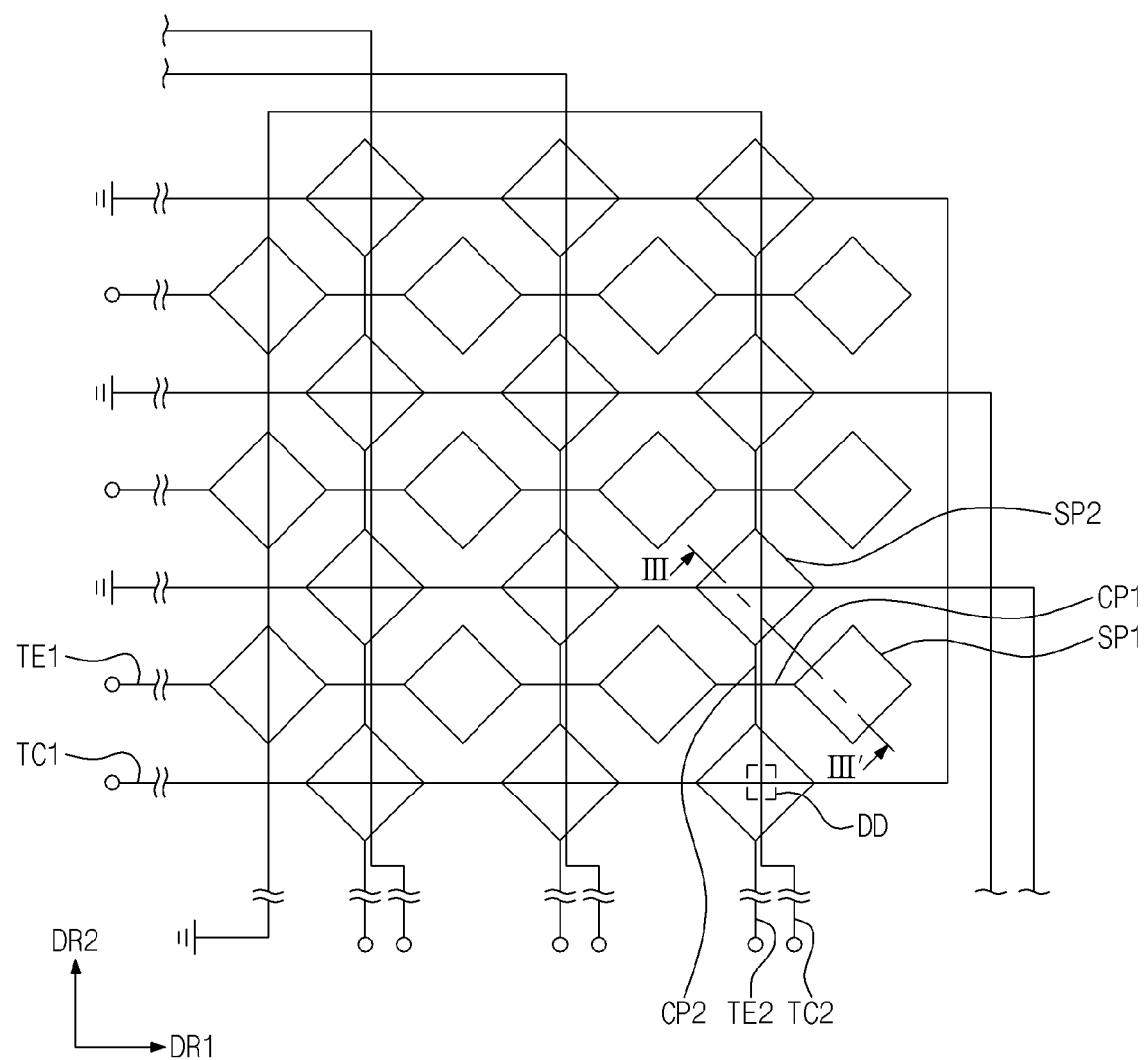
FIG. 42 is a partially enlarged plan view showing a portion of the touch panel shown in FIG. 25 according to exemplary embodiments of the present disclosure.
Figure 43:
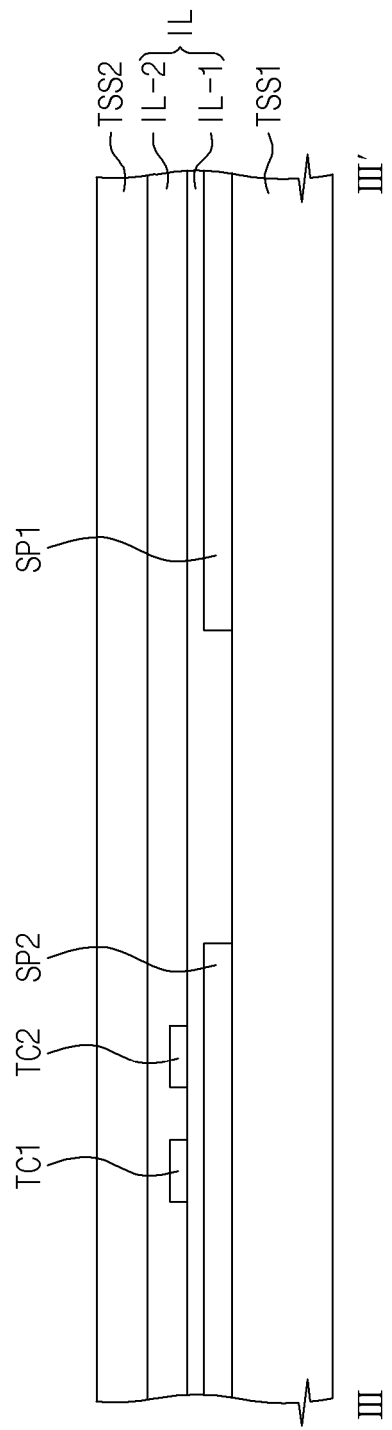
FIG. 43 is a cross-sectional view taken along a line III-III' shown in FIG. 42 according to exemplary embodiments of the present disclosure.
Figure 44:
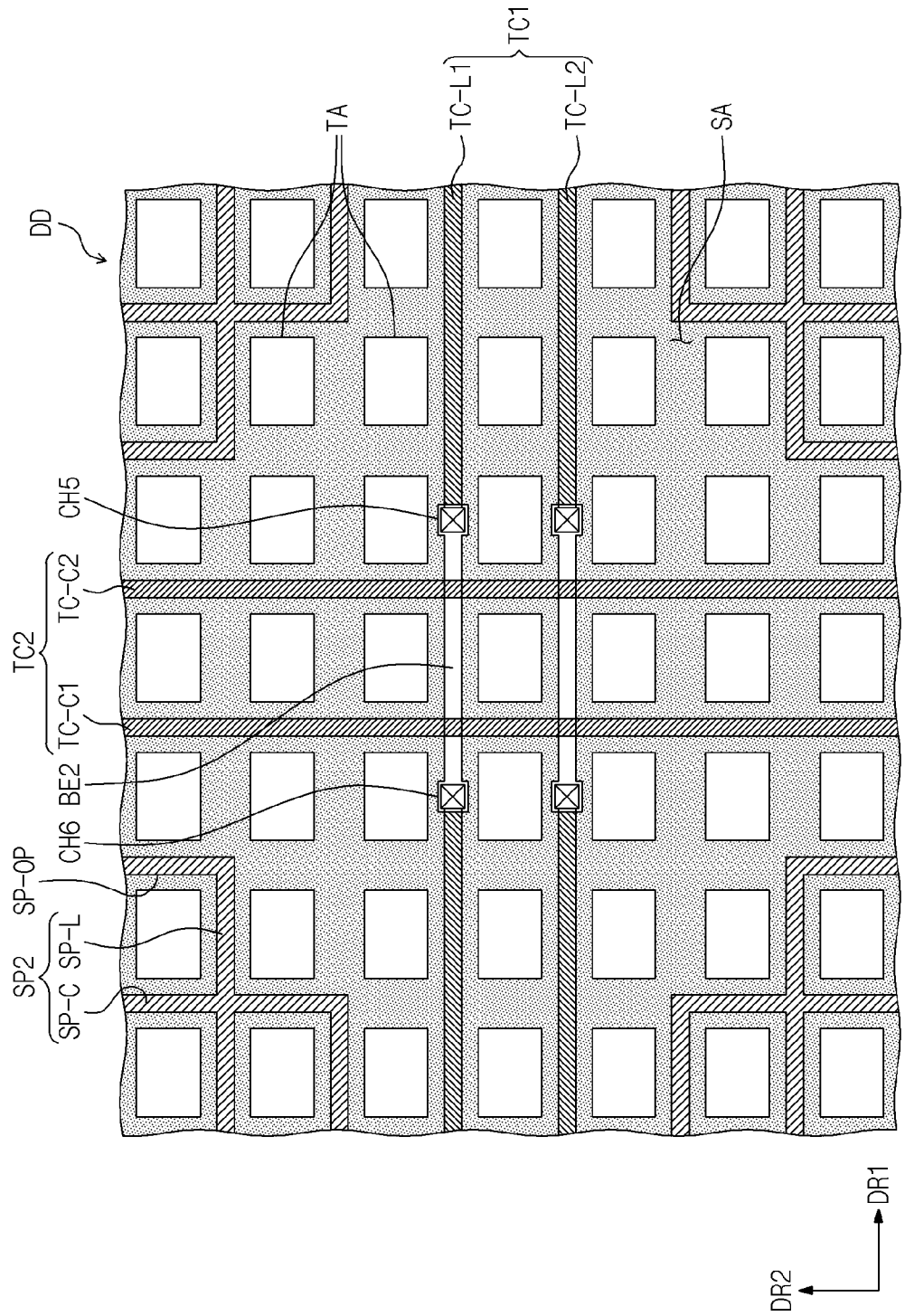
FIG. 44 is a partially enlarged plan view showing a portion "DD" shown in FIG. 42 according to exemplary embodiments of the present disclosure.

FIG. 42 is a partially enlarged plan view showing a portion of the touch panel TP shown in FIG. 25. FIG. 43 is a cross-sectional view taken along a line III-III' shown in FIG. 42 according to exemplary embodiments of the present disclosure. FIG. 44 is a partially enlarged plan view showing a portion "DD" shown in FIG. 42. FIG. 42 corresponds to FIG. 30. In FIGS. 42 to 44, the same reference numerals denote the same elements in FIGS. 30 to 41, and thus detailed descriptions of the same elements will be omitted.

Referring to FIGS. 42 and 43, the first sensor part SP1 and the second sensor part SP2 are disposed on the same layer, and the first touch coil TC1 and the second touch coil TC2 are disposed on the same layer. The first sensor part SP1 and the second sensor part SP2 form the first conductive layer CL1 (refer to FIG. 22) and the first touch coil TC1 and the second touch coil TC2 form the second conductive layer CL2 (refer to FIG. 22). In some cases, the first sensor part SP1 and the second sensor part SP2 form the second conductive layer CL2 and the first touch coil TC1 and the second touch coil TC2 form the first conductive layer CL1.

Referring to FIGS. 42 and 44, the first touch coil TC1 crosses the second touch coil TC2 on the second sensor part SP2. The second sensor part SP2 is overlapped with a portion of the blocking area SA and includes a plurality of horizontal portions SP-L and a plurality of vertical portions SP-C. The sensor part SP2 has a mesh shape defined by a plurality of openings SP-OP. FIG. 44 shows the second sensor part SP2 that is the same as the sensor part SP1 show in FIG. 31B, but it should not be limited thereto or thereby.

The first touch coil TC1 includes a plurality of horizontal portions TC-L1 and TC-L2 overlapped with the portion of the blocking area SA, and the second touch coil TC2 includes a plurality of vertical portions overlapped with the portion of the blocking area SA. The second bridge BE2 is disposed in the area in which the first touch coil TC1 crosses the second touch coil TC2. The second bridge BE2 is disposed on the same layer as the second sensor part SP2. The second bridge BE2 is disposed on the surface of the first touch substrate TSS1 (refer to FIG. 36).

In order to prevent the second bridge BE2 from electrically making contact with the second sensor part SP2, a portion of the second sensor part SP2 is removed from the area in which the first touch coil TC1 crosses the second touch coil TC2. In some cases, the first touch coil TC1 may cross the second touch coil TC2 on the first sensor part SP1.

Figure 45A:
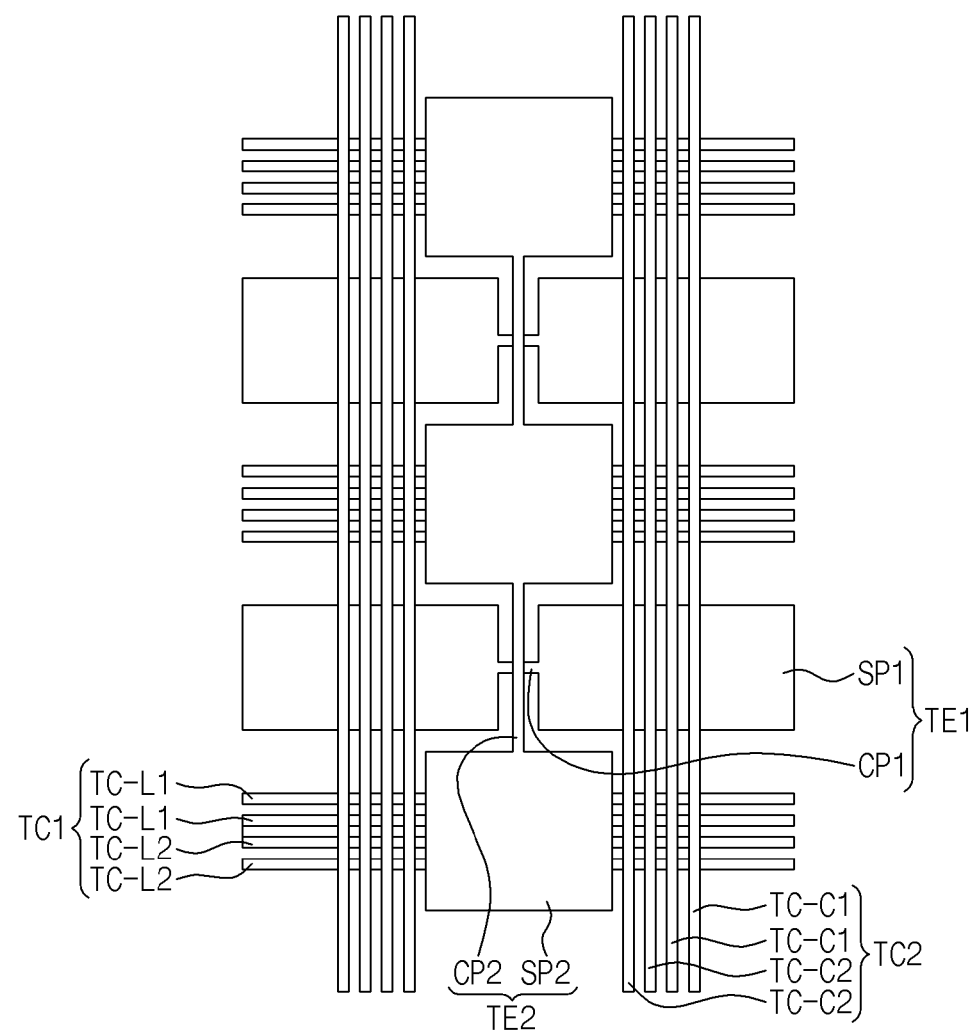
FIGS. 45A to 45C are enlarged plan views showing touch panels according to exemplary embodiments of the present disclosure.
Figure 45B:
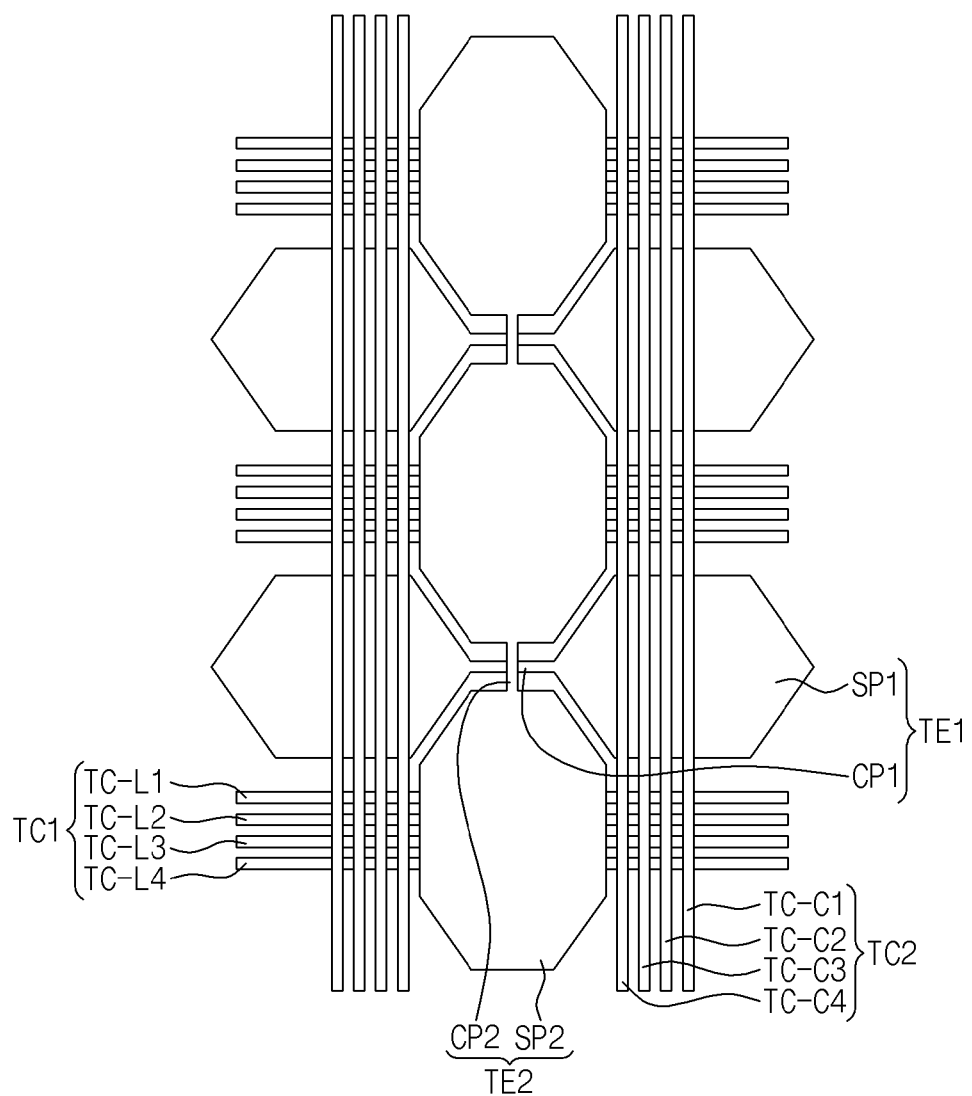
Figure 45C:
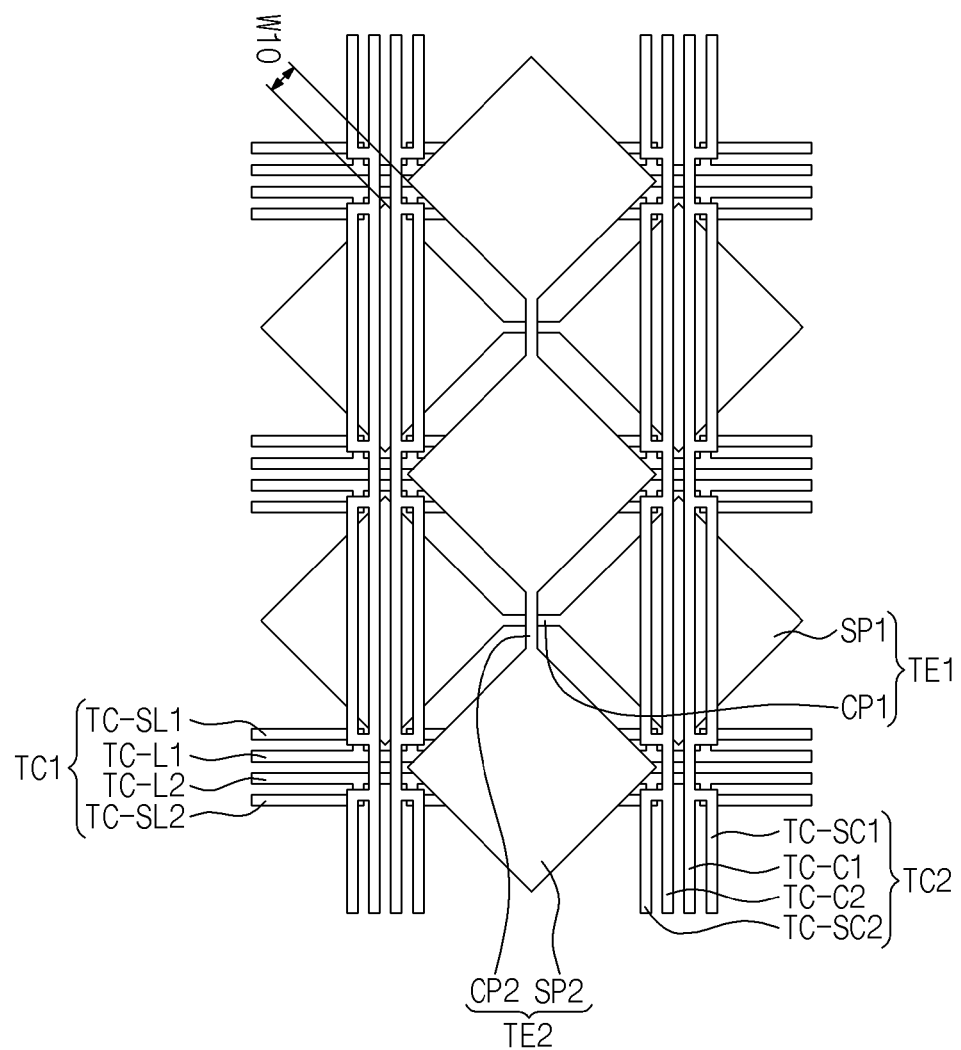

FIGS. 45A, 45B, and 45C are enlarged plan views showing touch panels TPs according to exemplary embodiments of the present disclosure. FIGS. 45A, 45B, and 45C show a first touch electrode TE1, a second touch electrode TE2, a first touch coil TC1, and a second touch coil TC2. The touch panels shown in FIGS. 45A, 45B, and 45C have the same cross-sectional structure as that of the touch panel TP shown in FIG. 37.

Referring to FIGS. 45A and 45B, a first sensor part SP1 of the first touch electrode TE1 and a second sensor part SP2 of the second touch electrode TE2 have different shapes from each other. For example, as shown in FIG. 45A, the first sensor part SP1 and the second sensor part SP2 may have a rectangular shape and a square shape, respectively. As shown in FIG. 45B, the first sensor part SP1 may have a hexagonal shape and the second sensor part SP2 may have an octagonal shape. In general, the first and second sensor parts SP1 and SP2 may have various shapes, such as a circular shape, an oval shape, a polygonal shape, etc., as long as the shape of the first sensor part SP1 is different from that of the second sensor part SP2.

In addition, the first touch coil TC1 includes a plurality of horizontal portions TC-L1 to TC-L4 and the second touch coil TC2 includes a plurality of vertical portions TC-C1 to TC-C4. As shown in FIGS. 45A and 45B, the first touch coil TC1 includes four horizontal portions TC-L1 to TC-L4 disposed substantially in parallel to each other, and the second touch coil TC2 includes four vertical portions TC-C1 to TC-C4 disposed substantially in parallel to each other. As the number of the horizontal portions TC-L1 to TC-L4 or the vertical portions TC-C1 to TC-C4 increases, an intensity of the magnetic field induced by the first touch coil TC1 or the second touch coil TC2 becomes stronger. Thus, the sensing sensitivity of the touch panel TP becomes higher in the second mode.

Referring to FIG. 45C, the first sensor part SP1 and the second sensor part SP2 have a trapezoid shape. In addition, the first touch coil TC1 includes two horizontal portions TC-L1 and TC-L2 and the second touch coil TC2 includes two vertical portions TC-C1 and TC-C2.

The first touch coil TC1 further includes sub-horizontal portions TC-SL1 and TC-SL2, and the second touch coil TC2 further includes sub-vertical portions TC-SC1 and TC-SC2. The sub-horizontal portions TC-SL1 and TC-SL2 and the sub-vertical portions TC-SC1 and TC-SC2 lower a resistance of the first touch coil TC1 and the second touch coil TC2, respectively.

The sub-horizontal portions TC-SL1 and TC-SL2 are disposed substantially in parallel to the horizontal portions TC-L1 and TC-L2, respectively, and are connected to different points of the horizontal portions TC-L1 and TC-L2. The sub-horizontal portions TC-SL1 and TC-SL2 are overlapped with the second sensor part SP2. The first sub-horizontal portion TC-SL1 connects a first point and a second point of the first horizontal portion TC-L1, and the second sub-horizontal portion TC-SL2 connects a first point and a second point of the second horizontal portion TC-L2.

The sub-vertical portions TC-SC1 and TC-SC2 are disposed substantially in parallel to the vertical portions TC-C1 and TC-C2, respectively, and are connected to different points of the vertical portions TC-C1 and TC-C2. The first sub-vertical portion TC-SC1 connects a first point and a second point of the first vertical portion TC-C1, and the second sub-vertical portion TC-SC2 connects a first point and a second point of the second vertical portion TC-C2.

The first sub-vertical portion TC-SC1 and the second sub-vertical portion TC-SC2 do not cross the first horizontal portion TC-L1 and the second horizontal portion TC-L2. The first sub-horizontal portion TC-SL1 and the second sub-horizontal portion TC-SL2 do not cross the first vertical portion TC-C1 and the second vertical portion TC-C2. Vertices of the first sensor part SP1 having the trapezoid shape are disposed adjacent to an area crossing the vertical portions TC-C1 and TC-C2 and the horizontal portions TC-L1 and TC-L2. Vertices of the second sensor part SP2 having the trapezoid shape are disposed adjacent to an area crossing the horizontal portions TC-L1 and TC-L2 and the horizontal portions TC-L1 and TC-L2.

Consequently, an area of the first sensor part SP1 and the second sensor part SP2 is increased and a distance between a side of the first sensor part SP1 and a side of the second sensor part SP2, which face each other, is reduced. Therefore, a capacitance of the capacitor formed between the side of the first sensor part SP1 and the side of the second sensor part SP2 increases, and thus the sensing sensitivity of the touch panel TP operated in the electrostatic capacitive mode may be improved.

Figure 46A:
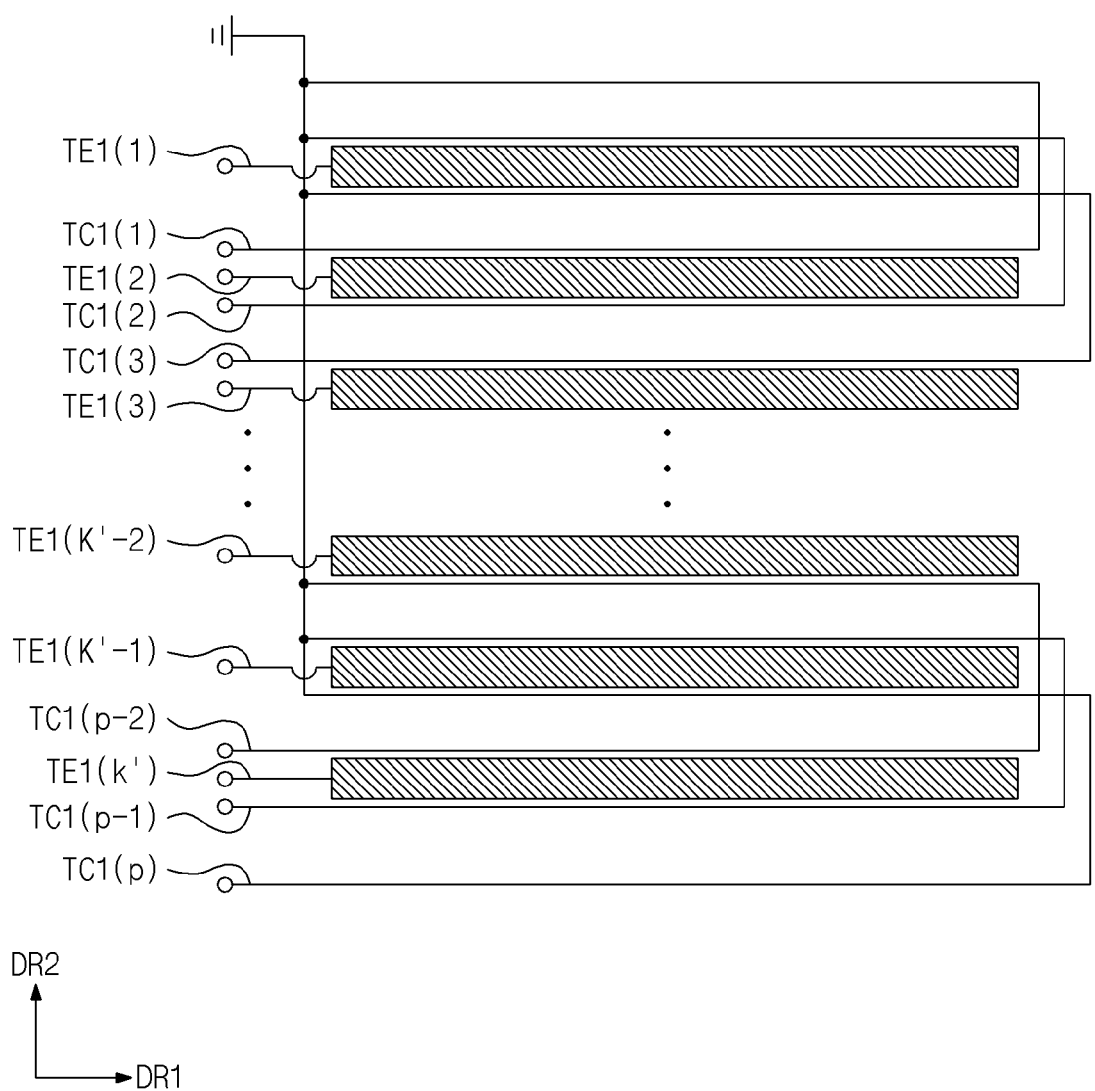
FIG. 46A is a plan view showing first touch electrodes and first touch coils according to exemplary embodiments of the present disclosure.
Figure 46B:
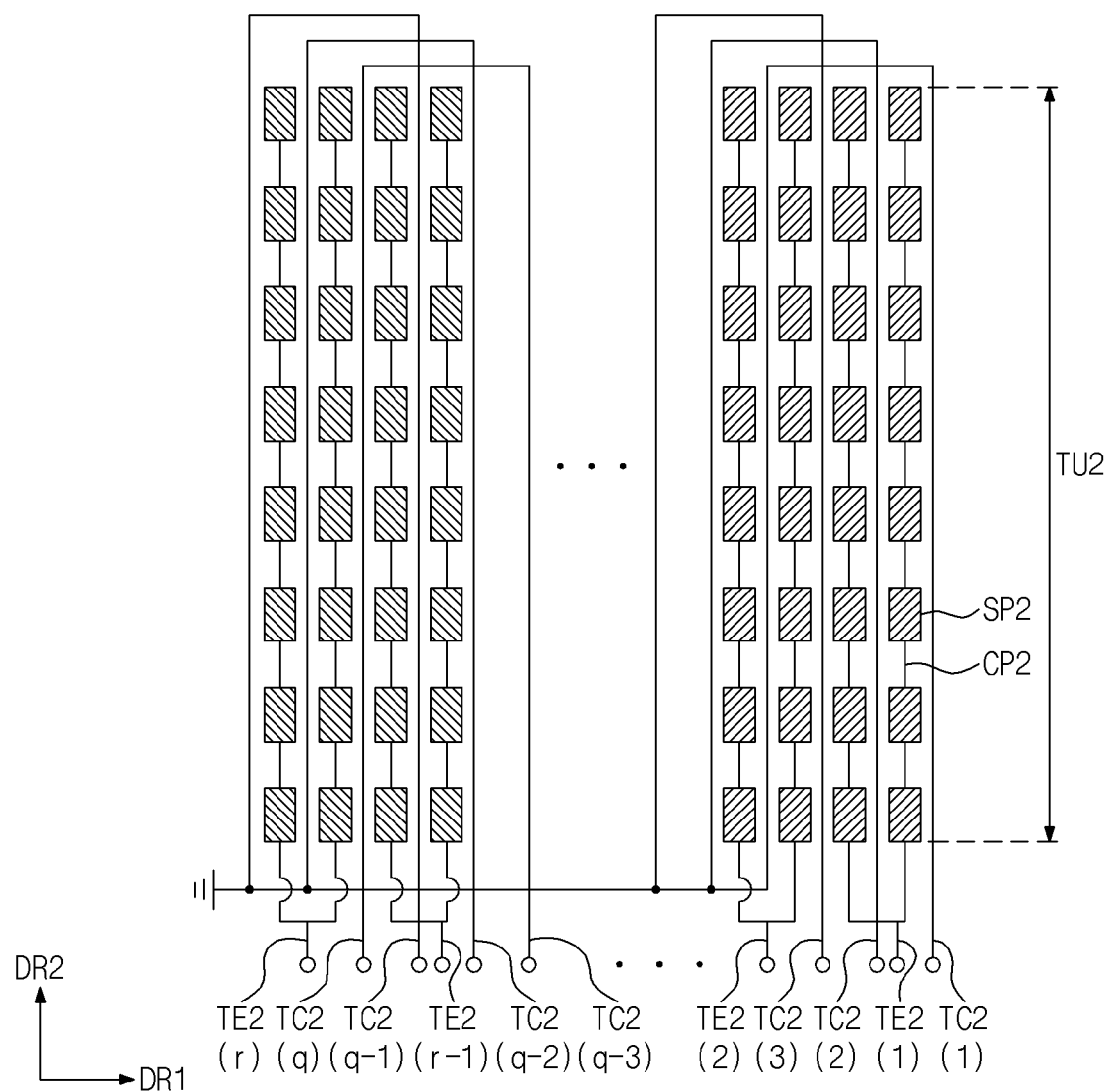
FIG. 46B is a plan view showing second touch electrodes and second touch coils according to exemplary embodiments of the present disclosure.

FIG. 46A is a plan view showing first touch electrodes TE and first touch coils TC according to exemplary embodiments of the present disclosure. FIG. 46B is a plan view showing second touch electrodes and second touch coils according to exemplary embodiments of the present disclosure. Hereinafter, the touch panel TP will be described with reference to FIGS. 46A and 46B. In FIGS. 46A and 46B, the same reference numerals denote the same elements in FIGS. 21 to 45C, and thus detailed descriptions of the same elements will be omitted.

Referring to FIG. 46A, each of the first touch coils TC1(1) to TC1($p$) has a loop shape extended in the first direction DR1. The first touch coils TC1(1) to TC1($p$) are arranged in the second direction DR2. The first touch coils TC1(1) to TC1($p$) are overlapped with each other in various ways.

Each of the first touch electrodes TE1(1) to TE1($k'$) has a bar shape extended in the first direction DR1. The first touch electrodes TE1(1) to TE1($k'$) are arranged in the second direction DR2 to be spaced apart from each other. The first touch electrodes TE1(1) to TE1($k'$) are disposed in portions of division areas defined by overlapping the first touch coils TC1(1) to TC1($p$) with each other.

Referring to FIG. 46B, each of the second touch coils TC2(1) to TC2($q$) has a loop shape extended in the second direction DR2. The second touch coils TC2(1) to TC2($q$) are arranged in the first direction DR1. The second touch coils TC2(1) to T2($q$) are overlapped with each other in various ways.

The second touch electrodes TE2(1) to TE2($r$) are arranged in the first direction DR1 to be spaced apart from each other. The second touch electrodes TE2(1) to TE2($r$) are disposed in division areas defined by overlapping the second touch coils TC2(1) to TC2($q$) with each other.

Each of the second touch electrodes TE2(1) to TE2($r$) includes second touch units TU2. The second touch unit TU2 includes second sensor parts SP2 arranged in the second direction DR2 and second connection parts CP2 that connect two adjacent sensor parts of the second sensor parts SP2. Although not shown in figures, the first touch electrodes TE1(1) to TE1($k'$) are overlapped with the connection portions CP2 of the second touch electrodes TE2(1) to TE2($r$).

Figure 47A:
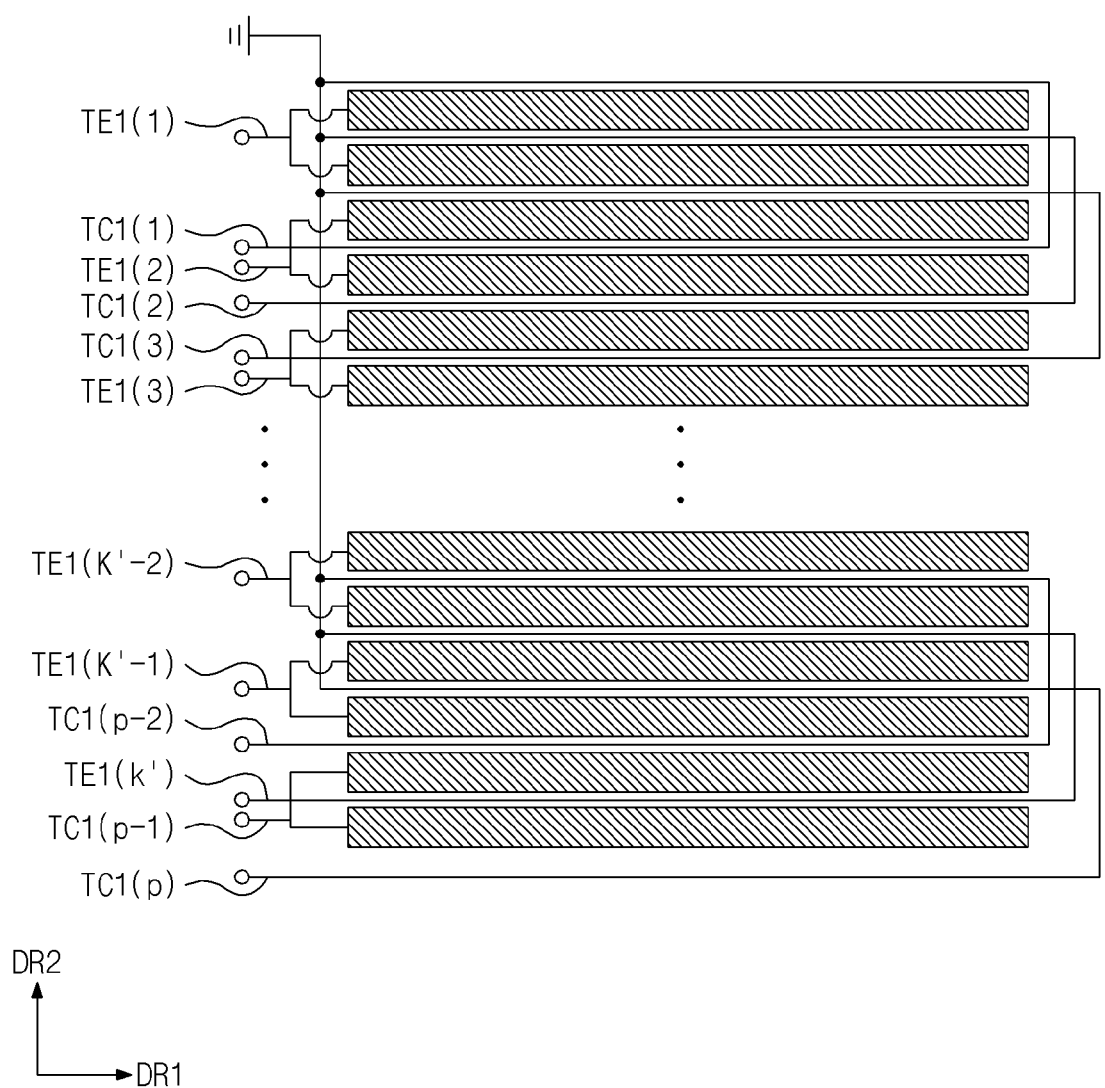
FIG. 47A is a plan view showing first touch electrodes and first touch coils according to exemplary embodiments of the present disclosure.
Figure 47B:
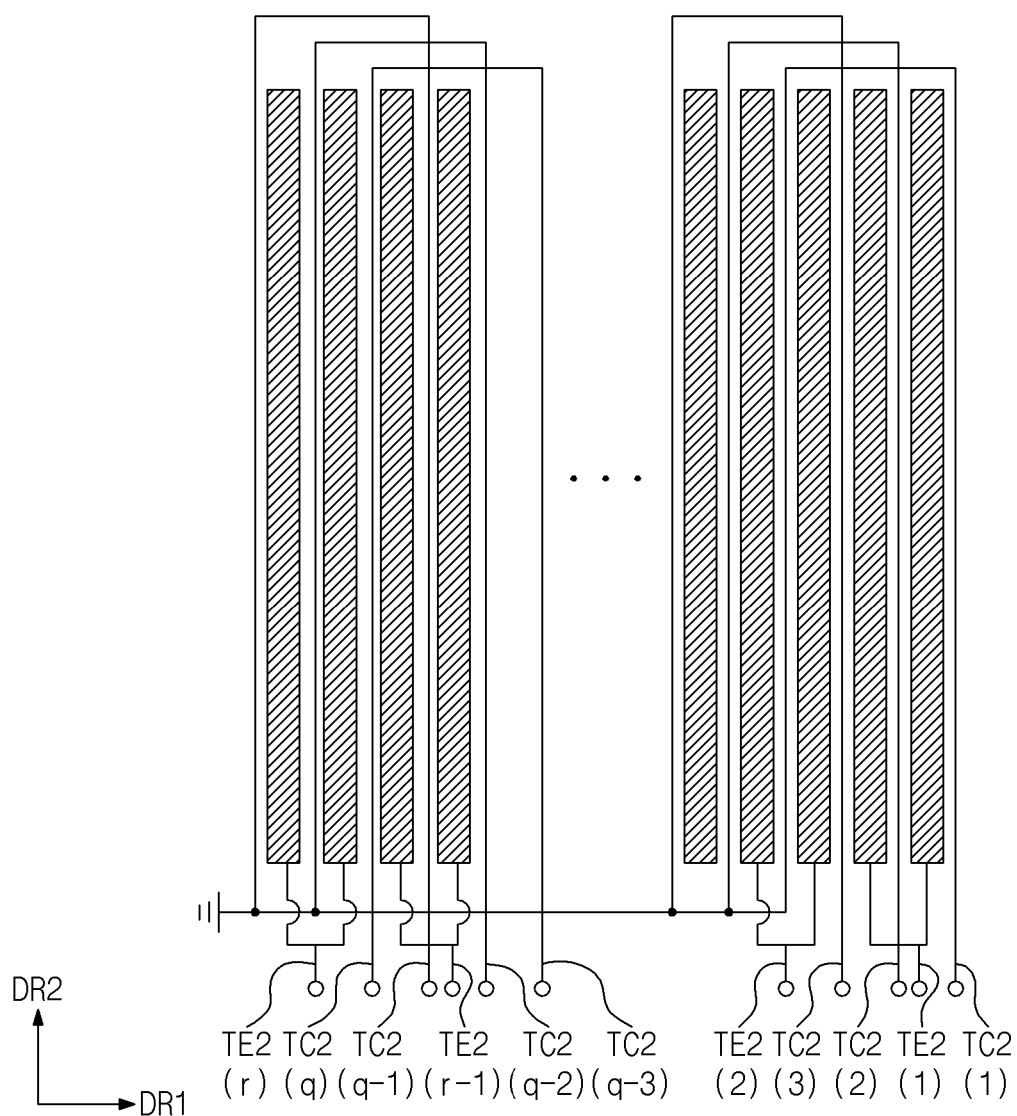
FIG. 47B is a plan view showing second touch electrodes and second touch coils according to exemplary embodiments of the present disclosure.

FIG. 47A is a plan view showing first touch electrodes TE1(1) to TE1($k'$) and first touch coils TC1(1) to TC1($p$) according to exemplary embodiments of the present disclosure. FIG. 47B is a plan view showing second touch electrodes TE2(1) to TE2($r$) and second touch coils TC2(1) to TC2($q$) according to exemplary embodiments of the present disclosure. In FIGS. 47A and 47B, the same reference numerals denote the same elements in FIGS. 21 to 45C, and thus detailed descriptions of the same elements will be omitted.

Referring to FIG. 47A, each of the first touch coils TC1(1) to TC1($p$) has a loop shape extended in the first direction DR1. The first touch coils TC1(1) to TC1($p$) are arranged in the second direction DR2. The first touch coils TC1(1) to TC1($p$) may be overlapped with each other in various ways. The first touch coils TC1(1) to TC1($p$) are partially overlapped with each other in groups, e.g., three touch coils.

Each of the first touch electrodes TE1(1) to TE1($k$) has a bar shape extended in the first direction DR1. The first touch electrodes TE1(1) to TE1($k$) are arranged in the second direction DR2 to be spaced apart from each other.

The first touch electrodes TE1(1) to TE1($k$) are disposed in division areas defined by overlapping the first touch coils with each other.

Referring to FIG. 47B, each of the second touch coils TC2(1) to TC2($q$) has a loop shape extended in the second direction DR2. The second touch coils TC2(1) to TC2($q$) are arranged in the first direction DR1. The second touch coils TC2(1) to TC2($q$) may be overlapped with each other in various ways. The second touch coils TC2(1) to TC2($q$) are partially overlapped with each other in groups, e.g., three touch coils.

Each of the second touch electrodes TE2(1) to TE2($r$) has a bar shape extended in the second direction DR2. The second touch electrodes TE2(1) to TE2($r$) are arranged in the first direction DR1 to be spaced apart from each other. The second touch electrodes TE2(1) to TE2($r$) are disposed in division areas defined by overlapping the second touch coils with each other.

Figure 48:
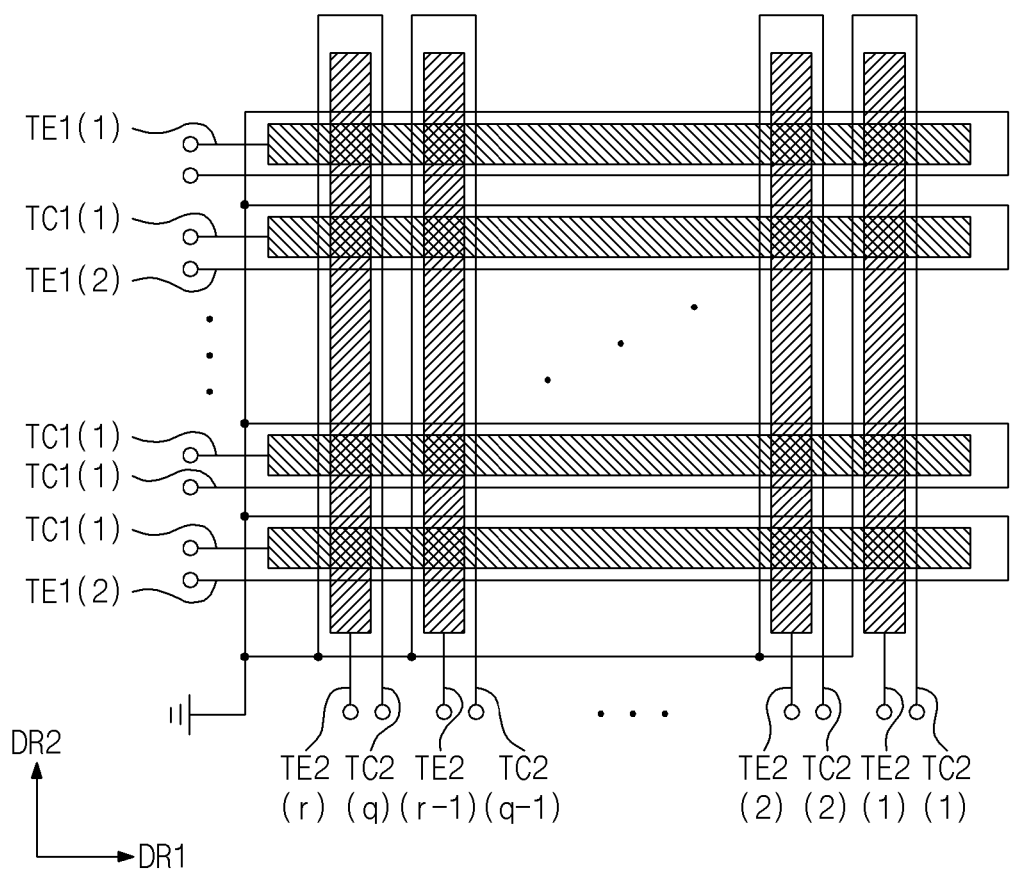
FIG. 48 is a plan view showing a touch panel according to exemplary embodiments of the present disclosure.

FIG. 48 is a plan view showing a touch panel TP according to exemplary embodiments of the present disclosure. In FIG. 48, the same reference numerals denote the same elements in FIGS. 21 to 45B, and thus detailed descriptions of the same elements will be omitted.

Referring to FIG. 48, each of the first touch coils TC1(1) to TC1($p$) has a loop shape extended in the first direction DR1. The first touch coils TC1(1) to TC1($p$) are arranged in the second direction DR2. Each of the second touch coils TC2(1) to TC2($q$) has a loop shape extended in the second direction DR2. The second touch coils TC2(1) to TC2($q$) are arranged in the first direction DR1.

The first touch electrodes TE1(1) to TE1($k$) cross the second touch electrodes TE2(1) to TE2($r$). The first touch electrodes TE1(1) to TE1($k$) and the second touch electrodes TE2(1) to TE2($r$) have a bar shape, but the shape of the first touch electrodes TE1(1) to TE1($k$) and the second touch electrodes TE2(1) to TE2($r$) should not be limited to the bar shape.

The first touch coils TC1(1) to TC1($p$) are not overlapped with each other and the second touch coils TC2(1) to TC2($q$) are not overlapped with each other. Each of the first touch electrodes TE1(1) to TE1($k$) is disposed in an area in which a corresponding touch coil of the first touch coils TC1(1) to TC1($p$) is formed. For instance, each of the first touch electrodes TE1(1) to TE1($k$) is surrounded by the corresponding touch coil of the first touch coils TC1(1) to TC1($p$). Each of the second touch electrode TE2(1) to TE2($r$) is disposed in an area in which a corresponding touch coil of the second touch coils TC2(1) to TC2($q$) is formed. Each of the second touch electrode TE2(1) to TE2($r$) is surrounded by the corresponding touch coil of the second touch coils TC2(1) to TC2($q$).

Figure 49A:
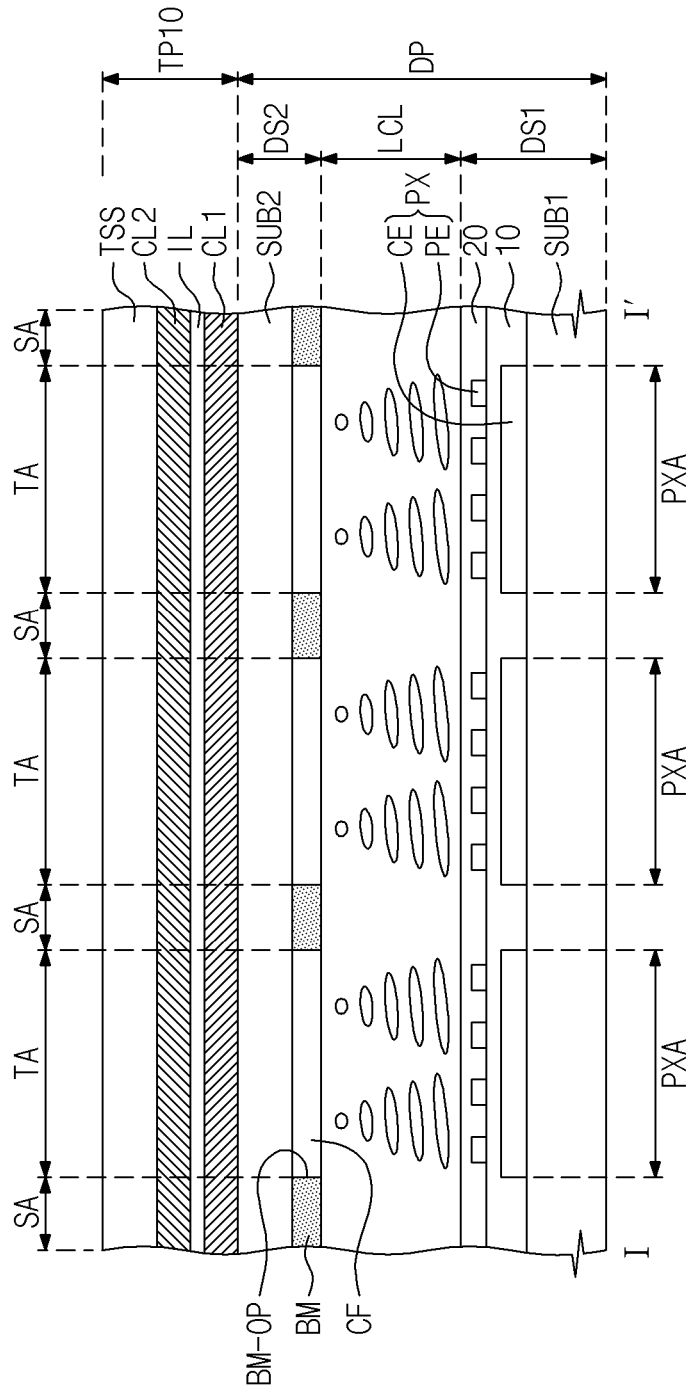
FIGS. 49A and 49B are cross-sectional views showing a touch panel according to exemplary embodiments of the present disclosure.
Figure 49B:
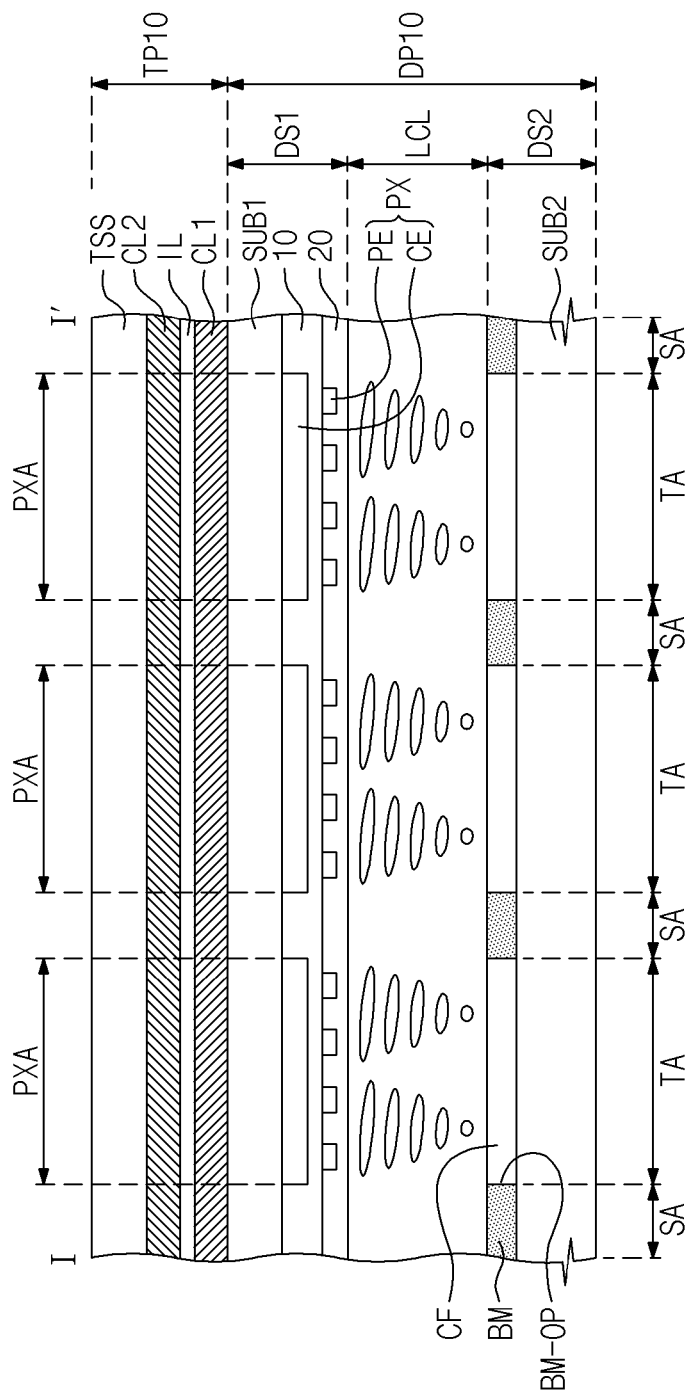

FIGS. 49A and 49B are cross-sectional views showing a touch panel TP10 according to exemplary embodiments of the present disclosure. Hereinafter, the touch panel TP10 will be described in detail with reference to FIGS. 49A and 49B. In FIGS. 49A and 49B, the reference numerals denote the same elements in FIGS. 21 to 48, and thus detailed descriptions of the same elements will be omitted.

Referring to FIG. 49A, the first display substrate DS1 is disposed under the liquid crystal layer LCL and the second display substrate DS2 is disposed on the liquid crystal layer LCL. The touch panel TP10 is disposed on the second display substrate DS2.

The touch panel TP10 includes a first conductive layer CL1, an insulating layer IL, a second conductive layer CL2, and a touch substrate TSS, which corresponds to the second touch substrate TSS2 shown in FIG. 23A. The first conductive layer CL1 is disposed on an upper surface of the second display substrate DS2. Different from a touch panel attached to a display panel after being separately manufactured, the touch panel TP10 is directly formed on the upper surface of the second display substrate DS2. After the first conductive layer CL1 is formed on the upper surface of the second display substrate DS2, the insulating layer IL, the second conductive layer CL2, and the touch substrate TSS are sequentially stacked.

Each of the first conductive layer CL1 and the second conductive layer CL2 includes a plurality of conductive patterns. As described with reference to FIGS. 21 to 48, the first conductive layer CL1 includes portions of the first touch electrodes TE1(1) to TE1(k), the second touch electrodes TE2(1) to TE2(r), the first touch coils TC1(1) to TC1(p), and the second touch coils TC2(1) to TC2(q), and the second conductive layer CL2 includes the other portions of the first touch electrodes TE1(1) to TE1(k), the second touch electrodes TE2(1) to TE2(r), the first touch coils TC1(1) to TC1(p), and the second touch coils TC2(1) to TC2(q).

Referring to FIG. 49B, the first display substrate DS1 is disposed on the liquid crystal layer LCL, and the second display substrate DS2 is disposed under the liquid crystal layer LCL. The touch panel TP10 is disposed on the first display substrate DS1. In some cases, the touch panel TP10 may have the same configuration as that of the touch panel shown in FIG. 29A.

Figure 50A:
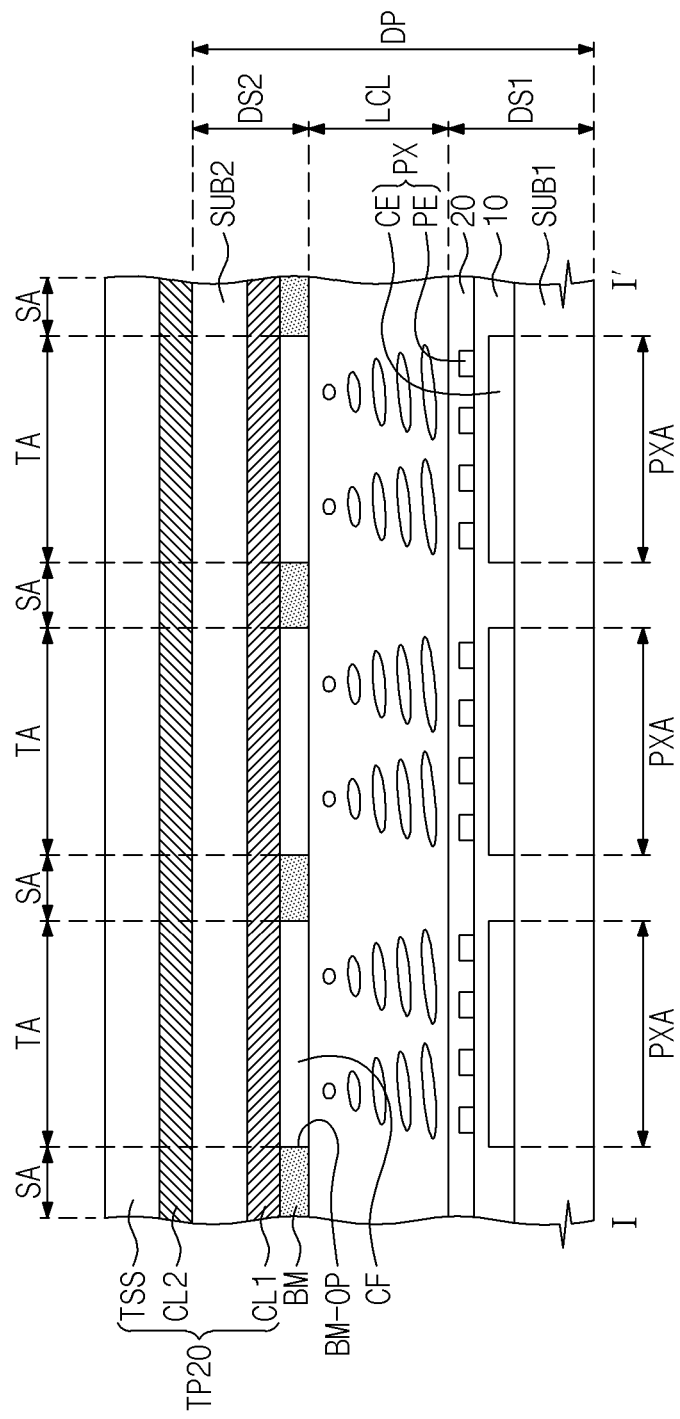
FIGS. 50A and 50B are cross-sectional views showing a touch panel according to exemplary embodiments of the present disclosure.
Figure 50B:
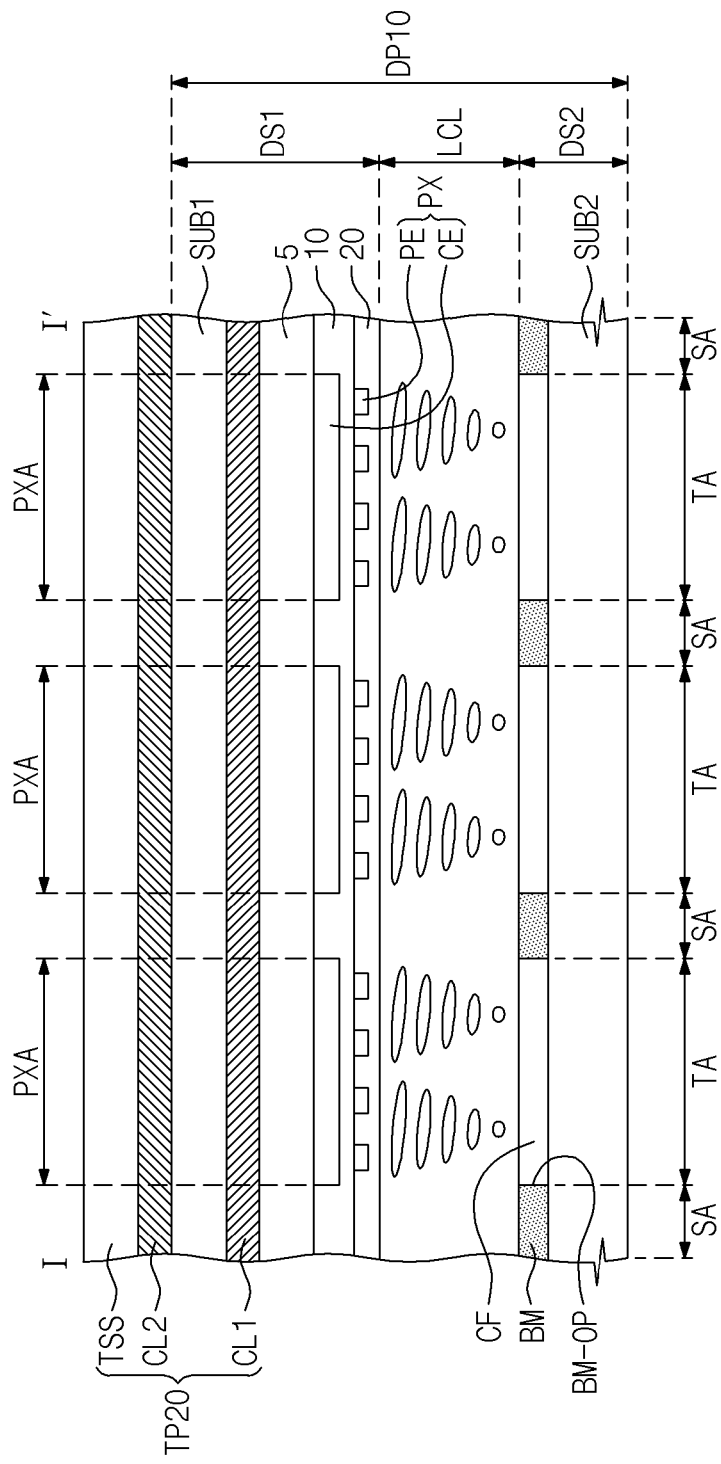

FIGS. 50A and 50B are cross-sectional views showing a touch panel TP20 according to exemplary embodiments of the present disclosure. Hereinafter, the touch panel TP20 will be described in detail with reference to FIGS. 50A and 50B. In FIGS. 50A and 50B, the same reference numerals denote the same elements in FIGS. 21 to 48, and thus the detailed descriptions of the same elements will be omitted.

Referring to FIG. 50A, the first display substrate DS1 is disposed under the liquid crystal layer LCL, and the second display substrate DS2 is disposed on the liquid crystal layer LCL. The first display substrate DS1 includes a first base substrate SUB1, a plurality of insulating layers 10 and 20, and pixels PX. The second display substrate DS2 includes a second base substrate SUB2, a black matrix BM and color filters CF.

The touch panel TP20 includes a first conductive layer CL1, a second conductive layer CL2, and a touch substrate TSS, which corresponds to the second touch substrate TSS2 shown in FIG. 23A. The first conductive layer CL1 is disposed on a lower surface of the second base substrate SUB2. The black matrix BM and the color filters CF are disposed on the lower surface of the second base substrate SUB2 to cover the first conductive layer CL1. In some cases, the first conductive layer CL1 may be disposed on the black matrix BM and the color filters CF, which are disposed on the lower surface of the second base substrate SUB2.

The second conductive layer CL2 is disposed on the upper surface of the second base substrate SUB2. The second base substrate SUB2 has an insulating function to insulate the first conductive layer CL1 from the second conductive layer CL2.

The touch substrate TSS is disposed on the second conductive layer CL2. In some cases, the touch panel TP20 may further include an insulating layer disposed between the second conductive layer CL2 and the touch substrate TSS.

Referring to FIG. 50B, the first display substrate DS1 is disposed on the liquid crystal layer LCL, and the second display substrate DS2 is disposed under the liquid crystal layer LCL. In some cases, the touch panel TP20 may have the same configuration as that of the touch panel shown in FIG. 50A.

The first conductive layer CL1 is disposed on the lower surface of the first base substrate SUB1. An insulating layer 5 is disposed on the lower surface of the first base substrate SUB1 to cover the first conductive layer CL1, and a common electrode is disposed on the insulating layer 5.

The second conductive layer CL2 is disposed on the upper surface of the first base substrate SUB1. The touch substrate TSS is disposed on the second conductive layer CL2. In some cases, the insulating layer 5 may be replaced with the black matrix BM and the color filters CF.

Figure 51:
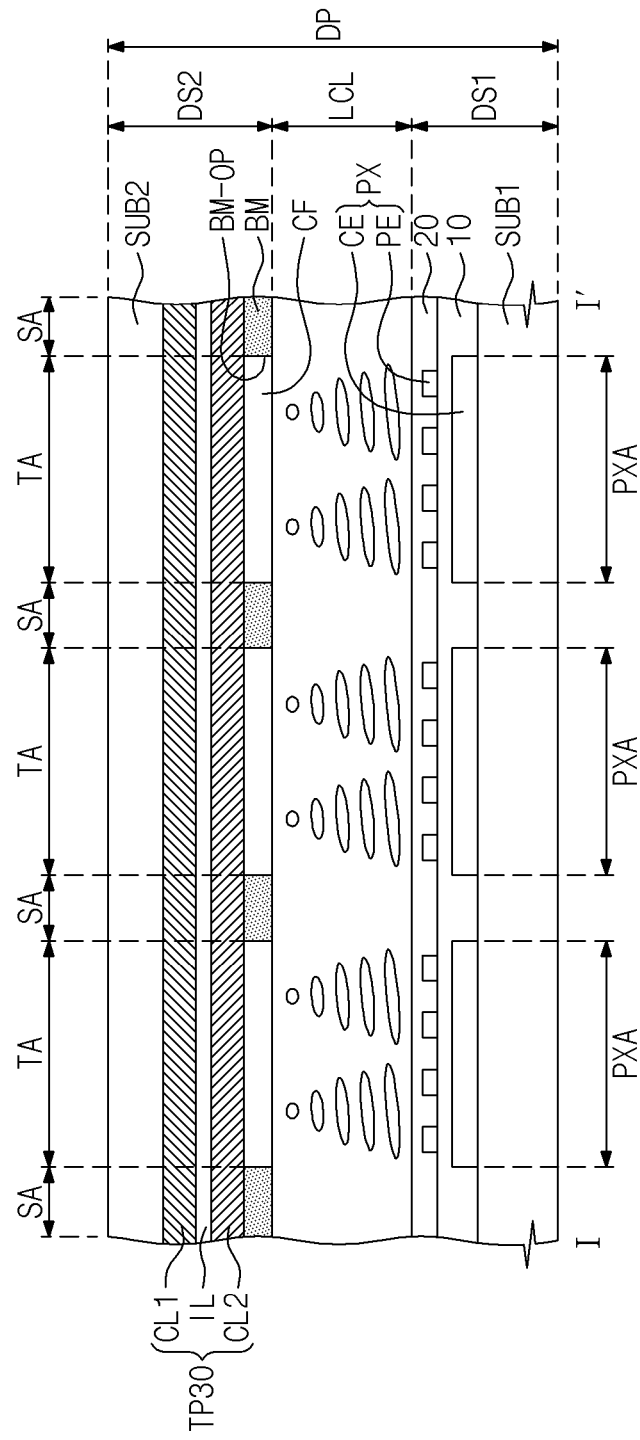
FIG. 51 is a cross-sectional view showing a display device according to exemplary embodiments of the present disclosure.
Figure 52A:
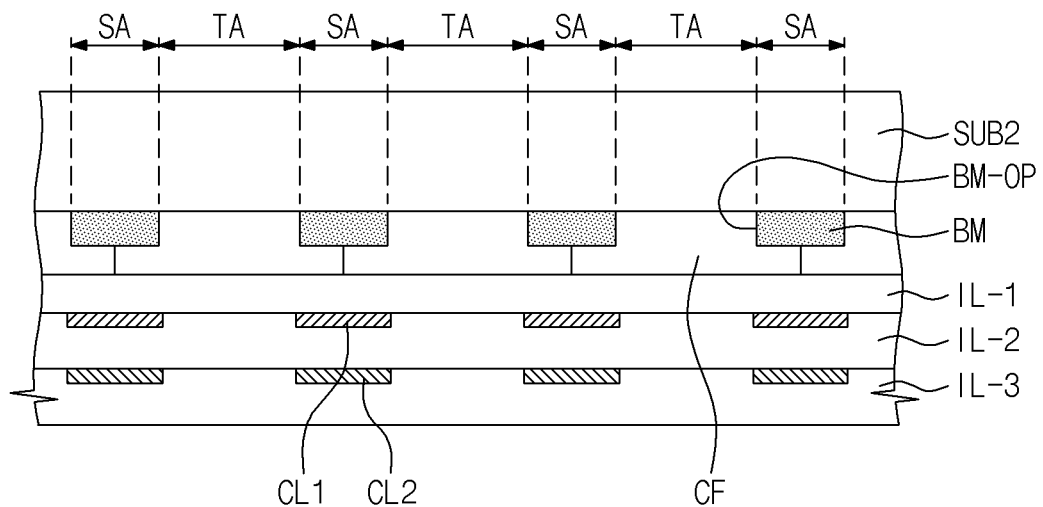
FIGS. 52A, 52B, 52C, 52D, and 52E are cross-sectional views showing a touch panel according to exemplary embodiments of the present disclosure.

FIG. 51 is a cross-sectional view showing a display device according to exemplary embodiments of the present disclosure. FIGS. 52A and 52E are cross-sectional views showing a touch panel according to exemplary embodiments of the present disclosure. Hereinafter, the touch panel will be described in detail with reference to FIGS. 51 and 52A to 52E. In FIGS. 51 and 52A to 52E, the same reference numerals denote the same elements in FIGS. 1 to 28, and thus detailed descriptions of the same elements will be omitted.

Referring to FIG. 51, the first display substrate DS1 is disposed under the liquid crystal layer LCL, and the second display substrate DS2 is disposed on the liquid crystal layer LCL. The first display substrate DS1 includes a first base substrate SUB1, a plurality of insulating layers 10 and 20, and pixels PX. The second display substrate DS2 includes a second base substrate SUB2, a black matrix BM, and color filters CF.

The touch panel TP30 includes a first conductive layer CL1, an insulating layer IL, and a second conductive layer CL2. The first conductive layer CL1, the insulating layer IL, and the second conductive layer CL2 are disposed on the lower surface of the second base substrate SUB2. For instance, the first conductive layer CL1 is disposed on the lower surface of the second base substrate SUB2, the insulating layer IL is disposed on the first conductive layer CL1, and the second conductive layer CL2 is disposed on the insulating layer IL.

FIGS. 52A to 52E show various layer structures with reference to the conductive pattern shown in FIG. 31B.

Referring to FIG. 52A, the black matrix BM and the color filters CF are disposed on the lower surface of the second base substrate SUB2. The first insulating layer IL-1 is disposed on the black matrix BM and the color filters CF to planarize an upper surface of the black matrix BM and the color filters CF. The first conductive layer CL1 is disposed on the first insulating layer IL-1. The second insulating layer IL-2 is disposed on the first insulating layer IL-1 to cover the first conductive layer CL1.

The second conductive layer CL2 is disposed on the second insulating layer IL-2. The third insulating layer IL-3 is disposed on the second insulating layer IL-2 to cover the second conductive layer CL2. The third and fourth contact holes CH3 and CH4 described with reference to FIG. 34 and the fifth and sixth contact holes CH5 and CH6 described with reference to FIG. 36 are formed through the second insulating layer IL-2. The third insulating layer IL-3 may be omitted.

Figure 52B:
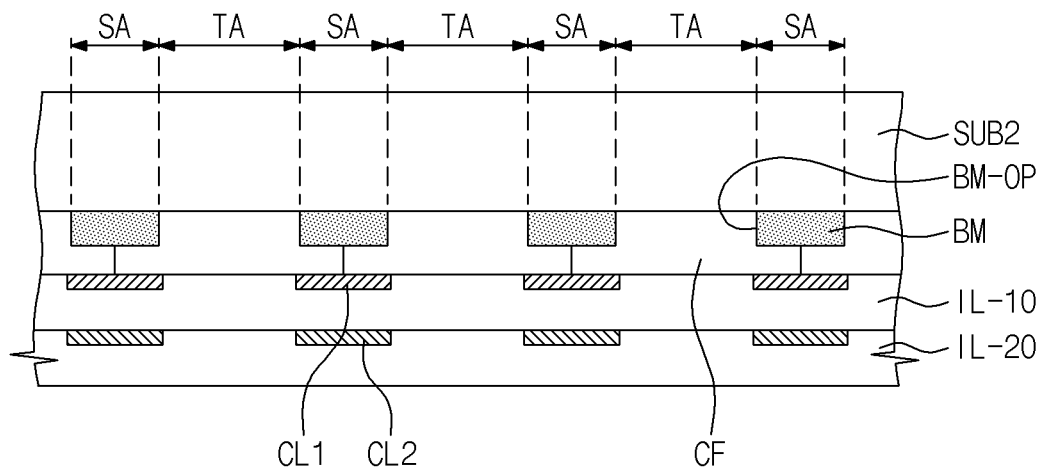

Referring to FIG. 52B, the black matrix BM and the color filters CF are disposed on the lower surface of the second base substrate SUB2. The color filters CF are disposed to overlap with the black matrix BM and openings BM-OP formed through the black matrix BM. The first conductive layer CL1 is disposed on a surface of the color filters CF.

A first insulating layer IL-10 is disposed on the surface of the color filters CF to cover the first conductive layer CL1. The second conductive layer CL2 is disposed on the first insulating layer IL-10. A second insulating layer IL-20 is disposed on the first insulating layer IL-10 to cover the second conductive layer CL2. The third and fourth contact holes CH3 and CH4 described with reference to FIG. 34 and the fifth and sixth contact holes CH5 and CH6 described with reference to FIG. 36 are formed through the first insulating layer IL-10.

Figure 52C:
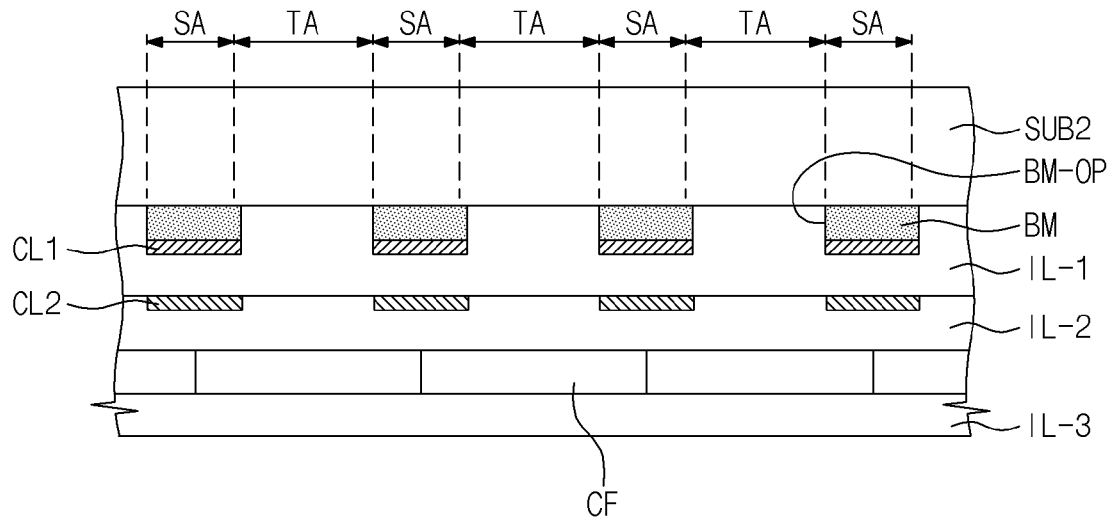

Referring to FIG. 52C, the black matrix BM is disposed on the lower surface of the second base substrate SUB2. The first conductive layer CL1 is disposed on the black matrix BM. The first insulating layer IL-1 is disposed on the lower surface of the second base substrate SUB2 to cover the black matrix BM and the first conductive layer CL1.

The second conductive layer CL2 is disposed on the first insulating layer IL-1. The second insulating layer IL-2 is disposed on the first insulating layer IL-1 to cover the second conductive layer CL2. The color filters CF are disposed on the second insulating layer IL-2 to overlap with the black matrix BM and the openings BM-OP formed through the black matrix BM. The color filters CF are disposed to allow a boundary between the color filters CF to overlap with the black matrix BM. The third insulating layer IL-3 is disposed on the color filters CF.

The third and fourth contact holes CH3 and CH4 described with reference to FIG. 34 and the fifth and sixth contact holes CH5 and CH6 described with reference to FIG. 36 are formed through the first insulating layer IL-1. In some cases, the second insulating layer IL-2 may be omitted and the second conductive layer CL2 may be covered by the color filters CF.

Figure 52D:
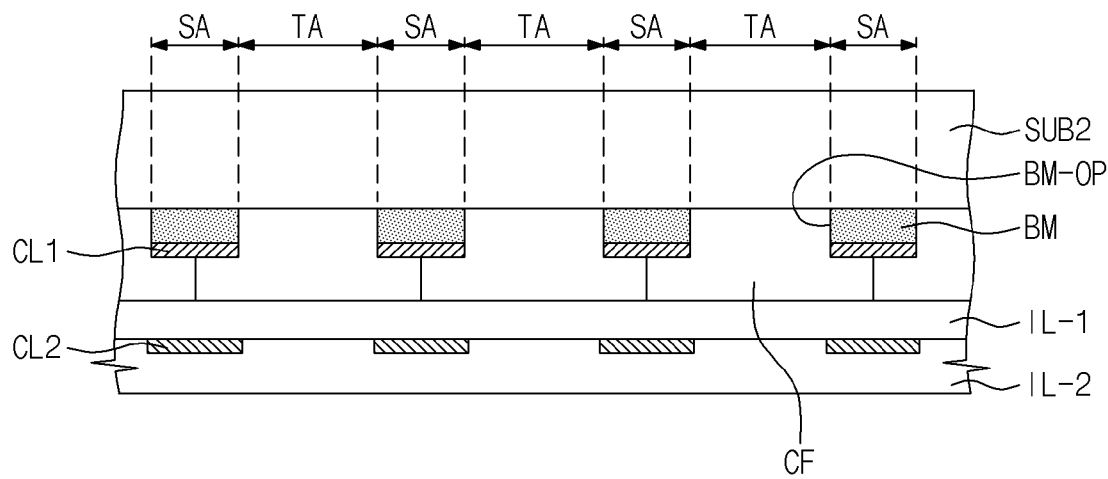
Figure 52E:
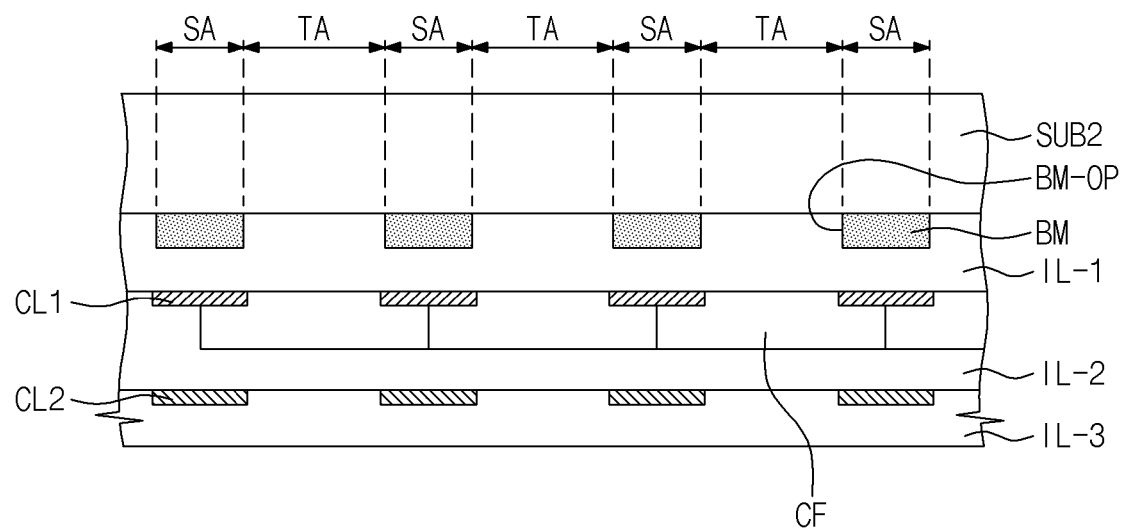

Referring to FIG. 52D, the black matrix BM is disposed on the lower surface of the second base substrate SUB2. The first conductive layer CL1 is disposed on the black matrix BM. The color filters CF are disposed on the lower surface of the second base substrate SUB2 to overlap with the black matrix BM and the openings BM-OP formed through the black matrix BM and to cover the first conductive layer CL1.

The first insulating layer IL-1 is disposed on the color filters CF. The first insulating layer IL-1 provides a flat surface thereon. The second conductive layer CL2 is disposed on the first insulating layer IL-1. The second insulating layer IL-2 is disposed on the first insulating layer IL-1 to cover the second conductive layer CL2.

The third and fourth contact holes CH3 and CH4 described with reference to FIG. 34 and the fifth and sixth contact holes CH5 and CH6 described with reference to FIG. 36 are formed through the color filters CF and the first insulating layer IL-10. In some cases, the first insulating layer IL-1 may be omitted and the second conductive layer CL2 may be disposed on the surface of the color filters CF.

Referring to FIG. 52E, the black matrix BM is disposed on the lower surface of the second base substrate SUB2. The first insulating layer IL-1 is disposed on the lower surface of the second base substrate SUB2 to cover the black matrix BM. The first conductive layer CL1 is disposed on the first insulating layer IL-1. The first conductive layer CL1 may be overlapped with the black matrix BM. The color filters CF are disposed on the first insulating layer IL-1 to cover the first conductive layer CL1.

The second insulating layer IL-2 is disposed on the color filters CF. The second insulating layer IL-2 provides a flat surface thereon. The second conductive layer CL2 is disposed on the second insulating layer IL-2. The third insulating layer IL-3 is disposed on the second insulating layer IL-2 to cover the second conductive layer CL2.

The third and fourth contact holes CH3 and CH4 described with reference to FIG. 34 and the fifth and sixth contact holes CH5 and CH6 described with reference to FIG. 36 are formed through the color filters CF and the second insulating layer IL-2. In some cases, the second insulating layer IL-2 may be omitted and the second conductive layer CL2 may be disposed on the surface of the color filters CF.

Figure 53:
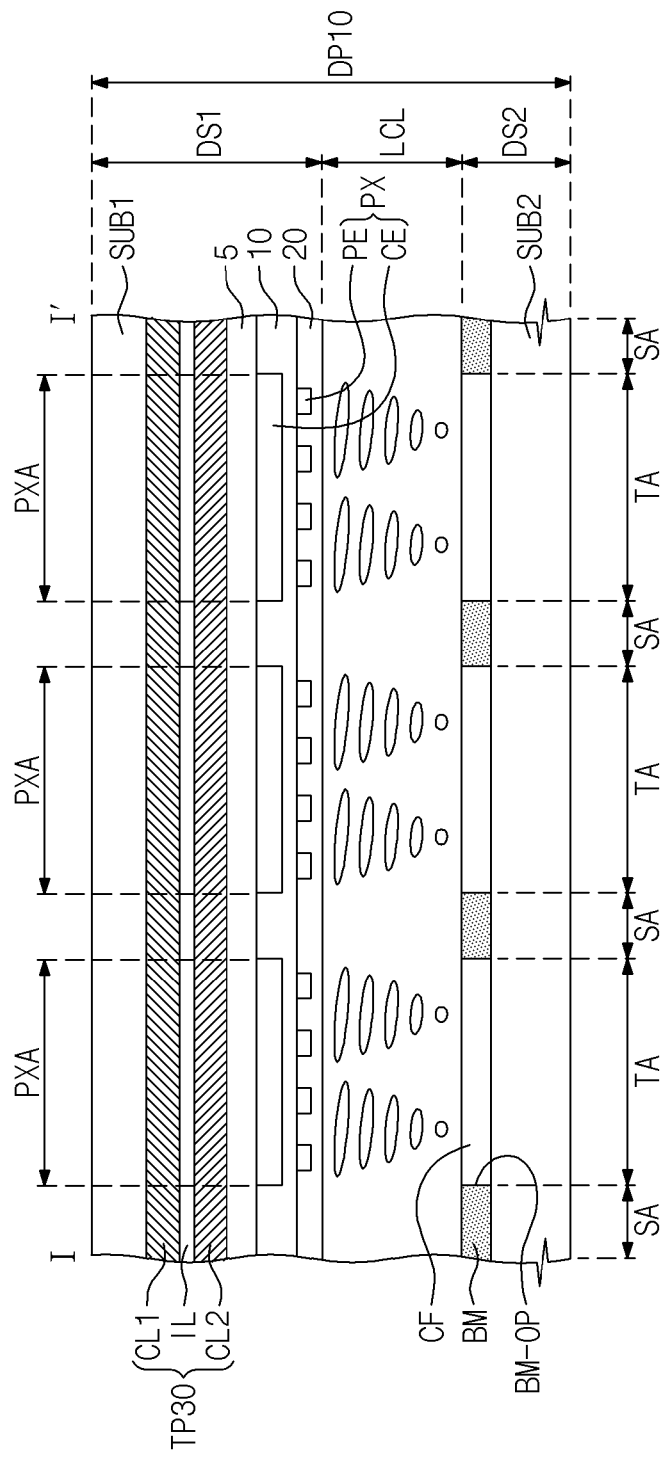
FIG. 53 is a cross-sectional view showing a display device according to exemplary embodiments of the present disclosure.

FIG. 53 is a cross-sectional view showing a display device according to exemplary embodiments of the present disclosure. Hereinafter, the touch panel TP30 will be described with reference to FIG. 53. In FIG. 53, the same reference numerals denote the same elements in FIGS. 21 to 48, and thus detailed descriptions of the same elements will be omitted.

Referring to FIG. 53, the first display substrate DS1 is disposed on the liquid crystal layer LCL, and the second display substrate DS2 is disposed under the liquid crystal layer LCL. The first display substrate DS1 includes a first base substrate SUB1, and a plurality of insulating layers 10 and 20, pixels PX. The second display substrate SUB2 includes a second base substrate SUB2, a black matrix BM, and color filters CF.

The touch panel TP30 includes a first conductive layer CL1, an insulating layer IL, and a second conductive layer CL2. The first conductive layer CL1, the insulating layer IL, and the second conductive layer CL2 are disposed on a lower surface of the first base substrate SUB1.

The first conductive layer CL1 is disposed on the lower surface of the first base substrate SUB1, the insulating layer IL is disposed on the first conductive layer CL1, and the second conductive layer CL2 is disposed on the insulating layer IL. An additional insulating layer 5 is disposed on the second conductive layer CL2. The pixels PX are disposed on the insulating layer 5.

The third and fourth contact holes CH3 and CH4 described with reference to FIG. 34 and the fifth and sixth contact holes CH5 and CH6 described with reference to FIG. 36 are formed through the insulating layer IL.

Figure 54:
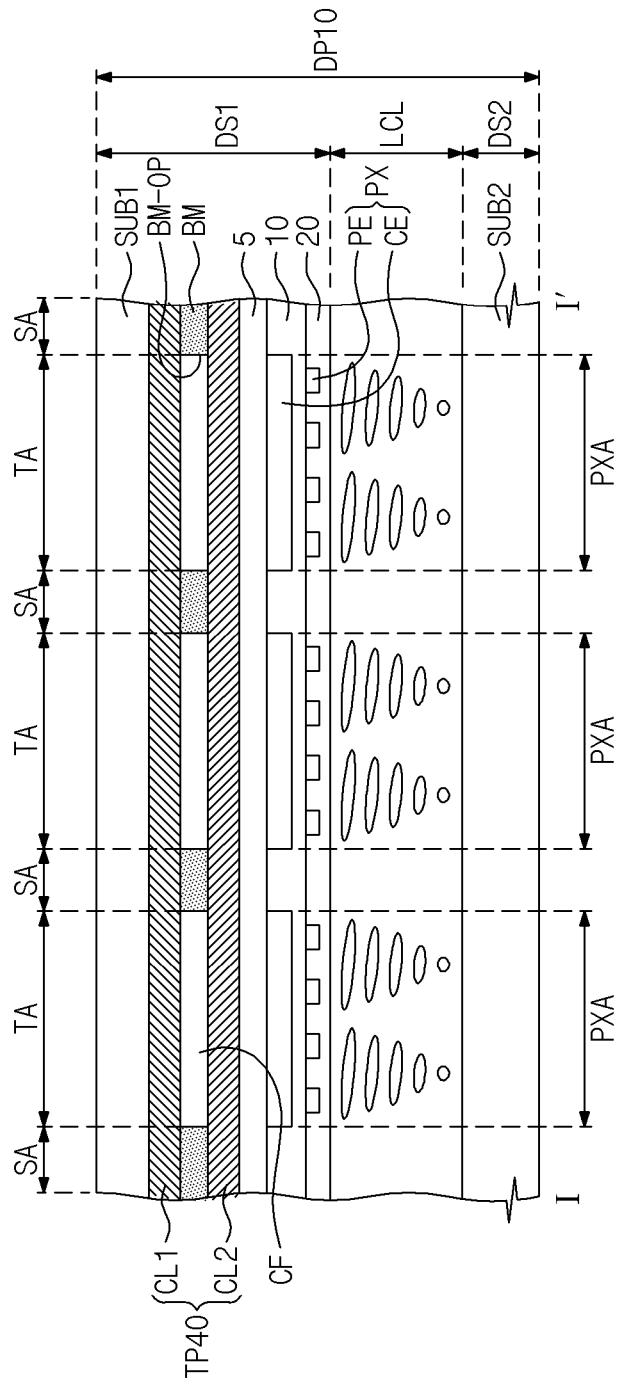
FIG. 54 is a cross-sectional view showing a display device according to exemplary embodiments of the present disclosure.

FIG. 54 is a cross-sectional view showing a display device according to exemplary embodiments of the present disclosure. Hereinafter, the touch panel TP40 will be described with reference to FIG. 54. In FIG. 54, the same reference numerals denote the same elements in FIGS. 21 to 48, and thus detailed descriptions of the same elements will be omitted.

Referring to FIG. 54, the first display substrate DS1 is disposed on the liquid crystal layer LCL, and the second display substrate DS2 is disposed under the liquid crystal layer LCL. The first display substrate DS1 includes a first base substrate SUB1, a black matrix BM, color filters CF, a plurality of insulating layers 10 and 20, and pixels PX. The second display substrate SUB2 includes a second base substrate SUB2.

The touch panel TP40 includes a first conductive layer CL1 and a second conductive layer CL2. The first conductive layer CL1 and the second conductive layer CL2 are disposed on a lower surface of the first base substrate SUB1.

The first conductive layer CL1 is disposed on the lower surface of the first base substrate SUB1, the black matrix BM and the color filters CF are disposed on the first conductive layer CL1, and the second conductive layer CL2 is disposed on the black matrix BM and the color filters CF. An insulating layer 5 is disposed on the second conductive layer CL2. The pixels PX are disposed on the insulating layer 5.

The third and fourth contact holes CH3 and CH4 described with reference to FIG. 34, and the fifth and sixth contact holes CH5 and CH6 described with reference to FIG. 36 are formed through the black matrix BM and/or the color filters CF.

Figure 55:
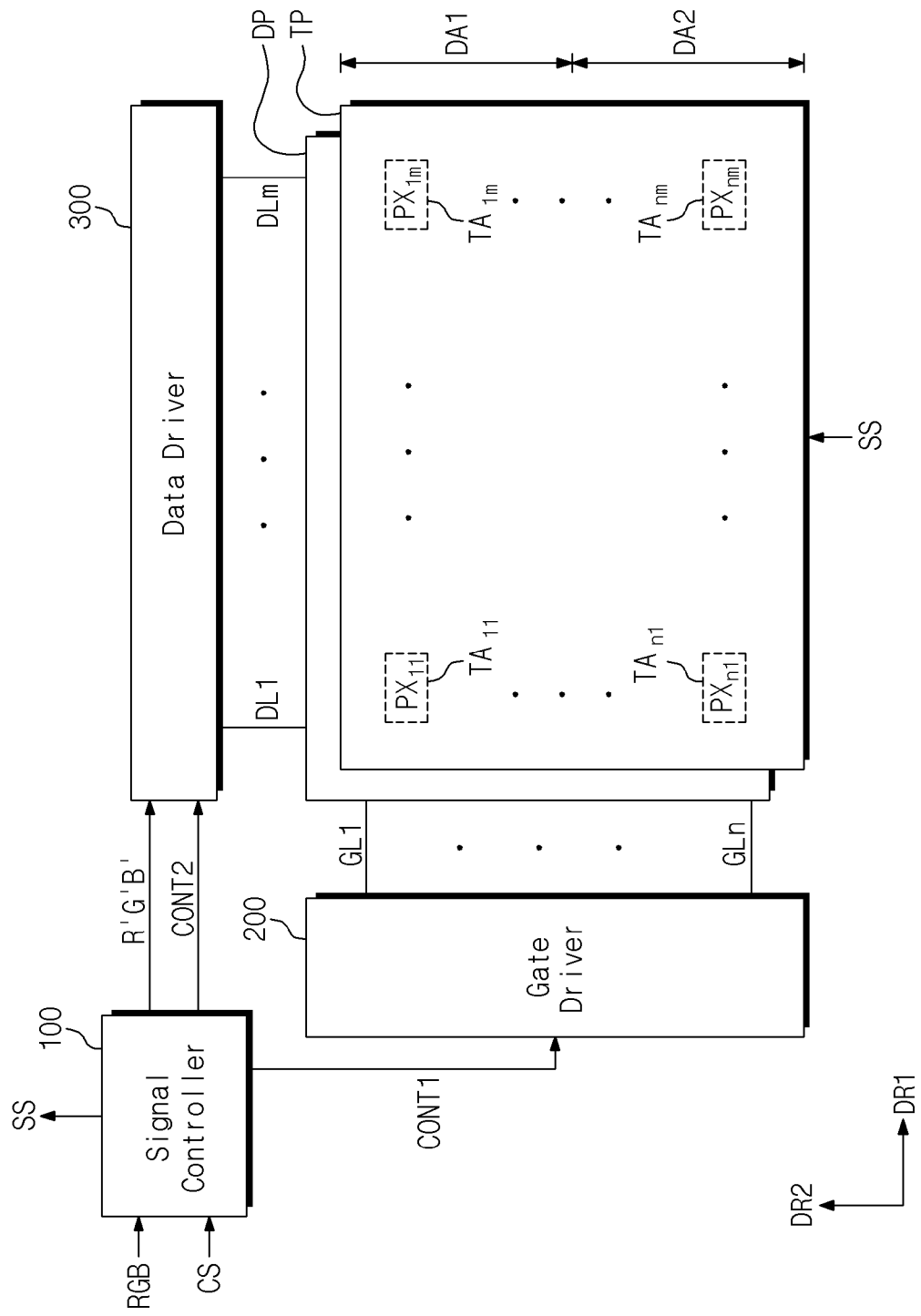
FIG. 55 is a block diagram showing a display device according to exemplary embodiments of the present disclosure.
Figure 56:
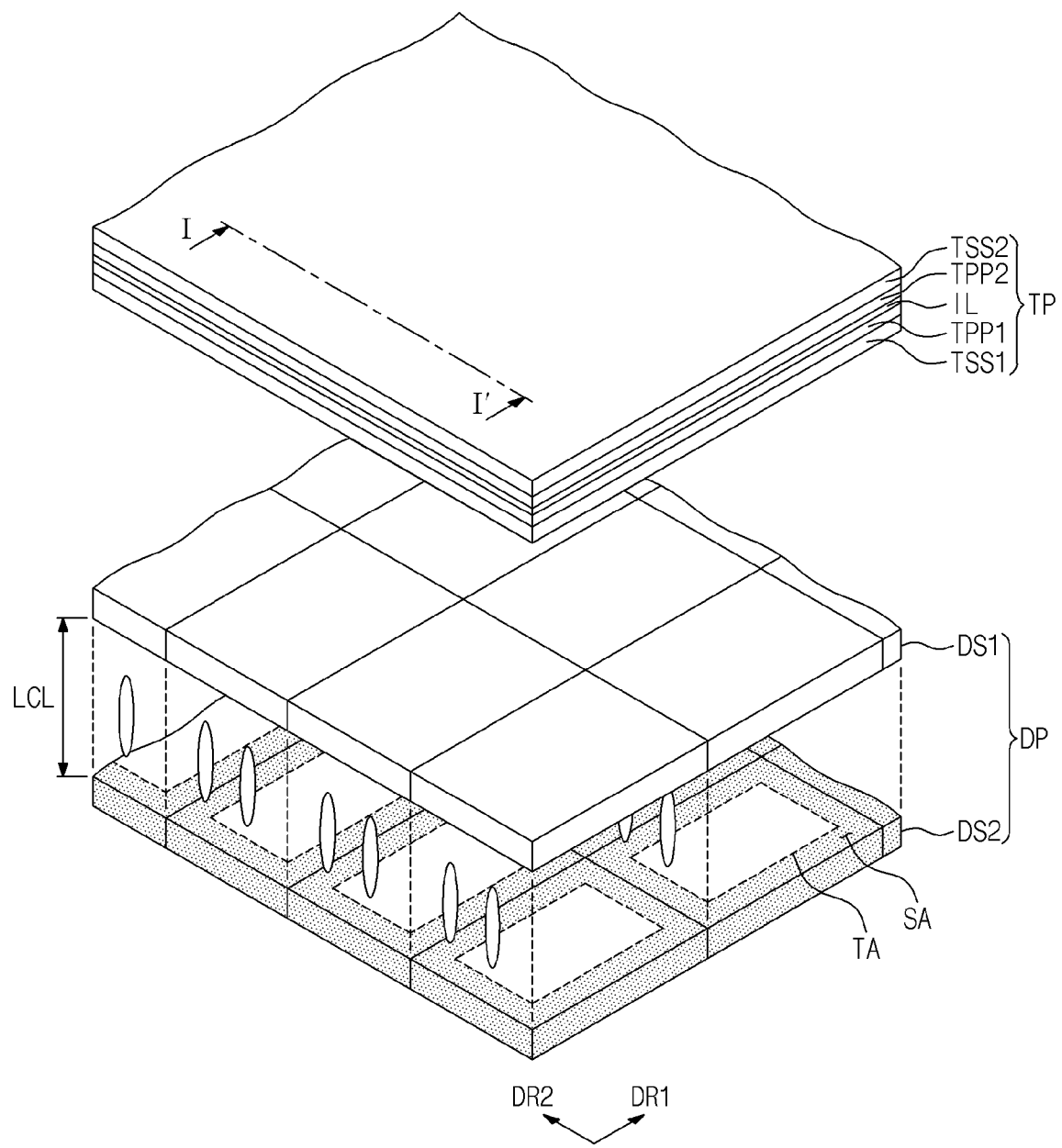
FIG. 56 is a partial perspective view showing the display device shown in FIG. 55 according to exemplary embodiments of the present disclosure.
Figure 57:
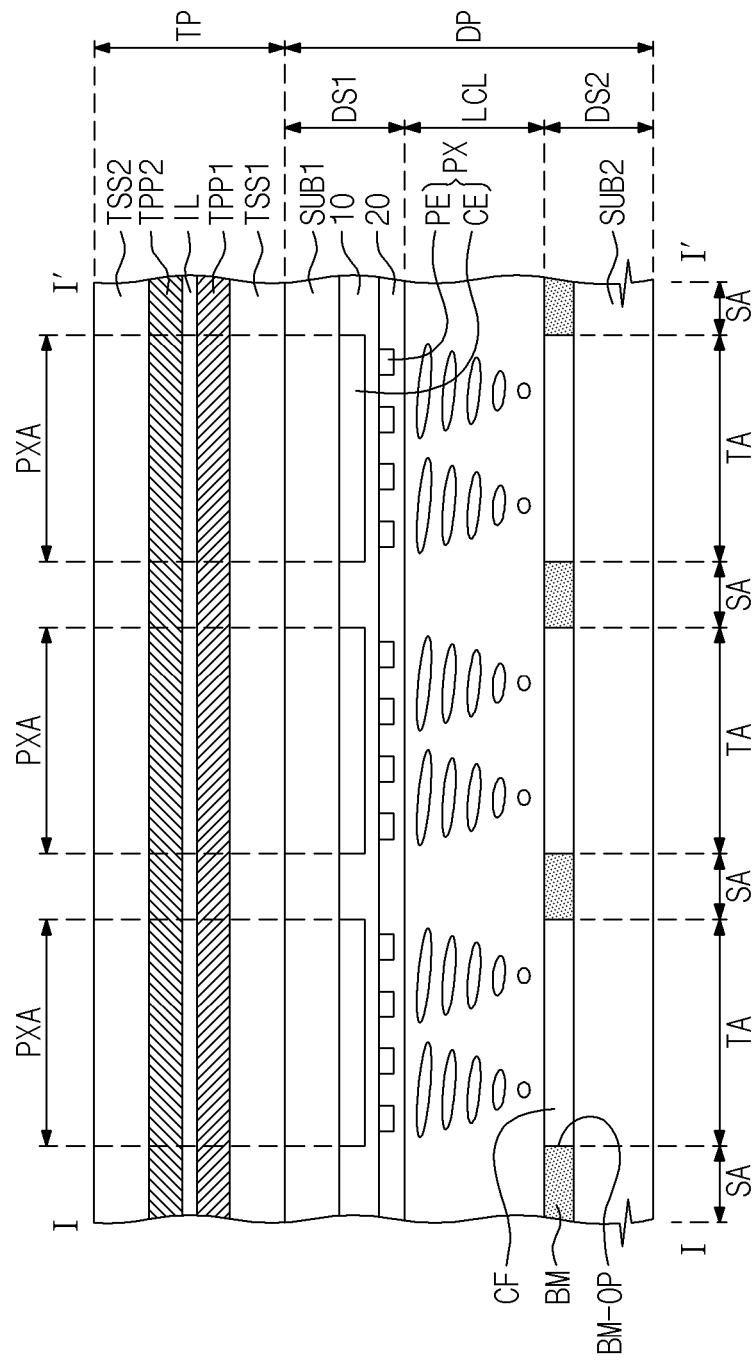
FIG. 57 is a cross-sectional view taken along a line I-I' shown in FIG. 56 according to exemplary embodiments of the present disclosure.
Figure 58:
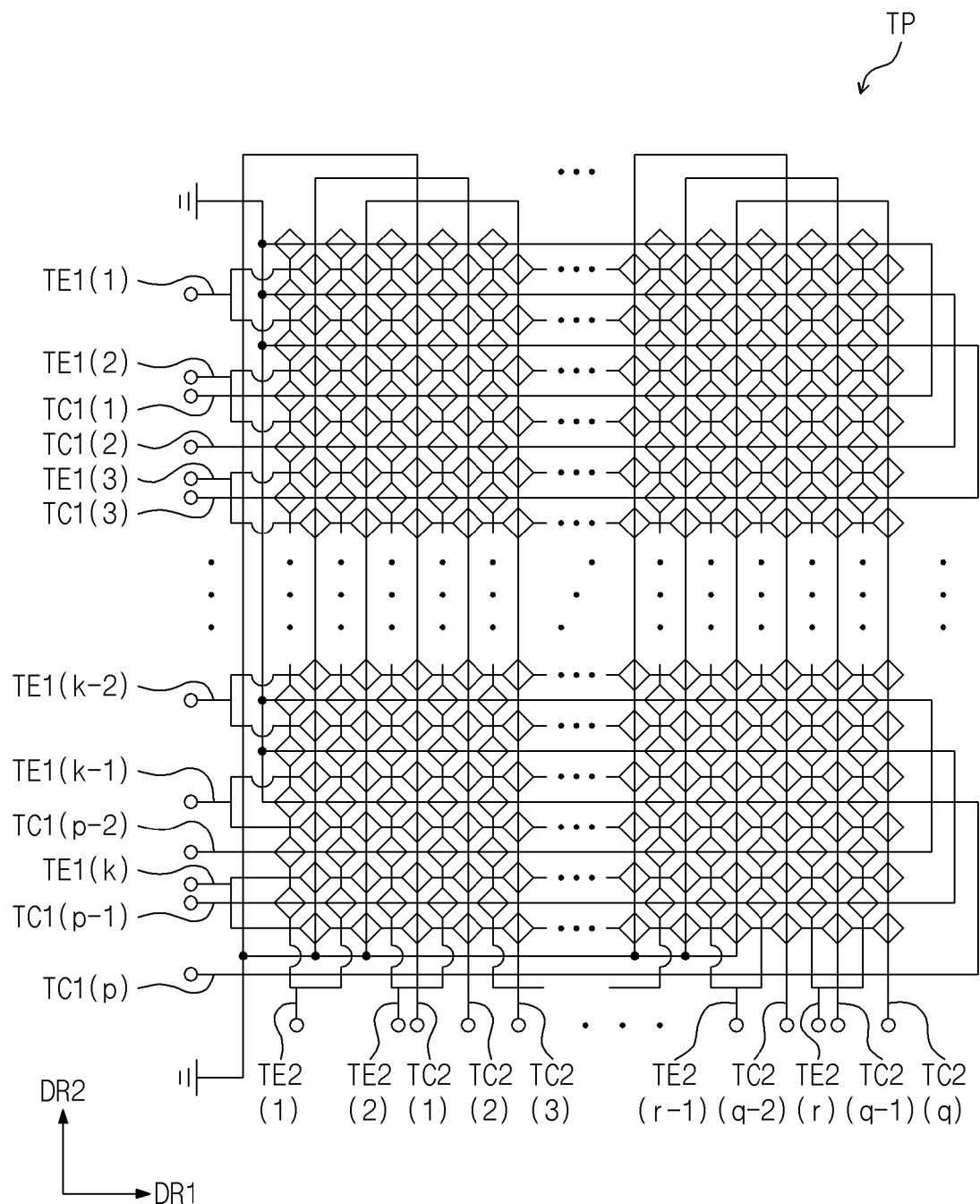
FIG. 58 is a plan view showing a touch panel according to exemplary embodiments of the present disclosure.

FIG. 55 is a block diagram showing a display device according to exemplary embodiments of the present disclosure. FIG. 56 is a partial perspective view showing the display device shown in FIG. 55. FIG. 57 is a cross-sectional view taken along a line I-I' shown in FIG. 56. FIG. 58 is a plan view showing a touch panel according to exemplary embodiments of the present disclosure.

Referring to FIG. 55, the display device includes a display panel DP, a signal controller 100, a gate driver 200, a data driver 300, and a touch panel TP. The signal controller 100, the gate driver 200, and the data driver 300 control the display panel DP to display an image. Although not shown in figures, the display device further includes a touch panel driver to drive the touch panel TP and a touch sensor to calculate coordinate information of an input position.

The display panel DP, the signal controller 100, the gate driver 200, the data driver 300, and the touch panel TP have the same configuration and function as the configuration and function of the display device described with reference to FIGS. 21 to 54. Therefore, hereinafter a difference between the display device described with reference to FIGS. 55 to 58 and the display device described with reference to FIGS. 21 to 54 will be described.

Referring to FIGS. 55 to 58, the display panel DP includes display areas DA1 and DA2 in which the image is displayed and a non-display area (not shown) in which the image is not displayed. The display areas DA1 and DA2 include a first display area DA1 and a second display area DA2 arranged in the second direction DR2. The non-display area surrounds the display areas DA1 and DA2, and terminals of gate lines GL1 to GLn and terminals of data lines DL1 to DLm are disposed in the non-display area.

The signal controller 100 outputs a selection signal SS to control the touch panel TP. The touch panel TP includes a first touch part TPP1 and a second touch part TPP2, which sense the touch event in different ways. Each of the first and second touch parts TPP1 and TPP2 is partially turned off in response to the selection signal SS.

At a specific time point during a frame period in which the image is displayed, the first touch part TPP1 overlapped with the first display area DA1 is turned off and the second touch part TPP2 overlapped with the first display area DA1 is turned on. In this case, the first touch part TPP1 overlapped with the second display area DA2 is turned on and the second touch part TPP2 overlapped with the second display area DA2 is turned off. In addition, at a different time point from the specific time point, the first touch part TPP1 overlapped with the first display area DA1 is turned on and the second touch part TPP2 overlapped with the first display area DA1 is turned off. In this case, the first touch part TPP1 overlapped with the second display area DA2 is turned off and the second touch part TPP2 overlapped with the second display area DA2 is turned on.

Referring to FIG. 56, the display panel DP includes a first display substrate DS1 and a second display substrate DS2 disposed to be spaced apart from the first display substrate DS1. A liquid crystal layer LCL is disposed between the first display substrate DS1 and the second display substrate DS2. The gate lines GL1 to GLn (refer to FIG. 1), the data lines DL1 to DLm (refer to FIG. 1), and the pixels PX11 to PXnm (refer to FIG. 1) are disposed on one of the first display substrate DS1 or the second display substrate DS2. Hereinafter, the first display substrate DS1 will be described with the assumption that the gate lines GL1 to GLn, the data lines DL1 to DLm, and the pixels PX11 to PXnm are disposed on the first display substrate DS1.

Each of the first display area DA1 and the second display area DA2 includes a plurality of transmitting areas TA and a blocking area SA. The transmitting areas TA transmit light generated by and provided from the backlight unit and the blocking area SA blocks the light. The blocking area SA surrounds the transmitting areas TA.

The touch panel TP is disposed on the display panel DP. The touch panel TP may be attached to the upper surface of the first display substrate DS1. The touch panel TP includes a first touch substrate TSS1, the first touch part TPP1, an insulating layer IL, the second touch part TPP2, and a second touch substrate TSS2.

The first touch part TPP1 includes the first touch coils TC1(1) to TC1($p$) and the second touch coils TC2(1) to TC2($q$). The second touch part TPP2 includes the first touch electrodes TE1(1) to TE1($k$) and the second touch electrodes TE2(1) to TE2($r$). The first touch part TPP1 is disposed under the second touch part TPP2.

The first touch coils TC1(1) to TC1($p$) are insulated from the second touch coils TC2(1) to TC2($q$). Each of the first touch coils TC1(1) to TC1($p$) has a loop shape extended in the first direction DR1. The first touch coils TC1(1) to TC1($p$) are arranged in the second direction DR2. The first touch coils TC1(1) to TC1($p$) and the second touch coils TC2(1) to TC2($q$) are disposed on the same layer and insulated from each other by the bridge BE2 (refer to FIGS. 35 and 36) disposed at crossing areas of the first touch coils TC1(1) to TC1($p$) and the second touch coils TC2(1) to TC2($q$).

The first touch electrodes TE1(1) to TE1($k$) are insulated from the second touch electrodes TE2(1) to TE2($r$). Each of the first touch electrodes TE1(1) to TE1($k$) is extended in the first direction DR1. The first touch electrodes TE1(1) to TE1($k$) are arranged in the second direction DR2 to be spaced apart from each other. Each of the first touch electrodes TE1(1) to TE1($k$) includes a plurality of sensor parts SP1 (hereinafter, referred to as first sensor parts) and a plurality of connection parts CP1 (hereinafter, referred to as first connection parts).

Each of the second touch electrodes TE2(1) to TE2($r$) is extended in the second direction DR2. The second touch electrodes TE2(1) to TE2($r$) are arranged in the first direction DR1 to be spaced apart from each other. Each of the second touch electrodes TE2(1) to TE2($r$) includes a plurality of sensor parts SP2 (hereinafter, referred to as second sensor parts) and a plurality of connection parts CP2 (hereinafter, referred to as second connection parts).

Figure 59A:
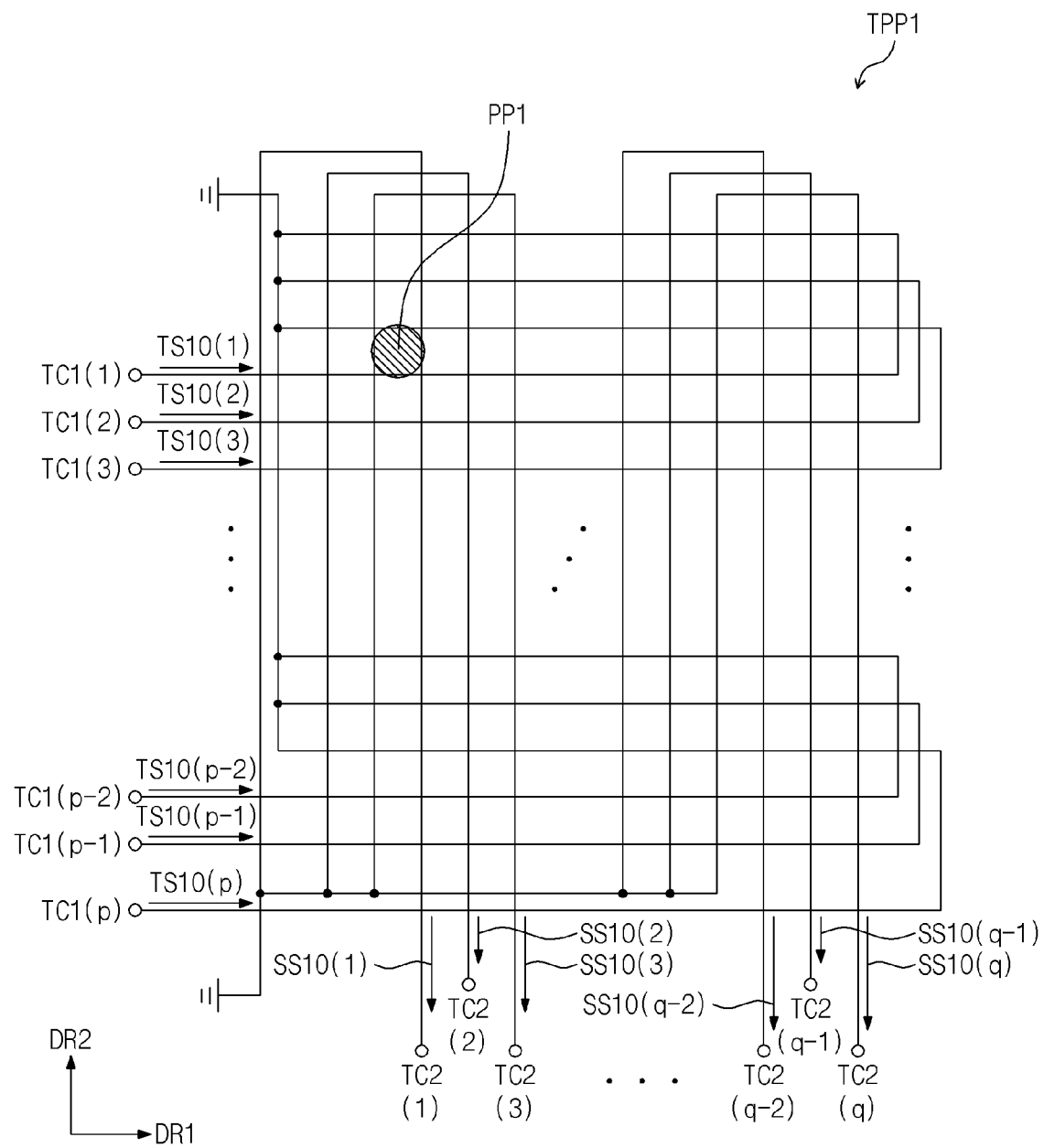
FIG. 59A is a plan view showing a first touch part shown in FIG. 58 according to exemplary embodiments of the present disclosure.
Figure 59B:
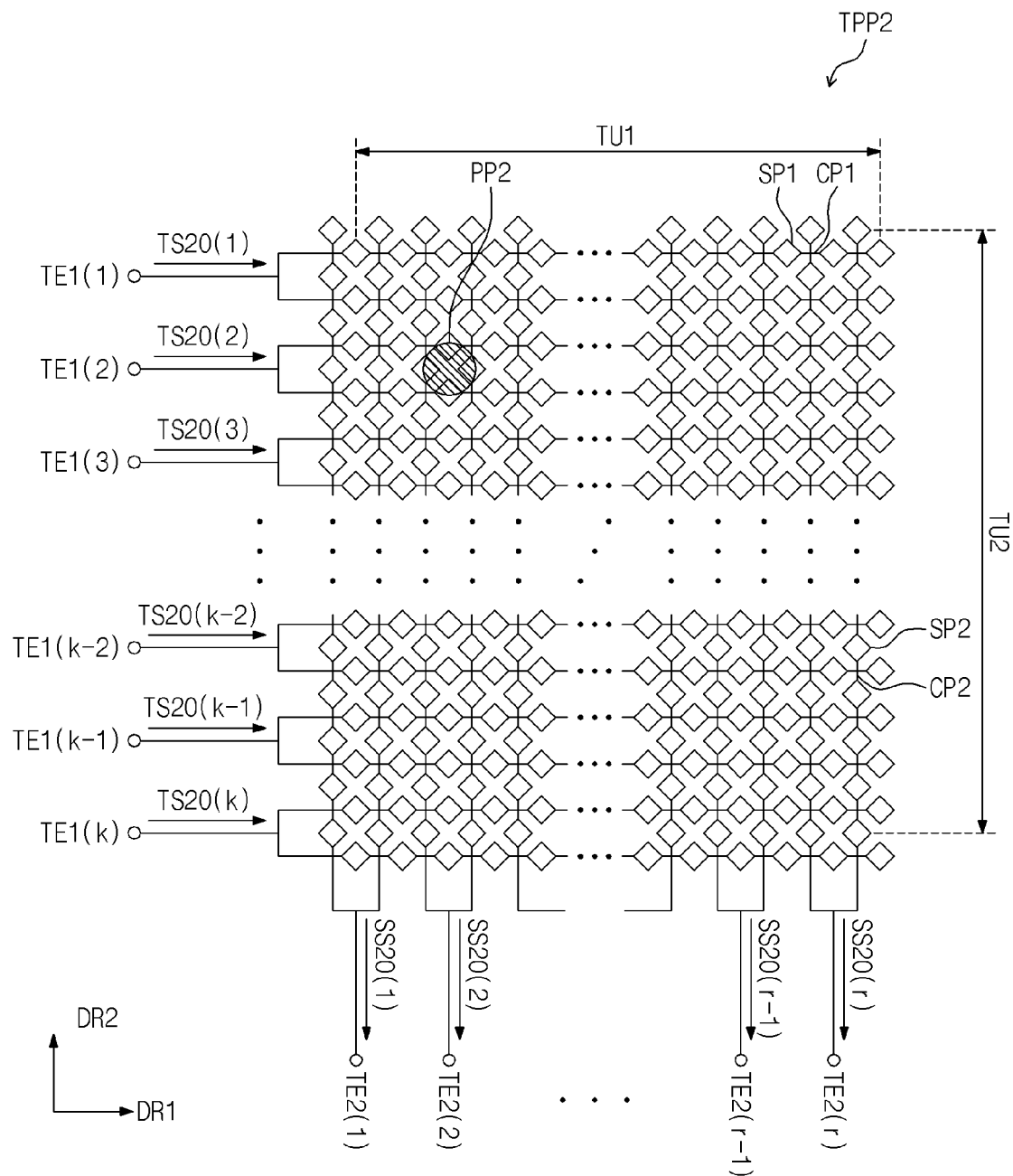
FIG. 59B is a plan view showing a second touch part shown in FIG. 58 according to exemplary embodiments of the present disclosure.

FIG. 59A is a plan view showing the first touch part TPP1 shown in FIG. 58 and FIG. 59B is a plan view showing the second touch part TPP2 shown in FIG. 58. Operations of the first and second touch parts TPP1 and TPP2 will be described in detail with reference to FIGS. 59A and 59B.

The first touch coils TC1(1) to TC1($p$) receive scan signals TS10(1) to TS10($p$) (hereinafter, referred to first scan signals), which are activated in different periods from each other. The first scan signals TS10(1) to TS10($p$) are the same or similar signals as the second scan signals TS2(1) to TS2($p$) shown in FIG. 27B.

Each of the first touch coils TC1(1) to TC1($p$) generates a magnetic field in response to a corresponding scan signal of the first scan signals TS10(1) to TS10($p$). When the input device (not shown) approaches to the first touch coils TC1(1) to TC1($p$), the magnetic field induced from the first touch coils TC1(1) to TC1($p$) resonates with the resonant circuit of the input device. Thus, the input device causes generation of the resonant frequency. The input device may be, but is not limited to, a stylus pen with an inductor-capacitor (LC) resonant circuit. The second touch coils TC2(1) to TC2($q$) output sensing signals SS10(1) to SS10($q$) (hereinafter, referred to as first sensing signals) according to the resonant frequency of the input device.

A center area in which the second first touch coil TC1(2) of the first touch coils TC1(1) to TC1($p$) crosses the second second touch coil TC2(2) of the second touch coils TC2(1) to TC2($q$) is referred to as the input position PP1 (hereinafter, referred to as a first input position).

The first sensing signal SS10(2) output from the second second touch coil TC2(2) has a level higher than that of the first sensing signals SS10(1), and SS10(3) to SS10($q$) output from other second touch coils TC2(1) and TC2(3) to TC2($q$).

The two-dimensional coordinate information of the first input position PP1 is calculated on the basis of the time at which the first sensing signal SS10(2) having the relatively high level is sensed and the relative position of the second second touch coil TC2(2) with respect to the second touch coils TC2(1) to TC2($q$).

Hereinafter, the operation of the second touch part TTP2 will be described with reference to FIG. 59B. The first touch electrodes TE1(1) to TE1($k$) correspond to input touch electrodes of the electrostatic capacitive type touch panel and the second touch electrodes TE2(1) to TE2($r$) correspond to output touch electrodes of the electrostatic capacitive type touch panel.

The first touch electrodes TE1(1) to TE1($k$) are capacitive-coupled to the second touch electrodes TE2(1) to TE2($r$). When scan signals TS20(1) to TS20($k$) (hereinafter, referred to as second scan signals) are applied to the first touch electrodes TE1(1) to TE1($k$), capacitors are formed between the first sensor parts SP1 and the second sensor parts SP2. The second scan signals TS20(1) to TS20($k$) are the same signals as the first scan signals TS1(1) to TS1($k$) shown in FIG. 27A.

The first touch electrodes TE1(1) to TE1($k$) sequentially receive the second scan signals TS20(1) to TS20($k$). The second scan signals TS20(1) to TS20($k$) are activated in different periods from each other. The second touch electrodes TE2(1) to TE2($r$) output sensing signals SS20(1) to SS20($r$) (hereinafter, referred to as second sensing signals) generated from the second scan signals TS20(1) to TS20($k$).

An area in which the second first touch electrode TE1(2) of the first touch electrodes TE1(1) to TE1($k$) crosses the second second touch electrode TE2(2) of the second touch electrodes TE2(1) to TE2($r$) is referred to as the input position PP2 (hereinafter, referred to as a second input position). Here, the second input position PP2 may be generated by an input device, e.g., user's finger.

The second sensing signal SS20(2) output from the second second touch electrode TE2(2) of the second touch electrodes TE2(1) to TE2($r$) has a level different from that of the second sensing signals SS20(1), and SS20(3) to SS20($r$) output from other second touch electrodes TE2(1) and TE2(3) to TE2($r$).

The coordinate information in the second direction DR2 of the second input position PP2 is calculated on the basis of the time at which the second sensing signal SS20(2) having the different level is sensed, and the coordinate information in the first direction DR1 of the second input position PP2 is calculated on the basis of the relative position of the second second touch electrode TE2(2) with respect to the second touch electrodes TE2(1) to TE2($r$).

Figure 60:
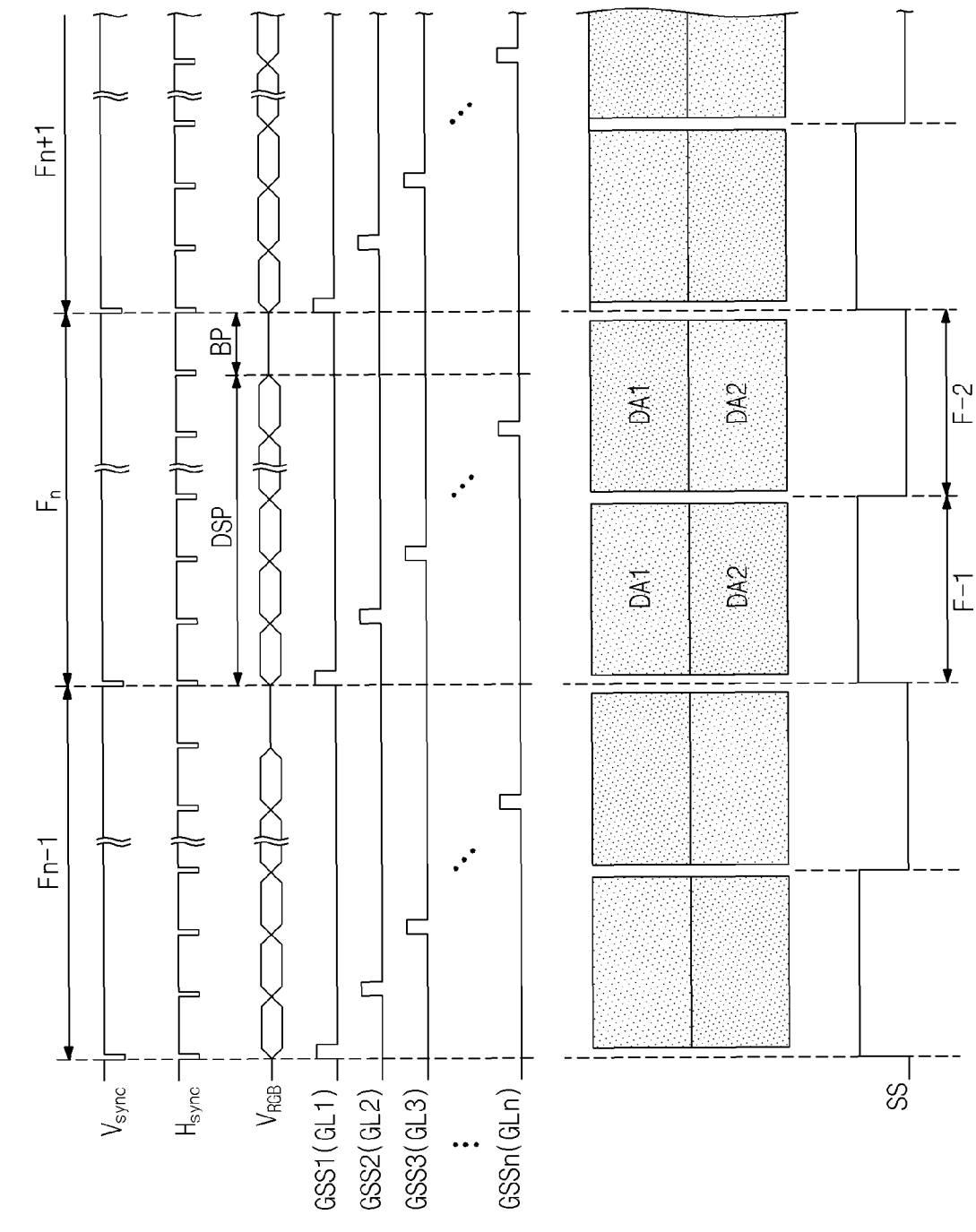
FIG. 60 is a timing diagram showing signals applied to a display device according to exemplary embodiments of the present disclosure.
Figure 61A:
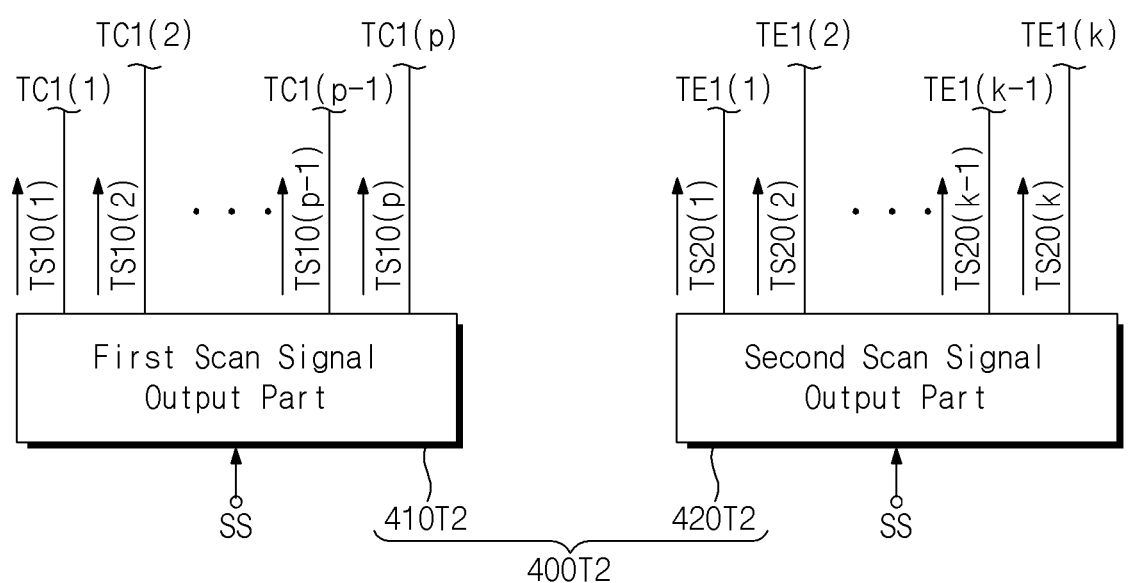
FIG. 61A is a block diagram showing a touch panel driver according to exemplary embodiments of the present disclosure.
Figure 61B:
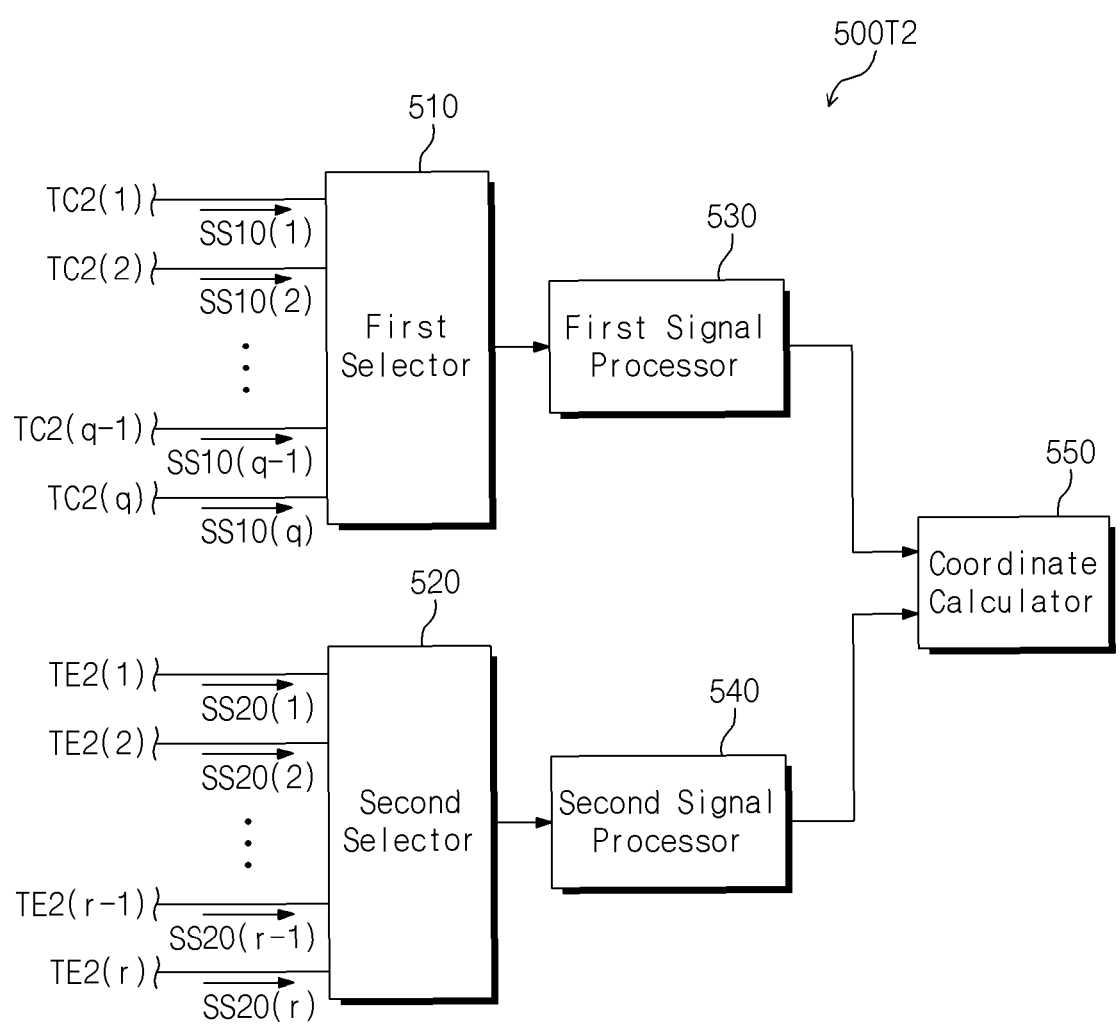
FIG. 61B is a block diagram showing a touch sensor according to exemplary embodiments of the present disclosure.
Figure 62A:
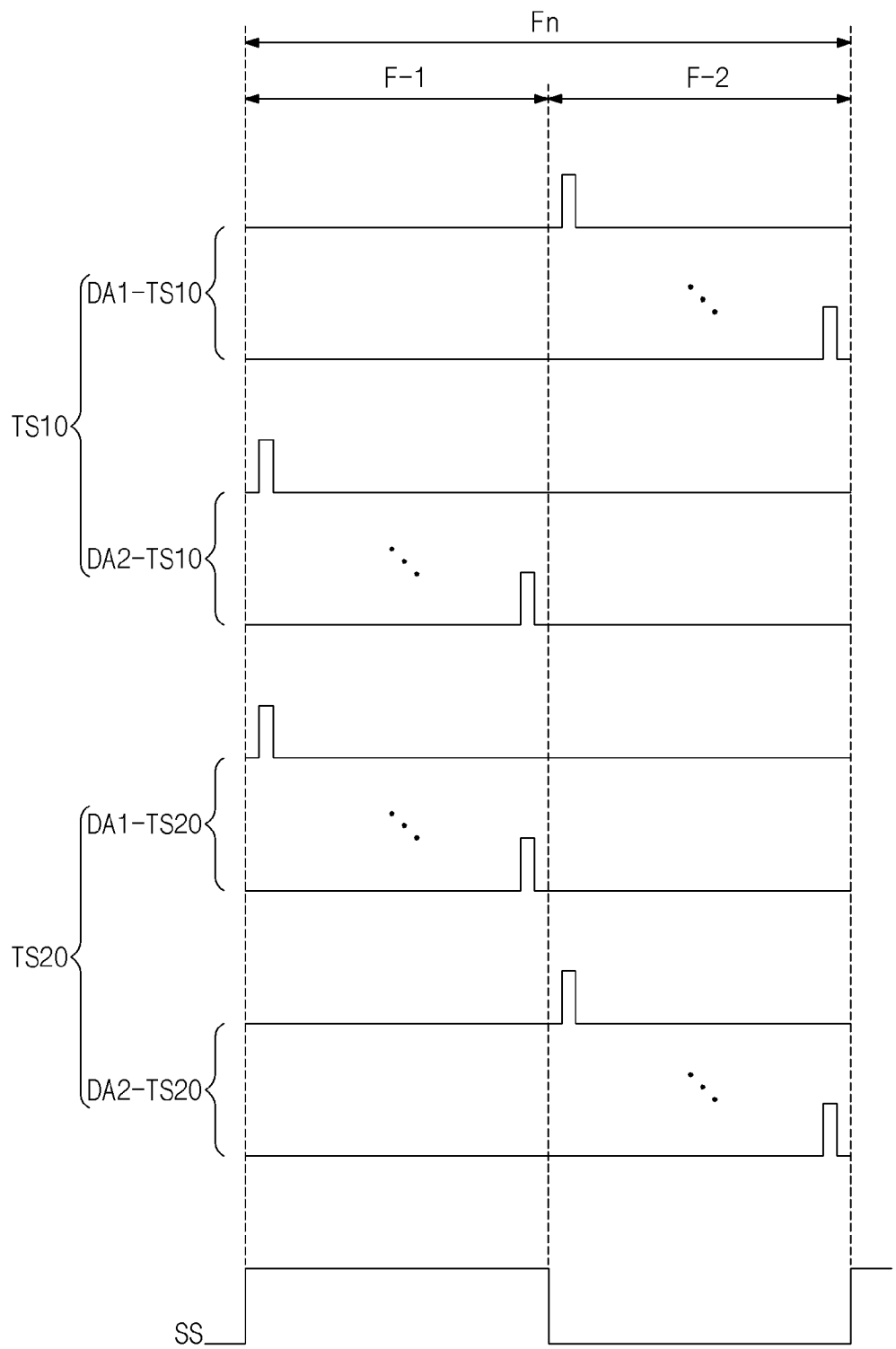
FIGS. 62A and 62B are timing diagrams showing scan signals according to exemplary embodiments of the present disclosure.
Figure 62B:
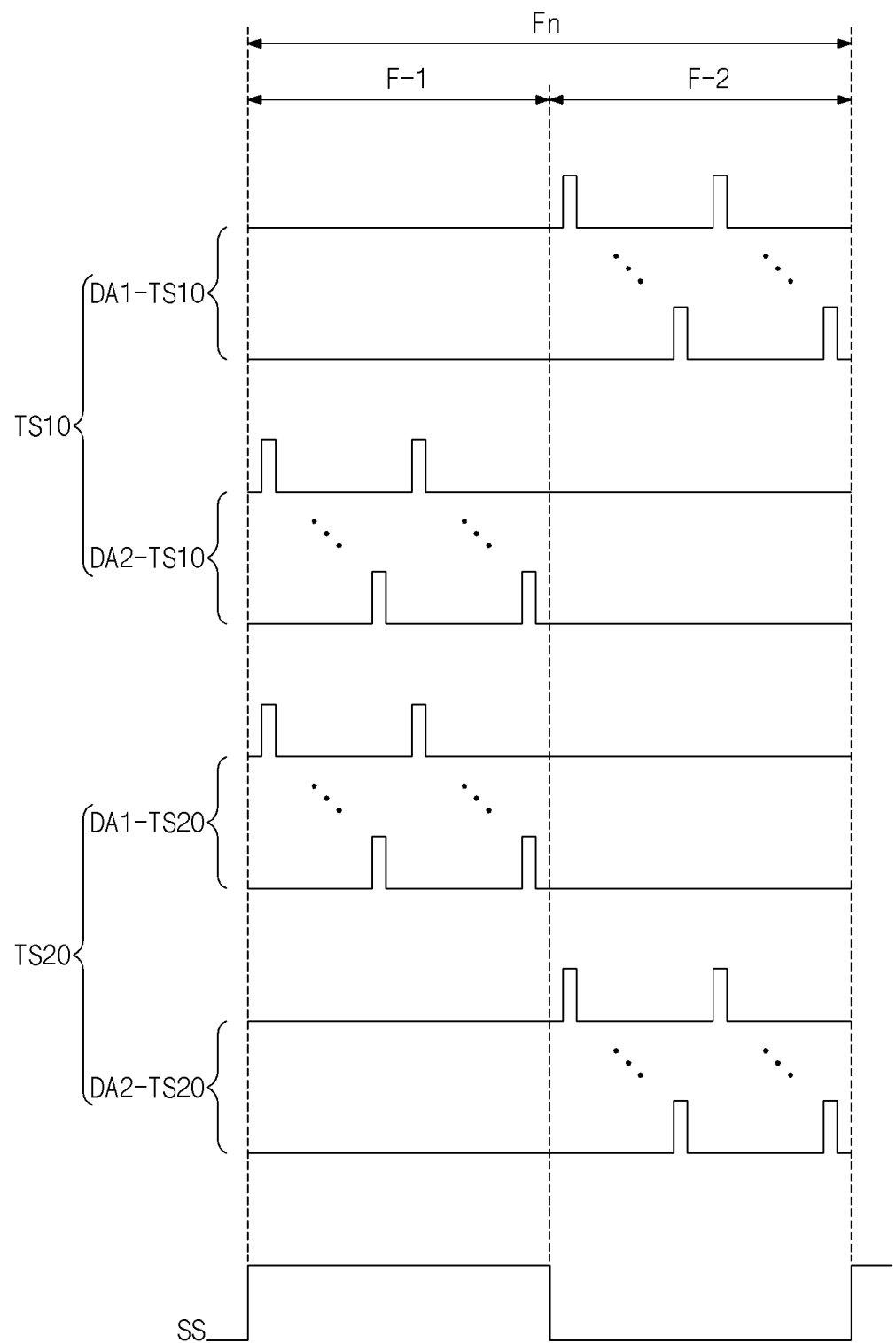

FIG. 60 is a timing diagram showing signals applied to a display device according to exemplary embodiments of the present disclosure. FIG. 61A is a block diagram showing a touch panel driver 400T2 according to exemplary embodiments of the present disclosure. FIG. 61B is a block diagram showing a touch sensor 500T2 according to exemplary embodiments of the present disclosure. FIGS. 62A and 62B are timing diagrams showing scan signals according to exemplary embodiments of the present disclosure.

Referring to FIG. 60, a vertical synchronizing signal Vsync defines frame periods FRn−1, FRn, and FRn+1. The frame periods FRn−1, FRn, and FRn+1 may include a display period DSP and a non-display period BP. Data voltages $V_{RGB}$ are not output during the non-display period BP, and thus the non-display period BP may be omitted. A horizontal synchronizing signal Hsync defines horizontal periods included in the display periods DSP. The data driver 300 outputs the data voltages $V_{RGB}$ every horizontal period.

During each frame period FRn−1, FRn, and FRn+1, gate signals GSS1 to GSSn are sequentially applied to the gate lines GL1 to GLn. The gate signals GSS1 to GSSn serve as pulse signals activated in different periods from each other. Thus, the pixels PX11 to PXnm are turned on in the unit of pixel row. The data voltages $V_{RGB}$ are applied to the pixels in the unit of pixel row and substantially and simultaneously applied to the pixels included in the same pixel row. The first display area DA1 and the second display area DA2 generate the image during each frame period FRn−1, FRn, and FRn+1 in a line-by-line scanning mode.

During a portion F-1 (hereinafter, referred to as a first period) of each frame period FRn−1, FRn, and FRn+1, the selection signal SS may have a high level, and the selection signal SS may have a low level during another portion F-2 (hereinafter, referred to as a second period) of each frame period FRn−1, FRn, and FRn+1. Responsive to the selection signal SS, each of the first touch part TPP1 (refer to FIG. 59A) and the second touch part TPP2 (refer to FIG. 59B) is partially turned off.

As shown in FIG. 61A, the touch panel driver 400T2 includes a first scan signal output part 410T2 and a second scan signal output part 420T2. During each frame period FRn−1, FRn, and FRn+1, the first scan signal output part 410T2 outputs first scan signals TS10(10) to TS10($p$) and the second scan signal output part 420T2 outputs second scan signals TS20(1) to TS20($k$).

Referring to FIG. 61B, the touch sensor 500T2 includes a first selector 510, a second selector 520, a first signal processor 530, a second signal processor 540, and a coordinate calculator 550.

The first selector 510 selects one of the first sensing signals SS10(1) to SS10($q$) to apply to the first signal processor 530, and the second selector 520 selects one of the second sensing signals SS20(1) to SS20($r$) to apply to the second signal processor 540. Each of the first and second selectors 510 and 520 may be, but is not limited to, a multiplexor.

The first signal processor 530 converts the first sensing signals SS10(1) to SS10($q$) to first digital signals. The second signal processor 540 converts the second sensing signals SS20(1) to SS20($r$) to second digital signals. The coordinate calculator 550 calculates the coordinate information of the first input position PP1 (refer to FIG. 59A) from the first digital signals, and calculates the coordinate information of the second input position PP2 (refer to FIG. 59B) from the second digital signals.

Referring to FIG. 62A, the first scan signal output part 410T2 outputs portions of the first scan signals, which are different from each other, during the first period F-1 and the second period F-2 in response to the selection signal SS.

The first touch coils TC1(1) to TC1($p$) (refer to FIG. 59A) are divided into a first group of first touch coils disposed to overlap with the first display area DA1 (refer to FIGS. 55 and 60) and a second group of first touch coils disposed to overlap with the second display area DA2 (refer to FIGS. 55 and 60). The first scan signal output part 410T2 sequentially applies the corresponding first scan signals DA2-TS10 to only the second group of first touch coils during the first period F-1. The first scan signal output part 410T2 sequentially applies the corresponding first scan signals DA1-TS10 to only the first group of first touch coils during the second period F-2.

Referring to FIG. 62B, the first scan signal output part 410T2 may apply the corresponding first scan signals DA2-TS10 to only the second group of first touch coils during the first period F-1 in plural times, e.g., two times. When the second display area DA2 is scanned several times, the touch sensitivity is improved. In addition, the first scan signal output part 410T2 may apply the corresponding first scan signals DA2-TS20 to only the first group of first touch coils during the second period F-2 in two times.

As shown in FIG. 62A, the second scan signal output part 420T2 outputs portions of the second scan signals, which are different from each other, during the first period F-1 and the second period F-2 in response to the selection signal SS. The first touch electrodes TE1(1) to TE1(k) (refer to FIG. 59B) are divided into a first group of first touch electrodes disposed to overlap with the first display area DA1 (refer to FIGS. 55 and 60) and a second group of first touch electrodes disposed to overlap with the second display area DA2 (refer to FIGS. 55 and 60).

The second scan signal output part 420T2 sequentially applies the corresponding second scan signals DA1-TS20 to only the first group of first touch electrodes during the first period F-1. The second scan signal output part 420T2 sequentially applies the corresponding first scan signals DA2-TS20 to only the second group of first touch electrodes during the second period F-2.

Referring to FIG. 62B, the second scan signal output part 420T2 may scan two times the first group of first touch electrodes during the first period F-1. The second scan signal output part 420T2 may scan two times the second group of first touch electrodes during the second period F-2.

As described with reference to FIGS. 60, 61A, 61B, 62A, and 62B, the touch event occurring in the first display area DA1 during the first period F-1 is sensed by the second touch part TPP2, and the touch event occurring in the second display area DA2 during the first period F-1 is sensed by the first touch part TPP1. During the second period F-2, the touch event occurring in the first display area DA is sensed by the first touch part TPP1 and the touch event occurring in the second display area DA2 is sensed by the second touch part TPP2.

As described above, since the first touch part TPP1 and the second touch part TPP2 are individually operated in accordance with the first and second periods F-1 and F-2 and the first and second display areas DA1 and DA2, the noise induced to the display panel DP or the first touch part TPP1 may be removed.

Figure 63:
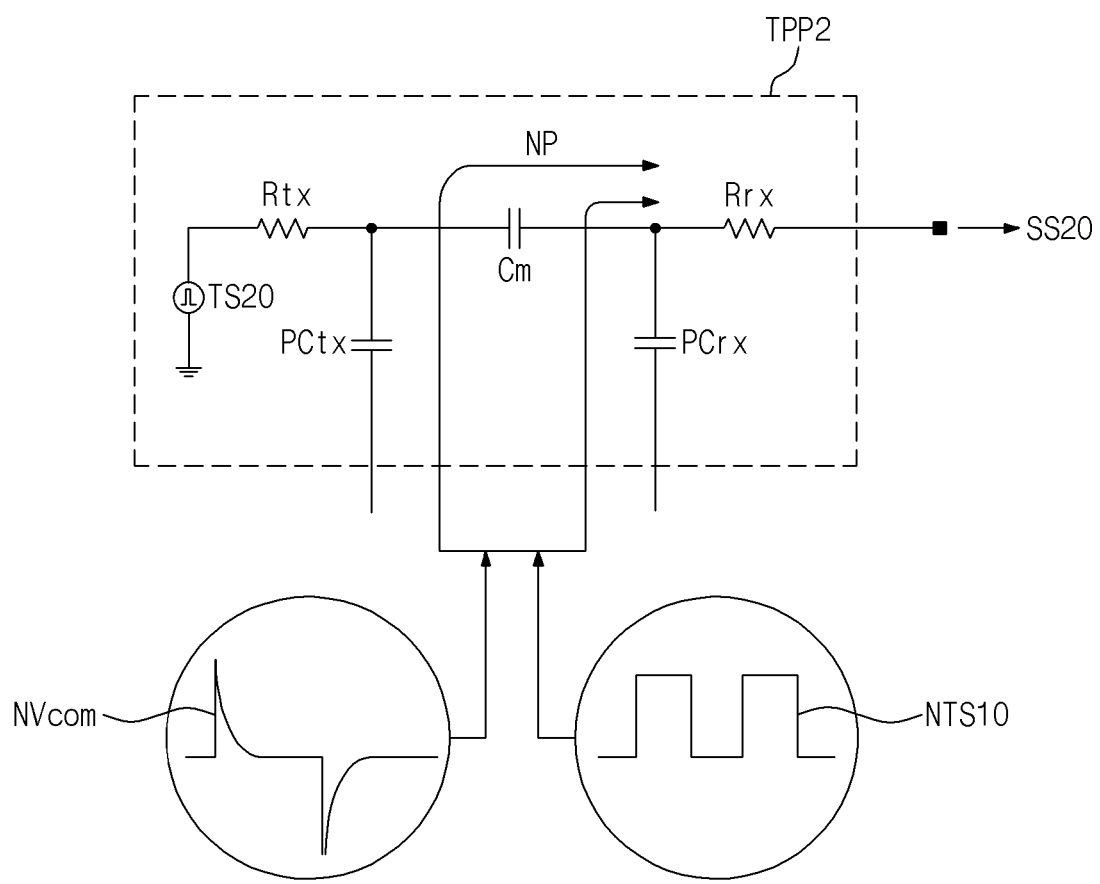
FIG. 63 is an equivalent diagram showing a path through which a noise is generated, which exerts an influence on a second touch sensor, according to exemplary embodiments of the present disclosure.
Figure 64A:
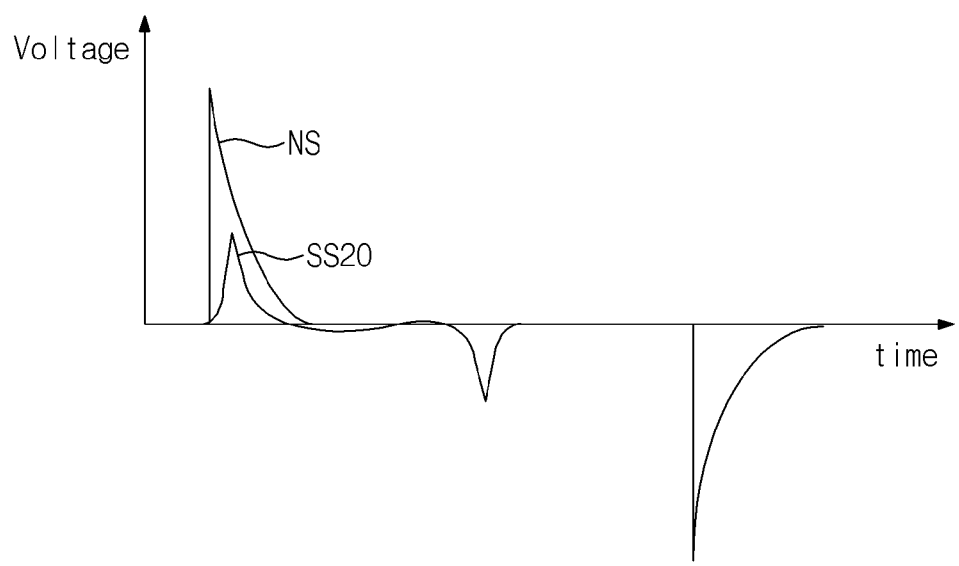
FIGS. 64A and 64B are graphs showing a relation between the noise and the detection signal according to exemplary embodiments of the present disclosure.
Figure 64B:
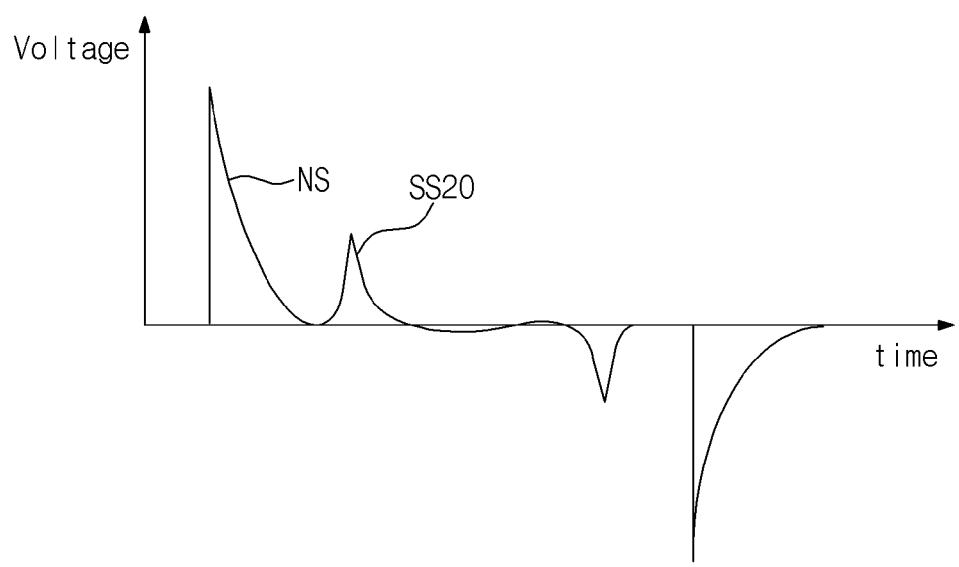
Figure 65:
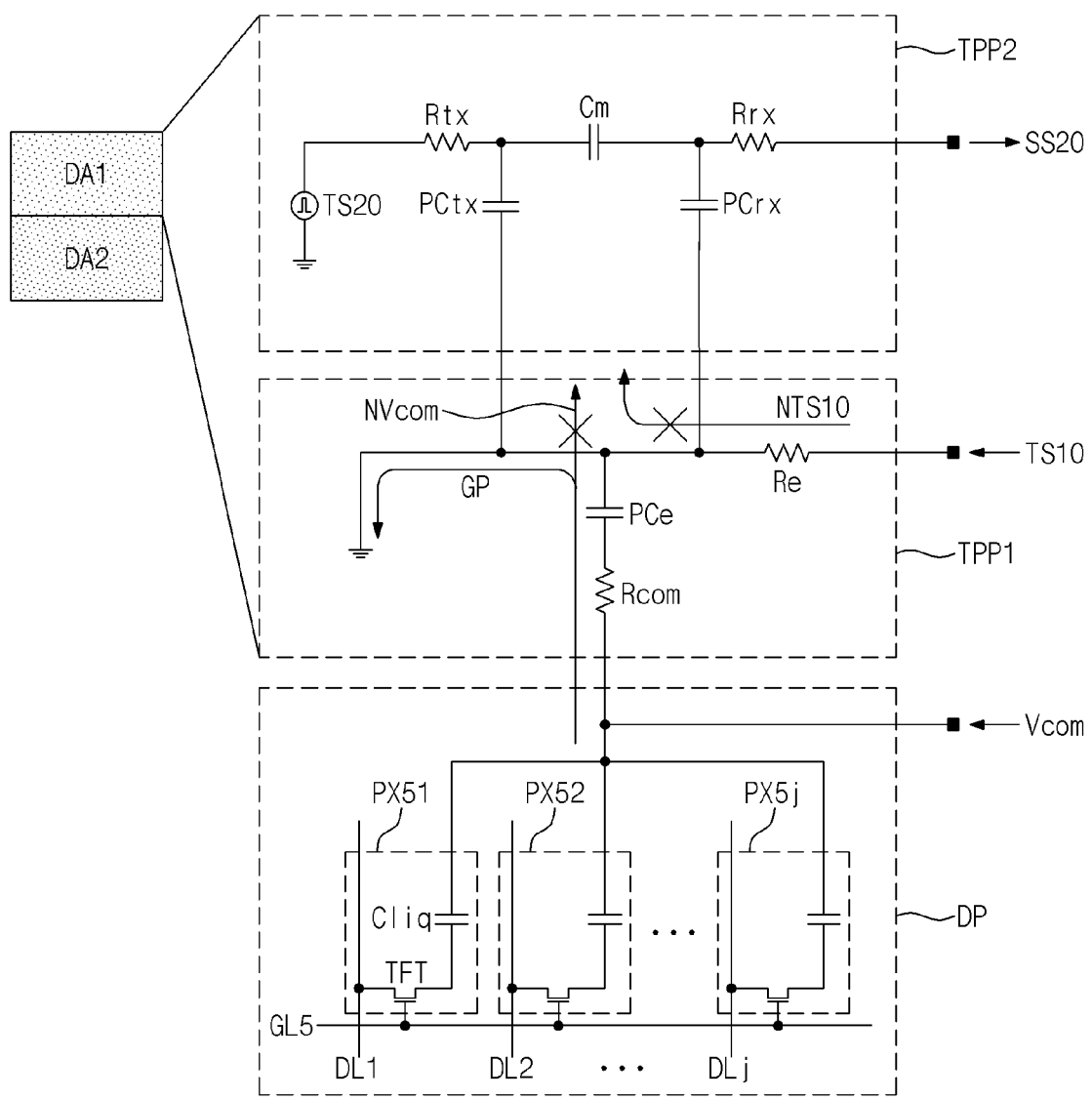
FIG. 65 is an equivalent diagram showing a path through which a noise is removed in a display device according to exemplary embodiments of the present disclosure.

FIG. 63 is an equivalent diagram showing a path through which noise is generated, which exerts an influence on a second touch sensor. FIGS. 64A and 64B are graphs showing a relation between the noise and the detection signal. FIG. 65 is an equivalent diagram showing a path through which a noise is removed in a display device according to exemplary embodiments of the present disclosure.

FIG. 63 shows an equivalent circuit diagram of the second touch part TPP2 (refer to FIG. 59B) including the first touch electrodes TE1(1) to TE1(k) and the second touch electrodes TE2(1) to TE2(r). In addition, FIG. 63 shows a path of noise NP that exerts an influence on the second touch part TPP2. A first resistor Rtx denotes an equivalent resistance of the first touch electrodes TE1(1) to TE1(k) and a second resistor Rrx denotes an equivalent resistance of the second touch electrodes TE2(1) to TE2(r).

A variable capacitor Cm is formed between the first touch electrodes TE1(1) to TE1(k) and the second touch electrodes TE2(1) to TE2(r). An amount of charges charged in the variable capacitor Cm is changed by the second scan signals TS20, which correspond to the second scan signals TS20(1) to TS20(k) shown in FIG. 59B. The variation amount of charges charged in the variable capacitor Cm may be calculated from the level of the second sensing signal SS20, which correspond to the second sensing signals SS20(1) to SS20(r) shown in FIG. 59B.

A first noise NVcom is generated by the common electrode in which an electric potential thereof is influenced by the pixel voltage. A second noise NTS10 is generated by the first scan signals TS10(1) to TS10(p) applied to the first touch coils TC1(1) to TC1(p) of the first touch part TPP1.

The first noise NVcom and the second noise NTS10 exerts an influence to the second touch part TPP2 through a first parasitic capacitor PCtx generated between the first touch electrodes TE1(1) to TE1(k), and the first touch coils TC1(1) to TC1(p) and a second parasitic capacitor PCrx generated between the second touch electrodes TE2(1) to TE2(r) and the first touch coils TC1(1) to TC1(p).

FIGS. 64A and 64B show a noise signal and a second sensing signal SS20, respectively. The noise signal NS is generated by at least one of the first noise NVcom or the second noise NTS10.

As shown in FIG. 64A, when the noise signal NS and the second sensing signal SS20 are overlapped with each other, the second sensing signal SS20 may not be identified. When the level of the noise signal NS is not overlapped with the second sensing signal SS20 and is similar to the second sensing signal SS20, as shown in FIG. 64B, the noise signal NS may be misidentified as the second sensing signal SS20. As described above, when the first noise NVcom and the second noise NTS10 are generated, the touch sensitivity of the second touch part TPP2 is deteriorated.

FIG. 65 shows an equivalent circuit diagram of the first display area DA1 represented during the first period F-1 (refer to FIG. 60). In particular, a pixel row corresponding to a fifth gate line GL5 has been shown in FIG. 65 as a representative example. The pixel row corresponding to the fifth gate line GL5 includes pixels PX51 to PX5j. Each of the pixels PX51 to PX5j includes a thin film transistor TFT and a liquid crystal capacitor Cliq. The liquid crystal capacitor Cliq includes a pixel electrode, a common electrode, and a liquid crystal layer disposed between the pixel electrode and the common electrode.

A third parasitic capacitor PCe is generated between the first touch coils TC1(1) to TC1(p) and the common electrode. The third resistor Rcom represents an equivalent resistance of the common electrode. The fourth resistor Re represents an equivalent resistance of the first touch coils TC1(1) to TC1(p).

During the first period F-1 (refer to FIGS. 60 and 62A), the corresponding first scan signals TS10 (refer to FIG. 65) are not applied to the first group of the first touch coils overlapped with the first display area DA1. Accordingly, the second noise NTS10 is not generated.

The electric potential of the common electrode is varied by the pixel voltages applied to the pixels PX51 to PX5j. The first noise NVcom generated by the variation in the electric potential of the common electrode is grounded by the first group of the first touch coils. The first touch coils included in the first group serve as a noise removal layer of the second touch part TPP2 during the first period F-1. FIG. 65 shows a ground path GP of the first noise NVcom.

As described above, since the first noise NVcom and the second noise NTS10 do not exert the influence on the second touch part TPP2, the second touch part TPP2 may sense the touch event occurring in the first display area DA1 during the first period F-1.

Although not shown in figures, the first touch part TPP1 senses the touch event occurring in the second display area DA2 during the first period F-1. In this case, the noise is not generated in the second group of the first touch electrodes overlapped with the second display area DA2 and the display panel DP.

The first touch part TPP1 senses the touch event occurring in the first display area DA1 during the second period F-2 (refer to FIGS. 60 and 62A). In this case, the noise is not generated from the second group of the first touch electrodes overlapped with the first display area DA1 and the display panel DP. This is because the corresponding second scan signals are not applied to the first touch electrodes included in the second group and the pixels PX of the display panel DP, which are overlapped with the first display area DA1, are inactivated during the second period F-2.

During the second period F-2, the second touch part TPP2 senses the touch event occurring in the second display area DA2. In this case, the equivalent circuit of the display device in the second display area DA2 is as shown in FIG. 65. Therefore, the noise generated from the display panel DP is removed, and the touch sensitivity of the second touch part TPP2 is improved.

In each frame period FRn−1, FRn, and FRn+1 (refer to FIG. 60), the first touch part TPP1 and the second touch part TPP2 scan the first display area DA1 and the second display area DA2, respectively. Accordingly, the first and second touch parts TPP1 and TPP2 may sense the touch event occurring by other input devices. In addition, the first touch part TPP1 removes the noise that exerts the influence on the second touch part TPP2, and thus the touch sensitivity of the second touch part TPP2 is improved.

Figure 66:
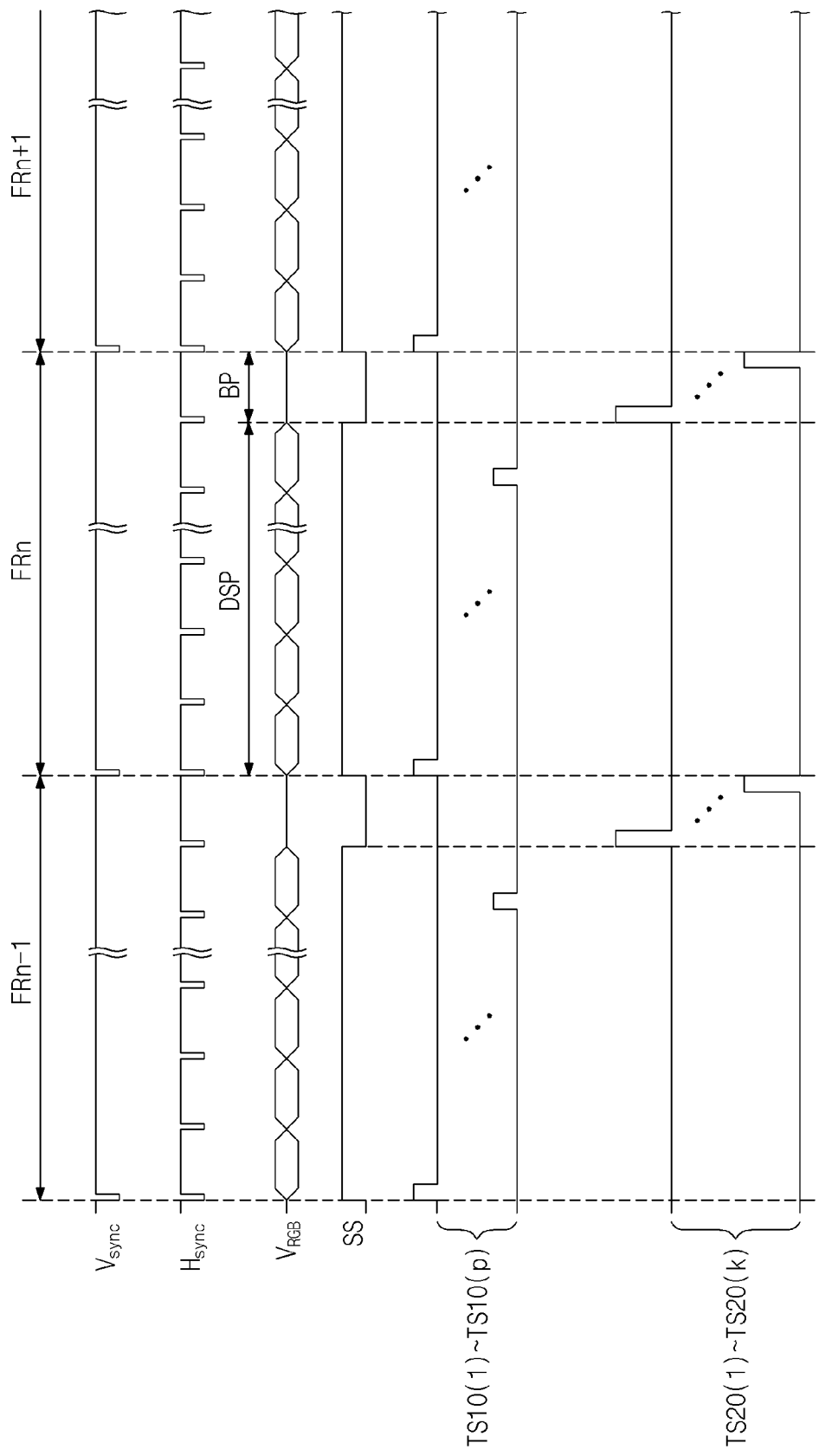
FIG. 66 is a timing diagram showing signals applied to a display device according to exemplary embodiments of the present disclosure.

FIG. 66 is a timing diagram showing signals applied to a display device according to exemplary embodiments of the present disclosure. Hereinafter, a driving method of the display device will be described with reference to FIG. 66.

Referring to FIG. 66, the frame periods FRn−1, FRn, and FRn+1 include the display period DSP and the non-display period BP. During the non-display period BP, the data voltages $V_{RGB}$ are not output, and thus the display panel DP displays a blank image during the non-display period BP.

The selection signal SS has the high level during the display period DSP and has the low level during the non-display period BP. Responsive to the selection signal SS, the first touch part TPP1 (refer to FIG. 59A) and the second touch part TPP2 (refer to FIG. 59B) are turned on or off in different periods.

The first touch part TPP1 is operated during the display period DSP. The first touch part TPP1 that senses the touch event in the magnetic field induction mode is not influenced by the variation in electric potential of the common electrode, which is caused by displaying the image. Thus, the first touch part TPP1 may sense the touch event during the display period DSP without being influenced by the noise generated in the display panel. In some cases, the first touch part TPP1 may be operated not only in the mutual scanning mode but also in a self-scanning mode.

Different from that shown in FIG. 66, the first scan signal output part 410T2 may output the first scan signals TS10(1) to TS10(p) multiple times, e.g., two times, during the display period DSP. Since the first and second display areas DA1 and DA2 are scanned multiple times during the display period DSP, the touch sensitivity may be improved.

The second touch part TPP2 is operated during the non-display period BP. Since the data voltages $V_{RGB}$ are not applied to the pixels during the non-display period BP, the noise is not generated from the display panel DP. In addition, since the first touch part TPP1 is not operated during the non-display period BP, the noise is not generated from the first touch part TPP1. Thus, the touch sensitivity of the second touch part TPP2 is improved during the non-display period BP.

Figure 67:
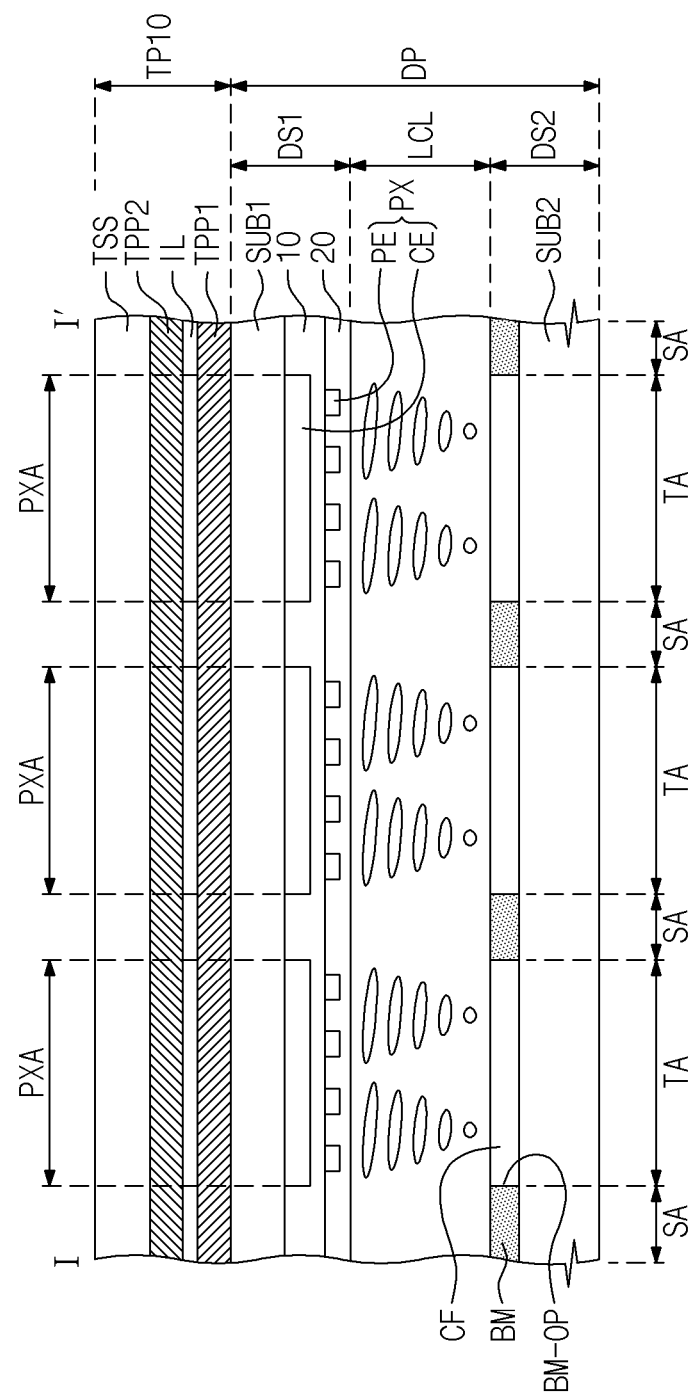
FIGS. 67, 68, and 69 are cross-sectional views showing display devices according to exemplary embodiments of the present disclosure.
Figure 68:
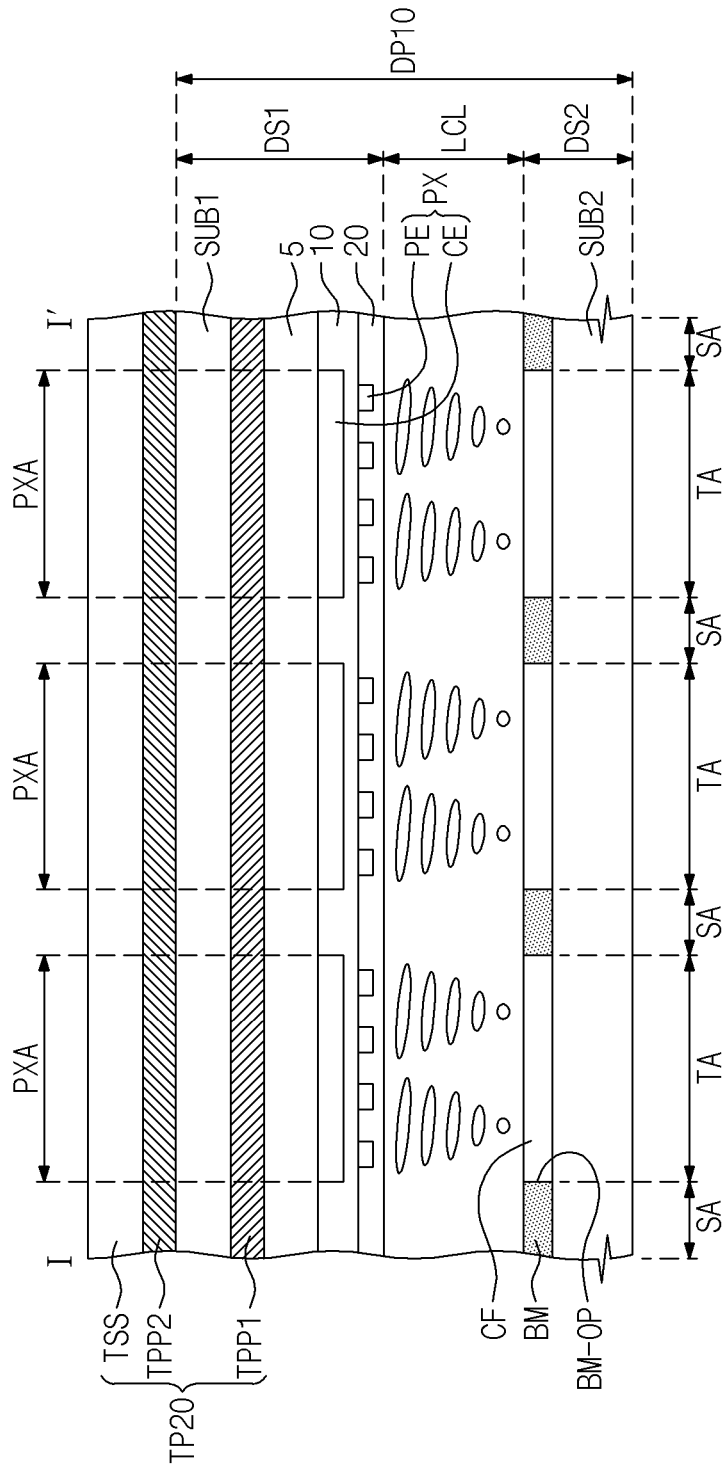
Figure 69:
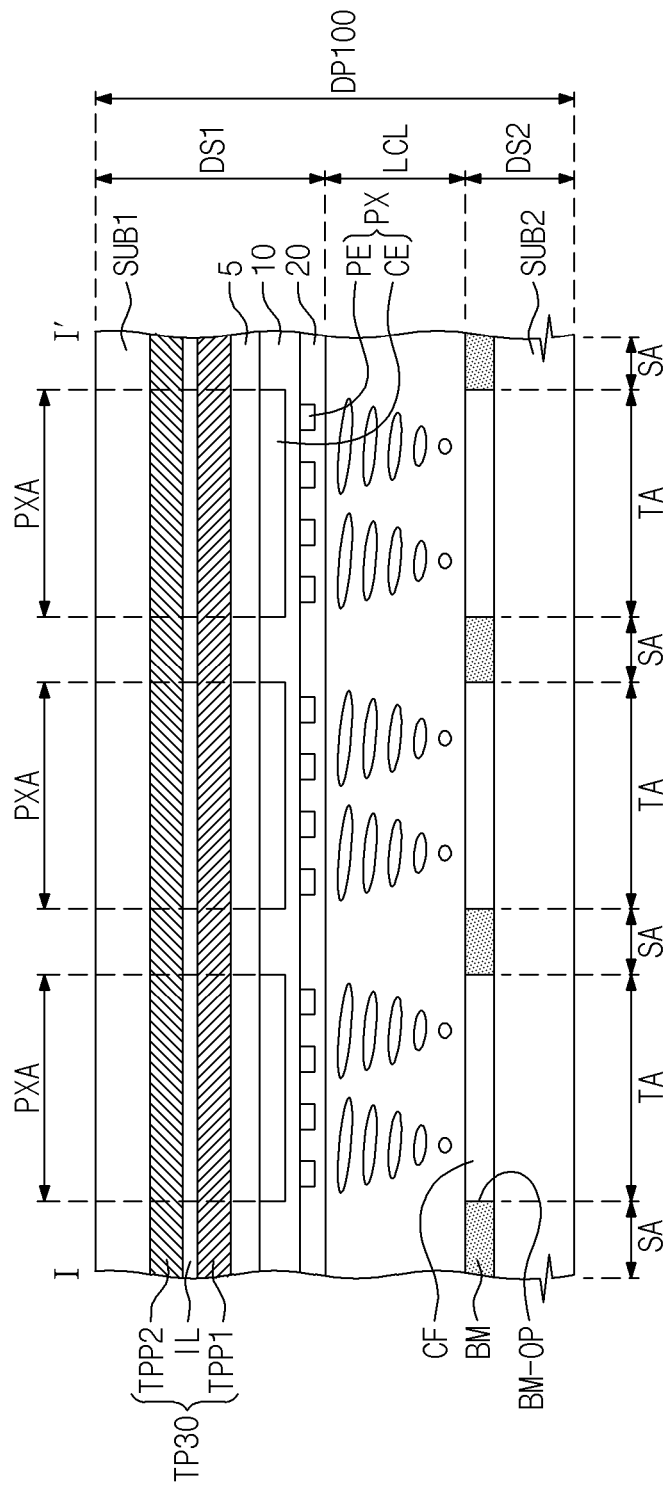

FIGS. 67 to 69 are cross-sectional views showing display devices according to exemplary embodiments of the present disclosure. Hereinafter, the display devices will be described with reference to FIGS. 67 to 69. In FIGS. 67 to 69, the same reference numerals denote the same elements in FIG. 55 to FIG. 66, and thus detailed descriptions of the same elements will be omitted.

Referring to FIG. 67, the first display substrate DS1 is disposed on the liquid crystal layer LCL and the second display substrate DS2 is disposed under the liquid crystal layer LCL. The touch panel TP10 is disposed on the first display substrate DS1. The touch panel TP10 includes the first touch part TPP1, the insulating layer IL, the second touch part TPP2, and the touch substrate TSS, which corresponds to the second touch substrate TSS2 shown in FIG. 57.

The first touch part TPP1 is directly disposed on the upper surface of the first display substrate DS1. Different from the touch panel TP shown in FIG. 57, which is attached to the display panel DP after being separately manufactured, the touch panel TP10 is directly manufactured on the upper surface of the first display substrate DS1. After the first touch part TPP1 is formed on the upper surface of the first display substrate DS1, the insulating layer IL, the second touch part TPP2, and the touch substrate TSS are sequentially stacked.

Referring to FIG. 68, the first display substrate DS1 is disposed on the liquid crystal layer LCL, and the second display substrate DS2 is disposed under the liquid crystal layer LCL. The touch panel TP20 includes the first touch part TPP1, the second touch part TPP2, and the touch substrate TSS, which corresponds to the second touch substrate TSS2 shown in FIG. 57.

The first touch part TPP1 is disposed on the lower surface of the first base substrate SUB1. The insulating layer 5 is disposed under the first touch part TPP1. The pixels PX are disposed under the insulating layer 5. In some cases, the insulating layer 5 may be replaced with the black matrix BM and the color filters CF.

The second touch part TPP2 is disposed on the upper surface of the first base substrate SUB1. The first base substrate SUB1 serves as an insulating layer to electrically isolate the first touch part TPP1 and the second touch part TPP2.

The touch substrate TSS is disposed on the second touch part TPP2. The touch panel TP20 may further include an insulating layer disposed between the second touch part TPP2 and the first base substrate SUB1 or between the second touch part TPP2 and the touch substrate TSS.

Referring to FIG. 69, the first display substrate DS1 is disposed on the liquid crystal layer LCL, and the second display substrate DS2 is disposed under the liquid crystal layer LCL. The first display substrate DS1 includes the first base substrate SUB1, the insulating layers 10 and 20, and pixels PX. The second display substrate DS2 includes the second base substrate SUB2, the black matrix BM, and the color filters CF.

The touch panel TP30 includes the first touch part TPP1, the insulating layer IL, and the second touch part TPP2. The first touch part TPP1, the insulating layer IL, and the second touch part TPP2 are disposed on the lower surface of the first base substrate SUB1.

The second touch part TPP2 is disposed on the lower surface of the first base substrate SUB1 and the insulating layer IL is disposed under the second touch part TPP2. The first touch part TPP1 is disposed under the insulating layer IL. The insulating layer 5 is additionally disposed under the first touch part TPP1. The pixels PX are disposed on the insulating layer 5.

Although the exemplary embodiments of the present disclosure have been described, it will be apparent to those skilled in the art that various modifications and variations can be made in the present disclosure without departing from the spirit or scope of the disclosed subject matter. Thus, it is intended that the present disclosure cover the modifications and variations of the disclosed subject matter provided they come within the scope of the appended claims and their equivalents.

What is claimed is:

1. A display device, comprising:
   a display panel comprising a first display substrate and a second display substrate facing the first substrate, the display panel being divided into a blocking area and a plurality of transmitting areas; and
   a touch panel comprising a first conductive layer and a second conductive layer insulated from the first conductive layer, the touch panel being disposed on one of the first display substrate or the second display substrate that is provided with an input surface, the touch panel comprising:
      a plurality of first touch electrodes configured to receive first scan signals;
      a plurality of second touch electrodes crossing the first touch electrodes and configured to provide first sensing signals according to a variation in capacitance;
      a plurality of first touch coils overlapping with the blocking area and configured to receive second scan signals; and
      a plurality of second touch coils overlapped with the blocking area and crossing the first touch coils and the first touch electrodes, the plurality of second touch coils being configured to provide second sensing signals according to a resonant frequency associated with an input device,
   wherein the first conductive layer comprises the first touch electrodes and one of the second touch electrodes and the first touch coils, and
   wherein the second conductive layer comprises the second touch coils and the other one of the second touch electrodes and the first touch coils.

2. The display device of claim 1, wherein the one of the first display substrate or the second display substrate provided with the input surface comprises a base substrate, and the first conductive layer and the second conductive layer are disposed on one side of the base substrate.

3. The display device of claim 2, wherein the touch panel comprises:
   a first touch substrate disposed on the base substrate;
   an insulating layer disposed between the first conductive layer and the second conductive layer; and
   a second touch substrate facing the first touch substrate, the insulating layer being disposed between the first touch substrate and the second touch substrate.

4. The display device of claim 2, wherein the touch panel comprises:
   an insulating layer disposed on the base substrate to insulate the first conductive layer from the second conductive layer; and
   a touch substrate facing the base substrate, the first conductive layer being disposed on an upper surface of the base substrate.

5. The display device of claim 4, wherein the first conductive layer and the second conductive layer comprise chromium oxide, chromium nitride, titanium oxide, titanium nitride, or alloys thereof.

6. The display device of claim 2, wherein the first conductive layer and the second conductive layer are disposed under the base substrate.

7. The display device of claim 6, wherein the display substrate provided with the input surface comprises:
   a black matrix comprising a plurality of openings corresponding to the transmitting areas; and
   a plurality of color filters disposed in the openings.

8. The display device of claim 7, wherein the black matrix and the color filters are disposed on a lower surface of the base substrate, and the first conductive layer and the second conductive layer are disposed to overlap with the black matrix.

9. The display device of claim 7, wherein the color filters cover the black matrix, and one of the first conductive layer and the second conductive layer is disposed on the color filters.

10. The display device of claim 7, wherein the display substrate provided with the input surface further comprises one of the first conductive layer and the second conductive layer disposed on the black matrix, an insulating layer covering the one of the first conductive layer and the second conductive layer, and the other of the first conductive layer and the second conductive layer is disposed on the insulating layer.

11. The display device of claim 7, wherein one of the first conductive layer and the second conductive layer is disposed on the black matrix, the color filters cover the one of the first conductive layer and the second conductive layer, and the other of the first conductive layer and the second conductive layer is disposed on the color filters.

12. The display device of claim 7, wherein the display substrate provided with the input surface further comprises an insulating layer covering the black matrix, one of the first conductive layer and the second conductive layer disposed on the insulating layer, and
   wherein the color filters cover the one of the first conductive layer and the second conductive layer, and the other of the first conductive layer and the second conductive layer is disposed on the color filters.

13. The display device of claim 1, wherein the display substrate provided with the input surface comprises a base substrate, and
   wherein the first conductive layer is disposed on one side of the base substrate, and the second conductive layer is disposed on a side of the base substrate other than the one side.

14. The display device of claim 1, wherein the first touch electrodes are extended in a first direction and the second touch electrodes are extended in a second direction.

15. The display device of claim 14, wherein each of the first touch electrodes comprises a plurality of first sensor parts arranged in the first direction and first connection parts, each of the first connection parts connecting two adjacent first sensor parts among the first sensor parts, and wherein each of the second touch electrodes comprises a plurality of second sensor parts arranged in the second direction crossing the first direction and second connection parts, each of the second connection parts connecting two adjacent second sensor parts among the second sensor parts.

16. The display device of claim 15, wherein the first touch coils are extended in the first direction and arranged in the second direction, and the second touch coils are extended in the second direction and arranged in the first direction.

17. The display device of claim 16, wherein portions of the first touch coils are partially overlapped with each other and portions of the second touch coils are partially overlapped with each other.

18. The display device of claim 17, wherein portions of the first touch electrodes are disposed in areas defined by the portions of the first touch coils partially overlapped with each other, and portions of the second touch electrodes are disposed in areas defined by the portions of the second touch coils partially overlapped with each other.

19. The display device of claim 16, wherein the first conductive layer comprises the first touch electrodes and the second touch electrodes, and the second conductive layer comprises the first touch coils and the second touch coils.

20. The display device of claim 19, wherein the first sensor parts and the second sensor parts are disposed on the same layer.

21. The display device of claim 20, wherein the first connection parts are disposed on the same layer as the first sensor parts, and the second connection parts comprise a bridge crossing the first sensor parts, an insulating layer being disposed between the first sensor parts and the bridge.

22. The display device of claim 21, wherein the insulating layer comprises a black matrix disposed in the blocking area.

23. The display device of claim 19, wherein the first touch coils or the second touch coils comprise bridges disposed in areas defined by the first touch coils and the second touch coils crossing the first touch coils, an insulating layer being disposed between the bridges and the first touch coils or the second touch coils.

24. The display device of claim 23, wherein the insulating layer comprises a black matrix disposed on the blocking area.

25. The display device of claim 16, wherein the first conductive layer comprises the first touch electrodes and the first touch coils, and the second conductive layer comprises the second touch electrodes and the second touch coils.

26. The display device of claim 16, wherein each of the first sensor parts and the second sensor parts comprises a plurality of openings respectively overlapped with corresponding areas of the transmitting areas.

27. The display device of claim 16, wherein each of the first touch coils comprises a plurality of vertical portions overlapped with the blocking area and extended in the first direction, and each of the second touch coils comprises a plurality of horizontal portions overlapped with the blocking area and extended in the second direction,
wherein the vertical portions are arranged in the second direction to be spaced apart from each other, corresponding areas of the transmitting areas being disposed between the vertical portions, and
wherein the horizontal portions are arranged in the first direction to be spaced apart from each other, corresponding areas of the transmitting areas being disposed between the horizontal portions.

28. The display device of claim 27, wherein each of the first touch coils further comprises a sub-vertical portion connecting different points of portions of the vertical portions such that a resistance of the first touch coils is lowered, and each of the second touch coils further comprises a sub-horizontal portion connecting different points of the horizontal portions such that a resistance of the second touch coils is lowered.

29. The display device of claim 1, wherein one of the first display substrate and the second display substrate comprises:
a black matrix comprising a plurality of openings respectively corresponding to the transmitting areas; and
a plurality of color filters disposed in the openings.

30. The display device of claim 29, wherein the other of the first display substrate and the second display substrate comprises:
a plurality of signal lines; and
a plurality of pixels respectively connected to the signal lines and disposed to respectively correspond to the transmitting areas.

31. The display device of claim 30, further comprising a liquid crystal layer disposed between the first display substrate and the second display substrate.

32. The display device of claim 31, wherein each of the pixels comprises:
a common electrode configured to receive a common voltage; and
a pixel electrode configured to receive a pixel voltage from a corresponding signal line of the signal lines, and a horizontal electric field being formed between the pixel electrode and the common electrode.

33. The display device of claim 29, wherein the black matrix and the color filters are disposed between the first conductive layer and the second conductive layer.

34. The display device of claim 29, wherein the one of the first display substrate and the second display substrate further comprises an insulating layer disposed between the first conductive layer and the second conductive layer.

35. The display device of claim 1, further comprising:
a touch panel driver configured to selectively provide the first scan signals and the second scan signals; and
a touch sensor configured to determine coordinate information of an input position from at least one of the first sensing signals or the second sensing signal.

36. The display device of claim 35, wherein the touch panel driver comprises:
a first scan signal output part configured to sequentially provide the first scan signals in a first operation mode in response to a mode selection signal;
a second scan signal output part configured to sequentially provide the second scan signals in a second operation mode in response to the mode selection signal; and
first switches configured to selectively provide a corresponding first scan signal of the first scan signals and a corresponding second scan signal of the second scan signals to a corresponding first touch electrode of the first touch electrodes and a corresponding first touch coil of the first touch coils.

37. The display device of claim 36, wherein the touch panel driver further comprises second switches configured to receive portions of the first scan signals or portions of the second scan signals and respectively apply the received scan signals to portions of the first touch electrodes or portions of the first touch coils.

38. The display device of claim 36, wherein the touch sensor comprises:
third switches configured to selectively provide at least portions of the first sensing signals from at least portions of the second touch electrodes or at least portions of the second sensing signals from at least portions of the second touch coils in response to the mode selection signal;

a first signal processor configured to convert the at least portions of the first sensing signals to first digital signals;

a second signal processor configured to convert the at least portions of the second sensing signals to second digital signals;

a selector configured to provide the signals output from the third switches to the first signal processor or the second signal processor; and a coordinate calculator configured to calculate the coordinate information of the input position from the first digital signals or the second digital signals.

39. The display device of claim 38, wherein the touch sensor further comprises fourth switches configured to provide the first sensing signals from portions of the second touch electrodes other than the at least portions of the second touch electrodes or the second sensing signal sensed from portions of the second touch coils other than the at least portions of the second touch coils.

40. The display device of claim 35, wherein the touch panel driver further comprises:

a first scan signal output part configured to sequentially provide the first scan signals to the first touch electrodes in response to a mode selection signal; and a second scan signal output part configured to sequentially provide the second scan signals to the first touch coils in response to the mode selection signal.

41. The display device of claim 40, wherein the second scan signal output part is configured to sequentially provide the second scan signals while the first scan signals are sequentially output from the first scan signal output part.

42. The display device of claim 40, further comprising:

a first signal processor configured to convert the first sensing signals to first digital signals;

a second signal processor configured to convert the second sensing signals to second digital signals;

a first selector configured to sequentially provide the first sensing signals from the second touch electrodes to the first signal processor;

a second selector configured to sequentially provide the second sensing signals from the second touch coils to the second signal processor; and a coordinate calculator configured to calculate coordinate information of the input position from at least one of the first digital signals or the second digital signals.

43. A display device, comprising:

a display panel comprising a first display substrate and a second display substrate facing the first substrate, the display panel being divided into a blocking area and transmitting areas; and a touch panel comprising a first conductive layer and a second conductive layer insulated from the first conductive layer, the touch panel being disposed on one of the first display substrate or the second display substrate that is provided with an input surface, the touch panel comprising:

a plurality of first touch electrodes configured to receive first scan signals;

a plurality of second touch electrodes crossing the first touch electrodes and configured to provide first sensing signals according to a variation in capacitance;

a plurality of first touch coils overlapping with the blocking area and configured to receive second scan signals; and a plurality of second touch coils overlapped with the blocking area and crossing the first touch coils, the plurality of second touch coils being configured to provide second sensing signals according to a resonant frequency associated with an input device, wherein the first conductive layer comprises the first touch electrodes and the first touch coils, and wherein the second conductive layer comprises the second touch electrodes and the second touch coils.

* * * * *